United States Patent [19]
Chelcun et al.
[11] 4,332,013
[45] May 25, 1982

[54] CHARACTERIZABLE DISTRIBUTION MEANS IN A SUPERVISORY AND CONTROL SYSTEM

[75] Inventors: Darrell N. Chelcun, Deerfield; Roderick J. Dougherty, Jr., Oak Park; Kenneth P. Belau, Chicago; Robert L. Old, Jr., Northbrook, all of Ill.

[73] Assignee: MCC Powers, Skokie, Ill.

[21] Appl. No.: 149,292

[22] Filed: May 12, 1980

[51] Int. Cl.[3] ........................ G06F 15/20; F28F 27/00
[52] U.S. Cl. .................................... 364/505; 364/418; 364/557; 165/11 R
[58] Field of Search ............... 364/418, 505, 557, 900; 165/11 R

[56] References Cited

U.S. PATENT DOCUMENTS

| | | | |
|---|---|---|---|
| 3,400,374 | 9/1968 | Schumann | 364/200 X |
| 3,972,470 | 8/1976 | Takagi | 364/492 |
| 4,123,796 | 10/1978 | Shih | 364/418 X |
| 4,136,392 | 1/1979 | Westphal et al. | 364/418 X |
| 4,205,381 | 5/1980 | Games et al. | 364/505 |
| 4,215,408 | 7/1980 | Games et al. | 364/505 |
| 4,217,646 | 8/1980 | Caltagirone et al. | 364/418 X |
| 4,234,927 | 11/1980 | First | 364/418 X |

*Primary Examiner*—Edward J. Wise
*Attorney, Agent, or Firm*—Fitch, Even, Tabin, Flannery & Welsh

[57] ABSTRACT

An improved distribution system for use in supervising and controlling temperature and other environmental conditioning equipment of a building or the like is disclosed. The distribution system is used in conjunction with a host or central computer. The distribution system includes one or more distribution panels which communicate with the host computer as well as with various control point apparatus that gather temperature, humidity, and other types of values, or gather status information regarding electrical switch states and the like. Other types of control point apparatus control electric motor starters, motors, or other control equipment for controlling environmental conditions or general energy use. The distribution panels have various function means therein which are capable of receiving digital input signals, providing digital output signals to control point apparatus, receiving frequency analog input signals, pneumatic analog input and output signals, and the like. The function means have the capability of being uniquely characterized with respect to the type of operation that is to be performed and certain function means can also be characterized to selectively provide change of value reporting to the central computer as well as significant change of value reporting. Moreover other function means can be characterized to provide output signal levesl or output pulses depending upon the characterization and such characterization is accomplished by an operator at the central or host computer with no switching or other manipulation being required at the distribution panel.

45 Claims, 10 Drawing Figures

34
TO CONT PT APP 26
A8
126
128
130
RESET
WR TO LATCH / RD
LATCH DATA IN/OUT
132
134
136
138
140
11 ENABLE 3
10 ENABLE 2
9 ENABLE 1
8 ENABLE Φ
7 WRITE TO CHIP
3870 μP
TEST
NC
110
4 MHZ
EXT INT
GND
RESET
STRO
TRI-ST/EN
WR / RD
112
114
116
118
120
124
R1
DB7
DB0
DATA BUS 86
FC RDY
LC RDY
SELECT
RESET
96
98
90
100

(3870)
ENABLE
DATA
ADDR 4
ADDR 2
ADDR 1
INC Φ
DEC Φ
INC 1
DEC 1
INC 2
DEC 2
INC 3
DEC 3
IN Φ
IN 1
IN 2
IN 3
MSB
LSB
RESET
EXT INT
FC RDY
LC RDY
SELECT
RESET
DATA BUS 86
PICKET DIG. GND
PICKET ANALOG GND

FREQ. OUTPUT 1
262
V REF 1
290
-15V
+15V
OSZ
FREQ OUT
DIG GND
I IN
OS1
VREF1
-Vcc
VFC 1
CO
ANAL GND
+Vcc
NINV
INV
Vo TRIG
288
286
284
282
V REF 1
TO BRANCH CONNECTION
V REF 1
280
PNEUMATIC CIRCUIT
INCREASE
DECREASE
+26V
276
278
274
ULN 2803A
INC 1
DEC 1
INC 2
DEC 2
INC 3
DEC 3
INC 4
DEC 4
254
256
258
260

CHARACTERIZABLE DISTRIBUTION MEANS IN A SUPERVISORY AND CONTROL SYSTEM

The present invention generally relates to supervisory and control systems, and more particularly, to systems that are used in association with a central computer for use with heating, air conditioning, energy control and other environmental control equipment that are installed in buildings and the like.

There is a continuing effort to improve and refine systems which efficiently monitor and control the environmental and temperature control equiment in buildings and the like. There is also a continuing effort in controlling such heating, ventilating and air conditioning equipment in a manner whereby operating efficiency in terms of energy consumption is maximized and maintenance labor costs are minimized through the use of automation and computer control. It is also quite apparent that with the increased sophistication of the systems that are being designed, that problems of training and employing knowledgeable field technicians is increasingly important, and such field personnel must either be highly trained or merely trained to perform tasks which may not be fully understood by them in a very real sense. Since it is economically desirable to have a system that does not require extraordinarily highly educated field personnel, it is desirable to effectively reduce if not virtually eliminate the functions that are performed in the field and therefore reduce the levelof expertise required by the field installation and maintenance personnel. It is also therefore desirable to have a system wherein the field located distribution panels can be relatively uniform from a standpoint of physical hardware and yet have a diversity of functions which can be performed by unique characterization of the various types of functions that are performed in the various distribution panels. When the specific characterization operations are effectively removed from the responsibility of the technicians that are installing the equipment in the building or the like, there is less likelihood of incurring increased labor costs caused by incorrect characterization, incorrect placement of various types of circuitry or circuit components, as well as lost time experienced by the field personnel in attempting to analyze and perform the type of characterization that may be required.

Accordingly, it is an object of the present invention to provide an improved system of the foregoing type which specifically includes improved distribution means wherein individual characterization of the various types of functions that are carried out by the hardware and circuitry that is located in remote distribution panels need not be performed by field personnel at the location of distribution panels.

It is yet another general object of the present invention to provide distribution means for use in a system of the foregoing type wherein the characterization or definition of specific functional operations that are to be performed by individual control point apparatus can be carried out by instructions that are provided by an operator from a central or host computer.

Still another general object of the present invention is to provide a distribution means in a system of the foregoing type that is capable of being configured to meet the specific needs of the equipment or function that is carried out in the immediate area and which is contained in a nearby distribution panel. This involves incorporating hardware on individual printed circuit boards that are of several categories and which control specific categories of control point apparatus and wherein each type or category of such printed circuit boards are uniform in their construction, but which can be uniquely characterized or operationally defined in terms of the specific function that is to be carried out with respect to each and every control point apparatus that is associated therewith.

Yet another object is to provide distribution means for use in a system of the foregoing type having a central or host computer that is particularly adapted for easy maintenance in that a particular category of function that is performed by a category of function means can be easily removed and replaced by a substitute function means if it is malfunctioning and this can be done by a technician that is not intimately familiar with the particular installation or system configuration that he is servicing.

Other objects and advantages of the present invention will become apparent upon reading the following detailed description, while referring to the attached drawings, in which.

Figure 1:
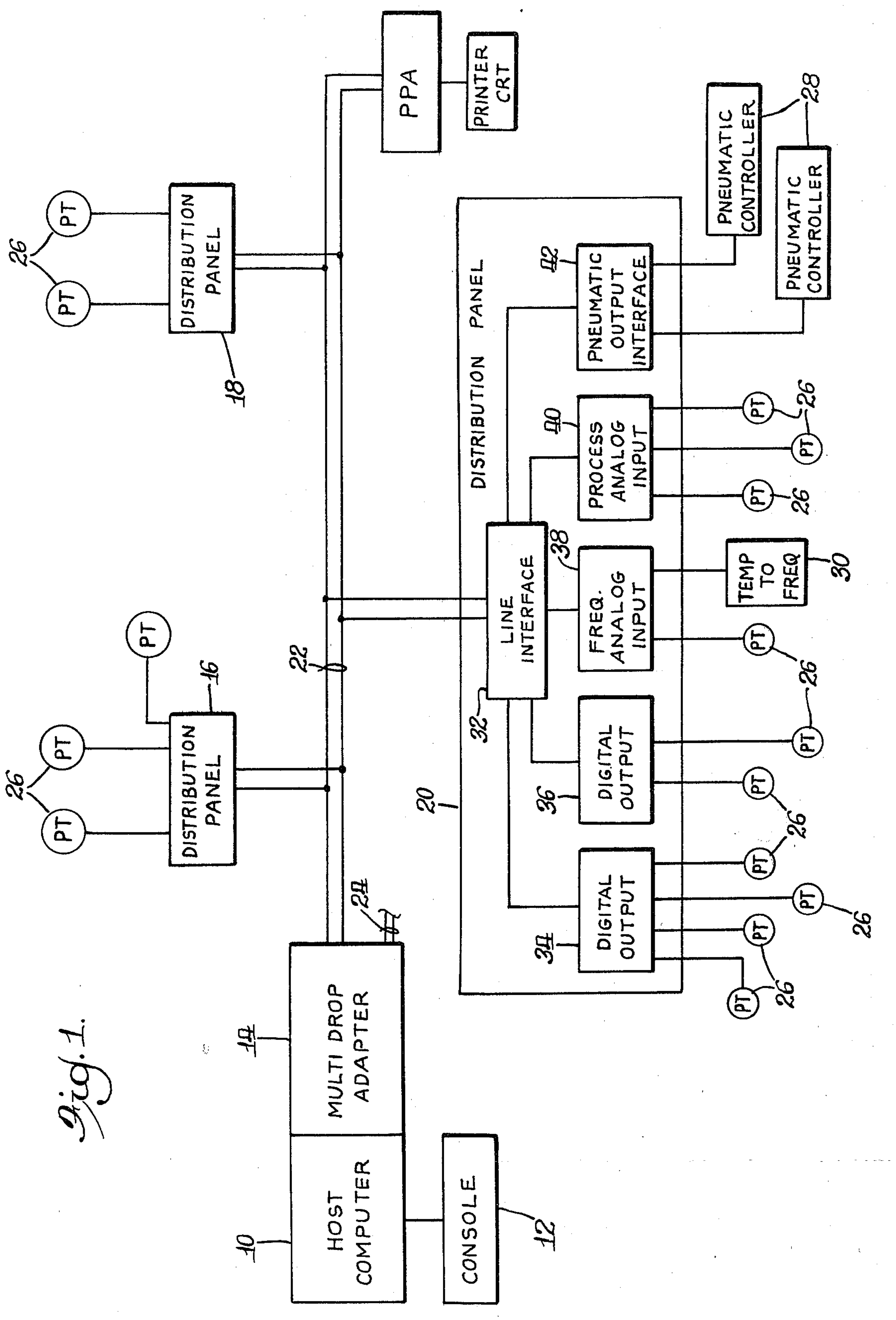
FIG. 1 is a broad block diagram of the system embodying the present invention.

Turning now to the drawings and particularly FIG. 1, there is shown a block diagram of apparatus embodying the present invention shown together with a central control computer which may include a general operating console which maintenance or operating personnel utilize to supervise and control the operation of heating, ventilating, air conditioning equipment, as well as other environmental control apparatus that may be a part of the physical plant of a building. As was alluded to herein, there is an increasing tendency to incorporate supervisory and control systems (also referred to as automated control systems) in buildings that are smaller that what had previously been regarded as the size of buildings that were economically cost-justifiable in terms of providing such sophisticated control. Because of the ever increasing cost of energy and of maintenance or building engineers, the incorporation of supervisory and control systems that are computer controlled or computer assisted continues to proliferate. Moreover, if a series of building in one general location are controlled, i.e., a college campus or a school system comprised of several buildings, a single computer based system may be used to reduce energy and labor costs.

The basic configuration of the system embodying the present invention has a central control computer 10 that is connected to a console 12, and to circuitry identified as a multi-drop adaptor 14 which is connected to one or more distribution panels 16, 18 and 20 by means of a two wire communication trunk 22. The central control computer is preferably a type PDP 11 computer, Model No. 11/34 as manufactured by the Digital Equipment Company of Maynard, Massachusetts. However, the computer can also be any Digital Equipment Company CPU that operates using the RXS-11/M real time operating system. The multi-drop adaptor 14 may have additional trunks such as trunk 24 which extends to other distribution panels in a similar fashion. The distribution panels are in turn interconnected with control point apparatus that may perform many diverse functions, such as either acquiring information or controlling equipment, based upon commands that are provided to the control point apparatus. In this regard, it should be appreciated that such control point apparatus may carry out data acquisition functions such as sensing temperature, humidity, the state of an electrical contact in a relay, motor starter or the like, as well as the position of a rotary shaft as may be employed in a damper controller and the like. On the other hand, the control point apparatus may be used to implement commands from the central control computer and as such may control a damper motor for effecting a change in the volume of air that is moving through a duct, starting or stopping electrical motors of heating and air conditioning equipment, effecting a change in the pressure of a pneumatic control line and the like. Thus, the distribution panels 16, 18 and 20 broadly interconnect the control point apparatus 26 with the distribution panel which in turn communicates with the central computer 10 via the two wire communication trunk 22. In addition to the control point apparatus that are identified by the number 26, other particular control point apparatus may be included, such as a pressure to frequency converter 28 and a temperature to frequency converter 30.

The distribution panels, such as panel 20, perform input and output functions and the communication trunk 22 is connected to a line interfacing means 32 which in turn communicates with various ones of different categories of function means which can be one of five different types or categories of function or operation. More particularly, each distribution panel may have one or more of each of these categories of function means which can include a digital output function means 34, a digital input function means 36, a frequency analog input function means 38, a signal level or process analog input function means 40 and a pneumatic output interface function means 42. Each of these function means is preferably fabricated of a printed circuit board with electrical components and integrated circuit chips attached to it, and the function means is preferably releasably connectable to a larger printed circuit board, hereafter referred to as a "mother" board and the line interfacing means 32 is also preferably releasably connected to the mother board in a similar manner. The exact construction of such an arrangement is set forth in detail in U.S. application Ser. No. 154,114 filed May 28, 1980, and entitled Backplane Assembly with Pickets, and assigned to the assignee of the present invention. The specific teachings of the above-referenced application is specifically incorporated by reference herein.

Virtually all of the functions that are performed by the control point apparatus in the system of the present invention can be performed by the five different categories of function means, each of which can be inserted into the mother board of the distribution panel as required by the control point apparatus that is located in the vicinity of the particular distribution panel 20. The mother board is also adapted to receive more than one of a particular category of function means and a particular panel may not have all five categories of function means therein. Of particular significance is the fact that each category of function means is uniform in its design and construction and requires no modification by field personnel for its operation. Only the line interfacing means requires minimal field manipulation to set a unique address code in the circuitry which may be easily done by manipulating a six bit binary switch or the like.

Since all function means of a particular category are identical, if a malfunction occurs in any one of them, all that is necessary for a technician or maintenance person to do is to replace the function means in the distribution panel. Since the address of the particular function means is effectively determined by the slot in which the function means is inserted, the newly inserted function means will automatically have the same address as the replaced function means. It is also advantageous from a manufacturing standpoint to have uniform design and construction for each category of function means since this facilitates easy inventory and control. Moreover, spare function means can be maintained at the building location if desired, so that replacement can be immediately accomplished by maintenance personnel that are employed by the building, as compared to manufacturing field service technicians that would otherwise have to be called in to perform diagnostic and maintenance work. It should be understood that just becuase the various categories of function means require no field manipulation, it does not mean that they are not individually capable of operating in different, diverse and varying manners with respect to the individual control point apparatus that is associated with each of the other categories of function means. On the contrary, one of the most significant desirable aspects of the present invention is the fact that each of the various categories of function means can operate in different functional manners with respect to each control point apparatus that is operatively connected to it.

The individualization or characterization of the function means controlling each control point apparatus is done by specific commands that are carried out by an operator at the console 12 through the use of the central control computer 10 and such characterization or down line loading of the function means can be easily carried out when the particular category of function means is inserted into the mother board, either originally or upon replacement of a malfunctioning function means. This aspect of the system of the present invention is also desirable in that the manner in which a particular function means controls a particular control point apparatus can be changed by an operator via the console and central controller computer as desired. Additionally, critical values for set points and the like can also be easily changed in the same manner as is necessary. The characterization is accomplished without performing any manual operation or structural switching or the like at the location of the distribution panel.

Each of the categories of function means as well as the interfacing means 32 has as a component thereof a processing means, such as a microprocessor or microcomputer, which includes memory into which status and other information is stored. The processing means and memory means also receives information regarding the characterization that is performed with respect to each of the control point apparatus and the various types of messages that are received and transmitted among the function means, the interfacing means and the central control computer is governed by communication protocol that will now be broadly described. The information must be exchanged between the central control computer and the various distribution panels over one or more serial data paths such as the trunk 22 and the protocol used to accomplish the exchange of information is by way of a master polling the slave on the serial trunk. The central control computer sends a command message and expects to receive a response message within a very short time. The communication protocol from the central control computer to the interfacing means 32 is one wherein the messages are sent in units of bytes with each byte consisting of a start bit, eight data bits, with the least significant bit appearing first, and a stop bit. The messages consist of a one byte message synchronization character, a one byte count of the number of bytes that are remaining in the rest of the message, a one byte address for the particular distribution panel that the message is to be addressed to, a 1 to 252 byte data field and a two byte field containing a cyclic redundancy check number with the low order byte appearing first. The maximum number of data bytes in the messages is restricted by the eight bit count byte and the minimum number of data bytes should be one since there is no reason to send no data. With respect to the communication protocol within the distribution panel, there is a need to exchange information between the interfacing means and the function means over a byte serial communication link and this communication link runs across the previously mentioned mother board backplane. It preferably consists of eight bidirectional data lines, two unidirectional hand-shaking lines which comprise an interfacing means ready signal (LCRDY) that is sent to the function means and a function means ready signal (FCRDY) that is sent to the interfacing means and one additional address line from the interfacing means to each of the function means. The interfacing means is the master and it polls each function means for information by sending a command to the function means who executes it and returns an appropriate message to the interfacing means. It is preferred that one byte every 200 microseconds is the maximum transfer rate and a command message for setting a digital output function means control point apparatus would pass eight bytes of data between the interfacing means and the digital output function means and would take only about 2.3 milliseconds. It is preferred that the message from the interfacing means to one of the function means comprises three fields with the first field having a one byte count of the bytes remaining to be sent, the second field containg the data to be exchanged and the last field providing a check sum.

In terms of the sequence of events that occur, in the event the interfacing means starts the communication sequence, it puts the count byte on the data bus and sets its hand-shake line (LCRDY) active and selects the appropriate or target function means which causes an external interrupt to occur in that function means. Upon selection, the function means saves its current state and devotes its resources to communicating with the interfacing means. The function means reads the data bus, resets its ready line (FCRDY) and then watches the interfacing means ready line (LCRDY). The interfacing means sees the function means hand-shake line change, puts the next byte of data on the bus and also changes the state of its hand-shaking line. When the function means reads the last byte of the command message it sends an acknowledge by way of the ready line (FCRDY) and waits for the interfacing means ready line (LCRDY) to change, indicating bus turnaround.

When the interfacing means sees the acknowledge signal it again turns the bus around to receive and it switches its ready line active (LCRDY). After the function means sees the interfacing means ready line change indicating the bus has turned around, it puts the count of its response message on the bus, turns the bus to transmit and switches its function card ready line active (FCRDY). The interfacing means picks up a byte of the message off of the bus and switches its ready line (LCRDY) each time it sees the function card ready change (FCRDY) until all bytes are transferred. The interfacing means holds the acknowledgement of the check sum on the bus for ½ millisecond and then deselects the bus. The function means then returns from the external interrupt as soom as it sees the interfacing means acknowledge the check sum byte.

The protocol for the central control computer communicating with a particular distribution panel is also eight bit byte oriented with the central control computer sending a command to individual distribution panels wich executes them and returns a response to the central computer. Each panel must be individually accessed and host commands also consist of three fields. The commands comprise one byte of command field, one byte of address field which preferably has the high order four bits indicating the particular slot address in the distribution panel and the low order four bit representing the particular control point apparatus address. It should be apparent that for some commands, only the function means address is significant. The interfacing means knows which function means to select from the slot address and knows from the response of the function means whether a particular function means occupies more than one slot in the mother board. The data field for a central computer command is of variable length depending upon the command and the low order byte of any multi-byte field is transmitted first.

The response from a distribution panel may contain one or more fields depending upon the command from the central control computer. The first field of the response message is an error indication field which, if the command was correctly received and executed by the distribution panel, will contain an acknowledgement in one byte. However, if there is some error detected in the command, a field containing a one byte negative acknowledgement followed by another byte containing an error code will be transmitted. Possible errors may include information that the function means needs to be characterized, that the command is invalid or that there is no change of status information in the distribution panel. When the central control computer requests change of values in the control point apparatus that sends such information, it will provide a command to the interfacing means 32 requesting such change of value information and the interfacing means will respond with an error indication field and one or more three byte entries in the data field. The first byte will be the control point apparatus address and the other two bytes are the associated data with the low order byte appearing first. If the high order bit of the control point apparatus address is set, the data for the point is not defined as change of value information but is an indication of some other condition being recorded, such as a function means failure or that a pneumatic output interface cannot control an associated control point apparatus, for example. The specific error code is contained in the succeeding two bytes of data.

Broadly stated, the various commands provide complete control of the function means in the distribution panel and each category of function means can be appropriately characterized. Function means which provide input signals may be enabled or disabled for change of value recording and significant change of value limits may be set for each analog input, whether it be a frequency analog input control means 38 or a process analog input function means 40, as well as a pulse accumulator point which is a particular characterization of the digital input function means 36 and which will be hereinafter described. Function means which provide input data may be read and function means which provide output signals may be written into the memory of the processing means associated with the function means. It is preferred that up to 83 changes of status in a distribution panel may be returned to the central control computer as a result of a single command. If the central control computer receives a garbled response from a distribution panel it can have the distribution panel repeat its last response and avoid sending redundant commands to a control point apparatus.

Function means also respond to other commands which are generated by the interfacing means 32. For example, at power up initialization, the interfacing means sends a "who-are-you" command to each slot in which a function means printed circuit board can be connected, requesting what category of function means is present. The interfacing means will also report the failure of a function means to the central computer once as a change of value and after the central control computer acknowledges the change of value the interfacing means will continually select failed function means to see if they have returned. The first instance the central control computer checks for a change of value after the function means returns to operation, the function means will make a characterization request. Until the central control computer characterizes a single control point apparatus on a function means, the function means will request characterization in response to every change of value request the central control computer makes of the particular distribution panel.

To summarize, the central control computer communicates with each function means and with the interfacing means in a distribution panel and the interfacing means often merely passes information between the central control computer and the function means. Some commands go from the central control computer to the interfacing means and some go from the central control computer to a function means and finally some commands go from the interfacing means to a function means. The details of the protocol that is used to characterize specific categories of function means as well as to amplify on the protocol as it relates to the interfacing means will be set forth hereinafter with respect to a description of the details of the various categories of function means.

The flexibility of each of the categories of function means in terms of the diverse functional operations that can be carried out by each of them, depending upon the individual characterization that is performed with respect to each control point apparatus associated with the function means, will become apparent from the following description of each of them.

Turning initially to the digital output function means 34, each of the outputs that are connected to a control point apparatus 26 can be individually characterized as to whether it is a pulsed output or a level signal output. Thus, if a particular output is individualized or characterized by an operator at the console 12 utilizing the central control computer 10, the output command to the particular output that is provided by the digital output function means 36 can be a pulse for triggering electric motor controllers or the like which require a momentary contact pulse to switch them on or off, or it can be a level state, i.e., a high or low voltage signal. Moreover, a simple command from the console 12 can change the characterization of the digital output function means with respect to each of the individual points and can change a pulse output to a level state output as well as change a level state output to a pulse state output. The digital output function means is characterized using the above-mentioned protocol wherein the characterization information comprises one byte of command, one byte of point address and one byte for characterizing pulsed or level states with bit zero being set for a pulsed control point apparatus and reset for a latched point. Once the particular control point is characterized as a pulsed output, then a pulse is sent as a logical 1. The digital output function means must be provided with a logical 1 from the central control computer in order for the point to issue a pulse output.

Turning now to the digital input function means 36, it has the capability of being characterized to function either as a pure digital input with respect to any of the control point apparatus that is operatively associated with it or it can be characterized to function as a pulse accumulator. As a pulse accumulator it functions as a counter. If a control point apparatus is characterized as a pulse accumulator, then it may be characterized to provide reporting for change of value reporting when enabled and it may also be enabled to provide only significant change of value reporting if desired. To characterize the digital input means, the characterization commands include one byte indicating a command, one byte identifying the particular control point apparatus and one byte which characterizes the control point apparatus as being either a straight digital input or a pulse accumulator with or without change of value reporting. In the last byte which characterizes the particular control point apparatus, bit 6 is set if the point is to be an accumulator. Bit 2 is set if the point is enabled for change of value reporting and bit 1 is set if the point accumulator is to count both rising and falling edges of an input signal and is merely reset to count only one edge. If significant change of value reporting is to occur, a two byte significant change of value amount is defined with the second byte being zero when the point is a pulse accumulator. If the particular control point apparatus is characterized as a pulse accumulator with significant change of value, then a disable point command will disable change of value reporting.

Referring now to the analog input function means, both the frequency analog input function means 38 and the process analog input function means 40, have the same basic operation as far as characterization commands and the like that are carried out are concerned and they can therefore be described together and referred to as analog input function means. The only difference between the two is that the frequency analog input function means has an input signal applied thereto from a control point apparatus that has the analog value converted to a signal of particular frequency by an appropriate converting means which converts the condition sensed to a frequency variable signal. In this regard, a temperature to frequency converter 30 converts a sensed temperature to a variable frequency signal and a circuit for performing this conversion is shown in detail in FIG. 9 and will be hereinafter described. The process analog input function means 40 receives from the control point apparatus an analog input signal wherein the current level varies within a predetermined range as opposed to a variable frequency input signal.

The analog input function means can be characterized with respect to each control point apparatus that is operatively connected thereto to be enabled for change of value reporting so that it will report to the central control computer when enabled for any change in the analog value of the particular control point apparatus. It can also be disabled from change of value reporting if desired, whereupon the change of value is stored in memory and is transmitted only when a change of value request is made. However, an operator can request the value of any point by operating the console to obtain the reading even though the point is disabled from change of value reporting. The analog input function means can also be characterized to operate for significant change of values with the amount of the significant change of value being individually defined or specified for each of the control point apparatus. If the value of the input changes only minimally, i.e., no greater than the amount of change that is defined for that control point apparatus, then any lesser amount of change will not be reported to the central control computer. However, if the amount of change in the input exceeds the defined deviation and therefore becomes a significant change of value, then it will be transmitted to the central control computer.

In terms of commands that are needed to characterize the analog input function means, each control point apparatus is characterized with a one byte command followed by one byte defining the control point apparatus number, an enable-disable command for change of value reporting comprising one byte, with the bit zero being set if it is enabled for change of value reporting. If the particular point is to be characterized for significant change of value operation, there will be two bytes of information with one byte providing the significant change of value number and the particular significant bits can be provided as needed with respect to a particular application of the system.

To reset the significant change of value data an operator can enter a new value for the particular control point apparatus significant change of value number by addressing the control point with one byte of command, one byte of the control point apparatus address number comprising the slot address in the distribution panel with the four high order bits and the point address in the low or four bits in the significant change of value data is then contained in two additional bytes of data. To enable or disable a control point apparatus from change of value reporting, one byte of command followed by one byte of the control point apparatus address followed by one byte whose low order bit is set if the point is to be enabled need merely be sent. When the central control computer requests a reading of the analog input values of a particular distribution panel, the panel will respond by sending a one byte acknowledge, one byte of the control point apparatus address followed by two bytes of analog input data with the low order byte occurring first.

The pneumatic output interface function means 42 is, in a sense, the most functionally flexible of the various function means because it can be characterized essentially as an input device or as an output device. More particularly, it can be characterized as a controller in that it can be enabled or disabled for control of a pneumatically controlled damper motor or the like or a local controller wherein a piston arrangement for controlling a control valve or the like is controlled by supply air and the particular set point can be varied within the range of preferably 3 to 15 p.s.i. The pneumatic output interface can also be characterized as an input device which, when so characterized can be enabled for operation to provide change of value reporting, or not provide such change of value reporting when disabled. If it is enabled for a change of value reporting, it also can be characterized to provide significant change of value reporting in a manner similar to the significant change of value reporting that is carried out by other of the function means having this functional capability. When characterized as an input device, it may be connected to pressure to frequency converting circuitry 28 which is shown in FIG. 1 and in detail in FIG. 8. In terms of the protocol for characterizing the pneumatic output interface function means, it comprises one byte of command, one byte defining the control point apparatus address, and enabling data of one byte wherein bit zero is for a change of value reporting enable and bit one is for controller enable. If significant change of value operation is to be carried out, there are two bytes of significant change of value and the significant bits can be defined in a manner best suited for the particular system application. If a set point is to be changed to a new value when the pneumatic output interface function means is characterized as a controller, the protocol for changing the value is carried out by a single byte of command, a single byte defining the particular control point apparatus address and two bytes for defining the new set point value.

While the foregoing provides a general description of the operation of the system of the present invention and also describes the protocol that is used to communicate among the various components of the system, including the central control computer means, the interfacing means and the various function means, the detailed circuitry of the various function means, interfacing means, as well as the pressure to frequency and temperature to frequency converters is shown in FIGS. 2–10 which comprise detailed electrical schematic circuit diagrams for the various components of the system.

Figure 2:
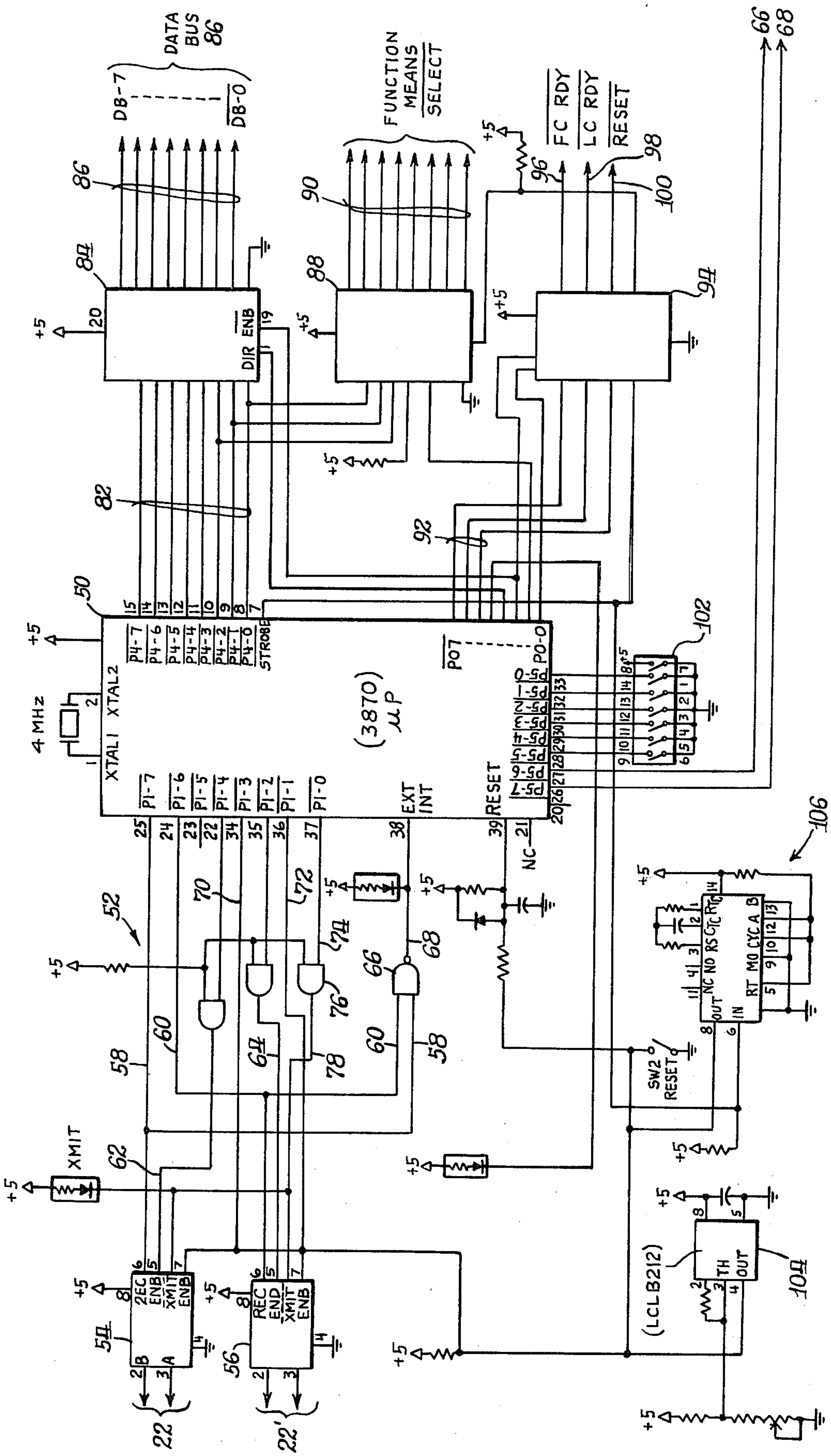
FIG. 2 is a detailed electrical schematic diagram of a portion of the apparatus of the present invention and particularly illustrating the circuitry for the interfacing means that is located in each of the distribution panels shown in the block diagram of FIG. 1.

Turning initially to the electrical schematic circuit diagram of the interfacing means 32 shown in FIG. 2, it has a microprocessor 50 with various eight bit ports, P0, P1, P4 and P5 shown as being utilized in the interfacing means with the port P1 being connected through logic, indicated generally at 52, to differential transmitter and receiver circuits 54 and 56 which are in turn connected to the trunk lines 22 that extend from the particular distribution panel in which the interfacing means is located to other interfacing means in other panels, as well as to the multi-drop adaptor means 14 associated with the central control computer 10, all of which is shown in the block diagram of FIG. 1. The system may desirably incorporate redundant trunks which is particularly illustrated in FIG. 2 with the lines 22' comprising the redundant trunk. When either of the receiver-transmitters 54 or 56 is enabled to receive, the data is received on line 58 from the receiver-transmitter 54 and on line 60 from the receiver-transmitter 56. If information is present on either of the trunks 22 or 22' and appears on one of receive lines 58 or 60, assuming that corresponding enable lines 62 or 64 are active, the signal on the receive lines will trigger an external interrupt via gate 66 and line 68 and will cause the processing means 50 to enable the receiver-transmitter so that the message will be received. If information is to be transmitted onto the trunk 22 or 22', then the processing means 50 will activate a transmitter enable line 70 for the receiver-transmitter 54 or a transmitter enable line 72 which enables the receiver-transmitter 56 so that the information can be transmitted from the processing means via line 74, gate 76 and line 78 to the enabled receiver-transmitter. The data is serially transmitted onto the trunk, but is applied to the processing means 50 via eight parallel data lines 82 which are connected to a tri-state driver 84 which has eight data bus lines 86 which extend along the previously mentioned mother board and which are interconnected to the data bus lines of all function means that are connected in the system. Three of the data bus lines 82 also extend to another tri-state driver 88 which has eight select lines 90, each of which is connected to an individual one of the function means and the three lines 82 define a three bit address for activating one of the select lines for communicating between the interfacing means and the particular addressed function means. The processing means 50 also has output lines 92 which extend to yet another tri-state driver 94 which provides the control signals FCRDY on line 96, LCRDY on line 98 and the RESET signal on line 100. These lines extend to each of the function means and control the operation of the bidirectional bus communication in the manner previously described with respect to the protocol operations. A six bit binary switch 102 is used to provide a unique identification address for the interfacing means. A power failure monitor circuit 104 is provided to reset the processing unit 50 when the D.C. power falls below a predetermined level and thereby protects the information in the random access memory of the processing means 50. A watchdog timer, indicated generally at 106, is also provided.

Figure 3:
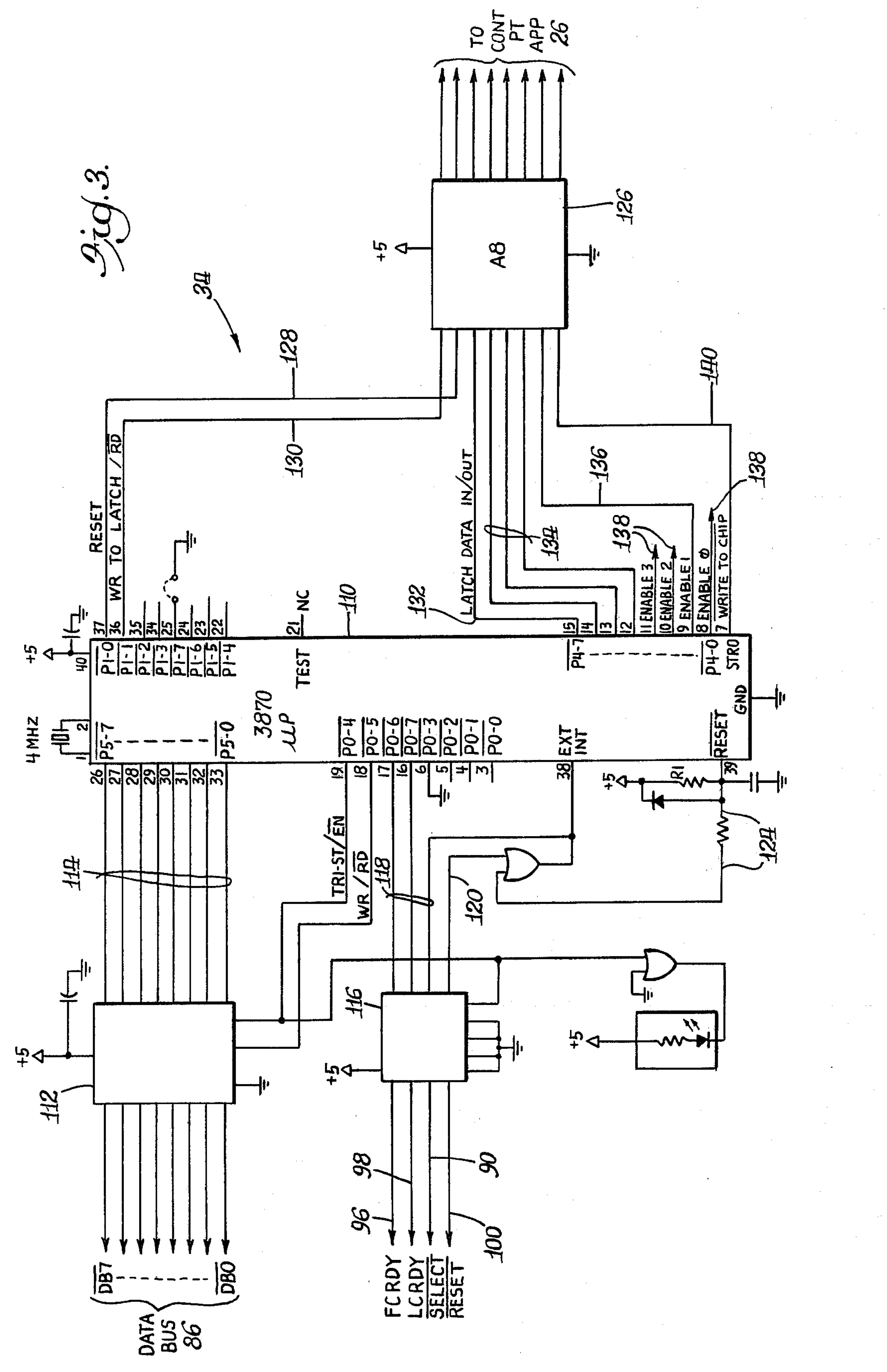
FIG. 3 is a detailed electrical schematic diagram of one of the categories of function means of the present invention and particularly illustrating the circuitry of the digital output function means.

Turning now to the digital output function means shown in detail in the electrical schematic circuit diagram of FIG. 3, it is shown to comprise a processing means 110 to which the data bus lines 86 are connected via a tri-state driver 112 and interconnecting lines 114. The control line FCRDY 96, LCRDY line 98 and SELECT line 90 are connected to the processing means 110 via another tri-state driver 116 and lines 118 with the RESET line 100 extending via the tri-state driver 116 and a line 120 to a dual OR gate integrated circuit 122 which has output line 124 extending to the RESET input of the processing means. The output of the processing means that extends to the various control point apparatus are shown on the right side of the processing means 110 and includes an eight bit latch 126 that may be one of four of such circuits that may be utilized with a single digital output function means. Only one of such circuits is shown in FIG. 3 for the sake of clarity and is typical of the interconnection and operation. A RESET line 128 as well as a write control line 130 extends to each latch 126 and a data line 132 also extends to each latch 126 for writing the appropriate data into the latch with the address being determined by three address lines 134 that extend to each latch 126. An enable line 136 extends to the latch 126 and other enable lines 138 are similarly provided for connection to other of the latches 126 that are not shown. A write control line 140 controls the actual writing of data into the latch whereas the signal level on line 138 controls whether the latch will be read from or written into. The output lines 142 extend to the specific control point apparatus 26, with each single line extending to a separate control point apparatus.

Figure 4:
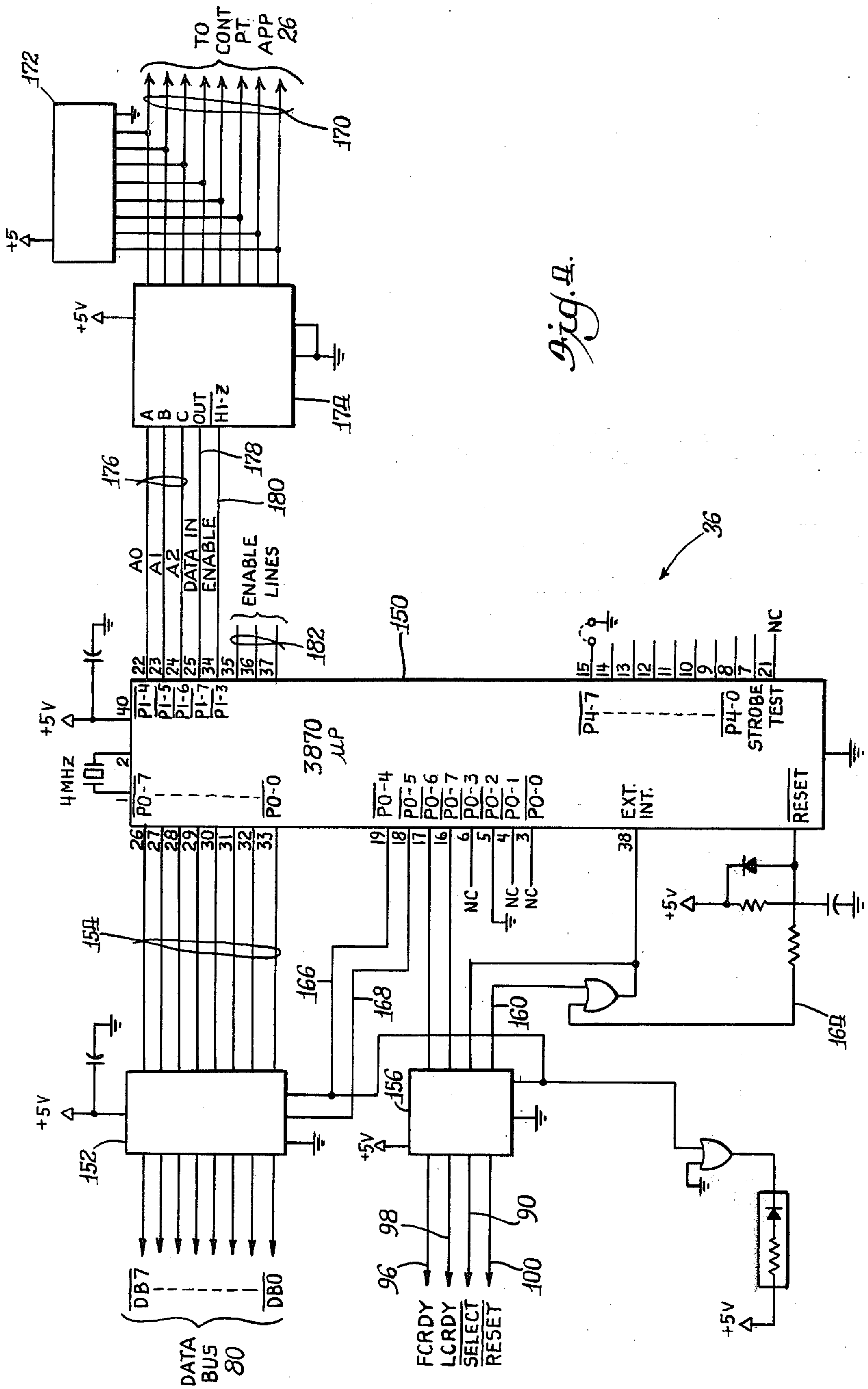
FIG. 4 is a detailed electrical circuit diagram of yet another one of the categories of function means embodying the present invention and particularly illustrating the digital input function means.

Turning now to the digital input function means 46, the detailed electrical schematic circuit diagram for it is shown in FIG. 4 and includes a processing means 150 to which the data bus lines 86 are connected via a tri-state driver 152 and interconnecting lines 154. Similarly, the FCRDY line 96, the LCRDY line 98 and the SELECT line 90 are connected to the processing means via another tri-state driver 156 and lines 158. The RESET line 100 is operably connected to the processing means via the tri-state driver 156, line 160, an OR gate circuit 162 and line 164. An enable line 166 and a read/write control line 168 extend from the processing means 150 to the tri-state driver 152 for controlling its operation. The digital inputs are shown on the right side of the processing means 150 and include the input lines 170 that extend to digital outputs of the control point apparatus 26. A series of pull up resistors contained in a single integrated circuit 172 provide voltage levels to a buffer and multiplexing circuit 174 which represents one of four of such circuits that can be included in the function means, with only one of such circuits being shown for the sake of simplicity. Address lines 176 extend to all of such circuits 174 and select one of the lines 170 for application of the data thereon to the processing means 150 via a tri-state data input line 178. The particular buffer and multiplexing circuit 174 that is to be enabled is enabled via line 180 and three other enable lines 182 are provided for enabling the other of the circuits 174.

Figure 5:
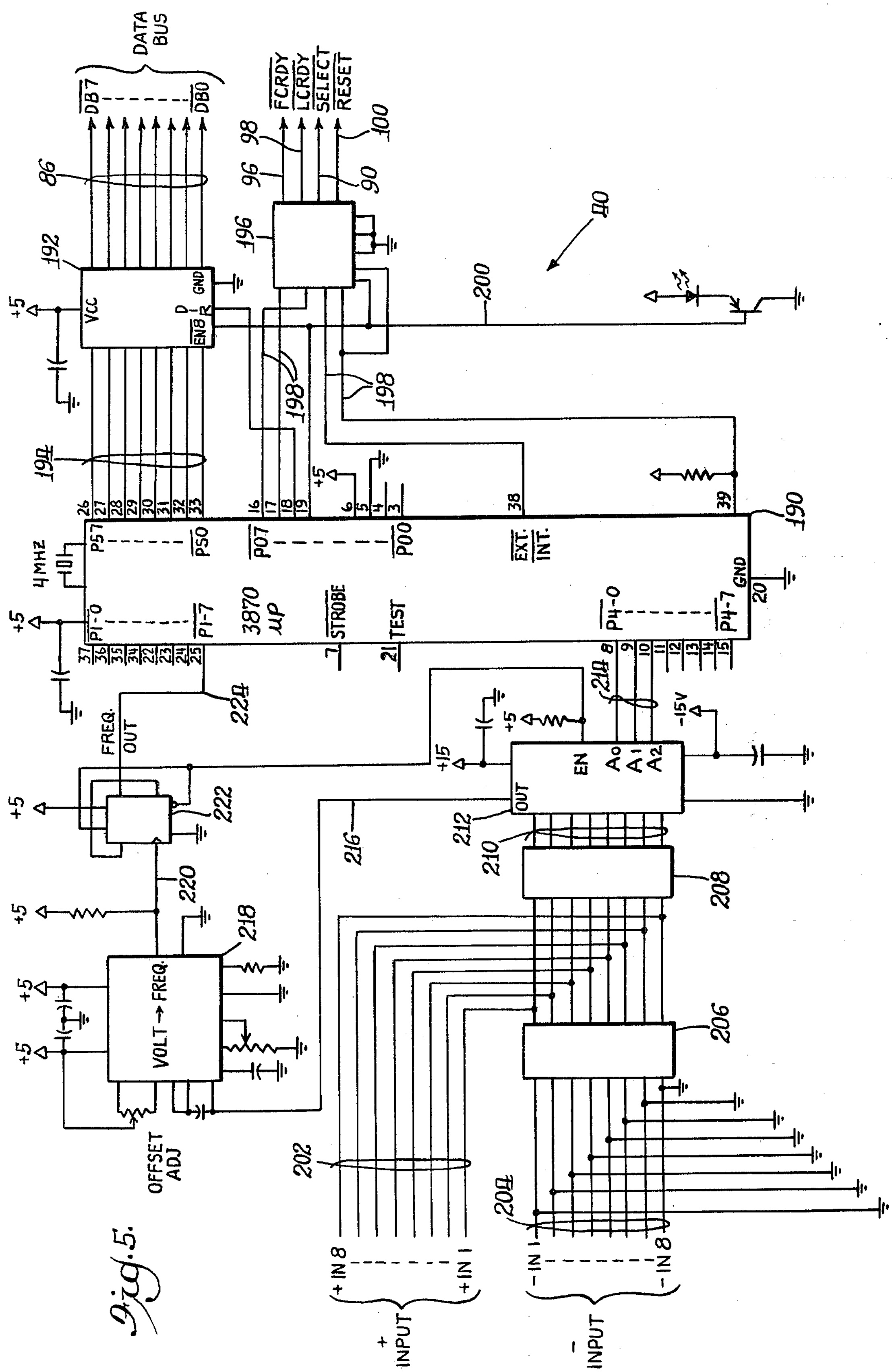
FIG. 5 is a detailed electrical schematic diagram of another category of function means embodying the present invention, and particularly illustrating the general analog input function means.

The detailed electrical schematic circuit diagram for the analog input is shown in FIG. 5 and includes the processing means 190 which has the data bus lines 86 connected thereto via a tri-state driver 192 and interconnecting lines 194. The control lines 90, 96, 98 and 100 are also connected thereto via another tri-state driver 196 and suitable interconnecting lines 198. An enable line 200 from the processing means 190 enables the tri-state drivers 192 and 196. The analog input lines are shown to the left of the drawing and include positive input lines 202, as well as negative input lines 204 with the latter extending through a resistor array 206. The analog values are preferably in the range of 4 to 20 milliamps and are applied to the resistor array 206 to provide an analog voltage at a resistor array 208 which extend to a multiplexer 212 via line 210. Three address lines 214 select which of the input lines 215 to apply to the output line 216 of a multiplexer and line 216 extends to a voltage to frequency converting circuit 218 that has an output line 220 which provides a pulsed signal at the frequency corresponding to the input voltage level on line 216. A D flip-flop 222 converts the pulses to a 50 percent duty cycle output on line 224 that is applied to the processing means 190.

Figure 6:
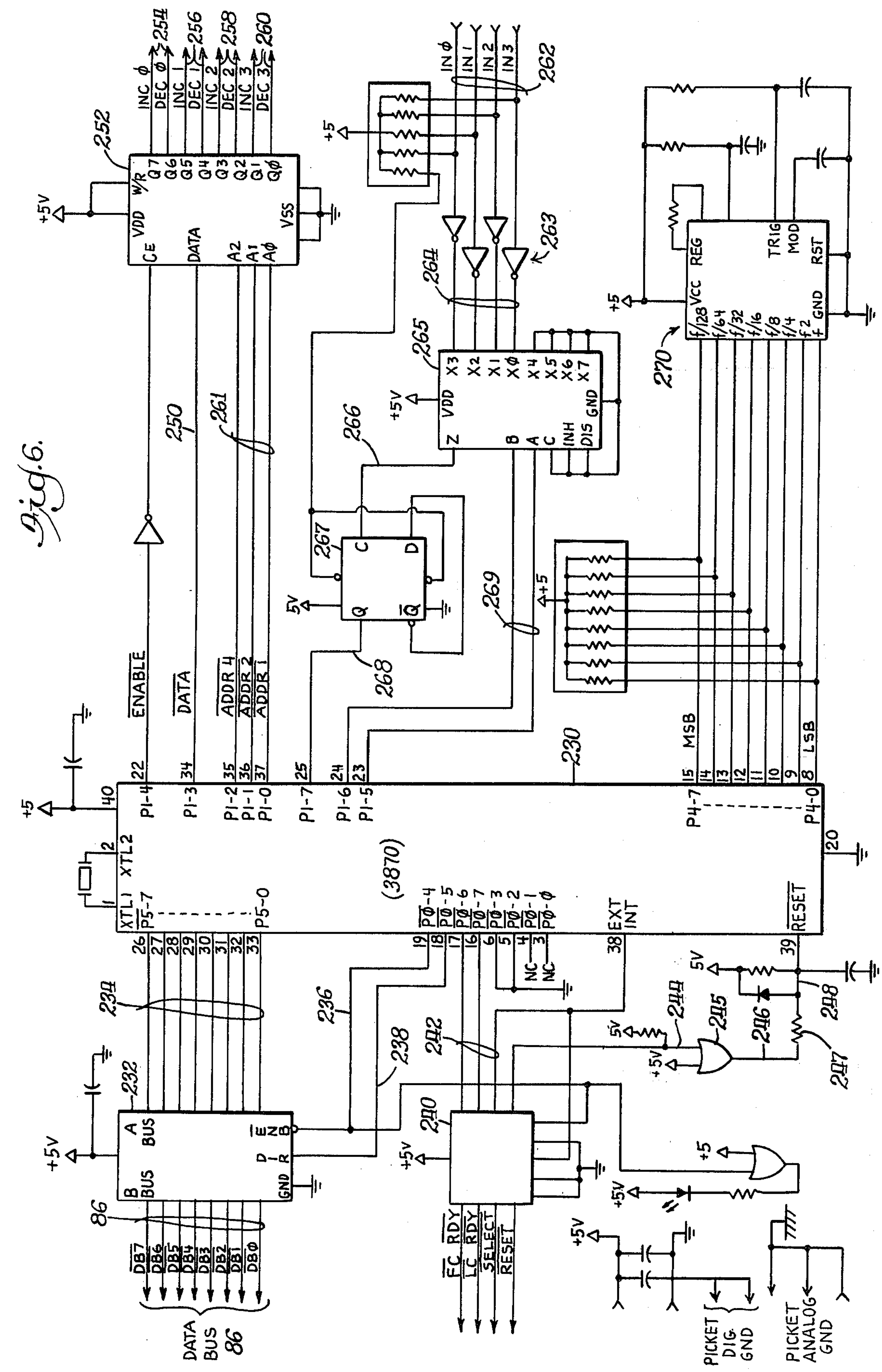
FIG. 6 is a detailed electrical schematic diagram of yet another category of function means embodying the present invention and particularly illustrating the circuitry of the pneumatic output interface function means.
Figure 7:
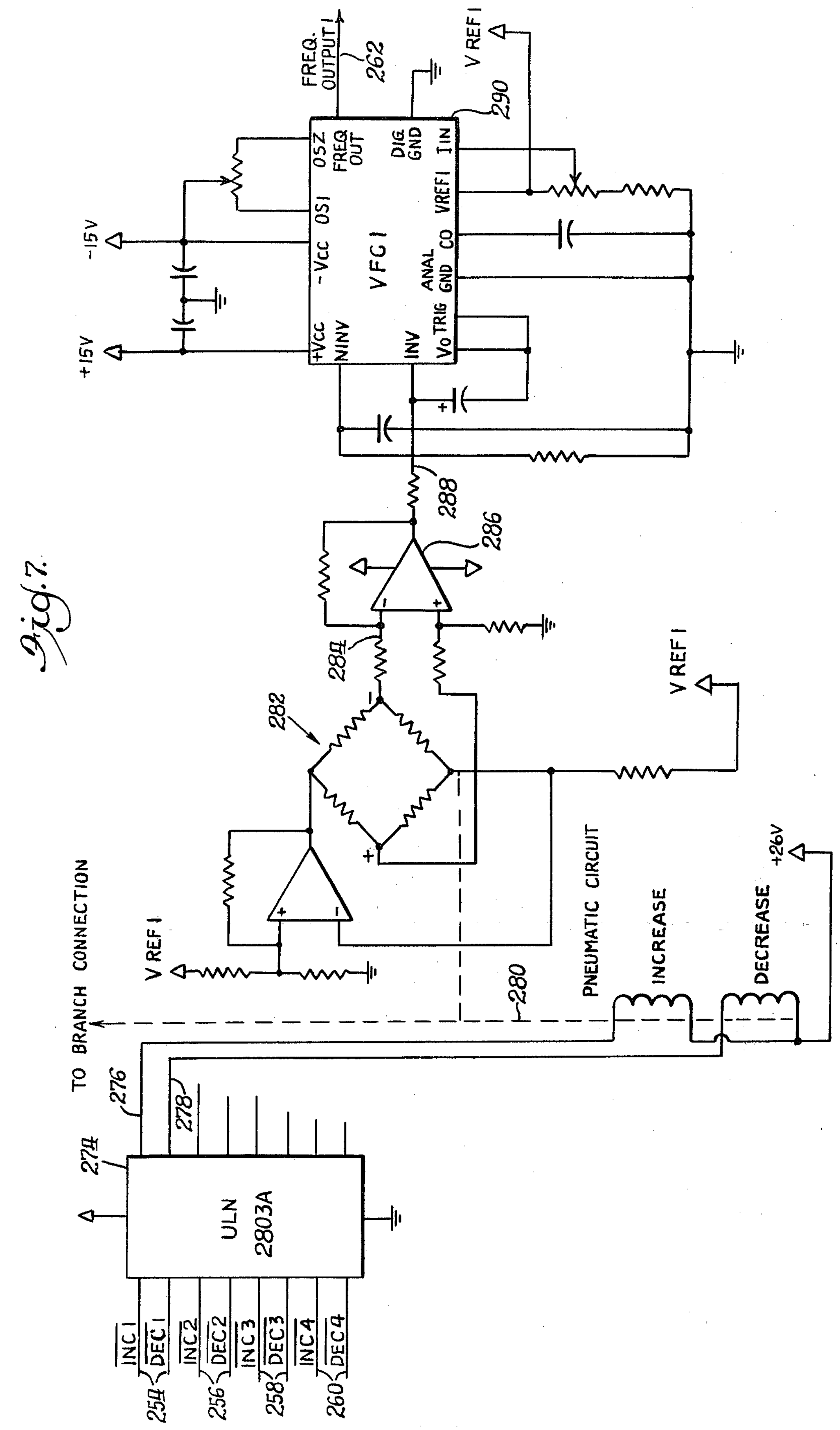
FIG. 7 is a detailed electrical schematic diagram of circuitry of the present invention and particularly illustrates the feedback circuitry that converts pneumatic pressure to variable frequency electrical signals and circuitry which provides output pressure control of the pneumatic devices.

Turning now to the pneumatic output interface function means 42, its detailed electrical schematic circuit diagram is shown in FIG. 6 and includes a processing means 230 which is connected to the data bus lines 86 via a tri-state driver 232 and interconnecting lines 234. Enable and read/write control lines 236 and 238 respectively control the operation of the tri-state driver 232, with the enable line also controlling another tri-state driver 240 which has the FCRDY line 96, the LCRDY line 98, the SELECT line 90 and RESET line 100 connected thereto. These control lines are connected to the processing means via lines 242, except that the RESET line 100 is operably connected to the processing means via line 244, OR gate circuit 245, line 246, resistor 247 and line 248. The processing means 230 has an output data line 250 connected to a 3 to 8 demultiplexer 252 which has four separate pairs of output lines 254, 256, 258 and 260 for controlling solenoids that control the pneumatic pressure in a pneumatic circuit. The lines 254–260 extend to another pneumatic output interface circuit having electrical and pneumatic controls thereon and which are shown in detail in FIG. 7 and which will be hereinafter described. The information on the data line 250 is applied to one of the eight output lines by the demultiplexer in accordance with the appropriate address that is provided by the processing means via the address line 261. If the pneumatic pressure in one of the control point apparatus is to be increased, then the appropriate one of the appropriate pair of lines will be activated to thereby increase the pressure in the pneumatic line whereas the other will be activated if it is to be decreased. The time in which the appropriate pressure change line is active is directly related to the amount of pressure change that will be effected in the appropriate pneumatic control line. To determine the actual pressure in the line, individual input lines 262 from the circuitry of FIG. 7 are provided, each of which is inverted by one of the inverters 263 and applied via respective lines 264 to a 4 to 1 multiplexer 265 which has an output line 266 that is connected to a D flip-flop 267. The flip-flop has output line 268 that is connected to the processing means 230. The multiplexer 265 is controlled by address lines 269 from the processing means to apply the desired input line 264 to the output line 266. The input signal on each of the lines 262 is a pulsed input having a pulse frequency corresponding to the actual pressure in the pneumatic line and the multiplexer applies the signals from one of the lines 262 to the flip-flop 267. The D flip-flop 267 changes the pulsed input to a 50 percent duty cycle square wave on line 268 that is used by the processing means 230. A free running counter timer 270 is provided to generate a number of various frequency signals to the processing means 230 for use in timing longer duration events, such as timing how long a valve should be opened or in determining whether a pneumatic line has failed after a several second diagnostic check, for example.

Turning now to the circuitry shown in FIG. 7, it is preferably on a separate printed circuit board which has pneumatic controls attached to it. The circuitry shown in FIG. 7 includes pneumatic as well as electrical functional operation and only one representative apparatus for a single control point apparatus is disclosed for the sake of simplicity. It should be appreciated that up to four pneumatic lines can be controlled by the equipment on one printed circuit function card means. The input lines 254–260 are shown as being connected to a solenoid driver circuit 274 which has output line 276 as well as output line 278, with the former being connected to a solenoid valve which is used to increase the pressure in the pneumatic control lines while the latter is connected to the operating coil of a solenoid valve that is used to decrease the pressure in the particular line. Both solenoid valves, while not shown in detail herein, are connected to the pneumatic line with the increase valve being connected to a high pressure source which, when opened, will increase the pressure in the controlled pneumatic line. Similarly, the solenoid valve that is used to decrease the pressure is connected to the pneumatic line and when it is opened in response to line 278 being energized, will bleed pressure from the controlled line to thereby reduce the pressure as desired. The pneumatic circuit is shown by the dotted line 280 which extends to a pressure to electrical signal converting bridge, indicated generally at 282, and this provides a voltage at the input line 284 of an amplifier 286 which provides a voltage on line 288 that is proportional to the pressure in the pneumatic line and this line is connected to a voltage to frequency converter 290 which provides a pulsed output signal on line 262 that is proportional to the pressure in the pneumatic line.

Figure 8:
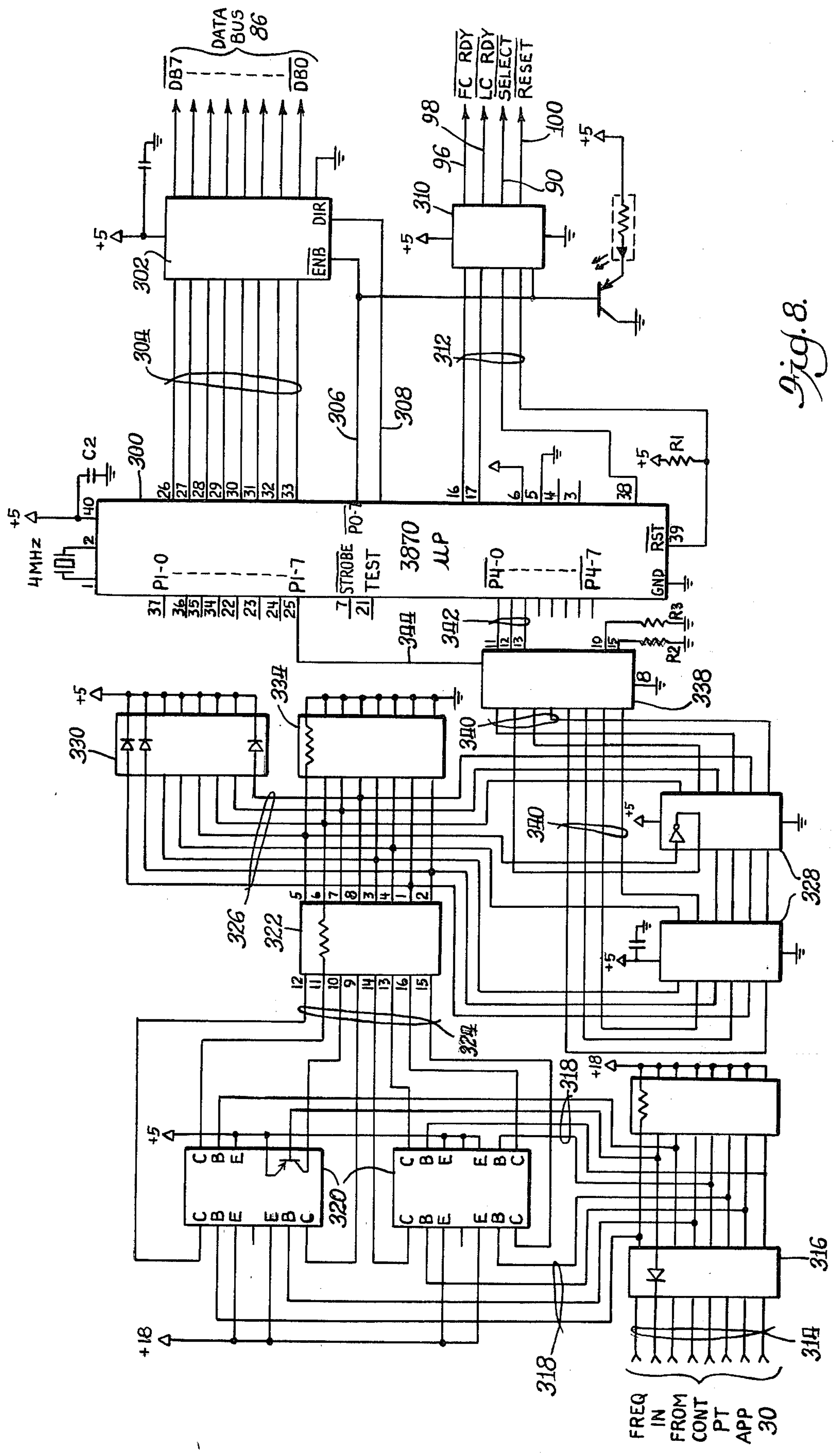
FIG. 8 is a detailed electrical schematic diagram of another category of function means embodying the present invention, and particularly illustrating the frequency analog input function means.

Turning now to the frequency analog input function means, its detailed electrical schematic circuit diagrams are shown in FIG. 8 and it includes a processing means 300 which is connected to the data bus 86 via a tri-state driver 302 and connecting lines 304. The driver 302 is also controlled by enable line 306 in a read/write control line 308. The FCRDY line 96, LCRDY line 98, RESET line 100 and SELECT line 90 are also connected to the processing means 300 via lines 312. Input lines 314 from control point apparatus 30 are applied to a diode pack circuit 316 which limits short circuit current and it has output lines 318 which extend to a pair of transistor array circuits 320 which act as buffer receivers for each of the lines 318. The outputs of these circuits are applied to a resistor pack 322 via lines 324. The outputs of the resistor pack 322 appear on lines 326 which are applied to Schmidt trigger circuits 328 which operate to square up the input current and convert it to appropriate transistor transistor logic levels as well as diodes 330 which limit the voltage applied to the Schmidt triggers to a value of 5 V. The lines 326 are also connected to a resistor pack 334 that provides a voltage level shift from about 18 V to about 5 V. The outputs of the Schmidt triggers 328 are applied to a multiplexing circuit 338 via lines 340. Three address lines 342 controlled by the processing means 300 select one of the input lines 340 of the multiplexer 338 and apply the same to the output line 344 to the processing means 300.

Figure 9:
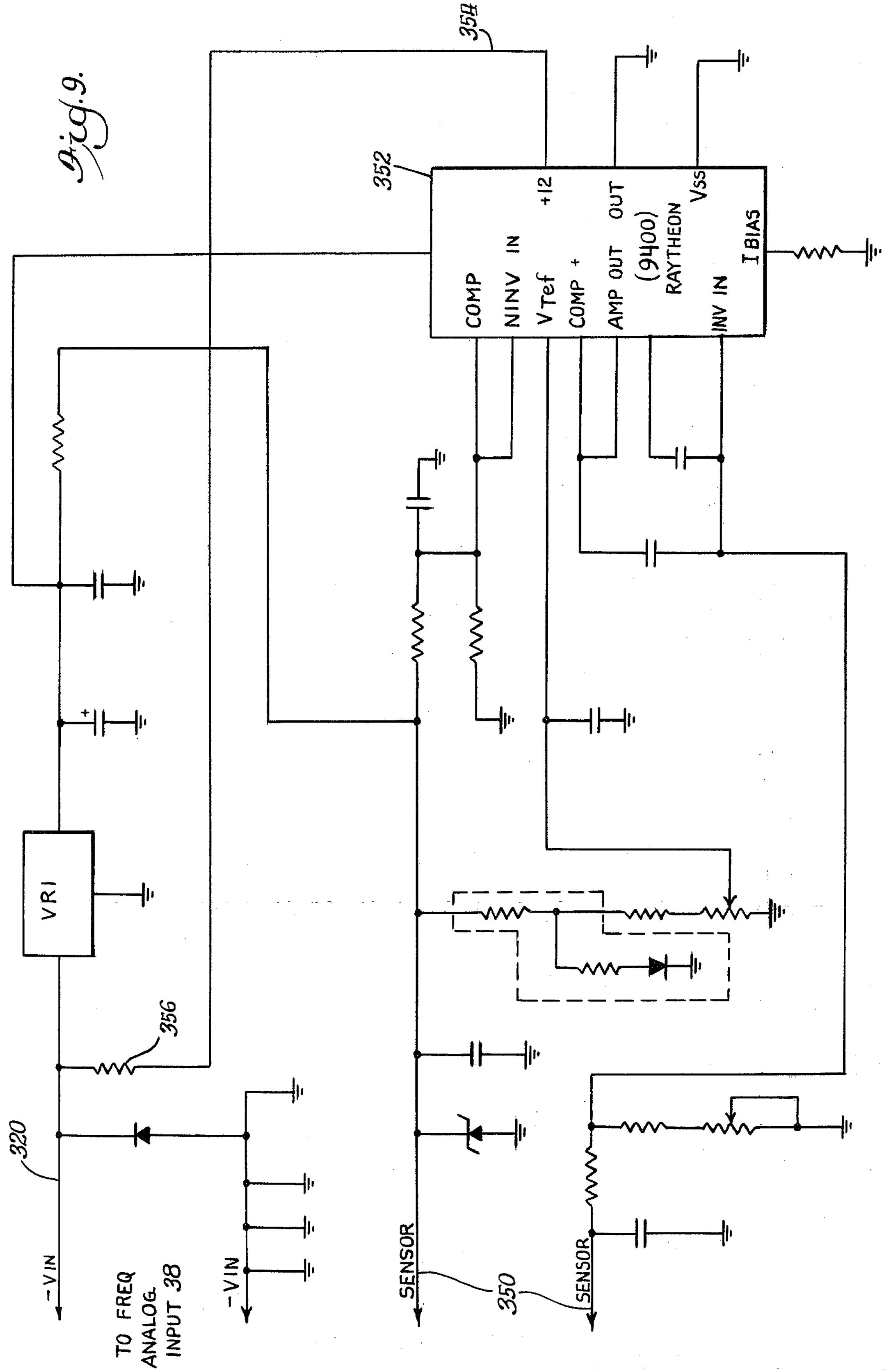
FIG. 9 is a detailed electrical schematic diagram of circuitry of the present invention and particularly illustrates circuitry for converting temperature readings to variable frequency electrical signals.

Turning now to the temperature transmitter detailed electrical schematic circuit diagrams shown in FIG. 9, it has a pair of leads 350 which extend to a temperature sensor and provide a voltage level that is applied to a voltage to frequency converting circuit 352 having an output line 354 which is pulsed at a frequency corresponding to the temperature being read. The line 354 is connected to resistor 356 to output line 320 that extends to a frequency input line of the circuitry of FIG. 8.

Figure 10:
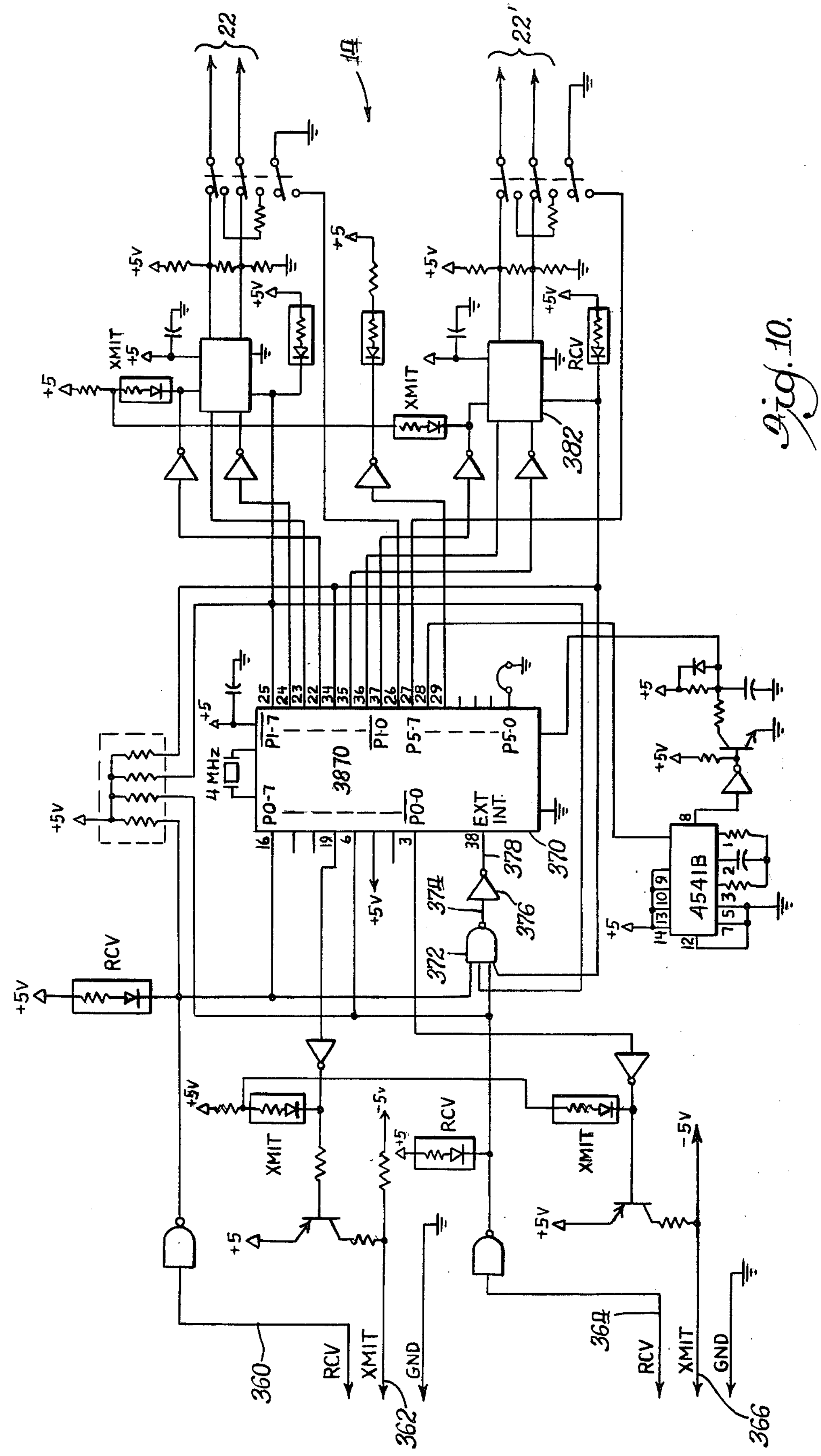
FIG. 10 is a detailed electrical schematic diagram of circuitry that interfaces the host or central computer for communicating with the distribution panels of the present invention and specifically illustrates the detailed circuitry corresponding to the multi-drop adaptor shown in the block diagram of FIG. 1.

Turning now to the multi-drop adaptor that is shown in FIG. 10, it essentially illustrates circuitry for use with a trunk 22 and redundant trunk 22' and converts this to a different standard via a receive line 360 and transmit line 362 for the trunk 22, and receive line 364 and transmit line 366 for the trunk 22'. Essentially the multi-drop adaptor circuitry has a processing means 370 which effectively converts from a RS232C standard via the line 360, 362 or 364, 366 to a different standard and preferably the RS422 type of transmission scheme that is used on the trunk 22 and 22'. The lines 360–366 are connected to the central control computer which is relatively close to the multi-drop adaptor, i.e., no greater than 50 feet of cable length in accordance with the requirements of the RS232C standard. Basically the processing means is adapted to watch all four of these input lines which, if data is present, provides an active signal on one of the inputs to a NOR gate 372 which is connected via line 374, converter 376 and line 378 to an external interrupt and the processing means then isolates the appropriate input and receives the data, converts it to the appropriate output for sending in the opposite direction. Thus, if data appeared on the line 22, they would be processed and transmitted via the RS232C format via line 362 to the central control computer as desired. Basically the RS232C format comprises one line which is used to transmit data and another line that is used to receive data. The RS422 standard utilizes a differential transmission scheme, involving two wires and two voltage levels, i.e., 0 volts and 5 volts, with one of the lines 22 being high while the other is low and vice versa. The data is thereby transmitted in a differential half duplex scheme onto the trunk lines 22. In this regard, lines 22 and 22' are connected to respective differential driver receiver circuits 380 and 382. If additional trunks other than the trunks 22 and 22' which are shown in FIG. 1, i.e., trunk lines 24, for example, are incorporated into a system, then an additional multi-drop adaptor 14 would be provided for the additional loop.

Each of the function means has now been described as has the interfacing means and multi-drop adaptor circuitry. The listings which are used in the processing means for each of the function means as well as the interfacing means and multi-drop adaptor are attached hereto as Appendix A and these systems comprise the instructions that are loaded into the memories of the various processing means for carrying out the operation and protocol that has been described.

From the foregoing detailed description of the system and its operation, it should be appreciated that an extremely advantageous system has been shown and described which has superior operational features which result in many advantages, including flexibility of operation and reduced labor costs, both in terms of initial installation and maintenance after installation. These advantages are obtained in part by virtue of the fact that individual function means can be characterized with respect to each and every control point apparatus that is associated with it wihout performing any mechanical or electrical manipulation at the location of the distribution panels. If a malfunction occurs in one of the function means, a suitable test procedure can be run to determine the extent of the malfunction, as well as the location of it and an appropriate processing means can be used to replace the malfunctioning one which, upon restart, will result in a recharacterization of the processing means in the same manner that previously existed and the processing means will thereafter function as desired.

It is, of course, understood that although preferred embodiments of the present invention have been illustrated and described, various modifications thereof will be apparent to those of ordinary skill in the art and, accordingly, the scope of the present invention should be defined only by the appended claims and equivalents thereof.

Various features of the invention are set forth in the following claims.

APPENDIX A

LINE CARD FIRMWARE

```
        * LCE.MAC
              TITLE   LINE CARD FIRMWARE
        *
        * MCC-POWERS
        * COPYRIGHT 1979
        * BOB OLD  2-FEB-79
        *
        * PMD TRUNK EQUATES
        *
        PMD      EQU    1               ;PMD TRUNK DATA AND CONTROL PORT
        *                               ;BIT 7 - TRUNK A INP, 0 IS QUIESCENT
        *                               ;BIT 6 - TRUNK B INP, 0 IS QUIESCENT
        *                               ;BIT 5 - UNUSED
        *                               ;BIT 4 - TRUNK A RCV ENABLE, ACTIVE LO
        *                               ;BIT 3 - TRUNK A XMIT ENABLE, ACTIVE LO
        *                               ;BIT 2 - TRUNK B RCV ENABLE, ACTIVE LO
        *                               ;BIT 1 - TRUNK B XMIT ENABLE, ACTIVE LO
        *                               ;BIT 0 - SERIAL DATA OUT, INVERTED
        LINEAF   EQU    H"80"           ;BIT OF PMD PORT THAT RCV'S LINE A
        LINEAC   EQU    H"0E"           ;ENABLE LINE A RCV FROM PMD
        LINEBC   EQU    H"1A"           ;ENABLE LINE B RCV FROM PMD
        MSGDET   EQU    H"0A"           ;WATCH BOTH LINES FOR A MSG
        ARCVEN   EQU    H"10"           ;A RCV ENABLED IF 0
        BRCVEN   EQU    H"04"           ;B RCV ENABLED IF 0
        LAXC     EQU    H"16"           ;A XMIT CONTROL
        LBXC     EQU    H"1C"           ;B XMIT CONTROL
        INIPMD   EQU    H"1E"           ;POWER UP STATE FOR PMD PORT
        MSGHLD   EQU    H"1E"           ;HOLD OFF HOST COMMANDS UNTIL AFTER
        *                               ;FIRST SCAN OF BOX IS DONE
        FAILA    EQU    H"20"           ;TRUNK A FAILED FLAG
        FAILB    EQU    H"08"           ;TRUNK B FAILED FLAG
        *
        * TIMER PORTS AND COSDAP ADDRESS PORT
        *
        TIMERD   EQU    7               ;TIMER DATA PORT
        ICP      EQU    6               ;INTERRUPT CONTROL PORT
        EXTINT   EQU    6               ;CURRENT LEVEL ON EXTERNAL INT PIN IN BIT 7
        ADDR     EQU    5               ;COSDAP ADDRESS SWITCHES INPUT PORT
        BSTLED   EQU    H"40"           ;BST LED ON THIS BIT OF ADDR PORT
        *
        * POWERS BUS I/O PORTS
        *
        PBUSD    EQU    4               ;PBUS DATA PORT, INP AND OUT
        PBUSC    EQU    0               ;PBUS CONTROL PORT
        *                               ;BIT 7 - FCRDY INP, 0 SAME AS INACTIVE BUS
        *                               ;BIT 6 - LCRDY OUT, 0 SAME AS INACTIVE BUS
        *                               ;BIT 5 - FC RESET OUT, ACTIVE HI
        *                               ;BIT 4 - UNUSED
        *                               ;BIT 3 - PBUS DATA DIRECTION, 1-RCV, 0-XMIT
        *                               ;BIT 2 - HANDSHAKE & DATA BUS ENABLE, ACTIVE HI
        *                               ;BIT 1 - ENABLE FC SELECT TO PBUS, ACTIVE HI
        *                               ;BIT 0 - ENABLE FC SELECT LATCH LOAD, ACTIVE HI
        *
        RSETFC   EQU    H"27"           ;RESET FUNCTION CARD
        SELCHE   EQU    H"09"           ;ENABLE 137 INP LATCH ONLY
        SELCHD   EQU    H"08"           ;DISABLE 137 INP LATCH, LEAVE REST
        *                               ;OF BUS I/F QUIESCENT
        INIFCX   EQU    H"44"           ;INIT CODE TO PBUSC FOR LC TO FC XFER
        *                               ;FCRDY QUIESCENT, 1ST XITION OF LCRDY, NO RESET,
        *                               ;BSTLED?, BUS DIR OUT, ENABLE BUS I/F,DISABLE
        *                               ;FC SELECT
        *
        FCSELC   EQU    H"46"           ;SAME AS ABOVE EXCEPT THIS ENABLES
        *                               ;FC SELECT TO THE FUNCTION CARD
        *
        DSELPB   EQU    H"08"           ;RELEASE BUS
        *
        FCRDY    EQU    H"80"           ; FC RDY BIT
        LCRDY    EQU    H"40"           ;LCRDY BIT
        PBSDIR   EQU    H"08"           ;PBUS DIRECTION BIT
        FCRDYM   EQU    H"7F"           ;FCRDY MASK
        *
        * TIMER EQUATES
        *
        BTIMD    EQU    167             ;DATA FOR 1 BIT TIME DELAY
        BTIMC    EQU    H"6A"           ;CONTROL INFO FOR 1 BIT TIME DELAY
        BTIMD2   EQU    H"E6"           ;DATA FOR 1/2 BIT TIME DELAY
        BTIMC2   EQU    H"2A"           ;CONTROL INFO FOR 1/2 BIT TIME DELAY
        IMICP    EQU    H"80"           ;INTER-MSG EXT INT ENABLE
```

```
ICTOD   EQU    0              ;INTER-CHARACTER TIME OUT DATA
ICTOC   EQU    H"EA"          ;CONTROL 25.6 MS.
*                             ;DIV BY 200, ENABLE BOTH INTERRUPTS
STPDL2  EQU    109            ;DELAY 1/2 BIT TIME FOR STOP BIT RECEIVE FINISH
*                             ;ACTUALLY, EVEN AT 1200 BAUD WE ONLY HAVE
*                             ;9 MICRO-SECONDS OF DELAY HERE TO TURN THE PMD
*                             ;FROM RECEIVE TO TRANSMIT SO WE GIVE IT AN EXTRA
*                             ;100 US TO TURN AROUND.  ON A PHONE LINE MAYBE
*                             ;MORE?
STPCL2  EQU    H"2A"          ;CONTROL ABOVE
TSTTMD  EQU    200            ;1MS TIMER TEST DATA
TSTTMC  EQU    H"6A"          ;1MS TIMER TEST CONTROL
*
* TEMPORARY DATA STORAGE USED BY A VARIETY OF ROUTINES
*
IMPUTA  EQU    4              ;READ/WRITE LC RAM
*
* REGISTER SAVE AREA DURING INTERRUPTS
*
ISARSV  EQU    7              ;INTERRUPT SAVE AREA FOR ISAR
ACCSAV  EQU    8              ;INTERRUPT SAVE AREA FOR ACCUMULATOR
*J      EQU    9              ;INTERRUPT SAVE AREA FOR STATUS FLAGS
*HU     EQU    10             ;INTERRUPT SAVE AREA FOR DATA COUNTER - UPPER
*HL     EQU    11             ;DC SAVE LOWER BYTE
*KU     EQU    12             ;SUBROUTINE RET ADDR SAVE AREA
*                             ;ALSO RPTR FOR MEMORY MOVE
*KL     EQU    13             ;ALSO SPTR FOR MEMORY MOVE
PWRUP   EQU    H"80"          ;PWR UP FLAGE
*QU     EQU    14             ;VECTOR TO ROUTINE DUE AT NEXT TIMER INTERRUPT
*QL     EQU    15             ;TIMER VECTOR - LOWER BYTE
*
* HOST COMMUNICATION CONTROL DATA
*
SERIAL  EQU    0              ;SERIALIZATION-DESERIALIZATION TRUNK DATA
BITCNT  EQU    1              ;CURRENT BIT COUNT OF ABOVE BYTE
CRCHI   EQU    2              ;PARTIAL CRC ASSEMBLY AREA - HI BYTE
CRCLO   EQU    3              ;PARTIAL CRC ASSEMBLY AREA - LO BYTE
*
MRCVCU  EQU    2              ;HOST COMMUNICATION CONTROL FLAGS
MRCVCL  EQU    0
CRCFND  EQU    H"80"          ;DATA IS DONE, CRC COMING IN
ADRFND  EQU    H"40"          ;ADDRESS RECEIVED FLAG OF MRCVCT
CNTFND  EQU    H"20"          ;COUNT FOUND FLAG OF MRCVCT
SYNFND  EQU    H"10"          ;SYNCH CHAR FOUND FLAG OF MRCVCT
VLDLEN  EQU    H"08"          ;SET IN MRCVCT IF MSG LENGTH IS IN RANGE
MEFLAG  EQU    H"04"          ;SET IN MRCVCT IF MSG ADDRESSED TO THIS COSDAP
CRCSNT  EQU    H"02"          ;SET IN MRCVCT IF CRC HAS BEEN SENT
*
MSGCTU  EQU    2              ;COUNT OF BYTES LEFT IN PMDT MESSAGE
MSGCTL  EQU    1
*
BFPUPR  EQU    2              ;UPPER OCTET OF PMDT BUFFER PTR SAVE AREA
BFPLWR  EQU    2              ;LOWER OCTET OF SAME
*
PMDCTU  EQU    2              ;CURRENT PMD CONTROL BYTE
PMDCTL  EQU    3
*
NXBFPU  EQU    2              ;NEXT BUFFER PTR
NXBFPL  EQU    4
*
NXBCU   EQU    2              ;NEXT BUFFER COUNT - UPPER OCTET
NXBCL   EQU    5              ;LOWER OCTET
*                             ;CONTAINS THE NUMBER OF BYTES IN THE NEXT
*                             ;BUFFER TO BE XMITTED.  IF THE SEND DATA
*                             ;TO HOST ROUTINE FINISHES AND FINDS 0 IN
*                             ;THIS FLAG IT KNOWS THAT THERE'S NO MORE DATA
*                             ;TO BE SENT AND TO SEND THE CRC.
*                             ;REPORT OR ACK IN ONE MSG
*
FCMERU  EQU    4              ;CURRENT FC DB WE ARE TALKING TO
FCMERL  EQU    4              ;RETRY FLAG
RETRY   EQU    H"80"          ;RETRY BIT
RCVBUF  EQU    O"77"          ;START OF MSG RCV BUF
RBFU    EQU    7              ;START OF RCV BUFFER - HI OCTET
RBFL    EQU    7              ;LO OCTET
SYNCRH  EQU    O"316"         ;PARTIAL CRC WITH ONLY SYN IN IT
SYNCRL  EQU    O"201"
DLY1MS  EQU    110            ;110. DS&BNZ'S + SETUP TIME IS 1 MS PLUS
HALFMS  EQU    55             ;55 INC&BNZ'S&LI @4MHZ = 497 US.
*
* FUNCTION CARD COMMUNICATION CONTROL DATA BASE
*
```

```
* THESE 5 BYTES OF THE SCRATCHPAD CONTROL THE COMMUNICATION
* WITH THE FUNCTION CARDS OVER THE PBUS.
*
BFPFCU  EQU     4               ;BUFFER PTR TO SCRATCHPAD
BFPFCL  EQU     0
*
DLYFCU  EQU     4               ;FCRDY TIMEOUT COUNT, APPROX 1 MS.
DLYFCL  EQU     1
FCTO    EQU     50              ;INITIAL FC TIMEOUT COUNT
FCTRNC  EQU     100             ;FC TURN AROUND, 2 MS. FOR CMD EXECUTION
*
PBCTLU  EQU     4               ;POWERS BUS CONTROL BYTE
PBCTLL  EQU     2
*
CNTFCU  EQU     4               ;COUNT OF BYTES LEFT TO BE XFER'D
CNTFCL  EQU     3
*
CKSM    EQU     6               ;RUNNING CHECKSUM
*
*
* FUNCTION CARD COV SCAN EQUATES
*
SCNBFU  EQU     4               ;START OF 3 BYTE BUFFER
SCNBFL  EQU     7
FCRCVB  EQU     O"47"           ;RESPONSE BUFF ADDR
SCNBFR  EQU     O"47"           ;FC SCAN BUFFER ADDR
*
CRNTFC  EQU     5               ;CURRENT FUNCTION CARD BEING SCANNED 3 LO BITS
*                               ;BIT 7 IS SET IF THERE IS AN UN-ACK'D COV OUT.
*                               ;BIT 6 IS SET FOR A GET-COV-COUNT, RESET FOR WRU
UNAKD   EQU     H"80"           ;UN-ACK'D COV PRESENT BIT
UNAKDM  EQU     H"7F"           ;UN-ACK'D COV PRESENT MASK
CRDFAL  EQU     H"80"           ;CARD FAILED BIT
SCNTYP  EQU     H"40"           ;SCAN TYPE BIT
SCNTPM  EQU     H"BF"           ;SCAN TYPE BIT MASK
*
* CARD CHANGE OF VALUE DATA BASE
*
* 8 BYTES STARTING AT O"30"
*
CDCOVU  EQU     3
CDCOVL  EQU     0
CRDCOV  EQU     O"30"
FCFALD  EQU     H"80"           ;FC FAILED BIT
FCFLRP  EQU     H"20"           ;FC FAILURE HAS BEEN REPORTED
FCFLAK  EQU     H"10"           ;HOST HAS ACK'D FC FAILURE
DBLINI  EQU     H"40"           ;INIT BYTE FOR DOUBLE WIDE DATA BASE
*
* GET COV CONTROL BYTES
*
RNGCNT  EQU     TMPDTA          ;RUNNING COUNT OF COV'S FOUND IN COSDAP
*
THSCVU  EQU     2               ;WHICH COV OF CARD TO START RETURNING
THSCVL  EQU     6
*
CFGCVU  EQU     2               ;CURRENT FC WE'RE GETTING COV'S FROM
CFGCVL  EQU     7
*
* GET COV CMD I/O BUFFERS
*
HXMT1   EQU     O"77"           ;1ST BUFFER FOR TRANSMISSION TO
HXMT1U  EQU     7               ;THE HOST, 77 THRU 66
HXMT1L  EQU     7
*
HXMT2   EQU     O"65"           ;2ND BUFFER FOR XMIT TO HOST
HXMT2U  EQU     6               ;65 THRU 54
HXMT2L  EQU     5
*
* ACK COV CONTROL BYTES
*
CFAKCU  EQU     2               ;CURRENT FC # BEING ACK'D
CFAKCL  EQU     6
*
ACKCTU  EQU     2               ;RUNNING COUNT OF COV'S BEING ACK'D
ACKCTL  EQU     7
MAXCOV  EQU     83              ;MAXIMUM NUMBER OF COV'S DAP CAN
*                               ;REPORT OR ACK IN ONE MSG
*
* REPEAT LAST RESPONSE DATA BASE
*
* 1 CONTROL BYTE AND 3 BYTES OF DATA BUFFER
* THE LO-ORDER 2 BITS OF THE CONTROL BYTE ARE A COUNT OF THE DATA BYTES.
```

```
* IF THE HI-ORDER BIT IS SET, THE BUFFER CONTAINS THE RESPONSE; OTHERWISE
* THE BUFFER CONTAINS A COMMAND TO BE RE-EXECUTED.
*
REPCON   EQU     O"53"             ;CONTROL
REPCTU   EQU     5
REPCTL   EQU     3
REPBUF   EQU     O"52"             ;BUFFER, 52 THRU 50
MOVCNT   EQU     CKSM              ;SAVE AREA
*
* COSDAP COMMUNICATION EQUATES
*
* THESE ARE THE COMMANDS ACCEPTED, AND THE RESPONSES GIVEN, BY
* THE VARIOUS CARDS.
*
*
* GENERAL
*
SYN      EQU     H"16"             ;MESSAGE SYNCHRONIZATION CHARACTER
ACK      EQU     H"06"             ;POSITIVE ACKNOWLEDGE
*
NAK      EQU     H"15"             ;NEGATIVE ACKNOWLEDGE
*
*
* COMMANDS FROM THE HOST TO THE LINE CARD
*
REP      EQU     H"01"             ;REPEAT LAST RESPONSE
GETCOV   EQU     H"02"             ;GET ANY COV'S FROM COSDAP
ACKCOV   EQU     H"03"             ;ACK COV'S JUST REPORTED
*
*
*
* COMMANDS FROM THE LINE CARD TO THE FUNCTION CARDS
*
WRU      EQU     H"80"             ;GET MASK ID
*
GTCOVN   EQU     H"81"             ;GET NUMBER OF COV'S ON CARD
*
FGTCOV   EQU     H"82"             ;GET NEXT COV DATA FROM CARD
*
FAKCOV   EQU     H"83"             ;ACK COV DATA
*
*
*
* COMMANDS FROM THE HOST TO THE FUNCTION CARDS
*
*
GETPNT   EQU     H"06"             ;GET CURRENT VALUE FOR POINT
*
SETPNT   EQU     H"07"             ;SET NEW OUTPUT FOR POINT
*
ENBCOV   EQU     H"0B"             ;ENABLE/DISABLE POINT FOR COV REPORTING
*
STSCOV   EQU     H"0D"             ;SET SIGNIFICANT CHANGE OF VALUE NUMBER
*
ENBCTL   EQU     H"0F"             ;ENABLE/DISABLE A POINT FROM CONTROL
*
CHARPT   EQU     H"11"             ;CHARACTERIZE A POINT
*
*
*
* ERROR RESPONSES THE DAP SENDS TO THE HOST
*
DATAER   EQU     H"FE"             ;TOO LITTLE OR TOO MUCH DATA FOR THE COMMAND
*
CMDERR   EQU     H"FD"             ;COMMAND NOT RECOGNIZED
*
CHAREQ   EQU     H"FC"             ;CHARACTERIZATION REQUIRED
NOCOV    EQU     H"FB"             ;NO COV'S IN THIS COSDAP
FCFALR   EQU     H"FA"             ;FUNCTION CARD FAILED
*
*
* FUNCTION CARD TO LINE CARD ERROR RESPONSES
*
FCRCKS   EQU     H"C0"             ;FC FOUND CKSM ERR ON THE COMMAND
*
LCRCKS   EQU     H"C1"             ;LC FOUND CKSM ERR ON THE FC'S RESPONSE
*
* CARD TYPES RETURNED FROM A WRU COMMAND
* LOWER NYBBLE IS DON'T CARE.
*
```

```
SGLDO    EQU      H"00"           ;SINGLE WIDE DO, 16 BITS
DBLDO    EQU      H"10"           ;DOUBLE WIDE DO, 32 BITS
SGLDI    EQU      H"20"           ;SINGLE WIDE DI, 16 BITS
DBLDI    EQU      H"30"           ;DOUBLE WIDE DI, 32 BITS
DBLID    EQU      H"10"           ;DBL-WIDE MASK ID BIT
POI      EQU      H"40"           ;PNEUMATIC OUTPUT INTERFACE
FAI      EQU      H"60"           ;FREQUENCY ANALOG INPUT
                  ********
                  ********
                  *
                  * INITIALIZATION -- THIS SEGMENT IS EXECUTED WHEN POWER COMES ON TO THE
                  * LINE CARD.  IT CHECKS OUT THE HARDWARE AND SETS UP THE FLAGS AND
                  * POINTERS FOR THE APPLICATION ROUTINES.
                  *
                  ********
                  ********
                  *
                  * INITIALIZE LINE CARD HARDWARE
                  *
                          ORG     0
0000 70                   CLR
0001 B5                   OUTS    ADDR              ;PRESET LINE CARD ADDRESS PORT FOR INPUT
0002 B4                   OUTS    PBUSD             ;AND RESET WATCHDOG TIMER
0003 20 1E                LI      INIPMD
0005 B1                   OUTS    PMD               ;CLEAR PMDT CONTROL
                  *
                  * RESET ALL FUNCTION CARDS
                  *
0006 A5                   INS     ADDR              ;IF WATCHDOG TIMER RESETS ME, DON'T RESET FC'S
0007 81 0F                BP      RSET20            ;IF P, NO RESET
0009 77                   LIS     7
000A 54                   LR      TMPDTA,A
000B 20 27                LI      RSETFC            ;SET CTRL BYTE
000D B0                   OUTS    PBUSC
000E 44          RSET10   LR      A,TMPDTA
000F B4                   OUTS    PBUSD
0010 70                   CLR
0011 1F                   INC
0012 94 FE                BNZ     *-1
0014 34                   DS      TMPDTA
0015 82 F8                BC      RSET10
0017 78          RSET20   LIS     DSELPB            ;DE-SELECT BUS
0018 B0                   OUTS    PBUSC
0019 29 04 16             JMP     INIT              ;FINISH INIT BELOW
                  ********
                  ********
                  *
                  * TIMER INTERRUPT STARTS EXECUTION HERE
                  *
                  ********
                  ********
                          ORG     H"20"
0020 1E                   LR      J,W               ;SAVE STATUS
0021 58                   LR      ACCSAV,A          ;ACCUMULATOR
0022 0A                   LR      A,IS              ;ISAR
0023 57                   LR      ISARSV,A
0024 11                   LR      H,DC              ;DATA COUNTER
0025 0D                   LR      P0,Q              ;VECTOR TO APPROPRIATE ROUTINE
                  ***
                  * START BIT VERIFICATION
                  * IS START BIT STILL THERE?
                  ***
0026 A6          SBV      INS     EXTINT            ;READ TRUNK
0027 81 04                BP      SBVA              ;IF P, YES
                  *
                  * FALSE START BIT, RESYNCH
                  *
0029 29 00 D1    DBGC     JMP     GCMD
                  *
                  * SET TIMER FOR 1 BIT TIME
                  *
002C 20 A7       SBVA     LI      BTIMD             ;SET 1 BIT TIME DATA
002E B7                   OUTS    TIMERD
002F 20 6A                LI      BTIMC             ;START TIMER
0031 B6                   OUTS    ICP
                  *
                  * SET TIMER VECTOR TO CHARACTER ASSEMBLY
                  *
0032 20 39                LI      CHA
0034 07                   LR      QL,A
0035 78                   LIS     8                 ;GET 8 BITS
```

```
0036 51                 LR      BITCNT,A
0037 90 0A              BR      RSTRTI          ;RESTORE AND RETURN FROM INTERRUPT
               ***
               * 8 BIT CHARACTER ASSEMBLY
               ***
0039 40        CHA      LR      A,SERIAL        ;SHIFT PARTIAL
003A 12                 SR      1
003B 50                 LR      SERIAL,A        ;SAVE
003C A6                 INS     EXTINT          ;READ TRUNK
003D E0                 XS      SERIAL          ;MERGE WITH REST
003E 50                 LR      SERIAL,A        ;SAVE
003F 31                 DS      BITCNT          ;ALL BITS IN?
0040 84 08              BZ      CHAA            ;IF Z, YES
               ***
               * RESTORE AND RETURN FROM INTERRUPTS
               ***
0042 10        RSTRTI   LR      DC,H            ;RESTORE DATA COUNTER
0043 47                 LR      A,ISARSV        ;ISAR
0044 0B                 LR      IS,A
0045 48                 LR      A,ACCSAV        ;ACCUMULATOR
0046 1D                 LR      W,J             ;STATUS
0047 1B                 EI                      ;ENABLE INTERRUPTS
0048 1C                 POP                     ;RETURN TO INTERRUPTED SEGMENT
               *
               * ALL DATA BITS ARE IN, NEXT TIME CHECK FOR STOP BIT
               *
0049 20 8D     CHAA     LI      STPBTV          ;TIMER VECTOR TO STOP BIT VERIFICATION
004B 07                 LR      QL,A
004C 90 F5              BR      RSTRTI
               ***
               * RECEIVE TO TRANSMIT LINE TURN-AROUND TIMER VECTOR
               ***
004E 20 A7     RXTURN   LI      BTIMD
0050 B7                 OUTS    TIMERD
0051 20 6A              LI      BTIMC
0053 B6                 OUTS    ICP
0054 20 FE              LI      -2              ;DELAY 22US
0056 1F        RXTRNB   INC
0057 94 FE              BNZ     RXTRNB
0059 62                 LISU    PMDCTU
005A 6B                 LISL    PMDCTL
005B 74                 LIS     BRCVEN
               *
               * CHECK WHICH LINE MSG CAME IN ON AND SEND A START BIT OUT ON THAT LINE
               *
005C FC                 NS      S               ;WAS LINE B ENABLED FOR RECEIVE?
005D 20 1C              LI      LBXC            ;ASSUME SO
005F 84 03              BZ      RXTRNA          ;IF Z, CORRECT ASSUMPTION
0061 20 16              LI      LAXC            ;WRONG, ENABLE TRANSMISSION ON LINE A.
0063 5C        RXTRNA   LR      S,A             ;SAVE LINE INDICATOR
0064 1F                 INC                     ;SET START BIT
0065 B1                 OUTS    PMD             ;SEND START BIT
0066 90 61              BR      STRGNA          ;FINISH BELOW
               ***
               * SEND 8 BITS TIMER ROUTINE
               ***
0068 71        SND8     LIS     1               ;GET CURRENT BIT OUT ALONE
0069 F0                 NS      SERIAL
006A 23 01              XI      1               ;INVERT XMIT
006C 62                 LISU    PMDCTU          ;MERGE WITH CURRENT TRUNK CONTROL BYTE
006D 6B                 LISL    PMDCTL
006E EC                 XS      S
006F B1                 OUTS    PMD             ;TELL HARDWARE WHAT BIT IS BEING SENT
               *
               * PUT NEXT BIT TO SEND IN POSITION
               *
0070 40                 LR      A,SERIAL
0071 12                 SR      1
0072 50                 LR      SERIAL,A
               *
               * ALL BITS OUT?
               *
0073 31                 DS      BITCNT
0074 94 CD              BNZ     RSTRTI          ;IF NZ, NOT YET
               *
               * THIS BYTE IS DONE, SET STOP BIT VECTOR
               *
0076 20 7B              LI      STPGEN
0078 07                 LR      QL,A
0079 90 C8     TORTI    BR      RSTRTI
               ***
               * STOP BIT TRANSMIT TIMER VECTOR
               ***
```

```
007B 62         STPGEN  LISU    PMDCTU          ;POINT ISAR TO PMD CONTROL BYTE
007C 6B                 LISL    PMDCTL
007D 4C                 LR      A,S
007E B1                 OUTS    PMD
007F 20 C3              LI      STRTGN          ;SET VECTOR TO NEXT START BIT
0081 07                 LR      QL,A
0082 29 01 E9           JMP     XMIT            ;NO, CONTINUE ELSEWHERE
                ***
                *
                * SET UP INTERRUPT SAVE LOCATIONS TO START BACKGROUND FUNCTION CARD COS SCAN
                * WHEN GET CHARACTER'S INITIALIZATION ROUTINE RETURNS FROM INTERRUPT.
                * THIS IS WHERE THE LINE IS TURNED AROUND FROM XMIT TO RECEIVE
                *
0085 70         XRTRNA  CLR
0086 59                 LR      9,A             ;CLEAR STATUS
                *
                * INITIALIZE ANY OTHER PART OF THE DATA BASE NECESSARY
                *
0087 28 00 D1           PI      GCMD            ;KLUGE TO GET GCMD IN PROGRAM COUNTER AND
008A 29 02 44           JMP     BGNDLP          ;SET STACK WITH RETURN ADDR DIRECTED TO BACKGRND
                * CHARACTER HAS BEEN RECEIVED, CHECK FOR FRAMING ERROR
                ***
008D A6         STPBTV  INS     EXTINT          ;READ EXTERNAL INT PIN
008E 91 40              BM      TOPGC           ;IF M, NO FRAMING ERROR
                *
                * MARK THIS LINE FAILED
                * KISS OFF REST OF MESSAGE
                *
0090 62                 LISU    PMDCTU          ;WHICH LINE FAILED?
0091 6B                 LISL    PMDCTL
0092 74                 LIS     BRCVEN
0093 FC                 NS      S
0094 02                 LR      A,QU
0095 84 05              BZ      FRMER1          ;IF Z, B FAILED
0097 22 20              OI      FAILA           ;MARK A FAILED
0099 90 03              BR      *+4
009B 22 08      FRMER1  OI      FAILB           ;MARK B FAILED
009D 06                 LR      QU,A
009E 90 32              BR      GCMD            ;RESET COMMAND SEARCH
                ********
                ********
                *
                * EXTERNAL INTERRUPT STARTS EXECUTION HERE
                *
                ********
                ********
                        ORG     H"A0"
00A0 1E                 LR      J,W             ;SAVE STATUS
00A1 58                 LR      ACCSAV,A        ;SAVE ACCUMULATOR
00A2 0A                 LR      A,IS            ;ISAR
00A3 57                 LR      ISARSV,A
                *
                * SET TIMER FOR 1/2 BIT TIME
                *
00A4 20 E6              LI      BTIMD2          ;SET TIMER DATA
00A6 B7                 OUTS    TIMERD
00A7 20 2A              LI      BTIMC2          ;SET TIMER CONTROL
00A9 B6                 OUTS    ICP
00AA 20 26              LI      SBV             ;SET TIMER VECTOR
00AC 07                 LR      QL,A
                *
                * IF A SYNCH CHARACTER HAS NOT BEEN FOUND, ACCEPT INPUT FROM EITHER LINE.
                *
00AD 62                 LISU    MRCVCU
00AE 6B                 LISL    MRCVCL
00AF 4C                 LR      A,S
00B0 21 10              NI      SYNFND
00B2 94 0A              BNZ     EXTRTI          ;IF NZ, SYNCH FOUND, DO NOT RESELECT LINE.
                *
                * DECIDE WHICH LINE CAUSED THE INTERRUPT AND DISABLE RECEIVE FROM OTHER LINE
                *
00B4 A1                 INS     PMD             ;READ TRUNK PORT, IS LINE A ACTIVE?
00B5 7E                 LIS     LINEAC          ;ASSUME IT IS
00B6 91 03              BM      XINTA           ;IF M, GOOD ASSUMPTION
00B8 20 1A              LI      LINEBC          ;WRONG, LINE B INTERRUPTED
00BA B1         XINTA   OUTS    PMD             ;ENABLE APPROPRIATE TRUNK
00BB 6B                 LISL    PMDCTL          ;POINT ISAR TO PMDT CONTROL SAVE AREA
00BC 5C                 LR      S,A             ;SAVE CURRENT CONTROL BYTE
                *
                * RESTORE REGISTERS AND RETURN FROM EXTERNAL INTERRUPT
                *
00BD 47         EXTRTI  LR      A,ISARSV        ;RESTORE ISAR
```

```
 00BE 0B              LR      IS,A
 00BF 48              LR      A,ACCSAV          ;RESTORE ACCUMULATOR
 00C0 1D              LR      W,J               ;STATUS
 00C1 1B              EI                        ;ENABLE INTERRUPTS
 00C2 1C              POP                       ;RETURN
               ***
               * SEND START BIT
               ***
 00C3 62       STRTGN LISU    PMDCTU            ;POINT TO CURRENT TRUNK CONTROL BYTE
 00C4 6B              LISL    PMDCTL
 00C5 4C              LR      A,S
 00C6 1F              INC
 00C7 B1              OUTS    PMD               ;PULL DOWN LINE
 00C8 78       STRGNA LIS     8                 ;SET BIT COUNT FOR DATA
 00C9 51              LR      BITCNT,A
 00CA 20 68           LI      SND8              ;SET TIMER VECTOR TO SEND 8 BITS
 00CC 07              LR      QL,A
 00CD 90 AB    TO4RTI BR      TORTI             ;BYE
 00CF 90 46    TOPGC  BR      PRGDCH
               ********
               ********
               *
               * PMDT COMMAND RECEIVE SEGMENT
               * THIS ROUTINE RUNS IN THE FOREGROUND AND PROCESSES MESSAGES FROM THE HOST.
               *
               ********
               ********
               *
               * LOOK FOR A COMMAND FROM THE HOST DIRECTED TO THIS CUSDAP
               *
               ICTO   EQU     *                 ;INTER-CHARACTER TIME OUT
 00D1 70       GCMD   CLR                       ;CLEAR CRC
 00D2 52              LR      CRCHI,A           ;HI BYTE
 00D3 53              LR      CRCLO,A           ;LO BYTE
               *
               * CLEAR MESSAGE RECEIVE CONTROL FLAGS
               *
 00D4 62              LISU    MRCVCU            ;CLEAR MSG RCV CTRL FLAGS
 00D5 68              LISL    MRCVCL
 00D6 5D              LR      I,A
 00D7 5D              LR      I,A               ;CLEAR MSG COUNT
               *
               * SET RECEIVE BUFFER POINTER
               *
 00D8 20 3E           LI      RCVBUF-1
 00DA 5D              LR      I,A
               *
               * SELECT LINE SEGMENT
               * CHECK EACH LINE FOR RETURN TO SERVICE
               * IF BOTH LINES ARE DOWN, WAIT ONE BIT TIME AND
               * CHECK RETURNED AGAIN,
               * ELSE ENABLE UNFAILED LINES
               *
 00DB 7A       SETIME LIS     MSGDET            ;ENABLE BOTH
 00DC B1              OUTS    PMD
 00DD 02              LR      A,QU              ;IS A FAILED?
 00DE 21 20           NI      FAILA
 00E0 84 08           BZ      SLCT50            ;IF Z, NO
 00E2 A1              INS     PMD
 00E3 91 05           BM      SLCT50            ;IF M, NOT RETURNED
 00E5 02              LR      A,QU              ;MARK A RETURNED
 00E6 23 20           XI      FAILA
 00E8 06              LR      QU,A
 00E9 02       SLCT50 LR      A,QU              ;IS B FAILED?
 00EA 21 08           NI      FAILB
 00EC 84 09           BZ      SLCT70            ;IF Z, NO
 00EE A1              INS     PMD
 00EF 13              SL      1
 00F0 91 05           BM      SLCT70            ;IF M, STILL DEAD
 00F2 02              LR      A,QU              ;MARK B RETURNED
 00F3 23 08           XI      FAILB
 00F5 06              LR      QU,A
               *
               * ENABLE PMD
               *
 00F6 02       SLCT70 LR      A,QU              ;ARE BOTH LINES FAILED?
 00F7 21 28           NI      FAILA+FAILB
 00F9 25 28           CI      FAILA+FAILB
 00FB 84 0C           BZ      SLCT80            ;IF Z, YES, WAIT FOR RETURN
 00FD 12              SR      1                 ;NO, ENABLE REMAINING LINES
 00FE 22 0A           OI      MSGDET
 0100 B1              OUTS    PMD
```

```
0101 20 80              LI      IMICP           ;CONTROL INTER-MSG INTERRUPT
0103 B6                 OUTS    ICP
0104 1F                 INC                     ;CLEAR ANY EXT INT QUEUED PREVIOUSLY
0105 B6                 OUTS    ICP
0106 90 C6      TO2RTI  BR      TO4RTI
                *
                * ALL LINES HAVE FAILED
                *
0108 20 1E      SLCT80  LI      MSGHLD          ;HOLD OFF PMD
010A B1                 OUTS    PMD
010B 20 A7              LI      BTIND           ;WAIT ONE BIT TIME
010D B7                 OUTS    TIMERD
010E 20 6A              LI      BTINC
0110 B6                 OUTS    ICP
0111 20 DB              LI      SETIME
0113 07                 LR      QL,A
0114 90 F1              BR      TO2RTI
                *
                * PROCESS GOOD CHARACTER FOUND
                *
                PRGDCH  EQU     *
                ***
                * CHECK WHERE WE ARE IN MSG ASSEMBLY PROCESS
                ***
0116 62                 LISU    MRCVCU          ;GET MSG RECEIVE CONTROL FLAGS
0117 68                 LISL    MRCVCL
0118 70                 CLR
0119 EC                 XS      S               ;ARE WE RECEIVING CRC?
011A 81 04              BP      AFND            ;IF P, NO CRC YET
011C 69                 LISL    MSGCTL          ;DO NOT ENTER CRC INTO BUFFER
011D 90 15              BR      CKCRC
                AFND    EQU     *
011F 13                 SL      1               ;HAS ADDRESS BEEN FOUND?
0120 81 4B              BP      CKCNT           ;IF PLUS, NO, GO CHECK COUNT
                *
                * THE FIRST THREE CHARACTERS OF THE MESSAGE HAVE ALREADY BEEN FOUND.
                * ENTER THIS CHARACTER INTO THE CRC, PUT IT IN THE BUFFER IF NECESSARY,
                * AND CHECK FOR MESSAGE DONE.
                *
0122 78                 LIS     VLDLEN          ;ARE WE BUFFERING THIS MSG?
0123 FD                 NS      I
0124 84 0E              BZ      CKCRC           ;IF ZERO, NO, LENGTH WAS TOO LONG
0126 6A                 LISL    BFPLWR
0127 4C                 LR      A,S             ;GET BUFFER PTR IN A
                *
                * STORE CHARACTER
                *
0128 0B                 LR      IS,A            ;SET BUFFER PTR
0129 40                 LR      A,SERIAL        ;GET RECEIVED CHARACTER
012A 5E                 LR      D,A             ;STORE CHAR AND DECR BUF PTR
012B 0A                 LR      A,IS            ;SAVE ISAR
012C 8F 03              BR7     AFNDA           ;IF NOT 7, DON'T UPDATE HI OCTET
                *
                * MOVE TO NEXT LOWER OCTET
                *
012E 24 F8              AI      -O"10"          ;SUBTRACT 8.
0130 62         AFNDA   LISU    BFPUPR          ;POINT TO SAVE AREA FOR BUF PTR
0131 6A                 LISL    BFPLWR
0132 5E                 LR      D,A             ;RESTORE UPDATED PTR
                *
                * ENTER CHARACTER INTO CRC
                *
                * CRC CALCULATION USING 64 BYTE TABLE
                * SERIAL - CHARACTER TO BE ENTERED
                * CRCLO - PARTIAL CRC LO ORDER BYTE
                * CRCHI - PARTIAL CRC HI ORDER BYTE
                * ACC, DC0, AND DC1 ARE USED
                * 49 CYCLES = 98 MICRO-SECONDS
                *
0133 40         CKCRC   LR      A,SERIAL        ;GET NEXT CHARACTER
0134 E3                 XS      CRCLO           ;XOR WITH LO PARTIAL
0135 53                 LR      CRCLO,A         ;SAVE AS INDEX TO MODIFIER TABLE
0136 21 F0              NI      H"F0"           ;MAKE INDEX TO 2ND MODIFIER
0138 12                 SR      1               ;MAKE IT
0139 12                 SR      1               ;A WORD
013A 12                 SR      1               ;OFFSET
013B 2A 07 DF           DCI     CRCTAB+32       ;POINT TO HI END OF TABLE
013E 8E                 ADC                     ;MAKE PTR TO LO BYTE OF 2ND MOD
013F 2C                 XDC                     ;SAVE IN DC1
0140 43                 LR      A,CRCLO         ;MAKE INDEX TO 1ST MODIFIER
0141 21 0F              NI      H"0F"
0143 13                 SL      1               ;MAKE WORD OFFSET
```

```
0144 2A 07 BF         DCI    CRCTAB
0147 8E               ADC                        ;PTR TO LO BYTE OF 1ST MOD
0148 16               LM                         ;GET LO BYTE OF 1ST MOD
0149 2C               XDC                        ;SWAP DC'S
014A 8C               XM                         ;XOR 2 LO BYTES OF MOD'S
014B E2               XS     CRCHI               ;XOR MOD SUM WITH OLD HI
014C 53               LR     CRCLO,A             ;SAVE AS NEW LOW
014D 16               LM                         ;GET HI BYTE OF 2ND MOD
014E 2C               XDC                        ;PTR TO HI BYTE OF 1ST MOD
014F 8C               XM                         ;XOR HI BYTES OF MOD'S
0150 52               LR     CRCHI,A             ;SAVE NEW HI
                *
                * DECREMENT BYTE COUNT.  IS MSG DONE?
                *
0151 3E               DS     D
0152 84 0D            BZ     CNTDON              ;IF Z, MESSAGE IS DONE
0154 20 D1      RCTDN LI     ICTO                ;SET INTER-CHARACTER TIME-OUT
0156 07               LR     QL,A
0157 70               LIS    ICTOD               ;SET TIMER DATA
0158 B7               OUTS   TIMERD
0159 20 EA            LI     ICTOC               ;TIMER CONTROL
015B 86               OUTS   ICP
015C 1F               INC
015D 86               OUTS   ICP
015E 90 A7            BR     TO2RTI              ;NOT YET, RESTORE AND RETURN FROM INTERRUPT
                *
                * HAS THE CRC BEEN RECEIVED?
                *
0160 70         CNTDON CLR
0161 EC               XS     S
0162 91 4B            BM     CRCDON              ;IF M, CRC IS IN
0164 4C               LR     A,S
0165 23 80            XI     CRCFND              ;SET FOUND
0167 5D               LR     I,A
0168 72               LIS    2                   ;COUNT 2 CRC BYTES
0169 5C               LR     S,A
016A 90 E9            BR     RCTDN
                ***
                * HAS A COUNT BEEN FOUND?
                ***
016C 13         CKCNT SL     1
016D 81 0F            BP     CKSYN               ;IF PLUS, NOT YET
                *
                * YES, THIS MUST BE THE ADDRESS
                * IF THIS MSG IS ADDRESSED TO ME THEN TELL BACKGROUND
                * SCAN TO HOLD OFF UNTIL THIS COMMAND HAS BEEN PROCESSED.
                *
016F A5               INS    ADDR                ;GET ID SWITCHES
0170 21 3F            NI     H"3F"
0172 E0               XS     SERIAL
0173 20 40            LI     ADRFND              ;SET ADDR FOUND IN ANY CASE.
0175 94 03            BNZ    CKCNTA              ;IF NZ, NOT MY ADDRESS
0177 22 04            OI     MEFLAG              ;IT'S FOR ME.  SET ME FLAG TOO.
0179 EC         CKCNTA XS    S                   ;MERGE WITH OTHERS
017A 5D               LR     I,A                 ;RESTORE ALL
017B 90 B7            BR     CKCRC               ;FINISH ABOVE
                ***
                * HAS A MSG SYNCH CHARACTER BEEN FOUND?
                ***
017D 13         CKSYN SL     1
017E 81 21            BP     TSTSYN              ;IF P, NOT YET
                *
                * SYN FOUND, THIS MUST BE MSG LENGTH
                * IS COUNT LESS THAN THE MINIMUM?
                * ADDR, COMMAND, AND 2 CRC BYTES MUST BE THERE.
                *
0180 40               LR     A,SERIAL            ;GET COUNT
0181 25 03            CI     3
0183 92 04            BNC    CKSYNA              ;IF NO CARRY, COUNT IS GREATER THAN 4
                *
                * COUNT IS TOO SMALL.
                * PROCESS TOO SMALL OF A COUNT.
                *
0185 29 00 D1   TOGCMD JMP   GCMD
                *
                * IS COUNT TOO LARGE FOR THIS BUFFER?
                *
0188 25 13      CKSYNA CI    19                  ;COUNT GREATER THAN 19?
018A 92 04            BNC    CKSYNB              ;IF NO CARRY, YES
018C 78               LIS    VLDLEN              ;COUNT IN RANGE, SET FLAG
018D EC               XS     S                   ;MERGE WITH OTHERS
018E 5C               LR     S,A      ;RESTORE
                *
```

```
              * PUT COUNT OF MSG LESS CRC +1 IN MSGCNT.
              * PLUS 1 BECAUSE MSGCNT GETS DECREMENTED AFTER CKCRC
              *
018F 40       CKSYNB  LR     A,SERIAL
0190 67               LISU   RBFU              ;SAVE COUNT OF DATA, NO DAP ADDR NOR CRC, IN
0191 6F               LISL   RBFL              ;1ST BYTE OF RCV BUFFER, TOO.
0192 24 FD            AI     -3
0194 5C               LR     S,A
0195 1F               INC                      ;COUNT ADDR
0196 1F               INC
0197 62               LISU   MSGCTU
0198 69               LISL   MSGCTL
0199 5E               LR     D,A
              *
              * SET COUNT FOUND FLAG
              *
019A 20 20            LI     CNTFND            ;GET FLAG
019C EC               XS     S                 ;MERGE WITH OTHERS
019D 5D               LR     I,A      ;RESTORE ALL
019E 90 94            BR     CKCRC             ;FINISH ABOVE
              ***
              * NO SYNCH CHAR YET, IS THIS ONE?
              ***
01A0 20 16    TSTSYN  LI     SYN               ;GET SYN CHAR
01A2 E0               XS     SERIAL            ;COMPARE TO RCV'D BYTE
01A3 84 04            BZ     TSTSNA            ;IF Z, WE HAVE A SYN
01A5 29 00 DB         JMP    SETIME            ;IGNORE CHAR
              *
              * FOUND A SYNCH CHAR, SET SYNFND FLAG AND ENTER INTO CRC
              *
01A8 20 10    TSTSNA  LI     SYNFND            ;GET FLAG
01AA EC               XS     S                 ;MERGE WITH OTHERS
01AB 5D               LR     I,A               ;SAVE ALL
01AC 90 86            BR     CKCRC             ;FINISH ABOVE
              ***
              * ALL CHARACTERS RECEIVED, ANY CRC ERROR?
              ***
01AE 70       CRCDON  CLR                      ;IS LO BYTE OF CRC ZERO?
01AF E3               XS     CRCLO
01B0 94 04            BNZ    CRCERR            ;IF NZ, NO
01B2 E2               XS     CRCHI             ;IS HI BYTE ZERO?

01B3 84 03            BZ     CNTDNA            ;IF Z, YES
              *
              * CRC ERROR, PROCESS IT
              *
              CRCERR  EQU    *
01B5 90 CF            BR     TOGCMD
              *
              * CRC CHECKS OUT, WAS THE LENGTH GOOD AND
              * MSG ADDRESSED TO ME?
              *
01B7 7C       CNTDNA  LIS    VLDLEN+MEFLAG     ;GET FLAGS
01B8 FD               NS     I                 ;ALONE
01B9 25 0C            CI     VLDLEN+MEFLAG     ;ARE BOTH SET?
01BB 84 03            BZ     STRSP             ;IF Z, IT'S MINE, START RESPONSE
01BD 90 C7            BR     TOGCMD            ;NOT FOR ME, LOOK FOR NEXT MSG
              *
              *
              * VALID MESSAGE TO ME HAS BEEN RECEIVED
              * PROCESS GOOD MSG
              *
              ********
              ********
              *
              * START RESPONSE TO HOST SEGMENT
              *
              * AT THIS POINT WE KISS OFF WHAT WE WERE DOING PRIOR TO THE LAST INTERRUPT.
              * THAT BACKGROUND FC COV SCAN WILL BE RESTARTED AFTER THIS COMMAND HAS BEEN
              * PROCESSED.  THOUGH THIS SEGMENT IS ENTERED VIA A TIMER INTERRUPT VECTOR,
              * IT HAS BECOME THE BACKGROUND TASK.
              *
              ********
              ********
              *
              * SET TIMER TO DELAY UNTIL REST OF STOP BIT IS IN
              *
01BF 20 6D    STRSP   LI     STPDL2
01C1 B7               OUTS   TIMERD
01C2 20 2A            LI     STPCL2
01C4 B6               OUTS   ICP
01C5 20 4E            LI     RXTURN            ;VECTOR TO LINE TURNAROUND
01C7 07               LR     QL,A              ;FROM RCV TO XMIT
```

```
01C8 1B                    EI                              ;ENABLE INTERRUPTS
                   *
                   * PRESET FLAGS, POINTERS, AND DATA BUFFERS TO START SENDING THE
                   * MESSAGE HEADER CONSISTING OF SYN, COUNT, ADDRESS
                   *
01C9 20 16                 LI       SYN                    ;WE'LL BE SENDING SYNCH
01CB 50                    LR       SERIAL,A
01CC 73                    LIS      3                      ;3 BYTES TO SEND
01CD 5D                    LR       I,A
01CE 4C            STRSP5  LR       A,S                    ;PUT HDR OF RSP RIGHT AFTER CMD FROM HOST
01CF 24 FF                 AI       -1
01D1 0B                    LR       IS,A
01D2 A5                    INS      ADDR                   ;ENTER ADDRESS
01D3 21 3F                 NI       H"3F"
01D5 5E                    LR       D,A
01D6 0A                    LR       A,IS                   ;SET NXTBUF PTR FOR RIGHT AFTER HEADER
01D7 8F 03                 BR7      ISUVFZ
01D9 24 F8                 AI       -O"10"
01DB 62            ISUVFZ  LISU     NXBFPU
01DC 6C                    LISL     NXBFPL
01DD 5D                    LR       I,A
01DE 70                    CLR
01DF 5C                    LR       S,A                    ;CLEAR NEXT BUFFER COUNT
                   *
                   * ENTER SYN INTO CRC
                   *
01E0 20 CE                 LI       SYNCRH
01E2 52                    LR       CRCHI,A
01E3 20 81                 LI       SYNCRL
01E5 53                    LR       CRCLO,A
                   **
                   * RESPONSE TO HOST IS NOW STARTED
                   **
01E6 29 04 BA              JMP      PROCMD                 ;GO PROCESS COMMAND
                   ********
                   ********
                   *
                   * CONTINUE SENDING RESPONSE TO HOST
                   *
                   ********
                   ********
01E9 69            XMIT    LISL     MSGCTL                 ;IS THIS BUFFER DONE?
01EA 3D                    DS       I
01EB 84 2E                 BZ       XMTD                   ;IF ZERO, YES
                   *
                   * PUT NEXT CHARACTER TO BE TRANSMITTED IN HOLDING REGISTER
                   *
01ED 4C            XMTB    LR       A,S                    ;GET POINTER TO NEXT CHARA
01EE 0B                    LR       IS,A                   ;POINT ISAR TO NEXT CHAR
01EF 4E                    LR       A,D                    ;GET NEXT CHAR AND DECR BUF PTR
01F0 50                    LR       SERIAL,A               ;PUT CHAR IN HOLDING REG
01F1 0A                    LR       A,IS                   ;SAVE CURRENT BUF PTR
01F2 8F 03                 BR7      XMTC                   ;IF LO OCTET OF ISAR NOT 7 THEN NO UNDERFLOW
01F4 24 F8                 AI       -O"10"                 ;ISAR UNDERFLOW, GET TO LOWER OCTET
01F6 62            XMTC    LISU     BFPUPR                 ;POINT TO BUFF PTR SAVE AREA
01F7 6A                    LISL     BFPLWR
01F8 5C                    LR       S,A                    ;RESTORE BUFFER PTR
                   *
                   * ENTER THIS CHARACTER INTO THE PARTIAL CRC
                   *
                   * CRC CALCULATION USING 64 BYTE TABLE
                   * SERIAL - CHARACTER TO BE ENTERED
                   * CRCLO - PARTIAL CRC LO ORDER BYTE
                   * CRCHI - PARTIAL CRC HI ORDER BYTE
                   * ACC, DC0, AND DC1 ARE USED
                   * 49 CYCLES = 98 MICRO-SECONDS
                   *
01F9 40                    LR       A,SERIAL               ;GET NEXT CHARACTER
01FA E3                    XS       CRCLO                  ;XOR WITH LO PARTIAL
01FB 53                    LR       CRCLO,A                ;SAVE AS INDEX TO MODIFIER TABLE
01FC 21 F0                 NI       H"F0"                  ;MAKE INDEX TO 2ND MODIFIER
01FE 12                    SR       1                      ;MAKE IT
01FF 12                    SR       1                      ;A WORD
0200 12                    SR       1                      ;OFFSET
0201 2A 07 DF              DCI      CRCTAB+32              ;POINT TO HI END OF TABLE
0204 8E                    ADC                             ;MAKE PTR TO LO BYTE OF 2ND MOD
0205 2C                    XDC                             ;SAVE IN DC1
0206 43                    LR       A,CRCLO                ;MAKE INDEX TO 1ST MODIFIER
0207 21 0F                 NI       H"0F"
0209 13                    SL       1                      ;MAKE WORD OFFSET
020A 2A 07 BF              DCI      CRCTAB
020D 8E                    ADC                             ;PTR TO LO BYTE OF 1ST MOD
```

```
020E 16              LM                         ;GET LO BYTE OF 1ST MOD
020F 2C              XDC                        ;SWAP DC'S
0210 8C              XM                         ;XOR 2 LO BYTES OF MOD'S
0211 E2              XS       CRCHI             ;XOR MOD SUM WITH OLD HI
0212 53              LR       CRCLO,A           ;SAVE AS NEW LOW
0213 16              LM                         ;GET HI BYTE OF 2ND MOD
0214 2C              XDC                        ;PTR TO HI BYTE OF 1ST MOD
0215 8C              XM                         ;XOR HI BYTES OF MOD'S
0216 52              LR       CRCHI,A           ;SAVE NEW HI
0217 29 00 42 TO3RTI JMP      RSTRTI            ;RETURN FROM INTERRUPT
              ***
              * THIS BUFFER'S WORTH OF DATA IS DONE.  ANY DATA IN OTHER BUFFER?
              ***
              XMTD   EQU      *                 ;POINT ISAR TO NEXT BUFFER COUNT
021A 6D              LISL     NXBCL
021B 70              CLR
021C EC              XS       S
021D 84 0B           BZ       XMTE              ;IF Z, NO OTHER DATA IS READY
              *
              * MORE DATA TO BE SENT, SWITCH BUFFERS
              *
021F 69       XMT20  LISL     MSGCTL
0220 5C              LR       S,A               ;SET CURRENT COUNT TO NEXT COUNT
0221 70              CLR                        ;CLEAR NEXT COUNT
0222 6D              LISL     NXBCL
0223 5E              LR       D,A               ;AND POINT TO BUFF PTR SAVE
0224 4C              LR       A,S               ;GET NEXT BUF PTR
0225 6A              LISL     BFPLWR
0226 5C              LR       S,A
0227 90 C5           BR       XMTB              ;GET NEXT BYTE ABOVE
              *
              * NO DATA READY, SHALL WE SEND CRC OR IS IT OUT TOO?
              *
0229 72       XMTE   LIS      CRCSNT            ;GET FLAG
022A 68              LISL     MRCVCL
022B FC              NS       S
022C 94 12           BNZ      XMTF              ;IF NZ, CRC ALREADY SENT
022E 72              LIS      CRCSNT            ;WE'RE GOING TO SEND IT, SET FLAG
022F EC              XS       S
0230 5D              LR       I,A
0231 72              LIS      2                 ;SET COUNT
0232 5D              LR       I,A
0233 20 3F           LI       RCVBUF
0235 5C              LR       S,A               ;TO START OF FIRST BUF
0236 0B              LR       IS,A
0237 43              LR       A,CRCLO           ;MOVE CRC INTO BUFFER
0238 5E              LR       D,A
0239 42              LR       A,CRCHI
023A 5C              LR       S,A
023B 62              LISU     BFPUPR
023C 6A              LISL     BFPLWR
023D 90 AF           BR       XMTB              ;FINISH ABOVE
              *
              * RESPONSE IS DONE, SET TIMER VECTOR FOR XMIT TO RECEIVE TURN AROUND
              *
023F 20 85    XMTF   LI       XRTRNA
0241 07              LR       QL,A
0242 90 D4           BR       TO3RTI
              *
              ********
              ********
              *
              * FUNCTION CARD COV SCAN
              *
              * THIS SEGMENT ACCESSES EACH SLOT IN TURN AND GETS THE NUMBER OF COV'S
              * THE FUNCTION CARD HAS TO REPORT.
              *
              ********
              ********
0244 62       BGNDLP LISU     MRCVCU            ;IS THIS DAP BEING ACCESSED BY THE HOST?
0245 68              LISL     MRCVCL
0246 7C              LIS      MEFLAG+VLDLEN
0247 FC              NS       S
0248 25 0C           CI       MEFLAG+VLDLEN
024A 94 04           BNZ      FCSCNA            ;IF NZ, NO, SCAN NEXT CARD
              *
              * DON'T FOOL WITH BACKPLANE IF HOST WANTS IT.
              * HANG AROUND CALCULATING ROM CKSM FOR LACK OF
              * ANYTHING BETTER TO DO.  70 MS FOR 2K OF ROM.
              *
024C 29 02 FB        JMP      SCN80
              *
              * DECIDE WHETHER WE SEND A GET COV COUNT COMMAND OR A WRU COMMAND.
```

```
                    * IF THE HOST HAS SOME UN-ACKNOWLEDGED COV INFO OR THE CARD IS FAILED
                    * OR POWER UP THEN SEND A WRU, ELSE REQUEST COV COUNT.
                    *
024F 64     FCSCNA  LISU    FCMERU          ;CLEAR RETRY COUNT
0250 6C             LISL    FCMERL
0251 70             CLR
0252 5C             LR      S,A
                    *
0253 02     FCSCAN  LR      A,QU
0254 23 00          XI      0               ;IS THIS THE POWER UP INIT SCAN?
0256 91 15          BM      SNDWRU          ;IF M, YES, SEND WRU
0258 70             CLR
0259 E5             XS      CRNTFC          ;UN-ACK'D COV?
025A 91 11          BM      SNDWRU          ;IF MI, YES, DON'T GET MORE COV
                    *
                    * GET CARD'S DATABASE TO SEE IF IT IS FAILED.
                    *
025C 21 07          NI      7               ;GET CARD # ALONE
025E 0B             LR      IS,A            ;PUT IT IN ISAR
025F 63             LISU    CDCOVU          ;ISAR TO PROPER OCTET
0260 70             CLR
0261 EC             XS      S               ;GET DATA BASE IN A
0262 91 09          BM      SNDWRU          ;IF MI, CARD HAS FAILED
0264 45             LR      A,CRNTFC        ;SET SCAN TYPE FLAG FOR GET COV CNT
0265 22 40          OI      SCNTYP
0267 55             LR      CRNTFC,A
                    *
                    * INITIATE COMMAND TO FUNCTION CARD
                    *
0268 20 81          LI      GTCOVN          ;PUT IN GET COV CNT CMD
026A 90 07          BR      COMSCN
                    *
                    * SEND A WRU AND RESET SCAN TYPE FLAG
                    *
026C 45     SNDWRU  LR      A,CRNTFC
026D 21 BF          NI      SCNTPM
026F 55             LR      CRNTFC,A
0270 20 80          LI      WRU
0272 64     COMSCN  LISU    SCNBFU          ;PUT WRU IN BUFFER
0273 6F             LISL    SCNBFL
0274 5C             LR      S,A
0275 0A             LR      A,IS            ;INIT BUFFER PTR
0276 64             LISU    BFPFCU
0277 68             LISL    BFPFCL
0278 5C             LR      S,A
0279 6B             LISL    CNTFCL          ;SET COUNT
027A 72             LIS     2
027B 5C             LR      S,A
027C 60             LISU    0               ;POINT TO CURRENT FC
027D 6D             LISL    CRNTFC
                    *
                    * SEND REST OF COMMAND
                    * ENTER WITH ISAR POINTING TO THE CURRENT FUNCTION CARD NUMBER
                    *
027E 28 03 28       PI      SNDCMD          ;SEND MSG TO FC
0281 82 0B          BC      SCNERR          ;IF C, FCRDY TIMED OUT
                    *
                    * NO XMIT ERROR, IS COUNT VALID?
                    * MUST BE 3
                    *
0283 4C             LR      A,S
0284 25 03          CI      3
0286 84 0D          BZ      SCN40
0288 20 92          LI      -DLY1MS         ;DELAY 1 MS TO ALLOW FC TO TIME OUT AND
028A 1F             INC                     ;RETURN FROM INTERRUPT
028B 94 FE          BNZ     *-1
                    *
                    * INVALID COMMUNICATION WITH FUNCTION CARD
                    * FCRDY TIMEOUT, CHECKSUM ERROR, INVALID RESPONSE LENGTH, DBL WIDE IN ODD SLOT
                    *
028D 28 03 DF SCNERR PI     FCOMER
0290 82 48          BC      NXCARD
0292 90 C0          BR      FCSCAN
                    *
                    * GOOD COUNT
                    *
0294 68     SCN40   LISL    BFPFCL
0295 20 27          LI      SCNBFR          ;SET BUFFER PTR
0297 5D             LR      I,A             ;LEAVE ISAR AT TIMEOUT COUNT
                    *
                    * PICKUP REST OF RSP FROM FC
                    *
0298 28 03 9E       PI      RCVRSP
```

```
029B 82 F1            BC      SCNERR          ;IF C, FCRDY TIMED OUT
                *
                * CHECK FOR VALID RESPONSE
                *
029D 64               LISU    SCNBFU
029E 6F               LISL    SCNBFL
029F 76               LIS     ACK
02A0 EE               XS      D               ;ONLY ACK'S ALLOWED HERE
02A1 94 EB            BNZ     SCNERR          ;IF NZ, ACK ERR
                *
                * WELL, WE'VE HAD A SUCCESSFUL TALK WITH THE FUNCTION CARD, WHAT DOES
                * IT ALL MEAN?
                *
02A3 45         SCN45 LR      A,CRNTFC        ;WERE WE WRU'ING?
02A4 13               SL      1
02A5 81 0F            BP      WRUEND          ;IF P, WE WERE
                *
                * GET COV COUNT
                *
02A7 4C               LR      A,S
02A8 21 3F            NI      H"3F"           ;COUNT MUST BE IN LOW 6 BITS
02AA 56               LR      CKSM,A          ;SAVE IT
02AB 45               LR      A,CRNTFC        ;POINT TO FC'S DB
02AC 0B               LR      IS,A
02AD 63               LISU    CDCOVU
02AE 4C               LR      A,S             ;GET OLD COUNT AND CONTROL
02AF 21 C0            NI      H"C0"           ;SAVE CONTROL
02B1 E6               XS      CKSM            ;MERGE NEW COUNT
02B2 5C               LR      S,A
02B3 90 25            BR      NXCARD          ;GO TO NEXT CARD
                *
                * SUCCESSFUL RESPONSE TO WRU SCAN
                *
02B5 02         WRUEND LR     A,QU            ;ARE WE AT POWER-UP?
02B6 23 00            XI      0
02B8 91 05            BM      SCN50           ;YES
02BA 70               CLR                     ;ARE THERE ANY UN-ACK'D COVS?
02BB E5               AS      CRNTFC
02BC 91 1C            BM      NXCARD          ;IF M, YES, DON'T CONFUSE HIM
                *
                * A FAILED CARD HAS JUST RETURNED - POWER UP
                *
02BE 64         SCN50 LISU    SCNBFU
02BF 6E               LISL    SCNBFL-1
02C0 4C               LR      A,S
02C1 21 10            NI      DBLID           ;IS IT A DOUBLE WIDE CARD?
02C3 84 10            BZ      SCNSGL          ;IF Z, NO.
                *
                * ONLY EVEN NUMBERED SLOTS MAY BE DOUBLE WIDE
                *
02C5 71         DBLA  LIS     1
02C6 F5               NS      CRNTFC
02C7 94 C5            BNZ     SCNERR          ;IF NZ, ODD ADDRESS
                *
                * SET DOUBLE WIDE BIT IN DB AND FF IN NEXT BYTE TO DISABLE NEXT SLOT
                *
02C9 45         SCN55 LR      A,CRNTFC
02CA 0B               LR      IS,A
02CB 63               LISU    CDCOVU
02CC 20 40            LI      DBLINI
02CE 5D               LR      I,A
02CF 20 FF            LI      H"FF"
02D1 5C               LR      S,A
02D2 90 06            BR      NXCARD
                *
                * THIS IS A SINGLE WIDE CARD, INIT IT'S DB.
                *
02D4 45         SCNSGL LR     A,CRNTFC
02D5 0B               LR      IS,A
02D6 63               LISU    CDCOVU
02D7 70               CLR
02D8 5C               LR      S,A
                *
                * DROP THRU TO NEXT CARD
                *
                * WE'RE DONE WITH THIS CARD, WHAT NEXT?
                *
02D9 45         NXCARD LR     A,CRNTFC        ;BUMP CURRENT FC PTR
02DA 0B               LR      IS,A
02DB 63               LISU    CDCOVU
02DC 4C               LR      A,S
02DD 21 40            NI      DBLINI
```

```
02DF 45              LR    A,CRNTFC
02E0 84 02           BZ    SCN70
02E2 1F              INC
02E3 1F     SCN70    INC
02E4 55              LR    CRNTFC,A
02E5 21 07           NI    7               ;CHECK BOX DONE
02E7 84 04           BZ    BOXDON
02E9 29 02 44 TOBGND JMP   BGNDLP          ;TRY NEXT CARD
            *
            * ALL CARDS CHECKED, RESET CURRENT FC ADDR
            *
02EC 45     BOXDON   LR    A,CRNTFC        ;RESET TO 1ST FC
02ED 21 F0           NI    H"F0"
02EF 55              LR    CRNTFC,A
            *
            * IS THE POWER UP FLAG SET?
            * IF SO, CLEAR IT AND ENABLE MESSAGES FROM HOST
            *
02F0 02              LR    A,QU
02F1 23 00           XI    0
02F3 81 07           BP    SCN80           ;IF P, NOT POWER UP
02F5 20 28           LI    FAILA+FAILB     ;MARK BOTH LINES FAILED AND GET SELECT RESTORE
02F7 06              LR    QU,A            ;CLEAR FLAG
02F8 29 00 B5        JMP   XRTRNA
            *
            * UPDATE BST LED
            *
02FB A5     SCN80    INS   ADDR
02FC 21 40           NI    BSTLED
02FE 23 40           XI    BSTLED
0300 B5              OUTS  ADDR
            *
            * CALCULATE ROM CKSM
            *
0301 2A 00 00        DCI   0               ;START AT 0
0304 70              CLR                   ;INIT CKSM TO 0
0305 54              LR    TMPDTA,A
0306 44     CKLPFC   LR    A,TMPDTA        ;GET CURRENT PARTIAL CKSM
0307 8C              XM                    ;XOR NEXT BYTE AND BUMP DC
0308 54              LR    TMPDTA,A
0309 C4              AS    TMPDTA
030A 19              LNK
030B 54              LR    TMPDTA,A
030C 11              LR    H,DC            ;PUT DC WHERE ACC CAN GET TO IT ALL
030D 70              CLR
030E EB              XS    11              ;LO BYTE OF ROM PTR EQUAL 0?
030F 94 F6           BNZ   CKLPFC          ;IF NZ, NOT YET
0311 B4              OUTS  PBUSD           ;HOLD OFF WATCHDOG TIMER
0312 77              LIS   7               ;IS HI BYTE 0 TOO?
0313 FA              NS    10
0314 94 F1           BNZ   CKLPFC          ;IF NZ, NOT YET
0316 E4              XS    TMPDTA          ;CKSM DONE, DID IT END UP 0?
0317 84 04           BZ    *+5             ;IF Z, YES
0319 29 04 66 FCCKFL JMP   BSTFAL          ;THUD!
            *
            * DELAY FOR 30 MS. MORE
            *
031C 7C              LIS   12              ;INIT OUTER LOOP
031D 56              LR    CKSM,A
031E 70              CLR                   ;INIT INNER LOOP
031F 54              LR    TMPDTA,A
0320 34              DS    TMPDTA
0321 94 FE           BNZ   *-1
0323 36              DS    CKSM
0324 94 FB           BNZ   *-4
0326 90 C2           BR    TOBGND
            *
            *
            * CONTINUE SENDING MSG TO FC
            * UPON ENTRY:  ISAR POINTS TO FC#
            *              BFPFC - DATA PTR
            *              CNTFC - DATA LEN + 1 FOR CKSM
            *
            * UPON RETURN:  NC - SUCCESS
            *               C - COMMUNICATION ERROR, FCRDY TIME-OUT
            *               ISAR POINTS TO RETURNING COUNT INCLUDING CKSM
            *
0328 08     SNDCMD   LR    K,P             ;SAVE RET ADDR
0329 77              LIS   7               ;GET CARD # ALONE
032A FC              NS    S
032B 64              LISU  FCMERU          ;SAVE IT
032C 6C              LISL  FCMERL
```

```
032D EC              XS      8
032E 5C              LR      S,A
                *
                * ENTER FC CODE INTO 137 LATCHES
                *
032F 79              LIS     SELCHE
0330 B0              OUTS    PBUSC
0331 4E              LR      A,D
0332 18              COM                   ;INVERTED DATA PORT
0333 B4              OUTS    PBUSD
0334 78              LIS     SELCHD
0335 B0              OUTS    PBUSC
0336 4E              LR      A,D           ;GET COUNT
0337 B4              OUTS    PBUSD         ;PUT ON BUS
0338 56              LR      CKSM,A        ;INIT CKSM
0339 C6              AS      CKSM
033A 19              LNK
033B 56              LR      CKSM,A
033C 20 44           LI      INIFCX
033E 5E              LR      D,A           ;SET PBUS CTROL
033F 20 32           LI      FCTO          ;SET COMM TIME OUT
0341 5D              LR      I,A
                * ENABLE EVERYTHING ON THE BUS FOR XMIT INITIATION
                * AND MOMENTARILY SELECT THE FC.  TRY IT WITH INTERRUPTS
                * LOCKED OUT FOR 14 MICRO-SECONDS (WHAT DOES THIS DO TO
                * OUR PMDT RCV TIMING??)
                *
0342 20 46           LI      FCSELC        ;ACTIVATE SELECT LINE
0344 B0              OUTS    PBUSC         ;WHILE FC IS SELECTED
0345 4C              LR      A,S
0346 B0              OUTS    PBUSC         ;AND DESELECT
                *
                * WAIT ON ACK OF LAST DATA PUT ON BUS
                *
0347 A0         FCWATA  INS  PBUSC
0348 EE              XS      D             ;FCRDY?
0349 91 06           BM      FCWATB        ;IF M, YES
034B 3D              DS      I
034C 94 FA           BNZ     FCWATA
034E 90 3C           BR      SNDER
0350 20 32      FCWATB  LI   FCTO          ;RE-LOAD SHUT CLOCK
0352 5D              LR      I,A
0353 4C              LR      A,S           ;SET CURRENT STATE OF FCRDY AND
0354 23 C0           XI      FCRDY+LCRDY   ;SET NEXT STATE OF LCRDY
0356 5D              LR      I,A
                *
                * MSG OUT?
                *
0357 3E              DS      D             ;ISAR TO CTRL FOR FCTURN
0358 91 20           BM      FCTURN        ;IF MI, TIME TO TURN BUS AROUND
035A 94 05           BNZ     NXSND         ;IF NZ, SEND NEXT BYTE
035C 46              LR      A,CKSM        ;IF Z, SEND CKSM
035D B4              OUTS    PBUSD
035E 90 14           BR      NXSNDA        ;FINISH BELD
                *
                * SEND NEXT BYTE.
                *
0360 66         NXSND   LISL BFPFCL        ;GET CRNT BUF PR
0361 4C              LR      A,S
0362 0B              LR      IS,A
0363 4E              LR      A,D           ;GET NEXT BYTE
0364 B4              OUTS    PBUSD         ;PUT ON BUS
0365 E6              XS      CKSM          ;ENTER INTO CKSM
0366 56              LR      CKSM,A
0367 C6              AS      CKSM
0368 19              LNK
0369 56              LR      CKSM,A
036A 0A              LR      A,IS          ;SAVE NEW BUF PTR
036B 8F 03           BR7     ISUVFA        ;TAKE CARE OF UNDERFLOW
036D 24 F8           AI      -O"10"
036F 64         ISUVFA  LISU BFPFCU        ;SAVE IN SCRATCHPAD
0370 68              LISL    BFPFCL
0371 5C              LR      S,A
0372 6A              LISL    PBCTLL        ;POINT TO BUS CONTROL BYTE
0373 4C         NXSNDA  LR   A,S
0374 21 7F           NI      FCRDYM
0376 B0              OUTS    PBUSC
0377 90 CF           BR      FCWATA
                *
                *
                * TURN LINE AROUND AND TELL FC ABOUT IT
                *
```

```
0379 70        FCTURN  CLR                       ;DON'T SHORT BUS-CPU DURING TURN
037A B4                OUTS    PBUSD
037B 78                LIS     PBSDIR
037C EC                XS      S
037D 5E                LR      D,A
037E 21 7F             NI      FCRDYM
0380 B0                OUTS    PBUSC
0381 20 64             LI      FCTRNC            ;SET 2 MS DELAY FOR FC CMD EXECUTION
0383 5D                LR      I,A
                *
                * WAIT ON FCRDY INDICATING HIS BUS IS TURNED AROUND
                * AND FIRST BYTE OF RESPONSE IS ON DATA BUS.  DURING THIS
                * TIME THE FC VALIDATES CKSM OF COMMAND, DISPATCHES ONT THE
                * COMMAND BYTE AND EXECUTES THE COMMAND (ALL THIS IN 2 MS?)
                *
0384 A0        FCWATC  INS     PBUSC
0385 EE                XS      D
0386 91 08             BM      FCWATD
0388 3D                DS      I
0389 94 FA             BNZ     FCWATC
038B 20 FF     SNDER   LI      H"FF"             ;SET CARRY FOR RETURN
038D 1F                INC
038E 0C                PK
038F 20 32     FCWATD  LI      FCTO              ;RESET TIME OUT
0391 5D                LR      I,A
0392 4C                LR      A,S
0393 23 C0             XI      FCRDY+LCRDY       ;UPDATE CONTROL
0395 5D                LR      I,A
0396 A4                INS     PBUSD             ;GET COUNT
0397 5C                LR      S,A               ;SAVE IT
0398 56                LR      CKSM,A            ;INIT CKSM
0399 C6                AS      CKSM
039A 19                LNK
039B 56                LR      CKSM,A
039C 18                COM                       ;MAKE SURE CARRY IS CLEAR
039D 0C                PK
                *
                * RECEIVE REST OF RESPONSE FROM FC
                *
                *
                * UPON ENTRY:  ISAR TO FC COM TIMEOUT COUNT
                *              BFPFC - NEW BUF PTR
                *
                * UPON RETURN: NC - SUCCESS
                *               C - FUNCTION CARD TIMEOUT
                *
039E 08        RCVRSP  LR      K,P               ;SAVE STACK (RET ADDR)
039F 4D        NXRCV   LR      A,I               ;MOVE ISAR
03A0 4C                LR      A,S               ;ACK LAST CHAR RCVD
03A1 21 7F             NI      FCRDYM
03A3 B0                OUTS    PBUSC
                *
                * WAIT ON NEXT CHARACTER READY
                *
03A4 A0        FCWATE  INS     PBUSC
03A5 EE                XS      D
03A6 91 06             BM      FCWATF
03A8 3D                DS      I
03A9 94 FA             BNZ     FCWATE
03AB 90 2F             BR      RCVER
03AD 20 32     FCWATF  LI      FCTO              ;RESET SHOT CLOCK
03AF 5D                LR      I,A
03B0 4C                LR      A,S               ;UPDATE CONTROL
03B1 23 C0             XI      FCRDY+LCRDY
03B3 5D                LR      I,A
03B4 3E                DS      D                 ;MSG DONE?
03B5 84 15             BZ      RRSP50            ;YES, THIS IS CKSM.  DON'T PUT IN BUFFER
03B7 68                LISL    BFPFCL            ;GET BUFFER PTR
03B8 4C                LR      A,S
03B9 0B                LR      IS,A
03BA A4                INS     PBUSD             ;GET NEXT CHAR
03BB 5E                LR      D,A               ;ENTER INTO BUFFER
03BC E6                XS      CKSM              ;ENTER INTO CKSM
03BD 56                LR      CKSM,A
03BE C6                AS      CKSM
03BF 19                LNK
03C0 56                LR      CKSM,A
03C1 0A                LR      A,IS
03C2 8F 03             BR7     ISOVFB
03C4 24 F8             AI      -O"10"
03C6 64        ISOVFB  LISU    BFPFCU
03C7 68                LISL    BFPFCL
```

```
03C8 5D              LR     I,A
03C9 90 05           BR     NXRCV
               *
               * GET CKSM
               *
03CB A4        RRSP50  INS    PBUSD
03CC E6                XS     CKSM          ;ENTER CKSM
03CD 56                LR     CKSM,A
               *
               * READ IS DONE, ACK LAST BYTE
               *
03CE 4C                LR     A,S
03CF 80                OUTS   PBUSC
03D0 20 C9             LI     -HALFMS       ;WAIT FOR FC TO SEE ACK
03D2 1F        DLYLAK  INC
03D3 94 FE             BNZ    DLYLAK
               *
               * RELEASE BUS
               *
03D5 78                LIS    DSELPB
03D6 80                OUTS   PBUSC
03D7 70                CLR
03D8 E6                XS     CKSM          ;VALID CKSM?
03D9 84 04             BZ     RCVRET        ;YES
               *
               * RECEIVE ERROR
               *
03DB 20 FF     RCVER   LI     H"FF"         ;SET CARRY FOR RETURN
03DD 1F                INC
03DE 0C        RCVRET  PK                   ;RETURN TRUE CARRY
               *
               *
               *
               * LINE CARD - FUNCTION CARD COMMUNICATION ERROR HANDLER
               * THIS ROUTINE IS CALLED UPON DISCOVERY OF A COMMUNICATION ERROR.
               * IT CHECKS TO SEE IF WE SHOULD RETRY THE COMMAND OR IT FAILS THE
               * FUNCTION CARD.
               *
               * FCMER CONTAINS A PTR TO THE CURRENT CARDS'S DATABASE IN THE LOW 6 BITS.
               * BIT 6 IS THE RETRY FLAG AND BIT 7 IS CMD DONE FLAG.
               * I KNOW CMD DONE DOESN'T FIT TOO WELL HERE BUT WE'RE SHORT OF RAM.
               *
               * RETURN NO CRY TO INDICATE A RETRY IS NECESSARY, ISAR AT CNTFC
               * RETURN W/ CRY SET MEANS FAILURE
               *
03DF 08        FCOMER  LR     K,P           ;SAVE RET ADDR
03E0 78                LIS    DSELPB        ;DE-SELECT PBUS
03E1 80                OUTS   PBUSC
03E2 64                LISU   FCMERU        ;SHALL WE RETRY THIS COMMAND?
03E3 6C                LISL   FCMERL
03E4 70                CLR
03E5 EC                XS     S
03E6 91 05             BM     FCMR10        ;IF M, NO, FAIL CARD ON SECOND ERROR
03E8 20 80             LI     RETRY
03EA 5E                LR     D,A           ;ISAR TO CNTFC FOR RETRY
03EB 0C                PK                   ;BYE
               *
               * THIS CARD HAD TWO ERRORS IN A ROW.
               * RESET THE FC
               *
03EC 79        FCMR10  LIS    SELCME        ;ENABLE LATCH INPUTS
03ED 80                OUTS   PBUSC
03EE 4C                LR     A,S
               * PUT CARD ADDR ON BUS
03EF 18                COM                  ;INVERTING PORT
03F0 B4                OUTS   PBUSD
03F1 20 27             LI     RSETFC        ;RESET CARD
03F3 80                OUTS   PBUSC
03F4 70                CLR                  ;HOLD RESET FOR 2.3 MS.
03F5 1F        FCMR20  INC
03F6 94 FE             BNZ    FCMR20
03F8 78                LIS    DSELPB        ;RELEASE BUS
03F9 B0                OUTS   PBUSC
               *
               * IS THIS CARD ALREADY FAILED?
               *
03FA 4C                LR     A,S           ;GET DB PTR
03FB 0B                LR     IS,A
03FC 63                LISU   CDCOVU
03FD 70                CLR
03FE EC                XS     S
```

```
03FF 91 12            BM      FCMR99          ;IF M, YES, RETURN TRUE CARRY
                *
                * IS THIS THE POWER-UP INITIAL SCAN?
                *
0401 02               LR      A,QU
0402 23 00            XI      0
0404 81 06            BP      FCMR30          ;NO
                *
                * IF CARD FAILS AT INIT, DON'T TELL HOST ABOUT IT.
                * THE CARD PROBABLY ISN'T THERE.
                *
0406 20 B0            LI      FCFALD+FCFLRP+FCFLAK   ;MARK CARD FAILED, SINGLE-WIDE,
0408 5C               LR      S,A                    ;REPORTED, AND ACK'D
0409 90 08            BR      FCMR99          ;RETURN TRUE CARRY
                *
                * NOT @ INIT, IS THERE AN OUTSTANDING, UNACK'D COV?
                *
040B E5       FCMR30  XS      CRNTFC
040C 91 05            BM      FCMR99          ;IF M, YES, DON'T FOOL WITH DB
                *
                * MARK FC FAILED
                *
040E 4C               LR      A,S
040F 22 80            OI      FCFALD
0411 5C               LR      S,A
                *
                * CARD IS FAILED, RETURN TRUE CARRY
                *
0412 20 FF    FCMR99  LI      H"FF"
0414 1F               INC
0415 0C               PK
                *
                * TEST RAM
                * PUT H"AA", H"FF", AND ZERO IN ALL SCRATCHPAD BYTES
                *
                * THIS RAM TEST COURTESY OF MIKE REMSON, THE TEST MAN.
                *
0416 67       INIT    LISU    7               ;START AT TOP OF SCRATCHPAD
0417 6F               LISL    7
0418 20 AA    RAMTST  LI      H"AA"           ;LOAD AN AA
041A 5C               LR      S,A
041B 20 55            LI      H"55"
041D EC               XS      S
041E 5C               LR      S,A             ;LOAD AN FF
041F 1F               INC                     ;SO FAR, SO GOOD?
0420 94 45            BNZ     BSTFAL          ;IF NZ, NO
0422 20 FF            LI      H"FF"
0424 EC               XS      S
0425 5C               LR      S,A             ;LOAD A 0
0426 70               CLR
0427 EE               XS      D
0428 94 3D            BNZ     BSTFAL          ;IF NZ, FAIL TEST
042A 8F ED            BR7     RAMTST
042C 0A               LR      A,IS            ;TAKE CARE OF UNDERFLOW
042D 24 F8            AI      -O"10"
042F 92 04            BNC     RAMGD           ;IF NC, ALL RAM CHECKED GOOD
0431 0B               LR      IS,A
0432 90 E5            BR      RAMTST
              RAMGD   EQU     *
                *
                * CALCULATE ROM CHECKSUM
                *
                * XOR AND ROTATE LEFT ALL BYTES IN ROM
                *
0434 2A 00 00         DCI     0               ;START AT 0
0437 70               CLR                     ;INIT CKSM TO 0
0438 54               LR      TMPDTA,A
0439 44       CKSMLP  LR      A,TMPDTA        ;GET CURRENT CKSM
043A 8C               XM                      ;XOR NEXT BYTE AND BUMP DC
043B 54               LR      TMPDTA,A
043C C4               AS      TMPDTA
043D 19               LNK
043E 54               LR      TMPDTA,A        ;SAVE CKSM
043F 11               LR      H,DC            ;PUT DC WHERE ACCUMULATOR CAN GET TO IT ALL
0440 70               CLR                     ;LO BYTE OF ROM PTR EQUAL 0?
0441 EB               XS      11
0442 94 F6            BNZ     CKSMLP          ;NO, NOT DONE YET.
0444 B4               OUTS    PBUSD           ;HOLD OFF WATCHDOG TIMER
0445 77               LIS     7               ;YES, HI BYTE 0, TOO?
0446 FA               NS      10
0447 94 F1            BNZ     CKSMLP          ;NOT YET
0449 E4               XS      TMPDTA          ;CKSM DONE, DID IT END UP 0?
044A 94 1B            BNZ     BSTFAL          ;IF NZ, NO, FAIL ROM CKSM
```

```
                 * TEST TIMER
                 *
                 * SET 1 MS TIME DELAY AND START COUNTING FOR 1 MS.
                 * IF COUNT FINISHES BEFORE INTERRUPT OR INTERRUPT COMES
                 * BEFORE IT SHOULD, THE TEST FAILS.
                 *
**OPERAND EXCEEDS RANGE
044C 20 61              LI      TMTST           ;SET TIMER VECTOR FOR TEST
044E 07                 LR      QL,A
044F 74                 LIS     TMTST:
0450 06                 LR      QU,A
0451 20 C8              LI      TSTTMD          ;SET COUNT FOR 1 MS.
0453 B7                 OUTS    TIMERD
0454 20 6A              LI      TSTTMC          ;SET CONTROL FOR 1 MS.
0456 B6                 OUTS    ICP
0457 1B                 EI
0458 20 6E              LI      DLY1MS          ;SET DELAY COUNT
045A 54                 LR      TMPDTA,A
045B 34          DLYLP  DS      TMPDTA
045C 94 FE              BNZ     DLYLP
045E 1A                 DI                      ;IF WE GET HERE, TIMER DIDN'T FINISH IN TIME
045F 90 06              BR      BSTFAL
0461 44          TMTST  LR      A,TMPDTA
0462 25 10              CI      H"10"           ;TIMER INT HAPPENED, WAS IT TOO FAST?
0464 82 0A              BC      BSTSUC          ;IF C, COUNT LE 10., TIMER PASSES
                 *
                 * BASIC SANITY TEST FAILED
                 *
0466 1A          BSTFAL DI
0467 20 1E              LI      MSGHLD
0469 B1                 OUTS    PMD
046A 78                 LIS     DSELPB
046B B0                 OUTS    PBUSC
046C A4                 INS     PBUSD
046D 90 FE              BR      *-1
                 *
                 *
                 BSTSUC EQU     *               ;BST COMPLETED SUCCESSFULLY
                 *
                 * DELAY 30 MS. FOR POWER UP
                 *
046F 7C                 LIS     12              ;INIT OUTER LOOP
0470 56                 LR      CKSM,A
0471 70                 CLR                     ;INIT INNER LOOP
0472 54                 LR      TMPDTA,A
0473 34                 DS      TMPDTA
0474 94 FE              BNZ     *-1
0476 36                 DS      CKSM
0477 94 FB              BNZ     *-4
                 *
                 *
                 * SET UP FOR REP
                 *
                 * SAVE A NAK, CHAR REQ
                 *
0479 65                 LISU    REPCTU          ;SET CTRL
047A 6B                 LISL    REPCTL
047B 20 82              LI      H"82"           ;2 BYTE RSP
047D 5E                 LR      D,A
047E 20 15              LI      NAK
0480 5E                 LR      D,A
0481 20 FC              LI      CHAREQ
0483 5C                 LR      S,A
                 *
                 * SET POWER-UP FLAG
                 *
0484 20 80              LI      PWRUP
0486 06                 LR      QU,A
0487 29 02 44    CMDEND JMP     BGNDLP
                 ********
                 ********
                 *
                 * PROCESS COMMAND FROM HOST
                 *
                 ********
                 ********
                 PROCMD EQU     *
                 *
                 * REP PROCESSING
                 * IS CMD TO BE SAVED IN REPBUF?
                 *
048A 67                 LISU    RBFU
```

```
048B 6E                 LISL   RBFL-1
048C 71                 LIS    1
048D FD                 NS     I                 ;IS BIT 0 RESET?
048E 94 18              BNZ    REP50             ;NO, SAVE RESPONSE LATER
               *
               * LO-ORDER BIT OF CMD WAS RESET
               *
               * SAVE THIS COMMAND
               *
0490 4E                 LR     A,D
0491 25 03              CI     3                 ;SHORT ENOUGH FOR REP BUFFER?
0493 82 02              BC     REP40             ;IF C, YES
               *
               * DATA ERROR
               *
0495 73                 LIS    3                 ;DO WHAT YOU CAN
               *
               * VALID CMD LENGTH
               * SET UP FOR MOVE
               *
0496 56        REP40    LR     MOVCNT,A          ;SET COUNT
0497 4E                 LR     A,D               ;GET COMMAND FROM BUFF
0498 04                 LR     KU,A
0499 4E                 LR     A,D
049A 05                 LR     KL,A
049B 4C                 LR     A,S
049C 54                 LR     TMPDTA,A
049D 65                 LISU   REPCTU            ;SET REP BUF & CONTROL
049E 6B                 LISL   REPCTL
049F 46                 LR     A,MOVCNT
04A0 5E                 LR     D,A
04A1 00                 LR     A,KU
04A2 5E                 LR     D,A
04A3 01                 LR     A,KL
04A4 5E                 LR     D,A
04A5 44                 LR     A,TMPDTA
04A6 5C                 LR     S,A
               REP50    EQU    *
               *
               * DISPATCH ON COMMAND
               *
04A7 67                 LISU   RBFU              ;GET COMMAND BYTE
04A8 6E                 LISL   RBFL-1
               *
               * IS THIS A REPEAT LAST RESPONSE COMMAND?
               *
04A9 71                 LIS    REP
04AA EC                 XS     S
04AB 94 35              BNZ    CDSPA             ;IF NZ, NO
               ***
               * PROCESS REPEAT LAST RESPONSE COMMAND
               ***
               *
               * VALID COMMAND LENGTH?
               *
04AD 6F        REP05    LISL   RBFL
04AE 3C                 DS     S
               *
               * IS THE RESPONSE TO BE REPEATED IN THE REP BUFFER
               * OR MUST THE COMMAND BE RE-EXECUTED?
               *
04AF 65        REP10    LISU   REPCTU            ;GET REP CTRL BYTE
04B0 6B                 LISL   REPCTL
04B1 70                 CLR
04B2 EE                 XS     D
04B3 81 12              BP     REXEC             ;IF P, RE-EXECUTE
               *
               * REP BUFFER CONTAINS RESPONSE
               *
04B5 21 7F              NI     H"7F"             ;CLEAR CTRL FLAG
04B7 56                 LR     MOVCNT,A          ;SET COUNT
04B8 62                 LISU   NXBCU             ;SET NEXT BUFFER COUNT
04B9 69                 LISL   NXBCL
04BA 5E                 LR     D,A
04BB 20 2A              LI     REPBUF            ;SET BUF PTR
04BD 5D                 LR     I,A
04BE 4C                 LR     A,S
04BF 67                 LISU   RBFU              ;SET MSG RSP COUNT
04C0 6D                 LISL   RBFL-2
04C1 24 03              AI     3                 ;DATA PLUS ADDR AND 2 CRC
04C3 5C                 LR     S,A
04C4 90 C2              BR     CMDEND            ;DONE!
               *
               * RE-EXECUTE THIS COMMAND
```

```
                *
04C6 56         REXEC   LR      MOVCNT,A        ;SET MOVE COUNT
04C7 4E                 LR      A,D             ;GET DATA FROM REP BUF
04C8 04                 LR      KU,A
04C9 4E                 LR      A,D
04CA 05                 LR      KL,A
04CB 4C                 LR      A,S
04CC 54                 LR      TMPDTA,A
04CD 67                 LISU    RBFU
04CE 6F                 LISL    RBFL            ;PUT INTO COMMAND BUFF
04CF 46                 LR      A,MOVCNT
04D0 5E                 LR      D,A
04D1 00                 LR      A,KU
04D2 5E                 LR      D,A
04D3 01                 LR      A,KL
04D4 5E                 LR      D,A
04D5 44                 LR      A,TMPDTA
04D6 5C                 LR      S,A
04D7 62                 LISU    BFPUPR          ;UPDATE RESPONSE BUFFER PTR TO
04D8 6A                 LISL    BFPLWR          ;REFLECT THE NEW COMMAND
04D9 46                 LR      A,MOVCNT
04DA 18                 COM
04DB 24 3F              AI      RCVBUF
04DD 5C                 LR      S,A
04DE 29 01 CE           JMP     STRSP5
                *
                * IS THIS A GET COV COMMAND?
                *
04E1 72         CDSPA   LIS     GETCOV
04E2 EC                 XS      S
04E3 84 04              BZ      GTCV05          ;IF Z, YES
04E5 29 06 44           JMP     CDSPB           ;NO, CHECK ANOTHER
                ***
                * PROCESS GET COV COMMAND
                ***
                *
                * CHECK FOR VALID MSG LENGTH
                *
04E8 6F         GTCV05  LISL    RBFL
04E9 3C                 DS      S
04EA 84 04              BZ      GTCV10          ;IF Z, RIGHT LENGTH
                *
                * INVALID MSG LENGTH
                * SET RSP TO HOST:  NAK, DATAER
                *
04EC 29 06 FB   TODATR  JMP     PFCM05
                *
                * FIND OUT HOW MANY COV'S THIS DAP HAS TO REPORT
                *
04EF 63         GTCV10  LISU    CDCOVU          ;POINT ISAR TO CARD DB
04F0 68                 LISL    CDCOVL
04F1 70                 CLR                     ;INIT RUNNING COUNT
04F2 54                 LR      RNGCNT,A
04F3 70         GTCVA   CLR                     ;NEXT CARD
04F4 EC                 XS      S
04F5 91 15              BM      GTCVC           ;IF M, CARD IS FAILED
                *
                * CARD IS PRESENT, ADD IT'S COV COUNT TO THE RUNNING COUNT
                *
04F7 21 3F              NI      H"3F"           ;MASK OFF CONTROL
04F9 C4                 AS      RNGCNT          ;ADD RUNNING COUNT
04FA 25 53              CI      MAXCOV          ;TOO MANY COV'S FOR 1 MSG?
04FC 92 2C              BNC     CVCNTD          ;IF NC, YES, DON'T LOOK FOR MORE
04FE 54                 LR      RNGCNT,A
04FF 8F 03              BR7     GTCVB           ;ARE ALL CARDS COUNTED?
0501 90 27              BR      CVCNTD          ;IF 7, YES
0503 4D         GTCVB   LR      A,I             ;IS THIS A DOUBLE CARD?
0504 21 40              NI      DBLINI
0506 84 EC              BZ      GTCVA           ;IF Z, NO
0508 4D                 LR      A,I             ;YES, MOVE PAST EMPTY SLOT
0509 90 E9              BR      GTCVA           ;CHECK NEXT CARD
                *
                * CARD IS FAILED, DOES HOST ALREADY KNOW ABOUT IT?
                *
050B 21 10      GTCVC   NI      FCFLAK
050D 94 0E              BNZ     GTCV20          ;IF NZ, HOST ALREADY KNOWS ABOUT
                *                               ;THIS CARD'S FAILURE.
                *
                * LET HOST KNOW THIS ONE IS FAILED
                *
050F 4C                 LR      A,S             ;WAS THIS A DOUBLE CARD?
0510 21 40              NI      DBLINI
0512 44                 LR      A,RNGCNT
```

```
0513 84 02          BZ      GTCV15          ;IF Z, NO, 1 COV
0515 1F             INC                     ;YES, 2 COV'S
0516 1F    GTCV15   INC
0517 25 53          CI      MAXCOV          ;TOO MANY?
0519 92 0F          BNC     CVCNTD          ;IF NC, YES
051B 54             LR      RNGCNT,A
051C 4C    GTCV20   LR      A,S
051D 21 40          NI      DBLINI          ;DOUBLE CARD?
051F 84 02          BZ      GTCV21          ;IF Z, NO
0521 4D             LR      A,I             ;YES, SKIP EMPTY SLOT
0522 8F 03 GTCV21   BR7     GTCVD           ;IF NOT 7, TRY NEXT
0524 90 04          BR      CVCNTD          ;IF 7, YES
0526 40    GTCVD    LR      A,I
0527 90 CB          BR      GTCVA           ;TRY NEXT CARD
           *
           * WE'VE CHECKED ALL CARDS.
           * DO WE HAVE ANY COV'S?
           *
0529 70    CVCNTD   CLR
052A E4             XS      RNGCNT
052B 94 07          BNZ     SOMCOV          ;IF NZ, YES
           *
           * NO COV'S IN THIS DAP
           * SET UP NAK, NO COV RESPONSE TO HOST
           *
052D 20 FA          LI      NOCOV           ;SET NO COV ERROR
052F 54             LR      TMPDTA,A
0530 29 07 19       JMP     PFCHDB          ;GO SET IT UP
           *
           * SOME COV'S FOUND, SET MSG RSP COUNT
           *
0533 67    SOMCOV   LISU    RBFU
0534 6D             LISL    RBFL-2
0535 44             LR      A,RNGCNT        ;CALC # OF BYTES
0536 C4             AS      RNGCNT
0537 C4             AS      RNGCNT
0538 24 04          AI      4               ;ADD OVERHEAD
053A 5C             LR      S,A
           *
           * FOR THIS FUNCTION WE WILL ABANDON PUTTING THE RESPONSE
           * DATA RIGHT BEHIND THE RESPONSE HEADER.  INSTEAD WE WILL
           * SEPARATE THE COMM BUFFER INTO TWO 10 BYTE BUFFERS.  THE LINE CARD
           * WILL SEND DATA FROM ONE BUFFER TO THEH HOST WHILE IT RECEIVES
           * DATA FROM A FUNCTION CARD AND PUTS IT IN THE OTHER BUFFER.
           * PUT THE ACK IN THE SECOND BUFFER AND WAIT FOR THE 1ST
           * BUFFER TO OPEN BEFORE PUTTING IN THE 1ST COV DATA.
           *
053B 66             LISU    HXMT2U          ;PUT ACK INTO BUFFER
053C 6D             LISL    HXMT2L
053D 76             LIS     ACK
053E 5C             LR      S,A
053F 0A             LR      A,IS
0540 62             LISU    NXBFPU          ;SET NEXT BUFFER PTR
0541 6C             LISL    NXBFPL
0542 5D             LR      I,A
0543 71             LIS     1               ;SET NEXT BUFFER COUNT
0544 5C             LR      S,A
           *
           * GET RNG CNT # OF COV'S FROM FC'S
           *
0545 62             LISU    CFGCVU          ;SET CURRENT FC NUMBER
0546 6F             LISL    CFGCVL
0547 70             CLR
0548 5C             LR      S,A
           *
           * DO FOR ALL CARDS
           * GET COV FROM NEXT CARD
           *
0549 4C    GCVNXC   LR      A,S
054A 56             LR      CKSM,A          ;TEMPORARILY SAVE CRNT FC # HERE
054B 0B             LR      IS,A
054C 63             LISU    CDCOVU
054D 70             CLR
054E EC             XS      S
054F 81 49          BP      GTCVF           ;IF P, CARD NOT FAILED
           *
           * HAS HOST ACK'D THIS FAILURE?
           *
0551 21 10          NI      FCFLAK
0553 94 49          BNZ     TOMDND          ;IF NZ, YES
           *
           * MARK THIS FAILURE REPORTED
           *
```

```
0555 4C       GTCV23  LR      A,S
0556 22 20            OI      FCFLRP
0558 5C               LR      S,A
                *
                * WAIT ON OPEN BUFFER
                *
0559 62               LISU    NXBCU
055A 6D               LISL    NXBCL
055B 70       WTOPBA  CLR
055C EC               XS      S
055D 94 FD            BNZ     WTOPBA
                *
                * SET NEXT BUFFER PTR
                *
055F 6C               LISL    NXBFPL
0560 4C               LR      A,S
0561 25 35            CI      HXMT2           ;ASSUME 2 IN USE
0563 20 3F            LI      HXMT1
0565 82 03            BC      *+4             ;IF C, GOOD ASSUMPTION
0567 20 35            LI      HXMT2
0569 5C               LR      S,A
                *
                * CHECK DOUBLE WIDE
                *
056A 46               LR      A,CKSM
056B 0B               LR      IS,A
056C 63               LISU    CDCOVU
056D 4C               LR      A,S
056E 21 40            NI      DBLINI          ;DBL WIDE
0570 62               LISU    NXBCU           ;PRESET NEXT BUF CNT
0571 6D               LISL    NXBCL
0572 94 07            BNZ     GTCV50          ;IF NZ, YES, DOUBLE
                *
                * SINGLE WIDE FAIL MSG
                *
0574 73               LIS     3               ;SINGLE FAIL ENTRY
0575 5E               LR      D,A
0576 4C               LR      A,S
0577 0B               LR      IS,A            ;POINT TO BUFFER
0578 90 10            BR      GTCV55          ;FINISH COMMON
                *
                * FAIL MSG'S FOR BOTH SLOTS
                *
057A 76       GTCV50  LIS     6               ;6 BYTES OF DATA
057B 5E               LR      D,A
057C 4C               LR      A,S
057D 0B               LR      IS,A            ;POINT TO BUFFER
057E 46               LR      A,CKSM          ;GET CARD #
057F 15               SL      4               ;RIGHT SPOT
0580 22 90            OI      H"90"           ;FAIL FLAG AND HI SLOT
0582 5E               LR      D,A             ;SET ADDR\
0583 20 FA            LI      FCFALR
0585 5E               LR      D,A             ;FC FAILED CODE
0586 70               CLR                     ;NULL
0587 5E               LR      D,A
0588 34               DS      RNGCNT          ;DECR COV CNT
0589 46       GTCV55  LR      A,CKSM          ;GET ADDR
058A 15               SL      4               ;RIGHT SPOT
058B 22 80            OI      H"80"           ;SET FAIL BIT
058D 5E               LR      D,A
058E 20 FA            LI      FCFALR
0590 5E               LR      D,A             ;FC FAILED CODE
0591 70               CLR                     ;NULL
0592 5C               LR      S,A
0593 34               DS      RNGCNT          ;ALL COV OUT?
0594 94 08            BNZ     GTCV57          ;IF NZ, NOT YET
0596 29 06 3D         JMP     MDUDN           ;YES, COMMAND DONE
                *
                * CARD IS PRESENT, DOES IT HAVE ANY COV'S TO REPORT?
                *
0599 21 3F    GTCVP   NI      H"3F"           ;MASK OFF CONTROL
059B 94 04            BNZ     GTCV90          ;IF NZ, YES
              TOMDND  EQU     *
059D 29 06 2A GTCV57  JMP     NDOEF           ;NO, TRY NEXT CARD
                *
                * SUBTRACT THIS CARD'S COV COUNT FROM THE RUNNING COUNT
                *
05A0 18       GTCV90  COM
05A1 1F               INC
05A2 C4               AS      RNGCNT
05A3 54               LR      RNGCNT,A        ;CHECK FOR END AFTER GETTING COV THRU
                *
                * CARD HAS SOME COV'S TO REPORT
```

```
                  *
 05A4 62                LISU    THSCVU             ;INIT STARTING COV NUMBER
 05A5 6E                LISL    THSCVL
 05A6 70                CLR
 05A7 5C                LR      S,A
                  *
                  * DO UNTIL ALL COV'S ARE OUT OF THE CARD
                  *
                  * WAIT ON BUFFER OPEN
                  *
 05A8 62          GTCDCV LISU   NXBCU
 05A9 6D                LISL    NXBCL
 05AA 70          WTOPBB CLR
 05AB EC                XS      S
 05AC 94 FD             BNZ     WTOPBB
                  *
                  * SWITCH BUFFERS
                  *
 05AE 6C                LISL    NXBFPL
 05AF 4C                LR      A,S
 05B0 25 35             CI      HXMT2              ;SECOND BUF IN USE?
 05B2 20 3E             LI      HXMT1-1            ;ASSUME SO
 05B4 82 03             BC      *+4                ;IF C, GOOD ASSUMPTION
 05B6 20 34             LI      HXMT2-1
 05B8 5C                LR      S,A
                  *
                  * SET UP FC COM TO GET THE NEXT COV'S
                  * CLEAR RETRY FLAG, SET COUNT, BUF PTR
                  * AND DATA IN BUFFER.
                  *
 05B9 64                LISU    FCMERU             ;CLEAR RETRY FLAG
 05BA 6C                LISL    FCMERL
 05BB 70                CLR
 05BC 5E                LR      D,A
 05BD 74          GTCVRT LIS    4                  ;SET COUNT
 05BE 5C                LR      S,A                ;FCGTCV,CARD#, THSCV, CKSM
 05BF 68                LISL    BFPFCL             ;SET BUF PTR
 05C0 20 27             LI      SCNBFR
 05C2 5C                LR      S,A
 05C3 62                LISU    CFGCVU             ;GET CARD #
 05C4 6F                LISL    CFGCVL
 05C5 4E                LR      A,D
 05C6 15                SL      4
 05C7 21 70             NI      H"70"              ;ALONE
 05C9 04                LR      KU,A               ;SAVE
 05CA 4C                LR      A,S                ;GET THIS COV
 05CB 64                LISU    SCNBFU             ;FILL BUFFER
 05CC 6D                LISL    SCNBFL-2
 05CD 5D                LR      I,A                ;THSCV
 05CE 00                LR      A,KU               ;CARD #
 05CF 5D                LR      I,A
 05D0 20 82             LI      FGTCOV             ;GET COV
 05D2 5C                LR      S,A
 05D3 62                LISU    CFGCVU             ;POINT TO CURRENT FC
 05D4 6F                LISL    CFGCVL
                  *
                  * SEND COMMAND TO FC
                  * RETURN NO CRY IF ALL WENT WELL
                  *
 05D5 28 03 28          PI      SNDCMD
 05D8 82 31             BC      GTCVER
                  *
                  * COMMAND GOT OUT OK AND WE HAVE A RETURNED COUNT
                  *
 05DA 4C          GTCV30 LR     A,S
 05DB 25 08             CI      8                  ;COUNT GT 8?
 05DD 92 05             BNC     GTCV35             ;IF NC, YES, FAIL IT
 05DF 25 03             CI      3                  ;IS THERE AT LEAST 1 COV? NAK, FCRCVCKSM???
 05E1 92 0D             BNC     GTCV40             ;IF NC, YES
                  *
                  * RESPONSE LENGTH ERROR
                  *
 05E3 28 03 DF GTCV35 PI        FCOMER             ;RETRY OR FAIL
 05E6 82 5A             BC      TOCND              ;IF C, FAIL
 05E8 20 92             LI      -DLY1MS
 05EA 1F                INC
 05EB 94 FE             BNZ     *-1
 05ED 90 CF             BR      GTCVRT             ;RETRY
                  *
                  * VALID LENGTH
                  * SET UP NEXT BUFFER FOR HOST
                  *
```

```
05EF 62         GTCV40  LISU    NXBCU          ;SET NEXT BUF CNT
05F0 6D                 LISL    NXBCL
05F1 24 FE              AI      -2             ;NO CKSM, NOR NAK
05F3 5C                 LR      S,A
05F4 62                 LISU    NXBFPU         ;SET BUF PTR
05F5 6C                 LISL    NXBFPL
05F6 4C                 LR      A,S
05F7 1F                 INC
05F8 64                 LISU    BFPFCU
05F9 68                 LISL    BFPFCL
05FA 5D                 LR      I,A
                *
                * GET REST OF RSP FROM FC
                * RETURN NO CARRY IF NO ERROR
                *
05FB 28 03 9E           PI      RCVRSP
05FE 82 0B              BC      GTCVER         ;IF C, COMM ERROR
                * VALID RESPONSE FROM CARD
                * DID CHECKSUM COME OUT?
                *
0600 62                 LISU    NXBFPU         ;CHECK NAK, CKSM
0601 6C                 LISL    NXBFPL
0602 4C                 LR      A,S
0603 1F                 INC
0604 0B                 LR      IS,A
0605 4C                 LR      A,S
0606 25 15              CI      NAK
0608 94 08              BNZ     GTCV59         ;IF NZ, RESPONSE OK
                *
                * COMMON FUCNTION CARD ERROR HANDLER
                *
060A 28 03 DF   GTCVER  PI      FCOMER         ;CHECK RETRY
060D 82 33              BC      TOCND          ;IF C, DEAD
060F 90 AD              BR      GTCVRT         ;RETRY
                *
                * DOES THIS GUY HAVE MORE COV'S?
                *
0611 62         GTCV59  LISU    THSCVU
0612 6E                 LISL    THSCVL
0613 72                 LIS     2
0614 CC                 AS      S              ;SET NEXT COV TO GET
0615 5D                 LR      I,A
0616 18                 COM                    ;2'S COMPLEMENT
0617 1F                 INC
0618 56                 LR      CKSM,A         ;SAVE
0619 4C                 LR      A,S
061A 0B                 LR      IS,A
061B 63                 LISU    CDCOVU         ;GET TOTAL COV'S FOR THIS CARD
061C 4C                 LR      A,S
061D 21 3F              NI      H"3F"
061F C6                 AS      CKSM           ;SUBTRACT NEXT COV TO GET
0620 91 05              BM      GTCV60         ;IF M, ALL OUT
0622 84 03              BZ      GTCV60         ;IF Z, ALL OUT
0624 90 83              BR      GTCDCV         ;MORE TO GET
                *
                * ALL COV ARE OUT OF THAT CARD
                * ARE ALL COV'S OUT OF THE BOX THAT ARE GOING?
                *
0626 70         GTCV60  CLR
0627 E4                 XS      RNGCNT
0628 84 14              BZ      MDODN          ;IF Z, YES
                *
                * END OF MAIN LOOP
                *
062A 62         MDOET   LISU    CFGCVU         ;IS THIS CARD DOUBLE WIDE?
062B 6F                 LISL    CFGCVL
062C 4C                 LR      A,S
062D 0B                 LR      IS,A
062E 63                 LISU    CDCOVU
062F 4C                 LR      A,S
0630 21 40              NI      DBLINI
0632 62                 LISU    CFGCVU
0633 6F                 LISL    CFGCVL
0634 4C                 LR      A,S
0635 84 02              BZ      GTCV65         ;NO, TRY NEXT SLOT
0637 1F                 INC                    ;SKIP EMPTY SLOT
0638 1F         GTCV65  INC
0639 5C                 LR      S,A
                *
                * NO LAST CARD TEST
                *
```

```
063A 29 05 49          JMP     GCVNXC          ;CHECK NEXT CARD
                *
                * MAIN DO IS DONE
                * SET OUTSTANDING UN-ACK'D COV
                *
063D 45         MDODN  LR      A,CRNTFC
063E 22 80             OI      UNAKD
0640 55                LR      CRNTFC,A
0641 29 04 87   TOCND  JMP     CMDEND
                *
                * IS THIS AN ACK COV COMMAND?
                *
0644 73         CDSPB  LIS     ACKCOV
0645 EC                XS      S
0646 84 04             BZ      AKCV            ;IF Z, YES
0648 29 06 F4          JMP     CDSPC           ;NO
                ***
                * PROCESS ACK COV CMD
                ***
                *
                * IS MSG LENGTH VALID?
                *
064B 6F         AKCV   LISL    RBFL
064C 3C                DS      S               ;MUST BE 1
064D 84 04             BZ      AKCVB           ;IF Z, IT WAS
                *
                * INVALID MSG LENGTH, SEND DATA ERR TO HOST
                *
064F 29 06 FB   AKCV10 JMP     PFCH05          ;SET DATA ERROR
                *
                * SET UP ACK RESPONSE TO HOST
                *
0652 62         AKCVB  LISU    NXBCU           ;SET NEXT BUF CNT
0653 6D                LISL    NXBCL
0654 71                LIS     1               ;ACK
0655 5E                LR      D,A
0656 4C                LR      A,S             ;PUT ACK IN BUFFER
0657 0B                LR      IS,A
0658 76                LIS     ACK
0659 5C                LR      S,A
065A 67                LISU    RBFU            ;PUT MSG RSP CNT IN HDR BUF
065B 6D                LISL    RBFL-2
065C 74                LIS     4               ;ADDR, ACK, 2 CRC
065D 5C                LR      S,A
                *
                * CLEAR UN-ACK'D COV REPORT FLAG IN CRNTFC
                *
065E 45                LR      A,CRNTFC
065F 21 7F             NI      UNAKDM
0661 55                LR      CRNTFC,A
                *
                * REP PROCESSING
                * SAVE RESPONSE TO THIS COMMAND
                *
0662 65                LISU    REPCTU          ;SET CTRL BYTE
0663 6B                LISL    REPCTL
0664 20 81             LI      H"81"           ;1 BYTE RESPONSE
0666 5E                LR      D,A
0667 76                LIS     ACK
0668 5C                LR      S,A
                *
                * INITIALIZE DO FOR EACH CARD LOOP
0669 62                LISU    CFAKCU
066A 6E                LISL    CFAKCL
066B 70                CLR                     ;START WITH CARD 0
066C 5D                LR      I,A
066D 20 53             LI      MAXCOV          ;ONLY ACK THE MAXIMUM NUMBER OF COV'S
066F 5E                LR      D,A
                *
                * DO FOR EACH CARD
                *
0670 4C         AKCVC  LR      A,S             ;POINT TO THIS CARD'S DB
0671 0B                LR      IS,A
0672 63                LISU    CDCOVU
0673 70                CLR
0674 EC                XS      S               ;IS CARD FAILED?
0675 81 17             BP      AKCVE           ;IF P, NO
                *
                * WAS FAILURE REPORTED?
                *
0677 21 20             NI      FCFLRP
0679 84 63             BZ      NDAKDO          ;IF Z, NO
```

```
067B 4C              LR    A,S           ;YES, MARK IT ACK'D
067C 22 10           OI    FCFLAK
067E 5C              LR    S,A
               *
               * CHECK DOUBLE WIDE
               *
067F 21 40           NI    DBLINI
               *
               * HAVE WE ACK'D THE MAX # OF COV'S?
               *
0681 62              LISU  ACKCTU
0682 6F              LISL  ACKCTL
0683 84 04           BZ    AKCV20        ;IF Z, SINGLE CARD
0685 3C              DS    S             ;DOUBLE CARD
0686 84 BA           BZ    TOCND         ;IF Z, COMMAND DONE
0688 3C        AKCV20 DS   S
0689 94 53           BNZ   NDAKDO        ;IF NZ, NOT YET
068B 90 B5     TO2CND BR   TOCND
               *
               * CARD NOT FAILED, DID IT HAVE ANY COV?
               *
068D 21 3F     AKCVE NI    H"3F"         ;CLEAR OUT CTRL
068F 54              LR    TMPDTA,A      ;SAVE
0690 84 4C           BZ    NDAKDO        ;IF Z, NO COV ON THIS ONE, TRY NEXT
0692 4C              LR    A,S           ;CLEAR COV_COUNT
0693 21 C0           NI    H"C0"
0695 5C              LR    S,A
0696 44              LR    A,TMPDTA
0697 62              LISU  ACKCTU        ;IS HOST ACKING THESE COV'S?
0698 6F              LISL  ACKCTL
0699 18              COM                 ;MAKE THIS COUNT A TWO'S COMPLEMENT NEG #
069A 1F              INC
069B CC              AS    S             ;SUBTRACT FROM RUNNING COUNT
069C 5E              LR    D,A
069D 91 ED           BM    TO2CND        ;IF M, ACK IS DONE
               *
               * SET UP TO TELL FC ABOUT ACK
               * CLEAR RETRY, SET MSG IN BUF, SET BUF ADDR AND COUNT
               * POINT TO FC#
               *
069F 64        AKCV50 LISU FCMERU        ;CLEAR RETRY
06A0 6C              LISL  FCMERL
06A1 70              CLR
06A2 5E              LR    D,A           ;FCCOM
06A3 72        AKCVRT LIS  2             ;RETRY ENTRY POINT
06A4 5C              LR    S,A           ;SET BUF CNT
06A5 68              LISL  BFPFCL
06A6 20 27           LI    SCNBFR        ;SET BUF PTR
06A8 5C              LR    S,A
06A9 0B              LR    IS,A
06AA 20 83           LI    FAKCOV        ;PUT CMD IN BUFFER
06AC 5C              LR    S,A
06AD 62              LISU  CFAKCU        ;POINT TO CURRENT FC #
06AE 6E              LISL  CFAKCL
               *
               * SEND COMMAND TO FC
               *
06AF 28 03 28        PI    SNDCMD
06B2 82 25           BC    AKCVER        ;IF C, COMM ERROR
               *
               * VALID RESPONSE LENGTH?
               *
06B4 4C              LR    A,S
06B5 25 03           CI    3             ;MUST BE 2 OR 3 FOR ACK OR NAK,CKSM
06B7 92 05           BNC   AKCV80        ;IF NC, TOO BIT
06B9 25 01           CI    1
06BB 92 0D           BNC   AKCV85        ;IF NC, OK
               *
               * CHECK RETRY OR FAIL CARD
               *
06BD 28 03 DF  AKCV80 PI   FCOMER
06C0 82 1C           BC    NDAKDO        ;IF C, NO RETRY
06C2 20 92           LI    -DLY1MS       ;DELAY 1+ MS FOR FC TO TIME-OUT AND
06C4 1F              INC                 ;RETURN FROM INTERRUPT
06C5 94 FE           BNZ   *-1
06C7 90 DB           BR    AKCVRT
               *
               * INIT BUFF PTR FOR RESPONSE
               * LEAVE ISAR AT PHUS CTRL
               *
06C9 68        AKCV85 LISL BFPFCL
06CA 20 27           LI    SCNBFR
06CC 5D              LR    I,A
```

```
                        *
                        * GET REST OF RESPONSE AND VERIFY CKSM
                        *
06CD 28 03 9E                   PI      RCVRSP
06D0 82 07                      BC      AKCVER          ;IF C, FCCOMM ERR
                        *
                        * WAS THAT A POSITIVE ACKNOWLEDGE?
                        *
06D2 64                         LISU    SCNBFU
06D3 6F                         LISL    SCNBFL
06D4 76                         LIS     ACK
06D5 EC                         XS      S
06D6 84 06                      BZ      NDAKDO          ;IF Z, YES
                        *
                        * FC COMMUNICATION ERROR
                        *
06D8 28 03 DF   AKCVER          PI      FCOMER          ;PROCESS ERROR
06DB 92 C7                      BNC     AKCVRT          ;IF NC, RETRY
                        *
                        * DONE WITH THIS CARD, GO TO NEXT
                        *
06DD 62         NDAKDO          LISU    CFAKCU
06DE 6E                         LISL    CFAKCL
06DF 4C                         LR      A,S
06E0 0B                         LR      IS,A            ;GET CARD DB
06E1 63                         LISU    CDCOVU
06E2 4C                         LR      A,S
06E3 21 40                      NI      DBLINI          ;CHECK DBL WIDE
06E5 62                         LISU    CFAKCU          ;POINT TO CURRENT FC
06E6 6E                         LISL    CFAKCL
06E7 4C                         LR      A,S
06E8 84 02                      BZ      AKCV90          ;ONLY A SINGLE
06EA 1F                         INC                     ;BUMP TWICE FOR DOUBLE
06EB 1F         AKCV90          INC
06EC 5C                         LR      S,A
06ED 21 07                      NI      7
06EF 84 9B                      BZ      TO2CND          ;IF Z, DONE WITH ALL CARDS
06F1 29 06 70                   JMP     AKCVC           ;NEXT CARD
                        *
                        * SINCE THE LINE CARD DOESN'T RECOGNIZE THIS COMMAND IT MUST
                        * BE DIRECTED TO A FUNCTION CARD
                        *
                        CDSPC   EQU     *
                        ********
                        ********
                        *
                        * PROCESS FUNCTION CARD COMMAND
                        *
                        ********
                        ********
                        *
                        * IS A CARD ADDRESS PRESENT?
                        *
06F4 67                         LISU    RBFU
06F5 6F                         LISL    RBFL
06F6 4C                         LR      A,S             ;DATA COUNT
06F7 25 01                      CI      1
06F9 92 06                      BNC     PFCM10          ;IF NC, ADDR IS PRESENT
                        *
                        * MSG NOT LONG ENOUGH TO CONTAIN A CARD ADDR.
                        *
06FB 20 FE      PFCM05          LI      DATAER          ;SET DATA ERROR
06FD 54                         LR      TMPDTA,A
06FE 90 1A                      BR      PFCMDB
                        *
                        * IS THE CARD FAILED?
                        *
0700 64         PFCM10          LISU    FCMERU          ;CLEAR RETRY
0701 6C                         LISL    FCMERL
0702 70                         CLR
0703 5C                         LR      S,A
0704 67         PFCMDA          LISU    RBFU
0705 6D                         LISL    RBFL-2
0706 4C                         LR      A,S             ;GET CARD ADDR
0707 14                         SR      4
0708 0B                         LR      IS,A            ;ISAR TO THAT SLOTS DATA BASE
0709 63                         LISU    CDCOVU
070A 70                         CLR
070B EC                         XS      S               ;IS FC FAILED BIT SET?
070C 81 25                      BP      PFCMDC          ;IF PLUS, NO, HAVE AT IT
                        *
                        * IS THE PREVIOUS A DOUBLE WIDE?
                        *
```

```
070E 1F                  INC
070F 94 06               BNZ     PFCM15           ;IF NZ, NO, NAK ON FAILED CARD
0711 4E                  LR      A,D              ;YES, POINT TO IT'S DB
0712 70                  CLR
0713 EC                  XS      S                ;HAS DOUBLE-FAILED?
0714 81 1D               BP      PFCMDC           ;IF PLUS, DOUBLE IS THERE
0716 20 FA      PFCM15   LI      FCFALR           ;CARD NOT PRESENT
0718 54                  LR      TMPDTA,A
                *
                * NAK DUE TO CARD NOT PRESENT
                *
0719 62         PFCMDB   LISU    NXBCU            ;SET NEXT BUFFER COUNT
071A 6D                  LISL    NXBCL
071B 72                  LIS     2
071C 5E                  LR      D,A
071D 4C                  LR      A,S              ;PUT NAK AND REASON INTO BUFFER
071E 0B                  LR      IS,A
071F 20 15               LI      NAK
0721 5E                  LR      D,A
0722 8F 05               BR7     ISOVFX
0724 0A                  LR      A,IS
0725 24 F8               AI      -O"10"
0727 0B                  LR      IS,A
0728 44         ISOVFX   LR      A,TMPDTA         ;GET ERROR CODE
0729 5C                  LR      S,A
072A 0A                  LR      A,IS
072B 24 03               AI      3
072D 0B                  LR      IS,A
072E 75                  LIS     5                ;SET RESPONSE MSG COUNT
072F 5C                  LR      S,A
0730 90 62               BR      REP60            ;SAVE RESPONSE
                *
                * EVERYTHING LOOKS GOOD ON THIS END.  TRY SENDING THE MESSAGE.
                *
0732 0A         PFCMDC   LR      A,IS
0733 56                  LR      CKSM,A           ;SAVE FC #
0734 67                  LISU    RBFU             ;GET CARD ADDR
0735 6F                  LISL    RBFL
0736 4C                  LR      A,S
0737 1F                  INC                      ;SET BUF CNT, DATA AND CKSM
0738 64                  LISU    CNTFCU
0739 6B                  LISL    CNTFCL
073A 5C                  LR      S,A
073B 68                  LISL    BFPFCL           ;SET BUFPTR
073C 20 3E               LI      RCVBUF-1
073E 5C                  LR      S,A
073F 60                  LISU    0                ;POINT TO CARD #
0740 6E                  LISL    CKSM
                *
                * SEND CMD
                *
0741 28 03 28            PI      SNDCMD
0744 82 2D               BC      PFCMER           ;IF C, COMM ERR
0746 72                  LIS     2                ;SET UP MSG RSP CNT TO HOST
0747 CC                  AS      S
0748 54                  LR      TMPDTA,A
0749 4C                  LR      A,S              ;CHECK VALID RECEIVE COUNT
074A 67                  LISU    RBFU
074B 6F                  LISL    RBFL
074C CC                  AS      S
074D 25 11               CI      17
074F 82 0D               BC      PFCM20           ;IF C, VALID LENGTH
                *
                * INVALID RESPONSE LENGTH
                *
0751 28 03 DF            PI      FCOMER
0754 82 C1               BC      PFCM15           ;IF C, NO RETRY
0756 20 92               LI      -DLY1MS
0758 1F                  INC
0759 94 FE               BNZ     *-1
075B 90 A8               BR      PFCMDA           ;RETRY
                *
                * SO FAR, SO GOOD
                * SET MSG RSP CNT, AND FC COM
                *
                *
                * NO TIME OUT
                *
075D 4C         PFCM20   LR      A,S              ;GET RCV DATA COUNT
075E 18                  COM
075F 24 3F               AI      RCVBUF
0761 0B                  LR      IS,A             ;POINT TO COUNT BYTE IN HDR OF RESPONSE
```

```
0762 44                LR      A,TMPDTA
0763 5C                LR      S,A
0764 62                LISU    NXBCU           ;INIT NEXT BUFFER COUNT
0765 6D                LISL    NXBCL
0766 24 FD             AI      -3
0768 5E                LR      D,A
0769 4C                LR      A,S             ;GET BUFFER PTR FOR FC'S RESPONSE
076A 64                LISU    BFPFCU          ;SET RESPONSE FROM FC BUFFER PTR
076B 68                LISL    BFPFCL
076C 5D                LR      I,A
                 *
                 * GET REST OF RESPONSE
                 *
076D 28 03 9E          PI      RCVRSP          ;GET RESPONSE FROM FC
0770 92 08             BNC     PFCM82          ;IF NC, OK
                 *
                 * FC FAILED, RETRY OR FAIL
                 *
0772 28 03 DF PFCMER   PI      FCOMER
0775 92 8E             BNC     PFCMDA          ;IF NC, RETRY
0777 90 9E             BR      PFCM15          ;SET FAILED RESPONSE
                 *
                 * CHECK FOR NAK DUE TO FC RCV CKSM
                 *
0779 62       PFCM82   LISU    NXBFPU
077A 6E                LISL    NXBFPL
077B 4C                LR      A,S
077C 0B                LR      IS,A
077D 4E                LR      A,D             ;GET DATA
077E 25 15             CI      NAK
0780 94 0C             BNZ     PFCMDG          ;IF NZ, NOT NAK
0782 8F 05             BR7     PFCM85          ;GET NEXT BYTE
0784 0A                LR      A,IS
0785 24 F8             AI      -O"10"
0787 0B                LR      IS,A
0788 4C       PFCM85   LR      A,S
0789 25 C0             CI      FCRCKS          ;FC RCV CKSM?
078B 84 E6             BZ      PFCMER          ;YES, TRY AGAIN
                 *
                 * FC EXECUTED COMMAND
                 * REP PROCESSING
                 * SHALL WE SAVE THE RESPONSE?
                 *
078D 67       PFCMDG   LISU    RBFU            ;POINT TO COMMAND
078E 6E                LISL    RBFL-1
078F 71                LIS     1
0790 FC                NS      S               ;WAS LO-BIT SET?
0791 84 2A             BZ      TO3CND          ;IF Z, NO, COMMAND ALREADY SAVED
                 *
                 * IS RESPONSE SHORT ENOUGH TO SAVE?
                 *
0793 62       REP60    LISU    NXBCU           ;GET RESPONSE DATA COUNT
0794 6D                LISL    NXBCL
0795 4E                LR      A,D
0796 25 03             CI      3
0798 82 02             BC      REP65           ;IF C, VALID LENGTH
079A 73                LIS     3               ;INVALID LEN. SALVAGE WHAT WE CAN, DON'T ABORT
079B 56       REP65    LR      MOVCNT,A        ;SET UP FOR MOVE
079C 4C                LR      A,S             ;SET READ PTR
079D 0B                LR      IS,A
079E 4E                LR      A,D             ;PICKUP 3 BYTES AND SAVE
079F 04                LR      KU,A
07A0 8F 05             BR7     REP53
07A2 0A                LR      A,IS
07A3 24 F8             AI      -O"10"
07A5 0B                LR      IS,A
07A6 4E       REP53    LR      A,D
07A7 05                LR      KL,A
07A8 8F 05             BR7     REP55
07AA 0A                LR      A,IS
07AB 24 F8             AI      -O"10"
07AD 0B                LR      IS,A
07AE 4C       REP55    LR      A,S
07AF 54                LR      TMPDTA,A
07B0 65                LISU    REPCTU          ;SET REP CTRL BYTE AND DATA
07B1 6B                LISL    REPCTL
07B2 46                LR      A,MOVCNT
07B3 22 80             OI      H"80"
07B5 5E                LR      D,A
07B6 00                LR      A,KU
07B7 5E                LR      D,A
07B8 01                LR      A,KL
```

```
07B9 5E             LR      D,A
07BA 44             LR      A,TMPDTA
07BB 5C             LR      S,A
              *
              * COMMON END-OF-COMMAND PROCESSING
              *
              ********
              ********
              *
              * TABLE OF MODIFIERS FOR CRC CALCULATION
              *
              ********
              ********
07BF 00       CRCTAB DC     H"00"
07C0 00             DC      H"00"
07C1 C1             DC      H"C1"
07C2 C0             DC      H"C0"
07C3 81             DC      H"81"
07C4 C1             DC      H"C1"
07C5 40             DC      H"40"
07C6 01             DC      H"01"
07C7 01             DC      H"01"
07C8 C3             DC      H"C3"
07C9 C0             DC      H"C0"
07CA 03             DC      H"03"
07CB 80             DC      H"80"
07CC 02             DC      H"02"
07CD 41             DC      H"41"
07CE C2             DC      H"C2"
              *
07CF 01             DC      H"01"
07D0 C6             DC      H"C6"
07D1 C0             DC      H"C0"
07D2 06             DC      H"06"
07D3 80             DC      H"80"
07D4 07             DC      H"07"
07D5 41             DC      H"41"
07D6 C7             DC      H"C7"
07D7 00             DC      H"00"
07D8 05             DC      H"05"
07D9 C1             DC      H"C1"
07DA C5             DC      H"C5"
07DB 81             DC      H"81"
07DC C4             DC      H"C4"
07DD 40             DC      H"40"
07DE 04             DC      H"04"
              *
07DF 00             DC      H"00"
07E0 00             DC      H"00"
07E1 01             DC      H"01"
07E2 CC             DC      H"CC"
07E3 01             DC      H"01"
07E4 D8             DC      H"D8"
07E5 00             DC      H"00"
07E6 14             DC      H"14"
07E7 01             DC      H"01"
07E8 F0             DC      H"F0"
07E9 00             DC      H"00"
07EA 3C             DC      H"3C"
07EB 00             DC      H"00"
07EC 28             DC      H"28"
07ED 01             DC      H"01"
07EE E4             DC      H"E4"
              *
07EF 01             DC      H"01"
07F0 A0             DC      H"A0"
07F1 00             DC      H"00"
07F2 6C             DC      H"6C"
07F3 00             DC      H"00"
07F4 78             DC      H"78"
07F5 01             DC      H"01"
07F6 B4             DC      H"B4"
07F7 00             DC      H"00"
07F8 50             DC      H"50"
07F9 01             DC      H"01"
07FA 9C             DC      H"9C"
07FB 01             DC      H"01"
07FC 88             DC      H"88"
07FD 00             DC      H"00"
07FE 44             DC      H"44"
                    ORG     H"7FF"
07FF A4       CHKSUM DC     H"A4"           ;CHECK SUM LOCATION
             END
NUMBER OF ERRORS= 1
```

```
ACCSAV=0008 ACK    =0006 ACKCOV=0003 ACKCTL=0007 ACKCTU=0002 ADDR   =0005
ADRFND=0040 AFND   =011F AFNDA  0130 AKCV    064B AKCVB  0652 AKCVC   0670
AKCVE   068D AKCVER 06D8 AKCVRT 06A3 AKCV10 064F AKCV20 0688 AKCV50 069F
AKCV80 068D AKCV85 06C9 AKCV90 06E8 ARCVEN=0010 BFPFCL=0000 BFPFCU=0004
BFPLWR=0002 BFPUPR=0002 BGNDLP 0244 BITCNT=0001 BOXDON 02EC BRCVEN=0004
BSTFAL 0466 BSTLED=0040 BSTSUC=046F BTIMC  =006A BTIMC2=002A BTIMD  =00A7
BTIMD2=00E6 CDCOVL=0000 CDCOVU=0003 CDSPA   04E1 CDSPB   0644 CDSPC  =06F4
CFAKCL=0006 CFAKCU=0002 CFGCVL=0007 CFGCVU=0002 CHA      0039 CHAA     0049
CHAREO=00FC CHARPT=0011 CHKSUM 07FF CKCNT   016C CKCNTA 0179 CKCRC   0133
CKLPFC 0306 CKSM   =0006 CKSMLP 0439 CKSYN  017D CKSYNA 0188 CKSYNB 018F
CMDEND 0487 CMDERR=00FD CNTDNA 01B7 CNTDON 0160 CNTFCL=0003 CNTFCU=0004
CNTFND=0020 COMSCN 0272 CRCDON 01AE CRCERR=01B5 CRCFND=0080 CRCHI  =0002
CRCLO  =0003 CRCSNT=0002 CRCTAB 078F CRDCOV=0018 CRDFAL=0080 CRNTFC=0005
CVCNID 0529 DATAER=00FE DBGC     0029 DBLA     02C5 DBLDI  =0030 DBLDO  =0010
DBLID  =0010 DBLINI=0040 DLYFCL=0001 DLYFCU=0004 DLYLAK 03D2 DLYLP   045B
DLYIMS=006E DSELPB=0008 ENBCOV=000B ENBCTL=000F EXTINT=0006 EXTRTI 008D
FAI    =0060 FAILA  =0020 FAILB  =0008 FAKCOV=0083 FCCKFL 0319 FCFALD=0080
FCFALR=00FA FCFLAK=0010 FCFLRP=0020 FCMERL=0004 FCMERU=0004 FCMR10 03EC
FCMR20 03F5 FCMR30 0408 FCMR99 0412 FCOMER 03DF FCRCKS=00C0 FCRCVB=0027
FCRDY  =0080 FCRDYM=007F FCSCAN 0253 FCSCNA 024F FCSELC=0046 FCTO   =0032
FCTRNC=0064 FCTURN 0379 FCWATA 0347 FCWATB 0350 FCWATC 0384 FCWATD 038F
FCWATE 03A4 FCWATF 03AD FGTCOV=0082 FRMER1 009B GCMD     00D1 GCVNXC 0549
GETCOV=0002 GETPNT=0006 GTCDCV 05A8 GTCOVN=0081 GTCVA   04F3 GTCVB   0503
GTCVC   050B GTCVD   0526 GTCVER 060A GTCVF   0599 GTCVRT 05BD GTCV05 04E8
GTCV10 04EF GTCV15 0516 GTCV20 051C GTCV21 0522 GTCV23 0555 GTCV30 05DA
GTCV35 05E3 GTCV40 05EF GTCV50 057A GTCV55 0589 GTCV57 059D GTCV59 0611
GTCV60 0626 GTCV65 0638 GTCV90 05A0 HALFMS=0037 HXMT1  =003F HXMT1L=0007
HXMT1U=0007 HXMT2  =0035 HXMT2L=0005 HXMT2U=0006 ICP    =0006 ICTO   =00D1
ICTOC  =00EA ICTOD  =0000 IMICP  =0080 INIFCX=0044 INIPMD=001E INIT     0416
ISARSV=0007 ISOVFA 036F ISOVFB 03C6 ISOVFX 0728 ISOVFZ 01DB LAXC   =0016
LBXC   =001C LCRCKS=00C1 LCRDY  =0040 LINEAC=000E LINEAF=0080 LINEBC=001A
MAXCOV=0053 MDODN   063D MDOET   062A MEFLAG=0004 MOVCNT=0006 MRCVCL=0000
MRCVCU=0002 MSGCTL=0001 MSGCTU=0002 MSGDET=000A MSGHLD=001E NAK    =0015
NDAKDO 06DD NOCOV  =00FB NXBCL  =0005 NXBCU  =0002 NXBFPL=0004 NXBFPU=0002
NXCARD 02D9 NXRCV   039F NXSND   0360 NXSNDA 0373 PBCTLL=0002 PBCTLU=0004
PBSDIR=0008 PBUSC  =0000 PBUSD  =0004 PFCMDA 0704 PFCMDB 0719 PFCMDC 0732
PFCMDG 078D PFCMER 0772 PFCM05 06FB PFCM10 0700 PFCM15 0716 PFCM20 075D
PFCM82 0779 PFCM85 0788 PMD    =0001 PMDCTL=0003 PMDCTU=0002 POI    =0040
PRGDCH=0116 PROCMD=048A PWRUP  =0080 RAMGD  =0434 RAMTST 0418 RBFL   =0007
RBFU   =0007 RCTDN   0154 RCVBUF=003F RCVER   03DB RCVRET 03DE RCVRSP 039E
REP    =0001 REPBUF=002A REPCON=0028 REPCTL=0003 REPCTU=0005 REP05   04AD
REP10   04AF REP40   0496 REP50  =04A7 REP53   07A6 REP55   07AE REP60   0793
REP65   079B RETRY  =0080 REXEC   04C6 RNGCNT=0004 RRSP50 03CB RSETFC=0027
RSET10 000E RSET20 0017 RSTRTI 0042 RXTRNA 0063 RXTRNB 0056 RXTURN 004E
SBV      0026 SBVA     002C SCNBFL=0007 SCNBFR=0027 SCNBFU=0004 SCNERR 028D
SCNSGL 02D4 SCNTPM=00BF SCNTYP=0040 SCN40   0294 SCN45   02A3 SCN50   02BE
SCN55   02C9 SCN70   02E3 SCN80   02FB SELCHD=0008 SELCHE=0009 SERIAL=0000
SETIME 00DB SETPNT=0007 SGLDI  =0020 SGLDO  =0000 SLCT50 00E9 SLCT70 00F6
SLCT80 0108 SNDCMD 0328 SNDER   038B SNDWRU 026C SNDB     0068 SOMCOV 0533
STPB1V 008D STPCL2=002A STPDL2=006D STPGEN 007B STRGNA 00C8 STRSP   01BF
STRSP5 01CE STRTGN 00C3 STSCOV=000D SYN    =0016 SYNCRH=00CE SYNCRL=0081
SYNFND=0010 THSCVL=0006 THSCVU=0002 TIMERD=0007 TMPDTA=0004 TMTST   0461
TOBGND 02E9 TOCND   0641 TODATR 04EC TOGCMD 0185 TOMDND=059D TOPGC   00CF
TORTI   0079 TO2CND 068B TO2RTI 0106 TO3CND 07BC TO3RTI 0217 TO4RTI 00CD
TSISNA 01A8 TSISYN 01A0 TSTTMC=006A TSTTMD=00C8 UNAKD  =0080 UNAKDM=007F
VLDLEN=0008 WRU    =0080 WRUEND 02B5 WTOPBA 055B WTOPBB 05AA XINTA   00BA
XMIT    01E9 XMTB    01ED XMTC    01F6 XMTD   =021A XMTE    0229 XMTF    023F
XMT20   021F XRTRNA 0085
```

FAI/PAI PROGRAM

```
        * TPROG.MAC
                TITLE   FAI/PAT PROGRAM
        * MCC POWERS
        * COPYRIGHT 1979
        * GREGORY HEPNER
        * JUNE 15, 1979
        *
        *
        * PBUS EQUATES
        *
        PBUSD   EQU     5               ;PORT # EQUATES - DATA
        PBUSC   EQU     0.              ;CONTROL
        *                               ;BIT 7 - LCRDY INP, 0 AT REST
        *                               ;BIT 6 - FCRDY OUT, NORMALLY 0
        *                               ;BIT 5 - DATA BUS DIRECTION; 1-RCV, 0-XMIT
        *                               ;BIT 4 - PBUS I/F ENABLE, ACTIVE HI
        *                               ;BIT 3 - ID INP.
        *                               ;BIT 2 - ID INP.
        *                               ;BIT 1 - UNUSED
        *                               ;BIT 0 - UNUSED
        *
        * OTHER PORT EQUATES*****************************
        *
        TNSEL   EQU     4               ; MULTIPLEXOR OUTPUT PORT
        FRQINI  EQU     1               ; FREQUENCY INPUT PORT
        TIMER   EQU     7               ; TIMER INPUT PORT #
```

```
ICP      EQU     6                   ; INTERRUPT CONTROL PORT #
*
*
**************************
* REGISTER ASSIGNMENTS
**************************
*
* LOWER SCRATCHPAD REGISTER SAVE AREA DURING INTERRUPTS
* STATUS GOES IN REG 9 AND DC GOES IN REG DCI
*
PINBR    EQU     0                   ; REG 0, WRITTEN AND READ FROM BOTH GROUNDS,
*                                    ; ACTIVE POINT # STORAGE FOR BACKGND ONLY,
*                                    ; IN LOWER 4 BITS.
*
*                                    ; UPPER 4 BITS ARE STATUS FLAGS.
PWRUP    EQU     H"80"               ; BIT 7, POWER UP FLAG, SET AT POWER UP IN
PWRUPM   EQU     H"7F"               ; BACKGND, CLEARED BY CHARACTERIZATION IN
*                                    ; FOREGND.
ABORFD   EQU     H"40"               ; BIT 6, EXXT INT, SET UPON COMPLETION OF
ABORDM   EQU     H"BF"               ; FOREGND TASK, READ BY BACKGND DURING DATA
*                                    ; AQUISITION, RESET AT START OF DATA AQUISITION.
TIMVCT   EQU     H"20"               ; BITS 5 AND 4, TIMER INT VECTOR CONTROL.
TMVCTM   EQU     H"DF"               ; USED IN BACKGND ONLY.
UPASS    EQU     H"10"               ; 00 = BST TIMER TEST
UPASSM   EQU     H"EF"               ; 01 + POINT FAIL TIMEOUT VECTOR
ABP1M    EQU     H"BF"               ; 10 + DATA AQUISITION TIMER PASS 1
ABP1M1   EQU     H"CF"               ;
*
*
COUNTR   EQU     1                   ; REG 1, WRITE AND READ IN BACKGND ONLY.
*                                    ; A, # EDGES COUNT - 1, DATA AQUISITION.
TIMCTR   EQU     1                   ; B, TEMP STORAGE FOR TIMER BYTE.
TMPUTR   EQU     1                   ; C, TEMP STORAGE DURING BST.
COUNTU   EQU     0                   ;
COUNTL   EQU     1                   ; LOWER 3 BITS OF ADDRESS.
*
*
TIMOVR   EQU     2                   ; REG 2, USED IN BACKGND ONLY, TIMER OVERFLOW
*                                    ; BYTE IN  DATA AQUISITION, EXTENDS TIMER TO 16
**                                   ; BITS. TEMP STORAGE FOR UPPER DATA BYTE.
*
*
TEMP4    EQU     3                   ; REG 3,  USED IN BACKGND FOR DIVIDE ROUTINE
*
*
TEMP5    EQU     4                   ; REG 4, USED IN BACKGND FOR DIVIDE ROUTINE
TEMP6R   EQU     5                   ; REG 5, USED IN FOREGND ONLY, FOR TEMP STORAGE.
*
*
CKSM     EQU     5                   ; REG 5, USED IN THE FOREGND AS THE
*                                    ; CHECKSUM SAVE AREA
*
*
ISARSV   EQU     6                   ; USED IN THE FOREGND INTERRUPTS AS THE
*                                    ; ISAR SAVE AREA.
*
*
TEMP3    EQU     7                   ; USED IN BACKGND FOR DIVIDE ROUTINE
*
*
ACCSAV   EQU     8                   ; REG 8, USED IN BACKGND AND  FOREGND INTERRUPTS
*                                    ; AS ACCUMULATOR SAVE AREA.
*
*
* REG J                              ; REG 9, USED IN BACKGND AND FOREGND INTERRUPTS
* I                                  ; AS PROCESSOR STATUS SAVE AREA.
*
*
TEMP1    EQU     10                  ; REG 10, USED IN THE BACKGND ONLY, FOR TEMP
*                                    ; STORAGE OF LOWER DATA BYTE,(TIMER), DURING
*                                    ; DIVIDE AND COV ROUTINES.
*
*
TEMP2    EQU     11                  ; REG 11, USED IN BACKGND ONLY FOR TEMP STORAGE
*                                    ; OF UPPER DATA BYTE.(TIMOVR), DURING DIVIDE
*                                    ; AND COV ROUTINES
* REG H  EQU     10+11               ; USED IN ROM CHECKSUM ROUTINES
*
*
* KU                                 ; REG 12, USED IN FOREGND AS TEMP STORAGE.
BFPLCU   EQU     1                   ;
BFPLCL   EQU     4                   ; BUFFER FOR MESSAGE AREA POINTER
*
*
*KL                                  ; REG 13, USED IN FOREGND AS DLYCR.
DLYCU    EQU     1                   ;
DLYCL    EQU     5                   ; L C READY TIME OUT COUNT
*
*
* QU                                 ; REG 14, USED IN FOREGND AS STORAGE FOR
PBCTLU   EQU     1                   ; POWERS BUS CONTROL BYTE.
PBCTLL   EQU     6                   ; LOWER 3 BITS OF BYTE
*
*
```

```
* OL                                  ; REG 15. USED IN FOREGND AS LENGTH OF MESSAGE
CNTLCU  EQU     1                     ; BEING TRANSFERRED.
CNTLCL  EQU     7                     ; AND AS TEMP STORAGE IN FOREGND.
*
*
COVCTR  EQU     16                    ; REG 16. USED IN FOREGND FOR
*                                     ; STORAGE OF COV COUNT.
COVCTU  EQU     2                     ;
COVCTL  EQU     0                     ;
*LCBUFR-7       EQU     16            ; ALSO THE EIGTH BYTE OF LC BUFFER REG
*
*
* LCBUFR-6      EQU     O"21"         ; REG 17. USED IN THE FOREGND AS THE
*                                     ; SEVENTH BYTE OF LC BUFFER.
*
* LCBUFR-5      EQU     O"22"         ; REG 18. USED IN FOREGND AS THE
*                                     ; SIXTH BYTE OF LC BUFFER.
*
*
* LCBUFR-4      EQU     O"23"         ; REG 199. USED IN THE FOREGND AS THE
*                                     ; FIFTH BYTE OF LC BUFFER.
*
* LCBUFR-3      EQU     O"24"         ; REG 20. USED IN THE FOREGND AS THE
*                                     ;  FOURTH BYTE OF LC BUFFER.
*
* LCBUFR-2      EQU     O"25"         ; REG 21. USED IN THE FOREGND AS THE
*                                     ; THIRD BYTE OF LC BUFFER.
*
*
* LCBUFR-1      EQU     O"26"         ; REG 22. USED IN THE FOREGND AS THE
*                                     ; SECOND BYTE OF LC BUFFER.
*
*
LCBUFR  EQU     O"27"                 ; REG 23. USED IN THE FOREGND AS THE
LCBUFU  EQU     2                     ; FIRST BYTE OF THE LC BUFFER. EITHER
LCBUFL  EQU     7                     ; COMMAND OR RESPONSE IS SENT IN THIS BYTE
*
COVSTR  EQU     O"30"                 ; REG 24. WRITTEN IN THE FOREGND, BUT READ
COVSTU  EQU     3                     ; IN THE BACKGND. ADDRESS OF POINT 0
COVSTL  EQU     0                     ; SIGNIFICANT CHANGE OF VALUE.
*
*
* COVSTR+1      EQU     O"31"         ; REG 25. SAME AS ABOVE, FOR POINT 1
*
*
* COVSTR+2      EQU     O"32"         ; REG 26. SAME AS ABOVE, FOR POINT 2
*
*
* COVSTR+3      EQU     O"33"         ; REG 27. SAME AS ABOVE, FOR POINT 3
*
*
* COVSTR+4      EQU     O"34"         ; REG 28. SAME AS ABOVE, FOR POINT 4
*
*
*COVSTR+5       EQU     O"35"         ; REG 29. SAME AS ABOVE, FOR POINT 5
*
*
* COVSTR+6      EQU     O"36"         ; REG 30. SAME AS ABOVE, FOR POINT 6
*
*
* COVSTR+7      EQU     O"37"         ; REG 31. SAME AS ABOVE, FOR POINT 7
*
*
PIBUFR  EQU     O"40"                 ; REG 32. READ AND WRITTEN IN FOREGND AND
PIBUFU  EQU     4                     ; BACKGND. THIS IS THE POINT DATA BASE
PIBUFL  EQU     0                     ; FOR EACH POOINT THERE ARE 4 BYTES.
*                                     ; PIBUFR IS THE 8 MS BITS OF A TWELVE BIT
*                                     ; REPRESENTATION OF A 15 BIT DATA WORD.
*                                     ; IT IS THE LAST KNOWN CHANGE OF VALUE AND
*                                     ; IT IS IN TWO'S COMPLEMENT FORM.
*
*
* PIBUF+1       EQU     O"41"         ; REG 33. THIS CONTAINS THE LOWER 4 BITS OF
*                                     ; THE 12 BIT WORD, AND 4 DATA BASE
*                                     ; STATUS FLAGS.
*
PIFAL   EQU     H"08"                 ; POINT FAIL IS WRITTEN IN THE BACKGND AND
*                                     ; READ IN BOTH GNDS. WHEN SET, THE GIVEN POINT
*                                     ; HAS FAILED TO RESPOND IN THE BACKGND.
PIFALM  EQU     H"F7"                 ; PIFAL MASK USED IN BACKGND AND FOREGND.
*
COVEN   EQU     H"04"                 ; WRITTEN IN FOREGND AND  READ IN BOTH
*                                     ; THIS BIT, WHEN SET, INDICATES THE POINT
*                                     ; HAS BEEN ENABLED FOR COV REPORTING
COVENM  EQU     H"FB"                 ; COVEN MASK USED IN FOREGND TO RESET
*                                     ; COVEN BIT
*
LCKN    EQU     H"02"                 ; WRITTEN AND READ IN THE FOREGND, THIS BIT,
*                                     ; WHEN SET, INDICATES THAT THE COV FOR THIS
*                                     ; POINT MAY BE REPORTED OR CLEARED
LCKNM   EQU     H"FD"                 ; USED IN THE FOREGND TO MASK THE LINE CARD
```

```
*                                       ; KNOWS BIT.
COVFND  EQU     H"01"                   ; WRITTEN IN BACKGND AND READ IN BOTH, THIS BIT
*                                       ; INDICATES THAT A CHANGE OF VALUE FOR THE
*                                       ; POINT HAS OCCURED
COVFDM  EQU     H"FE"                   ; USED IN THE FOREGND TO CLEAR THE COV BIT
*
LCOVM   EQU     H"FC"                   ; MASK USED IN FOREGND DURING ACK COV ROUTINE
*                                       ; TO CLEAR COVFND AND LCKN.
*
*
*PTUUFR+2       EQU     34              ; REG 34. WRITTEN AND READ IN BOTH GNDS,THIS
*                                       ; BYTE CONTAINS THE POINT RETURN BIT IN ITS
*                                       ; MSB, AND 7 BITS OF THE CURRENT UPPER DATA
*                                       ; WORD FOR THE POINT
*
*
*PTBUFR+3       EQU     35              ; REG 35. WRITTEN IN BACKGND, READ IN BOTH,
*                                       ; THIS IS THE LOWER BYTE OF THE CURRENT DATA
*                                       ; WORD FOR THE POINT.
*
*
* REG 36 THRU 39                        ; SAME AS ABOVE, FOR POINT 1
*
*
* REG 40 THRU 43                        ; SAME AS ABOVE, FOR POINT 2
*
*
* REG 44 THRU 47                        ; SAME AS ABOVE, FOR POINT 3
*
*
* REG 48 THRU 51                        ; SAME AS ABOVE, FOR POINT 4
*
*
* REG 52 THRU 55                        ; SAME AS ABOVE, FOR POINT 5*
*
*
* REG 56 THRU 59                        ; SAME AS ABOVE, FOR POINT 6
*
*
* REG 60 THRU 63                        ; SAME AS ABOVE, FOR POINT 7
*
*
*
*
*
*PAI/PAI EQUATES START HERE****************
**
*
*
* THESE ARE THE COMMANDS THAT THIS CARD CAN RESPOND TO
*
WHUC    EQU     H"80"                   ; GET MASK I D
GCOVCC  EQU     H"81"                   ; GET COV COUNT
FCOVC   EQU     H"82"                   ; FETCH NEXT COV POINT ADDRESS
ACOVC   EQU     H"83"                   ; ACK COV TRANSMISSION TO LC
RDPIC   EQU     H"06"                   ; READ A POINT
ECOVC   EQU     H"0B"                   ; ENABLE COV REPORTING FFOR POINT
SICOVC  EQU     H"0D"                   ; SET COV VALUE FOR A POINT
CHRCMD  EQU     H"11"                   ; CHARACTERIZE A POINT
*******************************************
*
* COMMANDS THAT GET A NAK
*
*******************************************
SETPNT  EQU     H"07"                   ; CANNOT SET A POINT
RDECRM  EQU     H"08"                   ; DO NOT READ RAM
WIECRM  EQU     H"09"                   ; DO NOT WRITE RAM
ENBCTL  EQU     H"0F"                   ; DO NOT ENABLE CONTROL
*
*
*
*
****************
* OTHER EQUATES
*
****************
CHAREQ  EQU     H"FC"                   ; CHARACTERIZATION REQUEST
N1COVR  EQU     6                       ; LOC OF 1 ST COV OUTPUT BUFFER
N2COVR  EQU     3                       ; LOC OF 2 ND COV OUTPUT BUFFER
CHDIAL  EQU     5                       ; COV GROUP ADDR
COVSET  EQU     6                       ; LOC OF CARD #
PBINTR  EQU     H"F0"                   ;CONTROL BYTE INIT FOR RECEIVE
PBRDCT  EQU     H"30"                   ;BUF I/F CTRL TO READ COUNT
DSELPB  EQU     H"20"                   ;DE-SELECT THE P-BUS
LCRDY   EQU     H"80"                   ;LCRDY INP BIT
FCRDY   EQU     H"40"                   ;FCRDY OUT BIT
TSTIMD  EQU     H"C8"                   ; TIMER COUNT FOR TEST
TSTIMC  EQU     H"6A"                   ; TCP VALUE FOR TIMER TEST
DLY1MS  EQU     H"6E"                   ; 1 MS DELAY FOR TIMER TEST
TM1MS   EQU     H"C8"                   ; 1 MS TIMEOUT
TIMST1  EQU     H"6B"                   ; D/10 PRESCALE AND TIMER START
TIMST2  EQU     H"2B"                   ; D/2 PRESCALE AND TIMER START
```

```
TIMSTP  EQU     H"21"           ; STOP TIMER CMD
TMDSBL  EQU     H"29"           ; CMD DISABLE TIMER INTERRUPT
TMOFST  EQU     H"EE"           ; OFFSET ADJUSTMENT FOR TIMER
COUNTS  EQU     127             ; # EDGES IN READ
ACK     EQU     5               ; POSITIVE ACKNOWLEDGE
LCTO    EQU     50              ; LINE CARD TIME OUT
PBSDIR  EQU     H"20"           ; POWERS BUS DIR BIT
LCRDYM  EQU     H"7F"           ; LINE CARD READY MASK
TM510U  EQU     208             ; 510 US TIMEOUT LENGTH
TM540U  EQU     218             ; 540 US TIMEOUT LENGTH
TIMST3  EQU     H"40"           ; DIVIDE BY 5 TIMER
*
* COMMUNICATION ERROR CODES
*
NAK     EQU     H"15"           ;NEGATIVE ACKNOWLEDGE
CKSMER  EQU     H"C0"           ;REASON FOR NAK IS CHECKSUM ERROR
DATAER  EQU     H"FE"           ;INVALID DATA IN COMMAND
CMDERR  EQU     H"F0"           ;INVALID COMMAND FOR THIS CARD
INVPNT  EQU     H"F9"           ;INVALID POINT NUMBER
CVERR   EQU     H"EF"           ; NOT ENOUGH COV'S IN THIS
*                               ; COV COMMAND
POTFAL  EQU     H"F8"           ; POINT FAILED
POTRET  EQU     H"F7"           ; POINT RETURNED FROM FAILURE
*
*
                        *
                        * POWER UP AND INITIALIZATION ROUTINE STARTS HERE.
                        *
                                ORG     0
0000 20 20      START   LI      DSELPB          ;DESELECT THE BUS
0002 B0                 OUTS    PBUSC           ;
0003 70                 CLR                     ;
0004 B6                 OUTS    TCP             ; ZERO TCP
0005 B7                 OUTS    TIMER           ; AND TIMER
0006 B4                 OUTS    INSEL           ;AND MUX SELECTOR
0007 B1                 OUTS    FROINI          ;AND FREQUENCY INPUT PORT
0008 29 06 24           JMP     INIT            ;INITIALIZE
                        *
                        * THIS PORTION OF CODE EFFICIENTLY HANDLES THE TIMER INTERUPT
                        * REQUESTS. THERE ARE TWO TYPES OF REQUESTS WHICH THIS SEGMENT
                        * DECODES:
                        * FIRST, IT HANDLES THE VALIDITY CHECK FOR A POINT. IF A POINT
                        * DOES NOT RESPOND WITHIN A MILLISECOND, THE POINT IS ASSUMED TO BE
                        * DEAD. THEN A FLAG WILL BE SET IN THE PTFAUIL BUFFER , AND THE POINT
                        * INPUT IS SKIPPED.
                        * THE SECOND JOB OF THIS ROUTINE IS TO TIME THE INTERVAL BETWEEN
                        * SET POINTS ON THE INCOMING DATA STREAM. THE LENGTH OF THE COUNTER IS
                        * DOUBLED HERE TO 65,000 US MAX TIME. AFTER THE TIMER OVERFLOW
                        * REGISTER IS INCREMENTED, CONTROL RETURNS TO THE INPUT SEGMENT.
                        * *
                        *
                        * TIMER INTERRUPT GOES HERE*****
                        *
                                ORG     H"20"
0020 58         TIMINT  LR      ACCSAV,A        ; SAVE THE ACC
0021 1E                 LR      J,W             ; AND THE STATUS
0022 40                 LR      A,PINBR         ; GET TIMER FLAGS
0023 21 20              NI      H"20"           ; DOING DATA AQUISITION?
0025 94 08              BNZ     TMINTA          ; YES
0027 40                 LR      A,PINBR         ; GET THE FLAGS AGAIN
0028 21 10              NI      H"10"           ;
002A 94 0A              BNZ     TIMOUT          ; TIMEOUT POINT?
002C 90 58              BR      TMTST           ; DO THE TIMER TEST
002E 32         TMINTA  DS      TIMOVR          ; DECREMENT UPPER TIMER BYTE
002F 92 09              BNC     TMOUT3          ; FAIL POINT IF CARRY IS SET
0031 1D                 LR      W,J             ; REPLACE STATUS REG
0032 48                 LR      A,ACCSAV        ; REPLACE ACCUMULATOR CONTENTS
0033 1B                 EI                      ; REENABLE INTERRUPTS
0034 1C                 POP                     ; RETURN TO THE MAIN PROGRAM.
                        *
                        * THE TIMER COMES HERE IF, WHEN STARTING AN INPUT ROUTINE,
                        * THE POINT FAILS TO RESPOND WITHIN A MILLISECOND. IT WILL
                        * FLAG THAT POINT AND CONTINUE WITH THE NEXT POINT.
                        *
0035 70         TIMOUT  CLR                     ; CLEAR THE ACC.
0036 E6                 XS      TSARSV          ; INTERRUPT OCCURED?
0037 94 20              BNZ     RETINI          ; YES, TRY AGAIN
0039 40         TMOUT3  LR      A,PINBR         ; GET THE POINT # THAT DID NOT RESPOND
003A 21 0F              NI      H"0F"           ; MASK THE POINT #
003C 13                 SL      1               ; QUADRUPLE IT
003D 13                 SL      1               ;
003E 24 21              AI      PTBUFR+1        ; ADD IT TO A BASE ADDR
0040 0B                 LR      IS,A            ;
0041 4C                 LR      A,S             ; GET THE FLAGS FOR THE POINT
0042 21 08              NI      PTFAL           ; ALREADY FAILED?
0044 94 0C              BNZ     TMOUT1          ; YES
0046 4C                 LR      A,S             ; GET THE FLAGS BACK
0047 21 04              NI      COVEN           ;
0049 4C                 LR      A,S             ; RESTORE THE BYTE BEFORE BRANCHING
004A 84 03              BZ      TMOUT2          ; COV ENABLED? NO
004C 22 01              OI      COVEND          ; COV IS FOUND, SET IT
004E 22 08      TMOUT2  OI      PTFAL           ; SET THE POINT FAIL BIT
0050 5C                 LR      S,A             ;
```

```
0051 20 21   TMOUT1  LI     TIMSTP          ; STOP THE TIMER, EXT INT IS ENABLED
0053 86              OUTS   TCP             ;
0054 1B              EI                     ; ENABLE INTERRUPT CONTROL
0055 29 03 ED        JMP    BEGN            ; GO TO THE NEXT POINT INPUT ROUTINE
0058 29 03 F8 RETIN1 JMP    BEGNB           ; TRY THIS POINT AGAIN
              *****************************************
005B 2A 00 00 CKSMRI DCI    0               ;START AT 0
005E 70              CLR                    ;INIT CKSM TO 0
005F 51              LR     TMPDTR,A
0060 41      CKSMLP  LR     A,TMPDTR        ;GET CURRENT CKSM
0061 8C              XM                     ;XOR NEXT BYTE AND BUMP DC
0062 51              LR     TMPDTR,A
0063 C1              AS     TMPDTR
0064 19              LNK
0065 51              LR     TMPDTR,A        ;SAVE CKSM
0066 11              LR     H,DC            ;PUT DC WHERE ACCUMULATOR CAN GET TO IT ALL
0067 70              CLR                    ;LO BYTE OF ROM PTR EQUAL 0?
0068 EB              XS     11
0069 94 F6           BNZ    CKSMLP          ;NO, NOT DONE YET.
006B 77              LIS    7
006C FA              NS     10              ;YES, HI BYTE 0, TOO?
006D 94 F2           BNZ    CKSMLP          ;NOT YET
006F E1              XS     TMPDTR          ;CKSM DONE, DID IT END UP 0?
0070 94 19           BNZ    BSTFAL          ;IF NZ, NO, FAIL ROM CKSM
0072 A4              INS    IHSEL           ;
             *       NI     PHDFAT          ; FAT CARD?
0073 94 01           BNZ    TSTTM1          ; YES
             *       JMP    PHDA            ;
             *
             * TEST TIMER
             *
             * SET 1 MS TIME DELAY AND START COUNTING FOR 1 MS.
             * IF COUNT FINISHES BEFORE INTERRUPT OR INTERRUPT COMES
             * BEFORE IT SHOULD, THE TEST FAILS.
             *
0075 20 C8   TSTTM1  LI     TSTTMD          ;SET COUNT FOR 1 MS.
0077 87              OUTS   TIMER
0078 20 6A           LI     TSTTMC          ;SET CONTROL FOR 1 MS.
007A 86              OUTS   TCP
007B 1B              EI
007C 20 6E           LI     DLY1MS          ;SET DELAY COUNT
007E 51              LR     TMPDTR,A
007F 31      DLYLP   DS     TMPDTR
0080 94 FE           BNZ    DLYLP
0082 1A              DI                     ;IF WE GET HERE, TIMER DIDN'T FINISH IN TIME
0083 90 06           BR     BSTFAL
0085 41      TMTST   LR     A,TMPDTR
0086 25 10           CI     H"10"           ; TIMEOUT HAPPENED, WAS IT TOO FAST?
0088 82 07           BC     BSTSUC          ;IF C, COUNT LE 10., TIMER PASSES
             *
             * BASIC SANITY TEST FAILED
             *
008A 1A      BSTFAL  DI                     ;
008B 20 20           LI     DSELPB          ;HOLD OFF WATCHDOG TIMER
008D B0              OUTS   PBUSC           ;
008E 90 FB           BR     BSTFAL          ;UNTIL POWER UP
             *
             *
             BSTSUC  EQU    *               ;BST COMPLETED SUCCESSFULLY
0090 20 80           LI     PWRUP           ;SET POWER UP FLAG
0092 50              LR     PTUBR,A         ;
0093 20 21   CKSMDN  LI     TIMSTP          ; STOP TIMER AND ENABLE EXTERNAL INTERRUPTS
0095 86              OUTS   TCP
0096 1B              EI
0097 29 03 E7        JMP    BEGNA1          ;
             ********
             ********
             *
             * EXTERNAL INTERRUPT STARTS HERE
             * THE LINE CARD WANTS SOMETHING
             *
             ********
             ********
                     ORG    H"A0"
00A0 1E              LR     J,W             ;SAVE STATUS,
00A1 58              LR     ACCSAV,A        ;ACCUMULATOR,
00A2 0A              LR     A,IS            ;ISAR,
00A3 56              LR     ISARSV,A
00A4 2C              XDC                    ; AND DC
             *
             * SET UP TO RECEIVE MSG
             *
00A5 61              LISU   BFPLCU          ;INIT BUF PTR
00A6 6C              LISL   BFPLCL
00A7 20 17           LI     LCBUFR
00A9 5D              LR     I,A
00AA 20 32           LI     LCTO            ;SET TIMEOUT COUNT
00AC 5D              LR     I,A
00AD 20 F0           LI     PBTNIR          ;INIT BUS CTRL BYTE
00AF 5D              LR     I,A
00B0 70              CLR                    ;READY PORT FOR INPUT
00B1 85              OUTS   PBUSD
00B2 20 30           LI     PBRDCT          ;ENABLE BUS TO GET COUNT ONLY
```

```
00B4 60                 OUTS    PBUSC
00B5 A5                 INS     PBUSD           ;READ COUNT
00B6 62                 LISU    2               ;
00B7 68                 LISL    0               ; EXTRA COUNT STORAGE
00B8 5C                 LR      S,A             ; STORE COUNT
00B9 61                 LISU    CNTLCU          ;
00BA 6F                 LISL    CNTLCL          ;
00BB 5C                 LR      S,A             ;SAVE MSG CNT
00BC 55                 LR      CKSM,A          ;ENTER INTO CKSM
00BD C5                 AS      CKSM
00BE 19                 LNK
00BF 55                 LR      CKSM,A
00C0 4F                 LR      A,D             ;
00C1 25 07              CI      7               ; 8 BYTE MESSAGE?
00C3 82 04              BC      ACKLC           ; CONTINUE
00C5 29 03 D3           JMP     LCFAL           ; ERROR
              *
              * ACK RECEIPT OF LAST BYTE AND WAIT FOR NEXT
              *
00C8 4C       ACKLC     LR      A,S
00C9 21 7F              NI      LCRDYM          ;READY BIT OF PORT FOR READ
00CB 60                 OUTS    PBUSC
00CC A0       LCWATA    INS     PBUSC           ;DATA RDY?
00CD EF                 XS      D               ;I.E. HAS LCRDY CHANGED?
00CE 91 07              BM      LCWATB          ;IF MI, YES
00D0 3D                 DS      T               ;TIMEOUT?
00D1 94 FA              BNZ     LCWATA          ;IF NZ, NOT YET
00D3 29 03 D3           JMP     LCFAL           ;ABORT MSG RCV ON TIMEOUT
00D6 20 32    LCWATB    LI      LCTO            ;RESET TIMEOUT COUNT
00D8 5D                 LR      T,A
00D9 4C                 LR      A,S             ;UPDATE BUS CTRL
00DA 23 C0              XI      LCRDY+FCRDY
00DC 5C                 LR      S,A
              *
              * GET DATA AND SAVE
              *
00DD 6C                 LISL    BFPLCL
00DE 4C                 LR      A,S
00DF 0B                 LR      IS,A
00E0 A5                 INS     PBUSD
00E1 5F                 LR      D,A
00E2 E5                 XS      CKSM            ;ENTER INTO CKSM
00E3 55                 LR      CKSM,A
00E4 C5                 AS      CKSM
00E5 19                 LNK
00E6 55                 LR      CKSM,A
00E7 0A                 LR      A,IS            ;UPDATE BUF PTR SAVE
              * LET BUF PTR WRAP AROUND IN THIS 8 BYTE BUFFER IF THE
              * LINE CARD IS SO FOOLISH AS TO SEND MORE THAN 8 BYTES.
00E8 61                 LISU    BFPLCU
00E9 6C                 LISL    BFPLCL
00EA 5C                 LR      S,A
              *
              * MSG DONE?
              *
00EB 6F                 LISL    CNTLCL
00EC 3F                 DS      D
00ED 94 DA              BNZ     ACKLC           ;IF NZ, NOT YET
              *
              * ACK LAST BYTE
              *
00EF 4E                 LR      A,D
00F0 21 7F              NI      LCRDYM
00F2 B0                 OUTS    PBUSC
00F3 20 32              LI      LCTO            ;RE-LOAD SHOT CLOCK WHILE WE'RE HERE
00F5 5C                 LR      S,A
              *
              * CKSM OK?
              *
00F6 70                 CLR
00F7 E5                 XS      CKSM
00F8 84 04              BZ      RCVDON          ;IF Z, MSG OK, PROCESS COMMAND
00FA 29 03 7C           JMP     CKSERR          ;NAK FOR CKSM ERR
              RCVDON    EQU     *
              ********
              ********
              *
              * PROCESS FUNCTION CARD COMMAND HERE
              *
              * THIS SEGMENT PARSES THE COMMAND BYTE IN THE MESSAGE BUFFER
              * AND AFTER DETERMINING THE DESIRED OPERATION, THE COMMAND
              * WILL BE PROCESSED.
              *
00FD 62       CMDST     LISU    LCBUFU          ; UPPER DIGIT OF CMD LOC.
00FE 6F                 LISL    LCBUFL          ; LOWER DIGIT OF CMD LOC.
00FF 4C                 LR      A,S             ; LOAD ACCUMULATOR WITH CMD
0100 55                 LR      TEMP6R,A        ; SAVE THE COMMAND
0101 25 80              CI      WRUC            ; WHO ARE YOU?
              *
0103 84 4E              BZ      WRURT
0105 25 81              CI      GCOVCC          ; GET COV COUNT?
              *
0107 84 53              BZ      GCOVRI
0109 25 82              CI      FCOVC           ; FETCH COV'S
              *
```

```
0108 94 04              BNZ     CMDST6          ;
010D 29 01 AB           JMP     ECOVRT          ;
0110 25 83     CMDST6   CI      ACOVC           ; ACK COV'S
               *
0112 94 04              BNZ     CMDST3          ;
0114 29 02 67           JMP     ACOVRT          ;
0117 6E        CMDST3   LISL    GCRUFL-1        ;
0118 4C                 LR      A,S             ;
0119 21 08              NI      8               ;
011B 94 2B              BNZ     INVPT1          ;
011D 45                 LR      A,TEMP6H        ;
011E 25 06              CI      RDPTC           ; READ POINT CCU MMAND
               *
0120 94 04              BNZ     CMDST4          ;
0122 29 02 UD           JMP     RDPTRT          ;
0125 25 08     CMDST4   CI      ECOVC           ; ENABLE COV REPORTING
               *
0127 94 04              BNZ     CMDST5          ;
0129 29 03 14           JMP     ECOVRT          ;
012C 25 0D     CMDST5   CI      STCOVC          ; SET COV FOR A POINT
               *
012E 94 04              BNZ     CMDST7          ;
0130 29 03 53           JMP     STCOVR          ;
0133 25 11     CMDST7   CI      CHRCMD          ; CHARACTERIZE A POINIT
0135 94 04              BNZ     INVCMD          ;
0137 29 02 8A           JMP     CHPTRT          ;
               *
               * UN-RECOGNIZED COMMAND
               * IF PWRUP SET, CHAREQ! ELSE CMDERR
               *
013A 40        INVCMD   LR      A,PTVBR         ;
013B 21 80              NI      PWRUP           ; IS THE POWER UP FLAG SET
013D 20 FD              LI      CMDERR          ;
013F 81 03              BP      *+4             ;IF P, CMDERR
0141 20 FC              LI      CHAREQ          ;REQ CHAR
0143 5D        INVCD1   LR      I,A
0144 29 03 81           JMP     NAKRSP
0147 20 F9     INVPT1   LI      INVPNT          ; INVALID POINT #
0149 90 F9              BR      INVCD1          ;
               *
               * RETURN FROM EXT INT
               *
014B 1D        INTRET   LR      W,J             ; RESTORE THE STATUS REG
014C 46                 LR      A,ISARSV        ; GET THE OLD ISAR VALUE
014D 0B                 LR      IS,A            ; PUT IT IN THE ISAR REG
014E 2C                 XDC                     ; RESTORE THE DATA COUNTER
014F 48                 LR      A,ACCSAV        ; RESTORE THE ACCUMULATOR
0150 1B                 EI                      ; ENABLE INTERRUD PTS
0151 1C                 POP                     ; RETUT RN TO MAIN PRUGRAM
               *
               *
               * WHO ARE YOU? IF YOU ARE WHO, THEN SAY' I AM WHO' AND
               * JUMP TO THE TRANSMIT ROUTINE; IF WHO ARE NOT YOU THEN
               * WHO ARE YOU
               *
               *
               ***********
               *
0152 76        WHORT    LIS     ACK             ; ACK COMMAND
0153 4E                 LR      A,D             ;
0154 20 60              LI      H"60"           ; CARD TYPE
0156 5D                 LR      I,A             ; STORE IT IN THE SECOND LOC.
0157 76                 LIS     ACK             ; ACK COMMAND
0158 5C                 LR      S,A             ;
0159 90 2E              BR      OUTLD4          ; JMP TO THE 3 BYTE OUTPUT RUT
               *
               *
               * THIS IS THE COV COUNT ROUTINE IN RESPONSE TO
               * A GET COV COUNT COMMAND. IT INSPECTS EACH BIT
               * OF THE COV FLAG REG AND INCREMENTS A COUNT IF
               * THAT BIT IS SET. WHEN COMPLETE THE CONTROL IS
               * TRANSFERRED TO THE TRANSMIT ROUTINE
               *
               *****************************
               *
               *
               *********************************************
               *
               * GET COV COUNT CALCULATES THE TOTAL NUMBER OF PRESENT
               * SIGNIFICANT CHANGES OF VALUE, AND OUTPUTS THIS DATA
               * TO THE REQUESTING DEVICE.
               * THIS SEGEMENT IS ENTERED VAI INTERRUPT DRIVEN COMMAND
               *
               *
               *********************************************
               *
015B 40        GCOVRT   LR      A,PTVBR         ; GET THE POWER UP FLAG BYTE
015C 21 80              NI      PWRUP           ; ARE WE JUST POWERED UP?
015E 94 2C              BNZ     OUTLD2          ; YES, SEND CHARACTERIZATION REQUEST.
0160 68                 LISL    0               ;
0161 5C                 LR      S,A             ; GET THE BYTE COUNT
0162 25 03              CI      3               ;
```

```
0164 82 05              BC      GCVCL1          ; COUNT O K
0166 6E                 LISL    LCBUFL-1        ; SET UP ISAR
0167 29 03 37           JMP     NAKR10
016A 70        GCVCL1   CLR                     ;
016B 55                 LR      TEMP6R,A        ; ZERO TEMP6R
016C 20 71              LI      PTBUFR+1        ; START OF THE POINT DATA FLAGS
016E 0B        GCVCLP   LR      IS,A            ; LOAD THE ISAR TO START
016F 4C                 LR      A,S             ;
0170 21 01              NI      COVEND          ; IS THE COV FLAG SET
0172 84 06              BZ      GCVC10          ;
0174 35                 DS      TEMP6R          ; YES
0175 4C                 LR      A,S             ;
0176 22 02              OI      LCKN            ; SET THE LINE CARD KNOWS BIT
0178 5C                 LR      S,A             ;
0179 0A        GCVC10   LR      A,IS            ; GET THE ISAR POINTER
017A 24 04              AI      4               ; MOVE TO NEXT POINT
017C 25 40              CI      O"100"          ; DONE YET
017E 82 EF              BC      GCVCLP
0180 45        GCVC20   LR      A,TEMP6R        ;GET NEGATIVE COUNT
0181 18                 COM                     ;2'S COMPLEMENT IT
0182 1F                 INC
0183 62        OUTLD1   LISU    LCBUFU          ; SET ISAR FOR MESG BUFFER
0184 6E                 LISL    LCBUFL-1
0185 5D                 LR      I,A             ; LOAD THE # OF COV'S HERE
0186 76        OUTLD3   LIS     ACK             ; STORE THE ACK BYTE
0187 5C                 LR      S,A
0188 29 03 84  OUTLD4   JMP     SHOUT           ; JMP TO THE SHORT OUTPUT RUT
018B 62        OUTLD2   LISU    LCBUFU          ; POINT TO THE SECOND BYTE OF THE

               *                                ; OF THE LINE CARD OUTPUT BUFFER
018C 6E                 LISL    LCBUFL-1        ;
018D 71                 LIS     1               ; DATA FOR 1 COV, POWER UP
018E 5D                 LR      I,A             ; STORE THE DATA, AND
018F 90 F6              BR      OUTLD3          ; BRANCH TO COMPLETE MSG BEFORE XMIT
               *
               *
               *
               ***********************************************
               *
               *
               *  FETCH 2 COV POINT ADDRESSES FROM THE COV DATA BASE.
               *
               *  WHICH PAIR IS DETERMINED FROM THE DATA IN THE
               *  COMMAND.
               *
               ***********************************************
               *
               *
               *  THIS ROUTINE ASKS FOR CHARACTERIZATION
               *
0191 20 06     GTCHAR   LI      ACK             ; LOAD AN ACK COMMAND
0193 5F                 LR      D,A             ; IN THE FIRST BYTE
0194 4C                 LR      A,S             ; GET THE CARD ADDRESS
0195 22 80              OI      H"80"           ; SET THE MSB.
0197 5F                 LR      D,A             ; RE-STORE THE CARD ADDRESS
0198 20 FC              LI      CHAREQ          ; PUT A CHARACTERIZATION REQUEST
019A 5E                 LR      D,A             ; IN THE THIRD BYTE
019B 70                 CLR
019C 5C                 LR      S,A             ; SET THE FOURTH BYTE TO ZERO
019D 61                 LISU    BFPLCU          ; LOAD THE ISAR TO THE BUFFER POINTER REG.
019E 6C                 LISL    BFPLCL          ;
019F 20 11              LI      LCBUFR          ; GET THE L C RESPONSE BUFFER ADR
01A1 5C                 LR      S,A             ; AND STORE IT
01A2 6F                 LISL    CNTLCL          ; POINT TO THE MESSAGE BYTE COUNT REG
01A3 75                 LIS     5               ; THIS MESSAGE HAS 5 BYTES
01A4 5C                 LR      S,A             ; STORE IT HERE
01A5 29 03 79           JMP     LCXMT2          ; JMP TO THE TRANSMIT ROUTINE
01A8 29 02 4C  INDN4    JMP     INDN3           ; JMP TO FINISH
01AB 40        FCOVPT   LR      A,PINDR         ; LOAD A WITH INTERRUPT STATUS
01AC 21 80              NI      PWRUP           ; JUST POWERED UP?
01AE 94 F2              BNZ     GTCHAR          ; YES, GET CHARACTERIZED
01B0 6D                 LISL    CMDTAL          ; POINT THE LOWER ISAR OCTET TO
01B1 4C                 LR      A,S             ; THE COV DUET REQUESTED AND GET IT
01B2 55                 LR      TEMP6R,A        ; PUT IT IN TEMP STORAGE
01B3 21 F8              NI      H"F8"           ; CHECK FOR VALID DATA
01B5 94 19              BNZ     NKRSPU          ; SEND ERROR MESSAGE
01B7 20 71              LI      PTBUFR+1        ; FIRST POINT FLAG LOCATION
01B9 0B        FCVRT1   LR      IS,A            ; USED IN THE ISAR
01BA 4C                 LR      A,S             ; GET THE POINT FLAGS
01BB 21 02              NI      LCKN            ;
01BD 94 10              BNZ     USACOV          ; IS THIS A COV?
01BF 0A        FCVRT2   LR      A,IS            ; GET THE ISAR POINTER

01C0 24 04              AI      4               ; MOVE THE VALUE TO THE NEXT POINT
01C2 25 40              CI      O"100"          ; ARE WE DONE?
01C4 92 03              BNC     FCVRT3          ; IF NO CARRY WE ARE OUT OF RANGE
01C6 90 F2              BR      FCVRT1          ; DO THE NEXT POINT
01C8 20 80     FCVRT3   LI      H"80"           ; TEST MASK FOR COV #
01CA F5                 NS      TEMP6R          ; IS THE MSB SET
01CB 84 07              BZ      NKRSP           ; IF ZERO THERE WERE NO COV'S
01CD 90 7E              BR      INDN3           ; O K FINISH UP
01CF 20 FE     NKRSPU   LI      DATAER          ; INVALID DATA IN COMMAND
```

```
0101 90 03                  BR      NKRS10
0103 20 FF        NKRSP     LI      CVERR              ; COV ERROR
0105 62           NKRS10    LISU    LCBUFU             ;
0106 6E                     LISL    LCBUFL-1           ; POINT TO THE OUTPUT BUFFER
0107 5D                     LR      I,A                ; STORE ERROR CODE
0108 29 03 81               JMP     HAKRSP             ;
                  *
                  *
                  *
01DB 77           USACOV    LIS     7                  ; MASK FOR COV'S THE LINE CARD DOESN'T WANT
01DC F5                     NS      TEMP6R             ; TAKE THIS ONE?
01DD 84 04                  BZ      FCVRT4             ; YES   IT IS GOOD
01DF 35                     DS      TEMP6R             ; THROW ONE MORE AWAY
01E0 90 DE                  BR      FCVRT2             ; LOOK FOR THE NEXT ONE
01E2 4D           FCVRT4    LR      A,I                ; GET THE FLAG BYTE
01E3 21 08                  NI      PTFAL              ; POINT FAILED?
01E5 94 60                  BNZ     FCVRT9             ; YES, REPORT STATUS COV
01E7 4C                     LR      A,S                ; GET THE MS DATA BYTE
01E8 21 80                  NI      H"80"              ; POINT RETURNED FROM FAILURE?
01EA 94 78                  BNZ     FCVR11             ; YES REPORT STATUS COV
01EC 4D                     LR      A,I                ; MOVE THE CURRENT VALUE
01ED 21 7F                  NI      H"7F"              ; STRIP THE 'POINT RETURNED BIT'
01EF 18                     COM                        ; COMPLEMENT THE DATA
01F0 07                     LR      QL,A               ; MSB TO HERE.
01F1 4E                     LR      A,D                ; LSB  TO NEXT SLOT
01F2 18                     COM                        ; MAKE TWO'S COMPLEMENT
01F3 1F                     INC                        ;
01F4 04                     LR      KU,A               ; TO HERE
01F5 03                     LR      A,QL               ; GET THE MSB
01F6 19                     LNK                        ; ADD THE CARRY
01F7 07                     LR      QL,A               ;
01F8 4E                     LR      A,D                ; MOVE THE ISAR
01F9 20 0F                  LI      H"0F"              ; MASK TO CLEAR LAST OLD VALUE
01FB EC                     NS      S                  ; CLEAR IT
01FC 5C                     LR      S,A                ;
01FD 00                     LR      A,KU               ;
01FE 13                     SL      1                  ; SHIFT DATA LEFT
01FF 21 F0                  NI      H"F0"              ; STRIP LOWER 3 BITS
0201 EC                     XS      S                  ; COMBINE IT WITH FLAGS
0202 5E                     LR      D,A                ;
0203 00                     LR      A,KU               ;
0204 21 FF                  NI      H"FF"              ; WAS MSB SET?
0206 03                     LR      A,QL               ; GET THE M S BYTE
0207 81 32                  BP      FCVR12             ; NO
0209 13                     SL      1                  ;
020A 22 01                  OI      1                  ; SET THE LSB
020C 5D           FCVRT5    LR      I,A                ; STORE NEW OLD VALUE
020D 4D                     LR      A,I                ; MOVE THE ISAR
020E 4D                     LR      A,I                ; GET THE MS BYTE
020F 21 7F                  NI      H"7F"              ; STRIP THE PT RET RET BIT.
0211 07                     LR      QL,A               ; STORE IT
0212 4E                     LR      A,D                ; DO THE LS BYTE
0213 04                     LR      KU,A               ;
0214 0A                     LR      A,IS               ; SAVE THE ISAR
0215 E5                     XS      TEMP6R             ; IN TEMP STORAGE
0216 55                     LR      TEMP6R,A           ; FOR THE MOMENT
0217 62                     LISU    LCBUFU             ; UPPER OCTET OF LC BUFFER IS 3
0218 6E                     LISL    N1COVR             ; LOWER OCTET OF 1 ST POINT IS 6
0219 45           FCVRT6    LR      A,TEMP6R           ; GET THE COV POINT WERE DOING
021A 21 80                  NI      H"80"              ; ' FIRST OR SECOND'
021C 4C                     LR      A,S                ; GET THE CARD #
021D 84 04                  BZ      FCVRT7             ; FIRST COV
021F 21 F0                  NI      H"F0"              ; MASK OUT FIRST POINT #
0221 69                     LISL    N2COVR             ; POINT TO SECOND  BUFFER
0222 5C           FCVRT7    LR      S,A                ; STORE CARD ADDRESS
0223 45                     LR      A,TEMP6R           ; GET ISAR POINTER BACK
0224 21 1F                  NI      H"1F"              ; STRIP COV BIT
0226 12                     SR      1                  ; CREATE A POINT ADDRESS
0227 12                     SR      1                  ;
0228 EC                     XS      S                  ; COMBINE IT WITH CARD ADDRESS
0229 5F                     LR      D,A                ; STORE ADDRESS
022A 00                     LR      A,KU               ; GET THE L S BYTE OF DATA AND
022B 5F                     LR      D,A                ; PUT IT IN THE NEXT LOC
022C 03                     LR      A,QL               ; GETTHE M S BYTE OF DATA AND
022D 5C                     LR      S,A                ; STORE IT ALSO
022E 45                     LR      A,TEMP6R           ; GET THE COV REG.
022F 25 80                  CI      H"80"              ; SECOND COV?
0231 92 08                  BNC     THDON2             ; DONE ', THE SECOND COV
0233 0B                     LR      IS,A               ; RESTORE THE  ISAR
0234 4E                     LR      A,D                ; MOVE IT TO THE FLAG BYTE
0235 20 80                  LI      H"80"              ; SET SECOND COV FLAG
0237 55                     LR      TEMP6R,A           ;
0238 90 86                  BR      FCVRT2             ; DO NEXT COV
023A 13           FCVR12    SL      1                  ;
023B 90 D0                  BR      FCVRT5             ;
                  *
023D 6F           THDON2    LISL    LCBUFL             ; SET UP LOWER OCTET OF L C BUFFER
023E 76                     LIS     6                  ; GET AN ACK RESPONSE AND
023F 5C                     LR      S,A                ; STORE IT IN THE FIRST BYTE
0240 78                     LIS     8                  ;
0241 61           THDN1     LISU    BFPBCU             ; POINT THE ISAR TO THE BUFFER
0242 6F                     LISL    CNTBCL             ; POINTER REGISTER AND
0243 5C                     LR      S,A                ;
```

```
0244 20 17                 LI     LCBUFR        ; STORE THE LOC OF THE L C BUFFER REGISTER
0246 6C                    LISL   BFPLCL        ; MOVE THE ISAR TO THE MSG COUNT BUFFER
0247 5C                    LR     S,A           ; STORE THIS HERE
0248 6F                    LISL   CNTLCL        ;
0249 29 03 79 FCVRT8       JMP    LCXMT2        ; BRANCH TO THIS POINT TO TRANSMIT DATA
024C 6F       THDR3        LISL   LCBUFL        ;
024D 62                    LISU   LCBUFU        ; THE SHORT COV REPORT
024E 76                    LIS    ACK           ; IS STARTED HERE
024F 5C                    LR     S,A           ;
0250 75                    LIS    5             ;
0251 90 FF                 BR     THDR1         ;
0253 20 F8    FCVRT9       LI     PUTFAL        ; POINT FAIL ERROR MSG
0255 04       FCVR10       LR     KU,A          ; TREAT IT AS AN L S BYTE
0256 70                    CLR                  ;
0257 07                    LR     QL,A          ; CLEAR THE M S BYTE
0258 0A                    LR     A,IS          ; SAVE THE ISAR
0259 E5                    XS     TEMP6R        ;
025A 55                    LR     TEMP6R,A      ; HERE
025B 62                    LISU   LCBUFU        ;
025C 6E                    LISL   HICOVR        ; GET THE CARD ADDRESS
025D 4C                    LR     A,S           ;
025E 22 80                 OI     H'80'         ; SET THE M S BIT, COV STATUS
0260 5C                    LR     S,A           ;
0261 90 B7                 BR     FCVRT6        ; CONTINUE IN MAIN RUT
0263 20 F7    FCVR11       LI     PUTRET        ; POINT RET MSG
0265 90 EF                 BR     FCVR10
                *
                *
                * LINE CARD ACKNOWLEDGES RECEIPT OF COV DATA
                *
0267 76       ACOVPT       LIS    ACK           ; LOAD AN ACK CMD IN THE FIRST BYTE
0268 5C                    LR     S,A           ; OOF THE LC OUTPUT BUFFER
0269 20 21                 LI     PTBUFR+1      ; START OF THE POINT DATA BASE
026B 0B       ACKCV3       LR     IS,A          ;
026C 4C                    LR     A,S           ;
026D 21 02                 NI     LCKN          ; CHECK LINE CARD KNOWS BIT
026F 84 09                 BZ     ACKCV2        ; IF IT IS SET , ZERO IT AND
0271 4C                    LR     A,S           ; CLEAR COV FOUND FLAG
0272 21 FC                 NI     LCOVH         ;
0274 5D                    LR     I,A           ;
0275 4C                    LR     A,S           ; GET POINT RET BIT
0276 21 7F                 NI     H'7F'         ; CLEAR IT
0278 5F                    LR     D,A           ; RESTORE THE BYTE
0279 0A       ACKCV2       LR     A,IS          ; GET THE ISAR
027A 24 04                 AI     4             ; MOVE IT TO NEXT POINT
027C 25 40                 CI     D'100'        ; ARE WE DONE?
027E 82 EC                 BC     ACKCV3        ; IF CARRY , NO
0280 6C       ACKCV1       LISL   BFPLCL        ; FIND THE LINE CARD BUFFER
0281 61                    LISU   BFPLCU        ;
0282 20 17                 LI     LCBUFR        ; POINTER REG, AND LOAD THE
0284 5C                    LR     S,A           ; L C BUFFER ADDRESS
0285 6E                    LISL   CNTLCL        ; GO TO THE MSG BYTE COUNT
0286 72                    LIS    2             ; ADDRESS, AND STORE 2 COUNTS
0287 5C                    LR     S,A           ;
0288 90 C0                 BR     FCVRT8        ; JMP TO THE TRANSMIT ROUTINE
                *
                * CHARACTERIZE A POINT HERE
                *
028A 68       CHPTP1       LISL   0             ; POINT TO COUNT BYTE
028B 4C                    LR     A,S           ;
028C 25 06                 CI     6             ; BYTE COUNT O K
028E 84 05                 BZ     CHPR10        ;
0290 6F                    LISL   LCBUFL-1      ;
0291 29 03 32              JMP    NAKR10
0294 6D       CHPR10       LISL   LCBUFL-2      ; ENABLE FLAGS FOR COV REPORTING
                *                               ; ARE AT
0295 71                    LIS    1             ;IS BIT 1 SET?
0296 ED                    XS     I             ;
0297 84 0A                 BZ     CHRP10        ;IF Z, ENABLE PT FOR COV REPORT
0299 25 01                 CI     1             ;DISABLE COV REPORT?
029B 84 20                 BZ     CHRP20        ;IF Z, YES
                *
                * INVALID DATA IN CHAR CMD
                *
029D 20 FE                 LI     DATAER        ;SEND NAK, DATA ERROR
029F 5D                    LR     I,A
02A0 90 18                 BR     NAKSP1
                *
                * ENABLE POINT FOR COOV REPORTING
                *
02A2 77       CHPP10       LIS    7             ;GET POINT # ALONE
02A3 FC                    NS     S
02A4 13                    SL     1             ; QUADRUPLE IT
02A5 13                    SL     1             ;
02A6 24 21                 AI     PTBUFR+1      ;
02A8 0B                    LR     IS,A          ; MAKE AN ADDRESS
02A9 4C                    LR     A,S           ;
02AA 21 08                 NI     PTFAL         ; POINT FAILED?
02AC 94 07                 BNZ    CHRP13        ; YES
02AE 4C                    LR     A,S           ;
02AF 22 04                 OI     COVEN         ; SET COV ENABLE FLAG
02B1 5C                    LR     S,A
02B2 90 14                 BR     CHRP30
```

```
                *
02B4 62         CHPP13  LISU    LCBUFU          ;
02B5 6E                 LISL    LCBUFL-1        ; POINT TO OUT PUT BUFFER
02B6 20 FB              LI      PUTFAL          ; POINT FAIL ERROR MSG
02B8 5D                 LR      I,A             ;
02B9 29 03 81   NAKSP1  JMP     NAKRSP          ;
                *
                * DISABLE PT FROM COV REPORTING
                *
02BC 77         CHPP20  LIS     7               ;POINT TO PROPER BIT
02BD FC                 NS      S
02BE 13                 SL      1               ;
02BF 13                 SL      1               ;
02C0 24 71              AI      PTBUFR+1        ; POINT TO PROPER POINT FLAGS
02C2 0B                 LR      IS,A            ;
02C3 4C                 LR      A,S             ; GET THE FLAGS
02C4 21 FB              NI      COVENH          ; RESET COV ENABLE FLAG
02C6 5C                 LR      S,A
                *
                * SET SIGNIFICANT COV VALUE.
                *
02C7 62         CHPP30  LISU    LCBUFU          ;SAVE SCOV
02C8 6C                 LISL    LCBUFL+3
02C9 4C                 LR      A,S
02CA 07                 LR      QL,A            ;TEMP SAVE
02CB 6E                 LISL    LCBUFL-1        ;GET PT ADDR
02CC 4C                 LR      A,S
02CD 0B                 LR      IS,A
02CE 63                 LISU    COVSTU
02CF 03                 LR      A,QL
02D0 5C                 LR      S,A             ;SET SCOV
                *
                * CLEAR PWRUP FLAG
                *
02D1 40                 LR      A,PTNBR
02D2 21 7F              NI      PWRUPM
02D4 50                 LR      PTNBR,A
                *
                * ACK THIS COMMAND
                *
02D5 62         CHPP40  LISU    LCBUFU
02D6 6F                 LISL    LCBUFL
02D7 76                 LIS     ACK
02D8 5C                 LR      S,A             ; STORE IT IN THE BUFFER
02D9 61                 LISU    BFPLCU
02DA 29 02 80           JMP     ACKCV1          ;FINISH ELSEWHERE
                *
                *
                * THIS IS THE READ A POINT ROUTINE
                *
                *
02DD 6F         RDPTRT  LISL    LCBUFL-1        ; IN THIS BUFFER
02DE 40                 LR      A,PTNBR         ;ARE WE CHARACTERIZED
02DF 21 80              NI      PWRUP
02E1 84 06              BZ      RDPT10          ;IF Z, YES
02E3 20 FC              LI      CHAREQ          ;NAK
02E5 5D                 LR      I,A
02E6 90 D2              BR      NAKSP1
02E8 77         RDPT10  LIS     7
02E9 FC                 NS      S               ;
02EA 13                 SL      1               ; DOUBLE IT
02EB 13                 SL      1               ;
02EC 24 71              AI      PTBUFR+1        ; ADD IT TO THE POINT BUFFER
02EE 0B                 LR      IS,A            ; ADR, AND LOAD THE ISAR
02EF 4D                 LR      A,I             ; GET THE L S DATA FLAGS
02F0 21 08              NI      PTFAL           ;
02F2 94 1A              BNZ     RDPT20          ; POINT HAS FAILED
02F4 4D                 LR      A,I             ;
02F5 21 7F              NI      H"7F"           ; STRIP POINT RETURNED BIT
02F7 07                 LR      QL,A            ; SAVE IT
02F8 4C                 LR      A,S             ; GET THE L S DATA BYTE
02F9 04                 LR      KU,A            ; AND SAVE IT
02FA 62         RDPT30  LISU    LCBUFU          ;
02FB 6F                 LISL    LCBUFL          ; THE L C RESPONSE BUFFER
02FC 76                 LIS     ACK             ; LOAD AN ACK
02FD 5E                 LR      D,A             ;
02FE 00                 LR      A,KU            ; GET THE L S DATA BYTE
02FF 5E                 LR      D,A             ; PUT IT IN THE BUFFER
0300 03                 LR      A,QL            ; GET THE M S DATA BYTE
0301 5C                 LR      S,A             ; STORE IT ALSO
0302 61                 LISU    BFPLCU          ;
0303 6C                 LISL    BFPLCL          ; THE BUFFER POINTER REG
0304 20 17              LI      LCBUFR          ; STORE THE L C RESPONSE
0306 5C                 LR      S,A             ; BUFFER ADR HERE
0307 6F                 LISL    CNTLCL          ; STORE A MESSAGE COUNT OF
0308 74                 LIS     4               ; 4 IN THE MSG CNT REG
0309 5C                 LR      S,A
030A 29 03 79           JMP     LCXMT2          ; JMP TO TRANSMIT
                *
030D 62         RDPT20  LISU    LCBUFU          ;
030E 6F                 LISL    LCBUFL-1        ; POINT TO OUTPUT BUFFER
030F 20 FB              LI      PUTFAL          ;
0311 5D         RDPT22  LR      I,A             ; STORE POINT RET ERROR MSG
```

```
0312 90 72              BR      NAKRES          ;
                *
                * ENABLE PT FOR COV REPORTING
                *
0314 68         ECOVR1  LISL    0
0315 4C                 LR      A,S             ; GET THE BYTE COUNT
0316 25 04              CI      4               ;
0318 84 05              BZ      ECOVR1          ; CONTINUE
031A 6F                 LISL    LCBUFL-1        ;
031B 29 03 32           JMP     NAKR10
031E 6F         ECOVR1  LISL    LCBUFL-1
031F 40                 LR      A,PINUR         ;CHARACTERIZED YET?
0320 21 80              NI      PWRUP
0322 84 06              BZ      ECOV10          ;IF Z, YES
0324 20 FC              LI      CHAREQ          ;NO, REQUEST CHAR
0326 5D                 LR      T,A
0327 90 0D              BR      NAKRES
                *
                * VALID COMMAND AND PT NUMBER
                * CHECK DATA
                *
0329 6D         ECOV10  LISL    LCBUFL-2
032A 71                 LIS     1
032B ED                 XS      T
032C 84 06              BZ      ECOV30          ;IF Z, ENABLE PT
032E 25 01              CI      1
0330 84 15              BZ      ECOV40          ;IF Z, DISABLE POINT
                *
                * INVALID DATA
                *
0332 20 FE      NAKR10  LI      DATAER
0334 5D                 LR      T,A
0335 29 03 B1   NAKRES  JMP     NAKRSP
                *
                * ENABLE PT FOR COV REPORTING
                *
0338 77         ECOV30  LIS     7               ;GET PT # ALONE
0339 FC                 NS      S
033A 13                 SL      1               ;
033B 13                 SL      1               ;
033C 24 21              AI      PTBUFR+1        ;
033E 0B                 LR      IS,A            ;
033F 4C                 LR      A,S             ;
0340 22 04              OI      COVEN           ;
0342 5C                 LR      S,A
0343 29 02 D5   ECOV31  JMP     CHRP40          ;ACK ELSEWHERE
                *
                * DISABLE PT FOR COV REPORTING
                *
0346 77         ECOV40  LIS     7
0347 FC                 NS      S               ;GET PT # ALONE
0348 13                 SL      1               ;
0349 13                 SL      1               ;
034A 24 21              AI      PTBUFR+1        ;
034C 0B                 LR      IS,A            ;
034D 4C                 LR      A,S             ;
034E 21 FB              NI      COVENN          ;
0350 5C                 LR      S,A
0351 90 F1              BR      ECOV31          ;ACK ELSEWHERE
                *
                * SET SIGNIFICANT COV
                *
                *
0353 68         SICOVR  LISL    0               ;
0354 4C                 LR      A,S             ;
0355 25 05              CI      5               ; BYTE COUNT O K ?
0357 6E                 LISL    LCBUFL-1        ; MOVE ISAR TO POINT # OR RESPONSE LOC
0358 84 04              BZ      SICOV1
035A 29 03 32           JMP     NAKR10
035D 40         SICOV1  LR      A,PINUR         ;CHAR YET?
035E 21 80              NI      PWRUP
0360 84 06              BZ      SICV10          ;IF Z, YES
0362 20 FC              LI      CHAREQ          ;NO, REQUEST CHAR
0364 5D                 LR      T,A
0365 90 CF              BR      NAKRES
0367 6D         SICV10  LISL    LCBUFL-2        ;GO GET THE NEW CHANGE
0368 4D                 LR      A,I             ; OF VALUE
0369 07                 LR      QL,A            ; SAVE IT
036A 77         SICV20  LIS     7
036B FC                 NS      S               ;GET PT NUMBER ALONE
036C 24 18              AI      COVSTR          ; ADD A STORAGE OFFSET
036E 0B                 LR      IS,A            ;
036F 03                 LR      A,QL            ; GET NEW DATA AGAIN
0370 5C                 LR      S,A             ; STORE IT
0371 62                 LISU    LCBUFU          ; POINT TO RESPONSE BUFFER
0372 6F                 LISL    LCBUFL          ;
0373 76                 LIS     ACK             ; LOAD AN ACK CMD
0374 5C                 LR      S,A             ; SAVE IT
0375 61                 LISU    RFPLCU          ;
0376 29 02 80           JMP     ACKCV1          ; JMP TO TRANSMIT
```

```
                *
                ********
                *
                * CHECKSUM ERROR ON COMMAND, NAK IT
                *
0379 4C         LCXMT2  LR      A,S
037A 90 10              BR      LCXMT1          ; RESTORE THE ACCUMULATOR
037C 62         CKSERR  LISU    LCBUFU          ;PUT RESPONSE INTO BUFFER
037D 6E                 LISL    LCBUFL-1
037E 20 C0              LI      CKSMER
0380 5D                 LR      I,A
0381 20 15      NAKRSP  LI      NAK
0383 5C                 LR      S,A
0384 61         RHOUT   LISU    BFPLCU          ; INIT BUFFER PTR
0385 6C                 LISL    BFPLCL
0386 20 17              LI      LCBUFR
0388 5C                 LR      S,A
0389 6F                 LISL    CNTLCL          ;INIT MSG CNT LESS CKSM PLUS COUNT BYTE
038A 73                 LIS     3
038B 5E         LCXMT1  LR      D,A
038C 85                 OUTS    PBUSD           ;PUT MSG CNT INCLUDING CKSM ON BUS
038D 13                 SL      1               ;ENTER INTO CKSM
038E 55                 LR      CKSM,A
                *
                * FALL THRU TO COMMON XMIT ROUTINE
                *
                ********
                ********
                *
                * FUNCTION CARD COMMAND PROCESSING ROUTINES COME HERE WHEN THEY ARE DONE
                * TO GET THEIR RESPONSES SENT TO THE LINE CARD.
                *
                * NOTE:  IT IS THE RESPONSIBILITY OF THE COMMAND PROCESSING ROUTINE TO
                *        PUT THE RESPONSE DATA IN THE BUFFER, SET THE BUFFER PTR IN BFPLCU,
                *        PUT THE COUNT OF THE NUMBER OF BYTES TO BE TRANSMITTED (NOT INCLUDING
                *        COUNT BYTE, INCLUDING CKSM) INTO CNTLCU AND ON THE POWERS BUS DATA
                *        PORT, PBUSD, AND INITIALIZE THE CKSM.  THE CKSM ERROR RESPONSE ABOVE
                *        GIVES YOU AN IDEA OF WHAT YOU HAVE TO DO.
                *
                ********
                ********
                *
                * WAIT HERE TO MAKE SURE THE BUS IS TURNED AROUND
                *
038F A0         LCXMIT  INS     PBUSC
0390 EE                 XS      D
0391 91 07              BM      LCWATF          ;IF M, BUS IS TURNED
0393 3D                 DS      I               ;TIME OUT?
0394 94 FA              BNZ     LCXMIT          ;NOT YET
0396 29 03 D3           JMP     LCFAL           ;THUD!
0399 20 32      LCWATF  LI      LCTO            ;RESET TIMER AS LONG AS WE'RE HERE
039B 5D                 LR      I,A
039C 4C                 LR      A,S             ;UPDATE PBUS CTRL, CHANGE DIRECTION OF BUS

039D 23 F0              XI      LCRDY+FCRDY+PBUSDIR
039F 5C                 LR      S,A
                *
                * ACKNOWLEDGE TURN AROUND AND TELL LC THAT COUNT IS ON THE BUS
                *
03A0 4C         LCXMTL  LR      A,S
03A1 21 7F              NI      LCRDYM
03A3 B0                 OUTS    PBUSC
                *
                * WAIT UNTIL LC GETS THIS BYTE
                *
03A4 A0         LCWATC  INS     PBUSC
03A5 EE                 XS      D               ;LCRDY?
03A6 91 07              BM      LCWATD          ;IF MI, YES
03A8 3D                 DS      I               ;TIMEOUT?
03A9 94 FA              BNZ     LCWATC          ;IF NZ, NOT YET
03AB 29 03 D3           JMP     LCFAL           ;ABORT SEND ON TIMEOUT
03AE 20 32      LCWATD  LI      LCTO            ;RESET TO
03B0 5D                 LR      I,A
03B1 4C                 LR      A,S             ;UPDATE CTRL BYTE
03B2 23 C0              XI      LCRDY+FCRDY
03B4 5D                 LR      I,A
                *
                * MSG ALL OUT?
                *
03B5 3E                 DS      D
03B6 91 16              BM      XMITDN          ;IF MI, CKSM OUT, WE'RE DONE
03B8 94 05              BNZ     NXTLCX          ;IF NZ, GET NEXT CHAR FROM BUF
                *
                * UPON COUNT GOING TO ZERO, SEND CHECKSUM
                *
03BA 45                 LR      A,CKSM          ;PUT IT ON BUS
03BB 85                 OUTS    PBUSD
03BC 90 E3              BR      LCXMTL
                *
                * GET NEXT BYTE
                *
03BE 6C         NXTLCX  LISL    BFPLCL
```

```
03BF 4C                  LR      A,S
03C0 0B                  LR      IS,A
03C1 4F                  LR      A,0
03C2 B5                  OUTS    PBUSD               ;PUT NEXT BYTE ON BUS
03C3 E5                  XS      CKSM                ;ENTER INTO CKSM
03C4 55                  LR      CKSM,A
03C5 C5                  AS      CKSM
03C6 12                  LNK
03C7 55                  LR      CKSM,A
03C8 0A                  LR      A,IS                ;UPDATE BUFFER PTR
03C9 8F 03               BR7     TSOVFA              ;XMIT WILL GO ACROSS OCTET BOUNDARIES
03CB 24 F8               AI      -O"10"
03CD 61         TSOVFA   LISU    BFPLCU
03CE 6C                  LISL    BFPLCL
03CF 5C                  LR      S,A
03D0 6F                  LISL    PBCILL              ;SET ISAR FOR TOP OF LOOP

03D1 90 C6               BR      LCXMTL
                *
                * XMIT IS DONE, DE-SELECT BUS AND RETURN TO WORK
                *
03D3 90 01      LCFAL    BR      XMITDN
                XMITDN   EQU     *
03D5 20 20               LI      DSELPB
03D7 B0                  OUTS    PBUSC
03D8 70                  CLR
03D9 B5                  OUTS    PBUSD
                *
                * RESTORE AND RETURN FROM INTERRUPT
                *
03DA 29 01 4B            JMP     INTRET              ;
                ********
                ********
                *
                *THIS IS THE INPUT PORTION OF THE FAI/PAI MICROCODE*******
                *

                *
                *
                *
                * THIS IS THE BEGINING OF THE EIGHT POINT INPUT ROUTINE
                * ALL EIGHT POINTS ARE CHECKED FOR VALIDITY AND INPUTED
                *

                *
                *
03DD A4         BEGNAZ   INS     INSEL               ; INPUT USER CONTROL PORT
03DE 81 13               BP      BEGNB1              ; JMP IF NOT IN  CAL MODE
03E0 1A                  DI
03E1 40                  LR      A,PINBR             ; GET THE POINT NUMBER
03E2 22 01               OI      1                   ; SET IT TO ONE
03E4 50                  LR      PINBR,A             ; RESTORE IT
03E5 90 12               BR      BEGNB               ; DO IT TO THE POINT
                BEGNA1   EQU     *
03E7 1A                  DI                          ;
03E8 40         BEGNA    LR      A,PINBR             ;
03E9 22 08               OI      8                   ;
03EB 50                  LR      PINBR,A             ;
03EC 1B                  EI
                *
03ED 20 80      BEGN     LI      H"80"               ; MASK TO CHECK PWRUP FLAG
03EF F0                  NS      PINBR               ; IS IT SET?
03F0 94 EC               BNZ     BEGNAZ              ; IF YES CHECK CAL MODE
03F2 20 0F      BEGNB1   LI      H"0F"               ;
03F4 F0                  NS      PINBR               ;
03F5 84 6C               BZ      CYCLE               ; YES, TIME FOR CHECKSUM
03F7 30                  DS      PINBR               ; SELECT A POINT
03F8 1B         BEGNB    EI                          ; MAKE SURE INTERRUPTS ARE ENABLED
03F9 20 21               LI      TIMSTP              ;
03FB B6                  OUTS    TCP                 ; STOP THE TIMER
03FC 70                  CLR                         ;
03FD 60                  LISU    COUNTU              ;
03FE 69                  LISL    COUNTL              ;

03FF 5C                  LR      S,A                 ; CLEAR THE COUNT REGISTER
0400 52                  LR      TIMOVR,A            ; CLEAR THE UPPER TIMER BYTE
0401 32                  DS      TIMOVR              ; SET IT TO FF
0402 1A                  DI
0403 56                  LR      ISARSV,A            ; CLR THE ISAR SAVE AREA
0404 40                  LR      A,PINBR             ;
0405 21 8F               NI      ADPIM               ;
0407 22 10               OI      H"10"
0409 50                  LR      PINBR,A             ;
040A 1B                  EI
040B 18                  COM                         ;
040C 21 0F               NI      H"0F"               ; SET ALL BITS NOT USED TO ZERO .
040E B4                  OUTS    INSEL               ; OUTPUT TO MULTIPLEXOR
040F 20 7F               LI      COUNTS              ; # OF EDGES IN MEASUREMENT
0411 5C                  LR      S,A                 ; STORE IT IN SCRATCHPAD AT COUNTA
                *
                * SET UP THE TIMER WITH A TIMEOUT. THIS WILL CHECK THE
                * VALIDITY OF THE POINT BEFORE THE INPUT IS ATTEMPTED
```

```
                   *
                   *
0412 20 DA      LOOPA    LI      TM540U       ; TIMEOUT LENGTH
0414 B7                  OUTS    TIMER        ; SEND IT TO THE TIMER
0415 20 48               LI      TIMST3       ; DIVIDE BY 5 AND START
0417 B6                  OUTS    TCP          ;
0418 A1         LOOPA3   INS     FROIN1       ;
0419 91 FE               BM      LOOPA3       ;
041B 20 D0               LI      TM510U       ;
041D B7                  OUTS    TIMER        ;
041E A1         LOOPA1   INS     FROIN1       ;
041F 81 FE               BP      LOOPA1       ;
0421 20 D0               LI      TM510U       ; RESTART THE TIMER
0423 B7                  OUTS    TIMER        ;
0424 A1         LOOPA2   INS     FROIN1       ; LOOK FOR A RISING EDGE
0425 91 FE               BM      LOOPA2       ;
0427 20 21               LI      TIMSTP       ;
0429 B6                  OUTS    TCP          ;
042A 1A                  DI                   ; DISABLE INTERRUPTS
042B 70                  CLR                  ; CLEAR THE ACC.
042C E6                  XS      ISARSV       ; ISAR SAVE STILL CLEAR?
042D 1B                  EI                   ;
042E 94 C9               BNZ     BEGNB        ;IF NOT, WE WERE INTERRUPTED, RESTART.
0430 A7                  INS     TIMER        ; INPUT THE TIMER VALUE
0431 25 B1               CI      177          ; IS IT < 80 US?
0433 92 2B               BNC     BEGND        ; NO, POINT FAIL
0435 70                  CLR                  ; SET UP TIMER FOR DATA AQUSITION
0436 B7                  OUTS    TIMER
0437 A1         LOOPB    INS     FROIN1       ; FOUND THE EDGE, LOOK FOR RISING
                   *                          ; EDGE NEXT
0438 81 FE               BP      LOOPB        ; LOOK FOR THE RISING EDGE OF
                   *                          ; THE INPUT
043A 70                  CLR                  ;
043B E6                  XS      ISARSV       ; INTERRUPT OCCURED?
043C 94 DB               BNZ     BEGNB        ; INT OCCURED, SO RESTART

043E 1A                  DI                   ;
043F 40                  LR      A,PINBR      ;
0440 21 EF               NI      NPASSM       ; CLEAR THE TIMEOUT BIT
0442 22 20               OI      TIMVCF       ;
0444 50                  LR      PINBR,A      ;
0445 1B                  EI                   ;
0446 20 2B               LI      TIMST2       ; TIMER CND FOR DATA AQUSITION START
0448 B6                  OUTS    TCP          ; START THHE TIMER
                   *
0449 A1         LOOPC    INS     FROIN1
044A 91 FE               BM      LOOPC        ; LOOK FOR FALLING EDGE
044C 3C                  DS      S            ; DECREMENT THE COUNT
044D 84 34               BZ      LSTCNT       ; GO FOR LAST EDGE
044F 70                  CLR                  ;
0450 E6                  XS      TSARSV       ; ANY BITS SET?
0451 94 A6               BNZ     BEGNB        ; IT IS SET, RESTART
                   *
0453 A1         LOOPD    INS     FROIN1       ; INPUT PULSE AGAIN
0454 81 FE               BP      LOOPD        ; LOOK FOR A RISING EDGE
0456 70                  CLR                  ;
0457 E6                  XS      TSARSV       ; ANY BITS SET?
0458 94 9F               BNZ     BEGNB        ; DID NOT HAPPEN YET
045A 3C                  DS      S            ; DECREMENT EDGE COUNTS AGAIN
045B 90 FD               BR      LOOPC        ; DO BOTH LOOPS AGAIN
045D 90 9A      BEGNC    BR      BEGNB        ;
045F 29 00 35   BEGND    JMP     TIMOUT       ;
                   *
                   *
                   *
                   * THIS SEGE MENT CHECKS THE NUMBER OF COMPLETE POINT CYCLES
                   * WHEN APPROXIMATELY 100 CYCLES ARE COMPLETE, A ROM
                   * CHECKSUM IS PERFORMED  CONTROL IS THEN TRANSFERRED TO
                   * THE INPUT ROUTINE, OR IF NECESSARY TO AN ERROR LOOP
                   *
                   *
                   *
                   *
                   * CALCULATE ROM CKSM
                   *
0462 2A 00 00   CYCLE    DCI     0            ;START AT 0
0465 70                  CLR                  ;INIT CKSM TO 0
0466 51                  LR      TMPDTR,A
0467 1B         CKSMLL   EI                   ; RE ENABLE INTERRUPTS
0468 41                  LR      A,TMPDTR     ;GET CURRENT CKSM
0469 8C                  XM                   ;XOR NEXT BYTE AND BUMP DC
046A 51                  LR      TMPDTR,A
046B C1                  AS      TMPDTR
046C 19                  LNK
046D 51                  LR      TMPDTR,A     ;SAVE CKSM
046E 1A                  DI                   ; DON'T STEP ON H
046F 11                  LR      H,DC         ;PUT DC WHERE ACCUMULATOR CAN GET TO IT ALL
0470 70                  CLR                  ;LO BYTE OF ROM PTR EQUAL 0?
0471 EB                  XS      11
0472 94 F4               BNZ     CKSMLL       ;NO, NOT DONE YET.
```

```
0474 77                  LIS     7
0475 FA                  NS      10          ;YES, HI BYTE 0, TOO?
0476 94 F0               BNZ     CKSHL1      ;NOT YET
0478 1B                  EI                  ; TURN ON INTERRUPTS
0479 E1                  XS      TMPUTR      ;CKSM DONE, DID IT END UP 0?
047A 94 04               BNZ     RSTFL2      ;IF NZ, NO, FAIL ROM CKSM
047C 29 03 E7            JMP     BEGNA1      ;GO FOR MORE
047F 29 00 8A RSTFL2     JMP     RSTFAL
0482 40         LSTCNT   LR      A,PINBR     ;
0483 21 10               NI      NPASS       ;
0485 94 27               BNZ     LOOPF1      ;
0487 42                  LR      A,TIMOVR    ;
0488 25 D3               CI      H"D3"
048A 92 D4               BNC     BEGND
048C 25 B7               CI      H"B7"       ; COMPARE TO MIDSCALE
048E 82 0E               BC      COMPLT      ; IF RESULT IS LARGER THAN
     *                                       ; MIDSCALE  , YOU ARE DONE
0490 20 7F               LI      COUNTS      ; RELOAD # OF EDGES
0492 5C                  LR      S,A         ; RESTORE IN COUNTA
0493 A1         LOOPG    INS     FROINI      ; USE UP ONE MORE EDGE
0494 81 FE               BP      LOOPG       ;
0496 1A                  DI
0497 40                  LR      A,PINBR     ;  GET THE FLAG REG
0498 22 10               OI      NPASS       ; SET THE TWO PASS FLAG
049A 50                  LR      PINBR,A     ; RESTORE THE FLAGS
049B 1B                  EI                  ; RE ENABLE INTERRUPTS
049C 90 AC               BR      LOOPC       ; CONTINUE AT LOOPC
     *
     **********
     * IF A BIT WAS SET, THEN THE SPEED OF THE INPUT IS
     * FAST ENOUGH TO ALLOW THE TIMER INTERRUPT TO BE DISABLED
     * OTHER WISE A METHOD IS USED TO WAIT A SHORT WHILE
     * BEFORE SHUTTING OFF THE TIMER INTERRUPT. INTERRUPTS
     * ARE DISABLED DURING THIS ROUTINE
049E 18         COMPL1   COM                 ; PUT IT RIGHT SIDE UP
049F 14                  SR      4           ; LOOK AT UPPER NIBBLE
04A0 25 08               CI      8           ; LESS THAN 289 US?
04A2 82 0A               BC      LOOPF1      ; YES
04A4 2A 06 3F            DCI     DATBL       ; GET THE DATA TABLE
04A7 8E                  ADC                 ; ADD THE ACC.
04A8 16                  LM                  ; LOAD ACC WITH DELAY COUNT
04A9 5B                  LR      TEMP2,A     ; PUT IT IN A REGISTER
04AA 3B         LOOPE    DS      TEMP2       ; DECREMENT DELAY
04AB 94 FE               BNZ     LOOPE       ; KEEP GOING AROUND
04AD 20 29      LOOPF1   LI      TMDSAB      ; DISABLE THE TIMER INTERRUPT
04AF B6                  OUTS    ICP         ;
04B0 A7                  INS     TIMER       ; INPUT AND SAVE THE TIMER
04B1 51                  LR      TIMCTR,A    ;
04B2 A1         LOOPF    INS     FROINI      ; CHECK FOR THE LAST EDGE
04B3 81 FE               BP      LOOPF       ;
04B5 A7                  INS     TIMER       ; READ THE TIMER
04B6 1A                  DI                  ;
04B7 5A                  LR      TEMP1,A     ; STORE THE TIMER
04B8 70                  CLR                 ; CLEAR THE ACC.

04B9 E5                  XS      ISARSV      ; ANY BITS SET?
04BA 94 A2               BNZ     BEGNC       ;
04BC 20 21               LI      TIMSTP      ; THEN STOP THE TIMER
04BE B6                  OUTS    ICP         ;
04BF 1B                  EI                  ;
04C0 41         TESTB    LR      A,TIMCTR    ; GET THE OLD TIMER VALUE
04C1 25 D7               CI      H"D7"       ; IS IT LESS THAN 40 US?
04C3 82 04               BC      CMPLT2      ; NO
04C5 32                  DS      TIMOVR      ; UPDATE UPPER BYTE
04C6 92 0C               BNC     CMPLT3      ; IF A CARRY AFTER ADJUSTING,QUIT
04C8 4A         CMPLT2   LR      A,TEMP1     ; GET THE TIMER VALUE, AND
04C9 18                  COM                 ; TAKE THE TWO'S COMPLEMENT
04CA 1F                  INC                 ;
04CB 84 0D               BZ      SKIP3       ; IF ZERO, THEN ABSOLUTELY NO OVERFLOW
04CD C1                  AS      TIMCTR      ; SUBTRACT IT FROM THE PREVIOUS
     *                                       ; VALUE, IF VALUE IS< OR= DON'T
     *                                       ; MODIFY UPPER TIMER BYTE
04CE 82 0A               BC      SKIP3       ;
04D0 32                  DS      TIMOVR      ; UPDATE UPPER TIMER BYTE
04D1 82 07               BC      SKIP3       ;
04D3 29 00 39 CMPLT3     JMP     TMOUT3      ;
04D6 29 05 F0 CMPL30     JMP     TMOVRT
04D9 4A         SKIP3    LR      A,TEMP1     ; INPUT THE TIMER
04DA 24 FE               AI      TMOFST      ; ADD THE OFFSET CORRECTION
04DC 51                  LR      TIMCTR,A    ; STORE THE ACTUAL TIME
04DD 82 04               BC      CMPL20      ; DO DIVIDE
04DF 32                  DS      TIMOVR      ; DECREMENT UPPER BYTE
04E0 92 F2               BNC     CMPLT3      ; OVERFLOWED
04E2 A4         CMPL20   INS     INSEL       ; INPUT PATCH CODE
04E3 21 40               NI      H"40"       ; PERIOD OR FREQUENCY?
04E5 84 F0               BZ      CMPL30      ; JMP IF PERIOD
04E7 1A                  DI
04E8 40                  LR      A,PINBR     ; GET THE POINT FLAGS
04E9 22 40               OI      H"40"       ; SET THE FREQ BIT
04EB 50                  LR      PINBR,A     ;
04EC 1B                  EI
04ED 41                  LR      A,TIMCTR    ;
```

```
04EE 12                 SR      1               ; DIVIDE BY 2
04EF 51                 LR      TIMCTR,A        ;
04F0 42                 LR      A,TIMOVR        ; GET UPPER BYTE
04F1 21 01              NI      1               ; LSB SET?
04F3 84 05              BZ      CMPL10          ; NO
04F5 41                 LR      A,TIMCTR        ;
04F6 22 80              OI      H"80"           ; SET THE MSB
04F8 51                 LR      TIMCTR,A        ;
04F9 42         CMPL10  LR      A,TIMOVR        ;
04FA 12                 SR      1               ; DIVIDE BY 2
04FB 22 80              OI      H"80"           ; SET THE MSB FOR TWO'S COMP
04FD 52                 LR      TIMOVR,A        ;
                *
                * 1/F DIVIDE ROUTINE,  THIS ROUTINE DIVIDES EITHER 128 OR 256
                * MILLION BY TIME IN U SEC. TO FREQUENCY IN HERTZ.
                * TIMCTR= LOWER BYTE OF DIVISOR
                * TIMOVR = UPPER BYTE OF DIVISOR

                * TEMP4 = UPPER BYTE OF DIVIDEND
                * TEMP3 = MID UPPER BYTE OF DIVIDEND
                * TEMP2 = MID LOWER BYTE OF DIVIDEND
                * TEMP1 = LOWERB BYTE OF DIVIDEND
                * SET UP DIVIDEND FOR 128 MILLION
                * IF ONLY ONE PASS DURING AQUSITION
                * IF TWO PASSES
                * SET DIVIDEND TO 256 MILLION
                *
                *
04FE 40         SETUP   LR      A,PINBR         ; GET THE PASS FLAGS
04FF 21 10              NI      NPASS           ; ONE PASS?
0501 84 0C              BZ      SETP10          ; YES
0503 20 0F              LI      H"0F"           ; 256 M 4TH BYTE
0505 53                 LR      TEMP4,A         ;
0506 20 42              LI      H"42"           ; 256M 3RD BYTE
0508 57                 LR      TEMP3,A         ;
0509 20 40              LI      H"40"           ; 256M 2ND BYTE
050B 5B                 LR      TEMP2,A         ;
050C 90 0A              BR      SETP20          ; CONTINUE BELOW
050E 20 07      SETP10  LI      H"07"           ; 4 TH BYTE
0510 53                 LR      TEMP4,A         ;
0511 20 A1              LI      H"A1"           ; 3 RD BYTE
0513 57                 LR      TEMP3,A         ;
0514 20 20              LI      H"20"           ; 2 ND BYTE
0516 5B                 LR      TEMP2,A         ;
0517 70         SETP20  CLR                     ; FIRST BYTE
0518 5A                 LR      TEMP1,A         ;
0519 20 10              LI      H"10"           ; LOOP COUNT
051B 54                 LR      TEMP5,A         ;
                *
                *
                *
                * MULTIPLY DIVIDEND AND QUOTIENT BY TWO
                *
                *
051C 4A         DIVLUP  LR      A,TEMP1         ; GET THE FIRST BYTE
051D 21 FF              NI      H"FF"           ;
051F 81 09              BP      DIVL10          ; IS THE MSB ZERO?  YES, JMP
0521 13                 SL      1               ; MULTIPLY BY TWO
0522 5A                 LR      TEMP1,A         ; RESTORE IT
0523 4B                 LR      A,TEMP2         ; GET THE NEXT BYTE
0524 1F                 INC                     ; INCREMENT IT
0525 82 08              BC      DIVL30          ; IF OVERFLOWED
0527 90 04              BR      DIVL20          ; CONTINUE TO SECOND BYTE
0529 13         DIVL10  SL      1               ; MULTIPLY FIRST BYTE
052A 5A                 LR      TEMP1,A         ; STORE IT
052B 4B                 LR      A,TEMP2         ; GET THEN SECOND BYTE
052C CB         DIVL20  AS      TEMP2           ; DOUBLE IT
052D 5B                 LR      TEMP2,A         ; STORE THE RESULT
052E 47         DIVL30  LR      A,TEMP3         ; GET THE THIRD BYTE
052F 19                 LNK                     ; ADD IN THE CARRY
0530 82 03              BC      DIVL40          ; IF CARRY, ANSWER ALREADY STORED
0532 C7                 AS      TEMP3           ; DOUBLE THE VALUE

0533 57                 LR      TEMP3,A         ; STORE THE RESULT
0534 43         DIVL40  LR      A,TEMP4         ; GET THE FOURTH BYTE
0535 19                 LNK                     ; ADD IN THE CARRY
0536 C3                 AS      TEMP4           ; DOUBLE IT
0537 53                 LR      TEMP4,A         ; STORE IT
0538 44                 LR      A,TEMP5         ; GET LOOP COUNT
0539 22 00              OI      0               ; IS IT NEGATIVE?
053B 91 23              BM      CUVRT           ; DONE WITH ADJUSTMENT
                *
                *
                *COMPARE DIVISOR TO DIVIDEND
                *
053D 41                 LR      A,TIMCTR        ; GET DIVISOR LOWER BYTE
053E C7                 AS      TEMP3           ; SUBTRACT FROM DIVIDEND
053F 42                 LR      A,TIMOVR        ; GET UPPER DIVISOR
0540 19                 LNK                     ;
0541 92 04              BNC     DIVL50          ; WATCH THE CARRY
```

```
0543 C3                 AS      TEMP4          ; SUBTRACT UPPER BYTES
0544 90 04              BR      DIVL60         ; CONTINUE
0546 C3       DIVL50    AS      TEMP4          ; SUBTRACT UPPER BYTES
0547 92 09              BNC     DIVL70         ; DO NOT MODIFY QUOTIENT
0549 53       DIVL60    LR      TEMP4,A        ; STORE NEW DIVIDEND
054A 41                 LR      A,TIMCTR       ;
054B C7                 AS      TEMP3          ; CREAT NEW DIVIDEND BYTE.
054C 57                 LR      TEMP3,A        ;
054D 4A                 LR      A,TEMP1        ; GET THE QUOTIENT
054E 22 01              OI      1              ; SET  A BIT
0550 5A                 LR      TEMP1,A        ; RESTORE IT
0551 34       DIVL70    DS      TEMP5          ; DECREMENT LOOP COUNT
0552 94 C9              BNZ     DIVLUP         ; CONTINUE IF NOT ZERO
0554 1A                 DI                     ;
0555 40                 LR      A,PINBR        ; GET THE PASS FLAGS
0556 21 CF              NI      ABPIHI         ; CLEAR AQUSITION FLAGS
0558 50                 LR      PINBR,A        ; RESTORE BYTE
0559 1B                 EI                     ;
055A 90 66              BR      COVR15         ; DO COV'S NEXT
055C 34       ADJST     DS      TEMP5          ; MAKE COUNT NEGATIVE
055D 90 BE              BR      DIVLUP         ; SHIFT QUOTIENT
              *
              *
              *
              ***********************************************************
              *
              * THIS IS THE CHANG OF VALUE ROUTINE. IF A POINT IN QUESTION
              * HAS BEEN PROPERLY ENABLED FOR COV REPORTING, THIS ROUTINE
              * WILL THEN EXECUTE.
              * COVRT FIRST CALCULATES A COV. THE DIFFERENCE BETWEEN THE LAST
              * KNOWN DATA FOR THE POINT AND THE AQUSITION JUST COMPLETED.
              * HERE IT DOES A SIXTEEN BIT SUBTRACTION. THE SECOND STEP IS TO
              * DETERMINE IF THIS CHANGE IS SIGNIFICANT OR NOT.
              *
              * ANOTHER SUBTRACTION IS PERFORMED BETWEEN THIS DIFFERENTIAL AND
              * A PRESET POINT LIMIT; THIS IS A TWELVE BIT SUBTRACTION. THE
              * PRESET LIMIT IS EIGHT BITS WIDE, AND IS SHIFTED LEFT TO CREAT
              * A TWELVE BIT WORD AT THE TIME OF EXECUTION.
              *
              ***********************************************************
              *
055F 4A       COVRT     LR      A,TEMP1        ; EXCHANGE REGISTERS
0560 51                 LR      TIMCTR,A       ;
0561 4B                 LR      A,TEMP2        ;
0562 52                 LR      TIMOVR,A       ;
0563 4E       COVTR     LR      A,D            ; MOVE THE ISAR POINTER DOWN
0564 1A                 DI                     ; KILL THE INTERRUPTS
0565 4C                 LR      A,S            ; GET THE DATA FLAGS
0566 21 08              NI      PTFAL          ; WAS POINT DEAD?
0568 4C                 LR      A,S            ;
0569 84 13              BZ      COVR11         ; NO
056B 21 F7              NI      PTFALM         ; YES
056D 5D                 LR      I,A            ; RESTORE FLAGS
056E 21 04              NI      COVEN          ; COV ENABLED?
0570 84 06              BZ      COVR12         ; NO
0572 4E                 LR      A,D            ; GET THE M S DATA BYTE
0573 4C                 LR      A,S            ; GET THE FLAGS AGAIN
0574 22 01              OI      COVEND         ; SET COV FLAG
0576 5D                 LR      I,A            ; STORE THE NEW FLAGS
0577 4C       COVR12    LR      A,S            ; GET THE M S DATA BYTE
0578 22 80              OI      H"80"          ; SET COV STATUS, PT RET.
057A 5E                 LR      D,A            ;
057B 4C                 LR      A,S            ;
057C 1B                 EI                     ;
057D 21 04    COVR11    NI      COVEN          ; COV'S ENABLED
057F 84 6A              BZ      COVRT4         ; NO
0581 4C                 LR      A,S            ; GET THE BYTE BACK
0582 21 01              NI      COVEND         ; COV ALREADY FOUND?
0584 94 65              BNZ     COVRT4         ; YES
0586 4F                 LR      A,D            ; LOAD A WITH LOWER BYTE OF LAST
              *                                ; POINT DATA
0587 21 F0              NI      H"F0"          ;
0589 22 07              OI      H"07"          ; KEEP IT COMPLEMENTED
058B 5A                 LR      TEMP1,A        ; STORE TWO'S COMP
058C 4C                 LR      A,S            ; GET THE UPPER BYTE
058D 5B       COVR13    LR      TEMP2,A        ; STORE THE UPPER BYTE, OLD DATA
058E 4A                 LR      A,TEMP1        ; GET THE LOWER BYTE BACK
058F C1                 AS      TIMCTR         ; SUBTRACT NEW VALUEV      FROM LAST
              *                                ; POINT VALUE LOWER BYTE
0590 5A                 LR      TEMP1,A        ; STORE RESULT TEMPORARILY
0591 4B                 LR      A,TEMP2        ; GET UPPER BYTE OF NEW DATA
0592 19                 LNK                    ; ADD THE CARRY BIT
0593 82 2A              BC      COVR20         ; IF CARRY, ITS ZERO
0595 C2                 AS      TIMOVR         ; SUBTRACT UPPER BYTES
0596 5B                 LR      TEMP2,A        ; PUT THE RESULT IN TEMPORARY STORAGE
0597 92 0C              BNC     COVRT1         ; IF NO CARRY, THEN RESULTS ARE
              *                                ; TWO'S COMPLEMENT
0599 18       COVR21    COM                    ;
059A 5B                 LR      TEMP2,A        ;
059B 4A                 LR      A,TEMP1        ;
059C 18                 COM                    ; RECOMPLEMENT HERE
```

```
059D 1F                 INC                   ;
059E 5A                 LR      TEMP1,A       ; STORE LOWER BYTE AGAIN
059F 4B                 LR      A,TEMP2       ;
05A0 19                 LNK                   ;
05A1 5B                 LR      TEMP2,A       ;
05A2 82 47              BC      COVRT4        ; IF ZERO, NO COV
05A4 40         COVRT1  LR      A,PINBR       ; LOAD A WITH CURRENT POIN NT #
05A5 21 0F              NI      H"0F"         ;
05A7 24 16              AI      COVSTR        ; ADD BASE ADDRESS FOR COV
        *                                     ; DATA STORAGE
05A9 0B                 LR      IS,A          ; CREAT AN ISAR ADDRESS
05AA 70                 CLR                   ; CLEAR THE ACC.
05AB EC                 XS      S             ; SLOV ZERO?
05AC 84 3D              BZ      COVRT4        ; YES, JUST STORE DATA
05AE 1A                 DI                    ;
05AF 4C                 LR      A,S           ; LOAD A WITH CURRENT POINT
05B0 14                 SR      4
05B1 55                 LR      TEMP6R,A      ;
05B2 4C                 LR      A,S           ;
        *                                     ; COV LIMIT VALUE
05B3 15                 SL      4             ; SHIFT LEFT TO CREAT A 12 BIT
        *                                     ; COV   MASK USE ON LOWER BYTE
05B4 CA                 AS      TEMP1         ; SUBTRACT LOWER BYTE OF CURRENT
        *                                     ; POINT DIFF. SAVE CARRY ONLY.
05B5 45                 LR      A,TEMP6R      ;
        *                                     ; WORD FOR 12 BIT MASK
05B6 19                 LNK                   ; ADD THE CARRY
05B7 CB                 AS      TEMP2         ; SUBTRACT UPPER BYTE OF CURRENT
05B8 1B                 EI
        *                                     ; POINT DIFF.
05B9 40                 LR      A,PINBR       ;
05BA 92 22              BNC     COVRT3        ; IF NO CARRY  , THEN SET COV FLAG.
05BC 90 20              BR      COVRT4        ; RETURN TO DATA AQUISITION
05BE C7         COVR20  AS      TIMOVR        ;
05BF 90 D9              BR      COVR21        ;
05C1 40         COVRT5  LR      A,PINBR       ; GET THE CURRENT POINT #
05C2 21 0F              NI      H"0F"         ;
05C4 13                 SL      1             ; DOUBLE THE VALUE
05C5 13                 SL      1             ;
05C6 24 22              AI      PTBUFR+2      ; ADD TO BASE ADDRESS OF
        *                                     ; POINT DATA BUFFER
05C8 0B                 LR      IS,A          ; POINT ISAR TO CORRECT BUFFER
                                                           ;  GET THE OLD MSB
05C9 4C         COVRT2  LR      A,S
05CA 21 80              NI      H"80"         ; SAVE POINT RET BIT
05CC EB                 XS      TEMP2         ; CREAT NEW MSB
05CD 1A                 DI                    ;
05CE 5D                 LR      I,A           ; SRORE IT
05CF 4A                 LR      A,TEMP1       ;
05D0 5E                 LR      D,A           ; SAVE LOWERB  BYTE OF NEW
05D1 1B                 EI                    ;
        *                                     ; POINT DATA
05D2 40                 LR      A,PINBR
05D3 21 40              NI      H"40"
05D5 84 04              BZ      COVTP1        ; DO PERIOD COV'S

05D7 29 05 5C           JMP     ADJST         ; DO THE FLAGS NOW
05DA 29 05 63 COVTP1    JMP     COVTR
05DD 21 0F      COVRT3  NI      H"0F"         ; MASK THE POINT #
05DF 13                 SL      1             ;
05E0 13                 SL      1             ;
05E1 24 21              AI      PTBUFR+1      ; CREATE AN ADDRESS
05E3 0B                 LR      IS,A          ;
05E4 1A                 DI                    ;
05E5 4C                 LR      A,S           ; GET THE FLAGS
05E6 22 01              OI      COVEND        ; AND SET THE COV FLAGS
05E8 5D                 LR      I,A           ; RESTORE THEM
05E9 1B                 EI                    ;
05EA 29 03 ED COVRT4    JMP     BEGN          ;
05ED 29 04 03 TMDV40    JMP     CMPUT3
05F0 42         TMDVRT  LR      A,TIMOVR      ; LOAD UPPER BYTE
05F1 18                 COM
05F2 52                 LR      TIMOVR,A      ; COMP AND RESTORE
05F3 41                 LR      A,TIMCTR      ; LOAD LOWER BYTE
05F4 18                 COM
05F5 1F                 INC                   ; TWO'S COMPLEMENT
05F6 51                 LR      TIMCTR,A      ;
05F7 42                 LR      A,TIMOVR      ;
05F8 19                 LNK                   ; LINK THE CARRY
05F9 82 F3              BC      TMDV40
05FB 52                 LR      TIMOVR,A      ; RESTORE UPPER BYTE
05FC 42         TMDV10  LR      A,TIMOVR      ; GET UPPER TIMER BYTE
05FD 21 01              NI      1             ; WAS LSB SET?
05FF 42                 LR      A,TIMOVR
0600 84 0A              BZ      TMDV30
0602 12                 SR      1             ; SHIFT THE UPPER BYTE
0603 5B                 LR      TEMP2,A
0604 41                 LR      A,TIMCTR      ;
0605 12                 SR      1             ; SHIFT LOWER BYTE
0606 22 80              OI      H"80"         ; SET MSB
0608 5A                 LR      TEMP1,A       ;
0609 90 06              BR      TMDV20
060B 12         TMDV30  SR      1             ; SHIFT THE UPPER BYTE
```

```
060C 5B                 LR     TEMP2,A          ; STORE IT
060D 41                 LR     A,TIMCTR         ; GET THE LOWER BYTE
060E 12                 SR     1
060F 5A                 LR     TEMP1,A          ; STORE IT
0610 40         TMDV20  LR     A,PINBR          ; GET THE PASS FLAG
0611 21 10              NI     NPASS            ; IS IT SET?
0613 84 0D              BZ     CVRT5
0615 4A                 LR     A,TEMP1          ;
0616 51                 LR     TIMCTR,A         ; RELOAD THE LOWER BYTE
0617 4B                 LR     A,TEMP2
0618 52                 LR     TIMOVR,A         ;
0619 1A                 DI                      ; DISABLE INTERRUPTS
061A 40                 LR     A,PINBR
061B 21 BF              NI     ABPIM            ; CLEAR PASS FLAGS
061D 50                 LR     PINBR,A          ;
061E 1B                 EI
061F 90 DC              BR     TMDV10           ; DIVDE AGAIN

0621 29 05 C1 CVRT5     JMP    COVRT5           ; DO COVT5
                *
                *
                *
                * TEST RAM
                * PUT H"AA", H"FF", AND ZERO IN ALL SCRATCHPAD BYTES
                *
                * THIS RAM TEST COURTESY OF MIKE REMSON, THE TEST MAN.
                *
0624 67         INIT    LISU   7                ; START AT TOP OF SCRATCHPAD
0625 6F                 LISL   7
0626 20 AA      RAMTST  LI     H"AA"            ;LOAD AN AA
0628 5C                 LR     S,A
0629 20 55              LI     H"55"
062B EC                 XS     S
062C 5C                 LR     S,A              ;LOAD AN FF
062D 1F                 INC
062E 94 16              BNZ    BSTFL1
0630 20 FF              LI     H"FF"
0632 EC                 XS     S
0633 5C                 LR     S,A              ;LOAD A 0
0634 70                 CLR
0635 EE                 XS     D
0636 94 0E              BNZ    BSTFL1           ;IF NZ, FAIL TEST
0638 8F ED              BR7    RAMTST
063A 0A                 LR     A,IS             ;TAKE CARE OF UNDERFLOW
063B 24 F8              AI     -O"10"
063D 92 04              BNC    RAMGD            ;IF NC, ALL RAM CHECKED GOOD
063F 0B                 LR     IS,A
0640 90 E5              BR     RAMTST
0642 29 00 5B RAMGD     JMP    CKSMRT           ;
0645 29 00 9A BSTFL1    JMP    BSTFAL
                *************************
                *
                *HERE ARE SOME TIME CONSTANTS USED DURING THE LAST INPUT
                * TRANSITION ROUTINE.
                *
                *************************
                DATBL   EQU    *-9
0648 04                 DC     4
0649 04                 DC     4                ; 40 US DELAY
064A 07                 DC     7
064B 07                 DC     7                ; 70 US DELAY
064C 0F                 DC     15               ;
064D 0F                 DC     15               ; 150 US DELAY
064E 10                 DC     16               ; 160 US DELAY
                END
NUMBER OF ERRORS=  0

ABORDH=006F ABORFU=0040 ABPIM =00BF ABPIN1=00CF ACCSAV=0008 ACK    =0006
ACKCV1 0280 ACKCV2 0279 ACKCV3 026B ACKLC  00C8 ACOVC =0083 ACOVRT 0267
ADJST  055C BEGN   03ED BEGNA  03E9 BEGNA1=03E7 BEGNA2 03DD BEGNB  03F8
BEGNB1 03F2 BEGNC  0450 BEGND  045F BFPLCL=0004 BFPLCU=0001 BSTFAL 009A
BSTFL1 0645 BSTFL2 047F BSTSUC=0090 CHARFO=00FC CHPR10 0294 CHPIRT 028A
CHRCMD=0011 CHPP10 02A2 CHPP13 02B4 CHPP20 02BC CHPP30 02C7 CHRP40 02D5
CKSERR 017C CKSM   =0005 CKSMON 0093 CKSMFR=00C0 CKSMLP 0060 CKSML1 0467
CKSMRT 005B CMDEPR=00FD CMDST  00F0 CMDST3 0117 CMDST4 0125 CMDST5 012C
CMDST6 0110 CMDST7 0133 CMDTAL=0005 CMPLT2 04C8 CMPLT3 04D3 CMPL10 04E9
CMPL20 04E2 CMPL30 04D6 CNTLCL=0007 CNTLCU=0001 COMPLT 049E COUNTL=0001
COUNTR=0001 COUNTS=007F COUNTU=0009 COVCTL=0000 COVCTR=0010 COVCTU=0002
COVEN =0004 COVENH=00FB COVFDM=00EE COVFND=0001 COVRT  055F COVRT1 05A4
COVRT2 05C9 COVRT3 05DD COVRT4 05EA COVRT5 05C1 COVR11 057D COVR12 0577
COVR13 058D COVR20 050F COVR21 0599 COVSET=0006 COVSTL=0000 COVSTR=0018
COVSTU=0003 COVIP  0563 COVIP1 050A CVERP =00EF CVRT5  0621 CYCLE  0462
DATAFR=00FE DATBL =063F DIVLOP 051C DIVL10 0529 DIVL20 052C DIVL30 052E
DIVL40 0534 DIVL50 0546 DIVL60 0549 DIVL70 0551 DLYCL =0005 DLYCU =0001
DLYLP  007F DLYIPS=006E DSFLPB=0020 FCOVC =0008 ECOVRT 0314 ECOVR1 031E
ECOV10 0329 FCOV30 033B FCOV31 0343 FCOV40 0346 FNBCTL=000F FCOVC =0082
FCOVRT 01AB FCRDY =0040 FCVRT1 01B9 FCVRT2 01BF FCVRT3 01C8 FCVRT4 01E2
FCVRT5 020C FCVRT6 0219 FCVRT7 0222 FCVRT8 0249 FCVRT9 0253 FCVR10 0255
FCVR11 0263 FCVR12 023A FRDIN1=0001 GCOVCC=0081 GCOVRT 015B GCVCLP 016E
GCVCL1 016A GCVC10 0179 GCVC20 0180 GICHAR 0191 ICP    =0005 IMDN1  0241
```

```
THDN3  024C THDN4  01A8 THDON2 023D INIT   0624 INSEL =0004 INTRET 0148
INVCD1 0143 INVCMD 013A INVPNT=00F9 INVPT1 0147 TSAKSV=0006 ISOVFA 03CD
LCBUFL=0007 LCBUFR=0017 LCBUFU=0002 LCFAL  0303 LCKN  =0002 LCKNM =00FD
LCOVR =00FC LCPGY =0040 LCRDYM=007F LCTO  =0032 LCWATA 00CC LCWATB 0006
LCWATC 03A4 LCWATD 03AE LCWATE 0399 LCXMIT 038F LCXMTL 03A0 LCXMT1 038B
LCXMT2 0379 LOOPA  0412 LOOPA1 041E LOOPA2 0424 LOOPA3 0418 LOOPB  0437
LOOPC  0449 LOOPD  0453 LOOPE  04AA LOOPF  04B2 LOOPF1 04AD LOOPG  0493
LSTCNT 0482 MAK   =0015 NAKRES 0335 NAKRSP 0381 NAKR10 0332 NAKSP1 02B9
NKPSP  0103 NKPSP0 01CF NKPS10 0105 NPASS =0010 NPASSM=00EF NXTLCX 03BE
N1COVR=0006 N2COVR=0003 OUTLD1 0183 OUTLD2 016B OUTLD3 0186 OUTLD4 0188
PBCTLL=0006 PBCTLU=0001 PBINIR=00F0 PBRDCI=0030 PBSDIR=0020 PBUSC =0000
PBUSD =0005 PUTFAL=00F8 PUTKEI=00F7 PIBUFL=0000 PIBUFR=0020 PIBUFU=0004
PIFAL =000B PIFALM=00F7 PINBR =0000 PWRUP =0080 PWRUPN=007F RAMGD  0642
RAMTST 0626 RCVDON=00FD RDFCRM=0009 RDPTC =0006 RDPIRT 020D RDPT10 02E8
RDPT20 030D RDPT22 0311 RDPT30 02FA RETIN1 0058 SETPNT=0007 SETP10 050F
SETP20 0517 SETUP  04EE SHOUT  0384 SKIP3  0409 START  0000 STCOVC=000D
STCOVR 0351 STCOV1 035D STCV10 0367 STCV20 036A TEMP1 =000A TEMP2 =000B
TEMP3 =0007 TEMP4 =0003 TEMP5 =0004 TEMP6R=0005 TESTB  04C0 TIMCTR=0001
TIMER =0007 TIMINI 0020 TIMOUT 0035 TIMOVR=0002 TIMSTP=0021 TIMST1=006B
TIMST2=002B TIMST3=004B TIMVCT=0020 TMDSPL=0029 TMDVRT 05F0 TMDV10 05FC
TMDV20 0610 TMDV30 0608 TMDV40 05ED TMINTA 002E TMOFST=00EE TMOUT1 0051
TMOUT2 004F TMOUT3 0039 TMPDTR=0001 TMTST  0085 TMVCTM=00DF TMINS =00C8
TM510U=0000 TM540U=00DA TSTIMC=006A TSTIMD=00CB TSTTM1 0075 USACOV 01DB
WRUC  =0080 WRURT  0152 YIFCPM=0009 XMITDN=0305

PMD ADAPTOR
        *
        * PMDA5.MAC
                 TITLE   .PMD ADAPTOR
        *
        * MCC-POWERS  COPYRIGHT 1979
        * BOB OLD 19-JUL-79
        *
        *
        * PASS CHARACTERS FROM LOCAL LINE TO EXTERNAL LINE OR
        * VICE VERSA.  SUPPORT TWO LINES, A AND B.
        *
        * WHEN EITHER LOOPBACK SWITCH IS THROWN, RECEIVE DATA ON
        * THAT LOCAL LINE IS PASSED THRU THE EXTERNAL LOOPBACK
        * SWITCH AND IS TRANSMITTED BACK THRU THE OTHER LOCAL LINE.
        *
        *
        * I/O PORT EQUATES
        *
        EXT      EQU      1                 ;EXTERNAL LINES
        *                                   ;BIT 7 - DATA IN A, INVERTED
        *                                   ;BIT 6 - RECV ENABLE A, ACTIVE HI
        *                                   ;BIT 5 - XMIT ENABLE A, ACTIVE LO
        *                                   ;BIT 4 - DATA OUT A
        *                                   ;BITS 3 - 0 ARE SIMILAR FOR B
        *
        DSELIN   EQU      H"33"             ;DE-SELECT LINES
        REDLNS   EQU      H"77"             ;ENABLE BOTH INP'S FOR RCV
        RDAEN    EQU      H"40"             ;ENABLE A RCV
        RDAENM   EQU      H"BF"
        RDBEN    EQU      H"04"             ;ENABLE B RCV
        RDBENM   EQU      H"FB"
        XMTA     EQU      H"03"             ;XMIT TO EXT A, START BIT
        XMTAS    EQU      H"13"             ;XMIT TO EXT A, STOP BIT
        XMTB     EQU      H"30"             ;XMIT TO EXT B, START BIT
        XMTBS    EQU      H"31"             ;XMIT TO EXT B, STOP BIT
        *
        * LOCAL LINES
        *
        LCL      EQU      0                 ;LOCAL LINE PORT
        *                                   ;BITS ARE SIMILAR TO EXT PORT
        LCLALP   EQU      H"70"             ;LCL CTRL FOR A LOOP BACK
        LCLBLP   EQU      H"07"             ;LCL CTRL FOR B LOOP BACK
        *
        * PMDA OR FAI PROGRAM SWITCH
        *
        KLUGE    EQU      4                 ;BIT 6 - PMDA/FAI SWITCH, 0 FOR PMDA
        PMDFAI   EQU      H"40"
        PMDFAM   EQU      H"BF"
        *
        * CONTROL PORT
        *
        CTRL     EQU      5                 ;BIT 7 - LOOPBACK A INP
        *                                   ;BIT 6 - LOOPBACK B INP

        *                                   ;BIT 5 - RESET WATCHDOG TIMER OUTPUT
        *                                   ;BIT 4 - BST LED
        *                                   ;BIT 0 - 1200/2400 BAUD STRAP
        *
        MRBIT    EQU      H"20"             ;RESET WATCHDOG TIMER
        BSTLED   EQU      H"10"             ;BST LED BIT
        LOPBKA   EQU      H"80"             ;A LOOPBACK
        LOPBKB   EQU      H"40"             ;B LOOPBACK
        SPEED    EQU      H"01"             ;1200/2400 BAUD STRAP
        *
        * INTERRUPT CONTROL PORT
        *
        ICP      EQU      6                 ;INTERRUPT CONTROL PORT
        ENBEXT   EQU      H"20"             ;CLEAR PENDING EXT INT
```

```
PMD ADAPTOR
                  *
                  * ISAR REGISTER DEFINITIONS
                  *
                  TMPDTA  EQU     0             ;ROM CKSM TEMPORARY LOC.
                  BITCNT  EQU     0             ;COUNT OF BITS TO READ
                  DLYCNT  EQU     1             ;TIMING LOOP DELAY COUNT
                  LCLCTL  EQU     2             ;LAST BYTE SENT TO LOCAL PORT
                  EXTCTL  EQU     3             ;LAST BYTE SENT TO EXTERNAL PORT
                  *
                  STRTCT  EQU     4             ;DELAY COUNT FOR START BIT
                  STRT12  EQU     28            ;1200 BAUD
                  STRT24  EQU     7             ;2400 BAUD
                  *
                  DATACT  EQU     5             ;DELAY COUNT FOR DATA BITS
                  DATA12  EQU     66            ;1200
                  DATA24  EQU     25            ;2400
                  *
                  D8CT    EQU     6             ;DELAY COUNT FOR 8TH DATA BIT
                  D812    EQU     59            ;1200
                  D824    EQU     17            ;2400
                  *
                  STPCT   EQU     7             ;DELAY FOR STOP BIT
                  STP12   EQU     48            ;1200
                  STP24   EQU     6             ;2400
                  *
                  * JREG  EQU     9             ;DECREMENTED FOR 3 US TIMING DELAY
                  *
                  * INP FAIL/RETURN DATA BASE
                  *
                  * 20 - LCL A
                  * 21 - LCL B
                  * 22 - EXT A
                  * 23 - EXT B
                  *
                  * BIT 7 - INP FAILED
                  *
                  INPDBU  EQU     2
                  INPDBL  EQU     0
                  INFALD  EQU     H"80"
                  *
                  * PMDA COMPATIBILITY
                  *
                  ACCSAV  EQU     8
                  ISARSV  EQU     0
                  *
                  *
                  * POWER-UP STARTS HERE
                  *
                          ORG     0
0000 20 33                LI      DSELIN        ;INIT LINES
0002 B1                   OUTS    EXT
0003 B0                   OUTS    LCL
0004 20 20                LI      MRBIT
0006 85                   OUTS    CTRL
                  *
                  * EXECUTE BASIC SANITY TEST
                  *
                  *
                  * TEST RAM
                  * PUT H"AA", H"FF", AND ZERO IN ALL SCRATCHPAD BYTES
                  *
                  * THIS RAM TEST COURTESY OF MIKE REMSON, THE TEST MAN.
                  *
0007 67                   LISU    7             ;START AT TOP OF SCRATCHPAD
0008 6F                   LISL    7
0009 20 AA        RAMTST  LI      H"AA"         ;LOAD AN AA
000B 5C                   LR      S,A
000C 20 55                LI      H"55"
000E EC                   XS      S
000F 5C                   LR      S,A           ;LOAD AN FF
0010 20 FF                LI      H"FF"
0012 EC                   XS      S
0013 5C                   LR      S,A           ;LOAD A 0
0014 70                   CLR
0015 EE                   XS      D
0016 94 22                BNZ     BSTFAL        ;IF NZ, FAIL TEST
0018 8F F0                BR7     RAMTST
001A 0A                   LR      A,IS          ;TAKE CARE OF UNDERFLOW
001B 24 F8                AI      -O"10"
001D 92 04                BNC     RAMGD         ;IF NC, ALL RAM CHECKED GOOD
001F 0B                   LR      IS,A
0020 90 E8                BR      RAMTST
                  RAMGD   EQU     *
                  *
                  * CALCULATE ROM CHECKSUM
                  *
                  * XOR AND ROTATE LEFT ALL BYTES IN ROM
                  *
0022 2A 00 00             DCI     0             ;START AT 0
0025 70                   CLR                   ;INIT CKSM TO 0
0026 50                   LR      TMPDTA,A
0027 40           CKSMLP  LR      A,TMPDTA      ;GET CURRENT CKSM
0028 8C                   XM                    ;XOR NEXT BYTE AND BUMP DC
```

```
PMD ADAPTOR
0029 50              LR     TMPDTA,A
002A C0              AS     TMPDTA
002B 19              LNK
002C 50              LR     TMPDTA,A        ;SAVE CKSM
002D 11              LR     H,DC            ;PUT DC WHERE ACCUMULATOR CAN GET TO IT ALL

002E 70              CLR                    ;LO BYTE OF ROM PTR EQUAL 0?
002F EB              XS     11
0030 94 F6           BNZ    CKSMLP          ;NO, NOT DONE YET.
0032 77              LIS    7
0033 FA              NS     10              ;YES, HI BYTE 0, TOO?
0034 94 F2           BNZ    CKSMLP          ;NOT YET
0036 E0              XS     TMPDTA          ;CKSM DONE, DID IT END UP 0?
0037 84 09           BZ     BSTSUC          ;IF Z, YES, SUCCESS
                *
                * BASIC SANITY TEST FAILED
                *
0039 1A         BSTFAL  DI
003A 20 20           LI     MRBIT           ;HOLD OFF WATCHDOG TIMER
003C B5              OUTS   CTRL
003D 70              CLR
003E B5              OUTS   CTRL
003F 90 F9           BR     BSTFAL          ;UNTIL POWER UP
                *
                *
                BSTSUC  EQU    *            ;BST COMPLETED SUCCESSFULLY
                *
                * INIT PORT CTRL BYTES
                *
0041 20 33           LI     DSELIN
0043 52              LR     LCLCTL,A
0044 53              LR     EXTCTL,A
                *
                * SET TRUNK SPEED 1200/2400 BAUD.
                *
0045 A5              INS    CTRL
0046 21 01           NI     SPEED
0048 94 0F           BNZ    SPD10           ;IF NZ, 2400
004A 20 1C           LI     STRT12          ;1200 BAUD START BIT
004C 54              LR     STRTCT,A
004D 20 42           LI     DATA12          ;DATA BIT COUNT
004F 55              LR     DATACT,A
0050 20 3B           LI     DB12
0052 56              LR     DBCT,A
0053 20 30           LI     STP12
0055 57              LR     STPCT,A
0056 90 0D           BR     SELECT
0058 20 07      SPD10   LI     STRT24       ;2400 BAUD START BIT
005A 54              LR     STRTCT,A
005B 20 19           LI     DATA24          ;DATA BIT COUNT
005D 55              LR     DATACT,A
005E 20 11           LI     DB24
0060 56              LR     DBCT,A
0061 20 06           LI     STP24
0063 57              LR     STPCT,A
                *
                *
                * SELECT
                *
0064 28 00 CB   SELECT  PI     CKRTA
0067 28 00 E3        PI     CKRTB
006A 28 00 FB        PI     ENLN
006D 43         SLCT05  LR     A,EXTCTL
006E B1              OUTS   EXT
006F 42              LR     A,LCLCTL
0070 B0              OUTS   LCL
0071 21 44           NI     RDAEN+RDBEN            ;ARE BOTH LINES DOWN?
0073 94 04           BNZ    SLCT10                 ;IF NZ, NO, LOOK FOR INT
0075 29 01 52        JMP    BGRND           ;YES, HANG AROUND AND CHECK AGAIN LATER
0078 20 20      SLCT10  LI     ENBEXT       ;ENABLE EXT INT
007A B6              OUTS   ICP
007B 1F              INC
007C B6              OUTS   ICP
007D 1B              EI
007E 2B              NOP
007F 29 01 52        JMP    BGRND
                *
                *
                * EXTERNAL INTERRUPT
                * A TRANSITION HAS BEEN DETECTED ON ONE OF THE RECEIVE DATA LINES
                *
                     ORG    H"A0"
00A0 1E              LR     J,W             ;SAVE STATUS FOR FAI
00A1 58              LR     ACCSAV,A        ;SAVE ACC FOR FAI
                *
                * PMDA/FAI TEST
                *
00A2 A4              INS    KLUGE
00A3 21 40           NI     PMDFAI
00A5 94 1C           BNZ    FAI             ;IF NZ, THIS IS AN FAI
00A7 A0              INS    LCL
```

```
PMD ADAPTOR
00A8 81 04              BP      XINT10          ;IF P, LCL A NOT ACTIVE
00AA 29 01 92           JMP     LCLAIN          ;44 US FROM A0 TO LCLAIN
00AD 15        XINT10   SL      4
00AE 81 04              BP      XINT20          ;IF P, LCL B NOT ACTIVE
00B0 29 02 9A           JMP     LCLBIN          ;53 US FROM A0 TO LCLBIN
00B3 A1        XINT20   INS     EXT
00B4 81 04              BP      XINT30          ;IF P, EXT A NOT ACTIVE
00B6 29 03 26           JMP     EXTAIN          ;64 US FROM A0 TO EXTAIN
00B9 15        XINT30   SL      4
00BA 81 04              BP      XINT40          ;IF P, EXT A NOT ACTIVE, MUST HAVE BEEN A GLITCH
00BC 29 03 99           JMP     EXTBIN          ;73 US FROM A0 TO EXTBIN
00BF 29 00 64 XINT40    JMP     SELECT          ;CHECK AGAIN
00C2 0A        FAI      LR      A,IS
00C3 50                 LR      ISARSV,A
00C4 2C                 XDC
00C5 29 00 C8 FAI10     JMP     FAI20
00C8 29 00 39 FAI20     JMP     BSTFAL
               *
               * CHECK LINE A FOR FAILURE OR RETURN FROM FAILURE
               * ENTERED WITH INTERRUPTS DISABLED FROM SELECT AND
               * DELAY FOR EIGHTH DATA BIT ON TRUNK B
               * 75 US
               *
00CB 62        CKRTA    LISU    INPDBU          ;PT TO LCL A DB
00CC 68                 LISL    INPDBL
00CD 42                 LR      A,LCLCTL
00CE 22 40              OI      RDAEN
00D0 B0                 OUTS    LCL
00D1 2B                 NOP
00D2 A0                 INS     LCL
00D3 2B                 NOP
00D4 21 80              NI      LNFALD
00D6 5C                 LR      S,A
               *
               * UPDATE EXT A
               *
00D7 6A                 LISL    INPDBL+2
00D8 43                 LR      A,EXTCTL
00D9 22 40              OI      RDAEN
00DB B1                 OUTS    EXT
00DC 2B                 NOP
00DD A1                 INS     EXT
00DE 2B                 NOP
00DF 21 80              NI      LNFALD
00E1 5C                 LR      S,A
00E2 1C                 POP
               *
               * CHECK LINE B FOR RETURN
               *
00E3 62        CKRTB    LISU    INPDBU          ;LCL B
00E4 69                 LISL    INPDBL+1
00E5 42                 LR      A,LCLCTL
00E6 22 04              OI      RDBEN
00E8 B0                 OUTS    LCL
00E9 2B                 NOP
00EA A0                 INS     LCL
00EB 15                 SL      4
00EC 21 80              NI      LNFALD
00EE 5C                 LR      S,A
               *
               * CHECK EXTERNAL SIDE
               *
00EF 6B                 LISL    INPDBL+3        ;EXT B
00F0 43                 LR      A,EXTCTL
00F1 22 04              OI      RDBEN
00F3 B1                 OUTS    EXT
00F4 2B                 NOP
00F5 A1                 INS     EXT
00F6 15                 SL      4
00F7 21 80              NI      LNFALD
00F9 5C                 LR      S,A
00FA 1C                 POP
               *
               *
               *
               * ENABLE UNFAILED LINES FOR RECEPTION
               * THIS ROUTINE MUST ALWAYS TAKE THE SAME TIME TO EXECUTE NO MATTER
               * WHAT LINES ARE FAILED.
               * 188 US
               * IT IS CALLED DURING THE EIGHTH AND STOP BIT DELAY
               *
               *
00FB 20 33     ENLN     LI      DSELIN          ;INIT LINE ENABLE BYTE
00FD 52                 LR      LCLCTL,A
00FE 62                 LISU    INPDBU
00FF 68                 LISL    INPDBL
0100 4C                 LR      A,S
0101 14                 SR      4
0102 6A                 LISL    INPDBL+2
```

```
--- PHD ADAPTOR
0103 CC                     AS       S
0104 94 07                  BNZ      ENLN05        ;IF NZ, LINE A NO GOOD
0106 42                     LR       A,LCLCTL
0107 22 40                  OI       RDAEN
0109 52                     LR       LCLCTL,A
010A 90 04                  BR       ENLN10
010C A5          ENLN05     INS      CTRL          ;DYNAMIC NO"S
010D 90 01                  BR       ENLN10
010F 69          ENLN10     LISL     INPDBL+1
0110 4C                     LR       A,S
0111 14                     SR       4
0112 6B                     LISL     INPDBL+3
0113 CC                     AS       S
0114 94 07                  BNZ      ENLN15        ;IF NZ, LINE B NO GOOD
0116 42                     LR       A,LCLCTL
0117 22 04                  OI       RDBEN         ;ENABLE B
0119 52                     LR       LCLCTL,A
011A 90 04                  BR       ENLN20
011C A5          ENLN15     INS      CTRL          ;DYNAMIC NOP
011D 90 01                  BR       ENLN20
011F 42          ENLN20     LR       A,LCLCTL
0120 53                     LR       EXTCTL,A
                 *
                 * CHECK LOOPBACK A
                 *
                 * 47 US
                 *
0121 68                     LISL     INPDBL        ;LCL A
0122 A5                     INS      CTRL
0123 21 80                  NI       LOPBKA
0125 84 0E                  BZ       ENLN40        ;IF Z, NO LOOPBACK A
0127 70                     CLR
0128 EC                     XS       S             ;SHALL WE ENABLE LCL A
0129 94 07                  BNZ      ENLN30        ;IF NZ, NO, IT'S FAILED
012B 42                     LR       A,LCLCTL
012C 22 40                  OI       RDAEN
012E 52                     LR       LCLCTL,A
012F 90 09                  BR       ENLN50        ;CHECK B
0131 A5          ENLN30     INS      CTRL          ;DELAY FOR NO ENABLE
0132 90 06                  BR       ENLN50
0134 A5          ENLN40     INS      CTRL          ;DELAY 25 US FOR NO LOOP BACK
0135 A5                     INS      CTRL
0136 2B                     NOP
0137 90 01                  BR       ENLN50
                 *
                 * CHECK LOOPBACK B
                 * 47 US
                 *
0139 69          ENLN50     LISL     INPDBL+1      ;LCL B
013A A5                     INS      CTRL
013B 21 40                  NI       LOPBKB
013D 84 0E                  BZ       ENLN70        ;IF Z, NO LOOPBACK B
013F 70                     CLR                    ;THIS INP FAILED?
0140 EC                     XS       S
0141 94 07                  BNZ      ENLN60        ;IF NZ, YES, DON'T ENABLE
0143 42                     LR       A,LCLCTL
0144 22 04                  OI       RDBEN
0146 52                     LR       LCLCTL,A
0147 90 09                  BR       ENLN80
0149 A5          ENLN60     INS      CTRL          ;DELAY FOR NO ENABLE
014A 90 06                  BR       ENLN80
014C A5          ENLN70     INS      CTRL          ;DELAY FOR NO LOOPBACK B
014D A5                     INS      CTRL
014E 2B                     NOP
014F 90 01                  BR       ENLN80
0151 1C          ENLN80     POP
                 *
                 * TOGGLE WATCHDOG TIMER AND SWITCH BSTLED
                 *
0152 A5          BGRND      INS      CTRL
0153 21 10                  NI       BSTLED
0155 23 20                  XI       MRBIT
0157 B5                     OUTS     CTRL
0158 23 20                  XI       MRBIT
015A B5                     OUTS     CTRL
                 *
                 * CALCULATE ROM CHECKSUM
                 *
                 * XOR AND ROTATE LEFT ALL BYTES IN ROM
                 *
015B 2A 00 00    CKSMB      DCI      0             ;START AT 0
015E 70                     CLR                    ;INIT CKSM TO 0
015F 50                     LR       TMPDTA,A
0160 40          CKSML1     LR       A,TMPDTA      ;GET CURRENT CKSM
0161 8C                     XM                     ;XOR NEXT BYTE AND BUMP DC
0162 50                     LR       TMPDTA,A
0163 C0                     AS       TMPDTA
0164 19                     LNK
0165 50                     LR       TMPDTA,A      ;SAVE CKSM
0166 11                     LR       H,DC          ;PUT DC WHERE ACCUMULATOR CAN GET TO IT ALL
0167 70                     CLR                    ;LO BYTE OF ROM PTR EQUAL 0?
```

```
PMD ADAPTOR
0168 E8                  XS      11
0169 94 F6               BNZ     CKSML1         ;NO, NOT DONE YET,
016B A5                  INS     CTRL           ;TOGGLE WATCHDOG TIMERE
016C 21 10               NI      BSTLED
016E 23 20               XI      MRBIT
0170 B5                  OUTS    CTRL
0171 23 20               XI      MRBIT
0173 B5                  OUTS    CTRL
0174 77                  LIS     7
0175 FA                  NS      10             ;YES, HI BYTE 0, TOO?
0176 94 E9               BNZ     CKSML1         ;NOT YET
0178 E0                  XS      THPDTA         ;CKSM DONE, DID IT END UP 0?
0179 84 04               BZ      BGND10         ;IF Z, YES, SUCCESS
017B 29 00 39            JMP     BSTFAL         ;NO, FAIL CHIP
              *
              *
              * TOGGLE WATCHDOG TIMER AND SWITCH BSTLED
              *
017E A5       BGND10     INS     CTRL
017F 21 10               NI      BSTLED
0181 23 20               XI      MRBIT
0183 B5                  OUTS    CTRL
0184 23 30               XI      MRBIT+BSTLED
0186 B5                  OUTS    CTRL
              *
              * IS EVERYBODY REALLY DEAD?
              *
0187 42                  LR      A,LCLCTL

0188 21 44               NI      RDAEN+RDBEN
018A 25 44               CI      RDAEN+RDBEN    ;ARE BOTH LINES ALREADY ENABLED?
018C 84 CE               BZ      CKSMB          ;YES, DON'T BOTHER THEM NOW.
018E 1A                  DI                     ;CHECK FOR RETURN FROM FAILURE AGAIN
018F 29 00 64            JMP     SELECT

              *
              * TRANSITION FOUND ON LCL A
              *
0192 A5       LCLAIN     INS     CTRL           ;29 US DELAY TO STRDL
0193 A5                  INS     CTRL
0194 A5                  INS     CTRL
0195 20 00               LI      0
0197 28 02 20 LAIN05     PI      STRDL
019A A0                  INS     LCL            ;STILL THERE?
019B 2B                  NOP                    ;TIMING DELAY
019C 90 01               BR      *+2
019E 91 04               BM      LAIN10         ;IF M, YES
01A0 29 00 64            JMP     SELECT         ;FALSE START BIT
              *
              * PASS START BIT THRU
              * AND INIT DATA BIT LOOP
              *
01A3 20 03    LAIN10     LI      XMTA
01A5 B1                  OUTS    EXT
01A6 53                  LR      EXTCTL,A
              *
              * PROCESS LOOPBACK OF START BIT
              *
01A7 28 02 58            PI      LOPA
01AA 77                  LIS     7
01AB 50                  LR      BITCNT,A
01AC A1                  INS     EXT            ;DYNAMIC NOP
01AD 2B                  NOP
              *
              * NEXT DATA BIT
              *
01AE 28 02 2C LAIN20     PI      BITDL          ;DELAY ONE BIT TIME
01B1 A0                  INS     LCL            ;READ NEXT DATA BIT
01B2 12                  SR      1
01B3 12                  SR      1
01B4 12                  SR      1              ;POSITION FOR OUTPUT
01B5 21 10               NI      H"10"
01B7 23 10               XI      H"10"
01B9 22 03               OI      XMTA
01BB B1                  OUTS    EXT            ;SEND DATA
01BC 53                  LR      EXTCTL,A
              *
              *
              * PROCESS LOOP BACK FOR THIS DATA BIT
              *
01BD 28 02 58            PI      LOPA
01C0 30                  DS      BITCNT         ;DATA BITS DONE?
01C1 94 EC               BNZ     LAIN20         ;IF NZ, NOT YET
              *
              * CHECK RETURN FROM FAILURE WHILE WAITING FOR MIDDLE OF 8TH DATA BIT
              *
01C3 28 00 E3            PI      CKRTB
01C6 28 02 39            PI      D8DL           ;WAIT REST OF TIME FOR MID 8TH DATA BIT
```

```
   PMU ADAPTOR
01C9 A0              INS    LCL
01CA 12              SR     1
01CB 12              SR     1
01CC 12              SR     1                 ;POSITION FOR OUTPUT
01CD 21 10           NI     H"10"
01CF 23 10           XI     H"10"
01D1 22 03           OI     XMTA
01D3 B1              OUTS   EXT               ;PASS THRU 8TH DATA BIT
01D4 53              LR     EXTCTL,A
                *
                * PROCESS LOOPBACK OF EIGHTH DATA BIT
                *
01D5 28 02 58        PI     LOPA
                *
                * SET UP TO ENABLE LINES WHILE WAITING FOR MIDDLE OF STOP BIT
                *
01D8 28 00 FB        PI     ENLN
01DB 28 02 49        PI     STPDL             ;WAIT REST OF TIME FOR MID STOP BIT
01DE 62              LISU   INPDBU
01DF 68              LISL   INPDBL
01E0 A0              INS    LCL
01E1 2B              NOP                      ;TIMING DELAY
01E2 90 01           BR     LAIN34            ;DYNAMIC NOP
01E4 21 80      LAIN34 NI   LNFALD
01E6 5C              LR     S,A               ;MARK FAILED IF NEC.
01E7 20 13           LI     XMTAS
01E9 B1              OUTS   EXT               ;SEND STOP BIT
01EA 2B              NOP
                *
                * SHALL WE LOOP THIS STOP BIT BACK?
                *
01EB 20 00           LI     0                 ;DYNAMIC NOP
01ED A5              INS    CTRL
01EE A5              INS    CTRL
01EF 21 80           NI     LOPBKA
01F1 84 12           BZ     LAIN45            ;IF Z, NO LOOPBACK
01F3 2B              NOP
01F4 20 53           LI     RDAEN+XMTAS
01F6 B1              OUTS   EXT
01F7 2B              NOP
01F8 A1              INS    EXT               ;READ LOOPBACKED CHAR
01F9 2B              NOP
01FA 14              SR     4                 ;SHIFT DOWN FOR LCL B XMIT
01FB 12              SR     1
01FC 12              SR     1
01FD 12              SR     1
01FE 23 01           XI     1                 ;INVERT FOR NORMAL XMIT
0200 22 70           OI     LCLALP            ;LOCAL CTRL FOR LOOPBACK
0202 B0              OUTS   LCL
0203 2B              NOP
                LAIN45 EQU  *
                *
                * DID THIS INP FAIL?
                *
0204 70              CLR
0205 EC              XS     S
0206 84 0F           BZ     LAIN40            ;IF Z, NO, GET READY FOR NEXT CHAR
                *
                * READ THREE MORE TIMES IF TO SEE IF IT RETURNS HERE
                *
0208 73              LIS    3
0209 50              LR     BITCNT,A
020A A0         LAIN35 INS  LCL
020B 2B              NOP
020C 81 0C           BP     LAIN50            ;IF P, IT RETURNED
020E 30              DS     BITCNT            ;NOT YET RETURNED, DONE CHECKING?
020F 94 FA           BNZ    LAIN35
0211 42         LAIN33 LR   A,LCLCTL
0212 21 BF           NI     RDAENM            ;DISABLE A READ
0214 52              LR     LCLCTL,A
                *
0215 53              LR     EXTCTL,A
0216 29 00 6D   LAIN40 JMP  SLCT05
                *
                * IS IT STILL RETURNED?
                *
0219 A0         LAIN50 INS  LCL
021A 91 F6           BM     LAIN33            ;NO, MARK IT FAILED
021C 70              CLR                      ;YES, LEAVE IT READY
021D 5C              LR     S,A
021E 90 F7           BR     LAIN40            ;YES, DON'T MARK IT FAILED
                *
                * START BIT DELAY
                *
0220 44         STRDL  LR   A,STRTCT
0221 51              LR     DLYCNT,A
0222 31         STRDL1 DS   DLYCNT,A
0223 94 FE           BNZ    STRDL1
                *
                * 1200/2400 BAUD TIMING ADJUSTMENT
                * 27 US FOR 1200
```

```
PHD ADAPTOR
                      * 28 US FOR 2400
                      *
0225 A5                       INS     CTRL            ;GET SPEED SWITCH
0226 21 01                    NI      SPEED
0228 94 01                    BNZ     STRDL2          ;IF NZ, 2400 BAUD
022A A5             STRDL2    INS     CTRL            ;1200
022B 1C                       POP
                      *
                      * DATA BIT DELAY
                      *
022C 45             BITDL     LR      A,DATACT
022D 51                       LR      DLYCNT,A
022E 31             BITDL1    DS      DLYCNT
022F 94 FE                    BNZ     BITDL1
                      *
                      * 1200/2400 BAUD SPEED ADJUSTMENT
                      * 26 US FOR 1200 BAUD
                      * 20 US FOR 2400 BAUD
                      *
0231 A5                       INS     CTRL
0232 21 01                    NI      SPEED
0234 94 03                    BNZ     BITDL2          ;IF NZ, 2400
0236 90 01                    BR      BITDL2          ;1200
0238 1C             BITDL2    POP
                      *
                      * EIGHT DATA BIT DELAY
                      *
0239 46             D8DL      LR      A,D8CT
023A 51                       LR      DLYCNT,A
023B 31             D8DL10    DS      DLYCNT
023C 94 FE                    BNZ     D8DL10
                      *
                      * 1200/2400 BAUD SPEED ADJUSTMENT
                      * 22 US FOR 1200 BAUD
                      * 26 US FOR 2400 BAUD
                      *
023E A5                       INS     CTRL
023F 21 01                    NI      SPEED
0241 84 05                    BZ      D8DL20          ;IF Z, 1200 BAUD
0243 84 03                    BZ      D8DL20          ;IF Z, 1200 BAUD
0245 90 02                    BR      D8DL30          ;2400
0247 2B             D8DL20    NOP
0248 1C             D8DL30    POP

                      *
                      * STOP BIT DELAY
                      *
0249 47             STPDL     LR      A,STPCT
024A 51                       LR      DLYCNT,A
024B 31             STPDL1    DS      DLYCNT
024C 94 FE                    BNZ     STPDL1
                      *
                      * 1200/2400 BAUD ADJUSTMENT
                      * 24 US FOR 1200 BAUD
                      * 28 US FOR 2400 BAUD
                      *
024E A5                       INS     CTRL
024F 21 01                    NI      SPEED
0251 94 04                    BNZ     STPDL2          ;IF NZ, 2400
0253 20 00                    LI      0
0255 1C                       POP
0256 A5             STPDL2    INS     CTRL
0257 1C                       POP
                      *
                      * SHALL WE LOOP BACK FROM LCL A TO EXT A TO LCL B?
                      * 86 US
                      *
0258 A5             LOPA      INS     CTRL
0259 21 80                    NI      LOPBKA
025B 84 14                    BZ      LOPA10
025D 43                       LR      A,EXTCTL
025E 22 40                    OI      RDAEN
0260 B1                       OUTS    EXT
0261 53                       LR      EXTCTL,A
0262 A1                       INS     EXT
0263 2B                       NOP
0264 14                       SR      4
0265 12                       SR      1
0266 12                       SR      1
0267 12                       SR      1
0268 23 01                    XI      1               ;INVERT FOR NORMAL OUTPUT
026A 22 70                    OI      LCLALP          ;MERGE WITH CONTROL
026C B0                       OUTS    LCL
026D 52                       LR      LCLCTL,A
026E 90 06                    BR      LOPA30
0270 20 FB          LOPA10    LI      -5
0272 1F             LOPA20    INC
0273 94 FE                    BNZ     LOPA20
0275 1C             LOPA30    POP
                      *
                      * SHALL WE LOOP THIS BIT BACK ON LINE B?
```

PMD ADAPTOR

```
                   * 86 US
                   *
0276 A5           LOPB    INS   CTRL
0277 21 40                NI    LOPBKB
0279 84 13                BZ    LOPB10
027B 43                   LR    A,EXTCTL
027C 22 04                OI    RDBEN
027E B1                   OUTS  EXT
027F 53                   LR    EXTCTL,A
0280 A1                   INS   EXT
0281 39                   DS    9
0282 13                   SL    1
0283 21 10                NI    H"10"
0285 23 10                XI    H"10"
0287 22 07                OI    LCLBLP
0289 B0                   OUTS  LCL
028A 52                   LR    LCLCTL,A
028B 90 06                BR    LOPB30
028D 20 FB        LOPB10  LI    -5          ;DELAY FOR NO LOOPBACK
028F 1F           LOPB20  INC
0290 94 FE                BNZ   LOPB20
0292 1C           LOPB30  POP
                   *
                   * DUMMY LOOPBACK CHECK
                   * 86 US
                   *
0293 20 F9        LOPDUM  LI    -7
0295 1F                   INC
0296 94 FE                BNZ   *-1
0298 2B                   NOP
0299 1C                   POP
                   *
                   * TRANSITION FOUND ON LCL B
                   *
029A A5           LCLBIN  INS   CTRL        ;DELAY 20 US
029B A5                   INS   CTRL
029C A0                   INS   LCL
029D 28 02 20             PI    STRDL       ;WAIT FOR MID START BIT
02A0 A0                   INS   LCL         ;STILL THERE?
02A1 15                   SL    4
02A2 90 01                BR    *+2         ;DYNAMIC NOP
02A4 91 04                BM    LBIN10      ;IF M, YES
02A6 29 00 64             JMP   SELECT      ;FALSE START BIT
                   *
                   * PASS START BIT THRU
                   * INIT 7 DATA BITS LOOP
                   *
02A9 20 30        LBIN10  LI    XMTB
02AB B1                   OUTS  EXT
02AC 53                   LR    EXTCTL,A
                   *
                   * PROCESS LOOPBACK OF START BIT
                   *
02AD 28 02 76             PI    LOPB
02B0 77                   LIS   7
02B1 50                   LR    BITCNT,A
02B2 A1                   INS   EXT         ;DYNAMIC NOP
02B3 2B                   NOP
                   *
                   * NEXT DATA BIT
                   *
02B4 28 02 2C     LBIN20  PI    BITDL       ;DELAY 1 BIT TIME
02B7 A0                   INS   LCL         ;READ INVERTED INPUT
02B8 12                   SR    1
02B9 12                   SR    1
02BA 12                   SR    1           ;POSITION FOR OUTPUT
02BB 21 01                NI    1           ;GET IT ALONE
02BD 23 01                XI    1           ;INVERT FOR TRUE OUTPUT
02BF 22 30                OI    XMTB        ;MERGE WITH CONTROL
02C1 B1                   OUTS  EXT         ;PASS IT OUT
02C2 53                   LR    EXTCTL,A    ;SAVE FOR CKRT
                   *
                   * PROCESS LOOPBACK FOR THIS DATA BIT
                   *
02C3 28 02 76             PI    LOPB
02C6 30                   DS    BITCNT      ;7 DATA BITS DONE?
02C7 94 EC                BNZ   LBIN20      ;IF NZ, NOT YET
                   *
                   * CHECK RETURN FROM FAILURE WHILE WAITING FOR MIDDLE OF 8TH DATA BIT
                   *
02C9 28 00 CB             PI    CKRTA
02CC 28 02 39             PI    D8DL        ;WAIT REST OF TIME FOR MID 8TH DATA BIT
02CF A0                   INS   LCL         ;READ INVERTED INPUT
02D0 12                   SR    1
02D1 12                   SR    1
02D2 12                   SR    1           ;POSITION FOR OUTPUT
02D3 21 01                NI    1           ;GET IT ALONE
02D5 23 01                XI    1           ;INVERT FOR TRUE OUTPUT
02D7 22 30                OI    XMTB        ;MERGE WITH CONTROL
02D9 B1                   OUTS  EXT         ;SEND IT
02DA 53                   LR    EXTCTL,A    ;SAVE FOR CKRT
```

```
PMD ADAPTOR
                  *
                  * PROCESS LOOPBACK FOR EIGHTH DATA BIT
                  *
02DB 28 02 76              PI      LOPB
                  *
                  * SET UP TO ENABLE LINES WHILE WAITING FOR MIDDLE OF STOP BIT TO COME IN
                  *
02DE 28 00 FB              PI      ENLN
02E1 28 02 49              PI      STPDL          ;WAIT REST OF TIME FOR MID STOP BIT
02E4 62                    LISU    INPDBU         ;POINT TO INP FAILURE DATA BASE
02E5 69                    LISL    INPDBL+1
02E6 A0                    INS     LCL
02E7 90 01                 BR      LBIN30         ;DYNAMIC NOP
02E9 15           LBIN30   SL      4
02EA 21 80                 NI      LNFALD
02EC 5C                    LR      S,A            ;IF INP WAS HI, FRAMING ERR; ELSE GOOD CHAR
02ED 20 31                 LI      XMTBS          ;SEND STOP BIT NO MATTER WHAT
02EF B1                    OUTS    EXT
02F0 2B                    NOP
                  *
                  * SHALL WE LOOPBACK THE STOP BIT?
                  *
02F1 20 00                 LI      0
02F3 A5                    INS     CTRL
02F4 A5                    INS     CTRL
02F5 21 40                 NI      LOPBKB
02F7 84 11                 BZ      LBIN70
02F9 2B                    NOP
02FA 20 35                 LI      RDBEN+XMTBS
02FC B1                    OUTS    EXT
02FD 2B                    NOP
02FE A1                    INS     EXT
02FF 39                    DS      9
0300 13                    SL      1
0301 21 10                 NI      H"10"
0303 23 10                 XI      H"10"
0305 22 07                 OI      LCLBLP
0307 B0                    OUTS    LCL
0308 2B                    NOP
                  LBIN70   EQU     *
                  *
                  * DID THIS INP FAIL?
                  *
0309 70                    CLR
030A EC                    XS      S
030B 84 0F                 BZ      LBIN40         ;IF Z, NO, GET READY FOR NEXT CHAR
                  *
                  * READ INP A FEW MORE TIMES TO MAKE SURE IT REALLY FAILED
                  *
030D 73                    LIS     3
030E 50                    LR      BITCNT,A
030F A0           LBIN33   INS     LCL
0310 15                    SL      4
0311 81 0C                 BP      LBIN50         ;IF P, RETURNED
0313 30                    DS      BITCNT         ;NOT RETURNED YET, ARE WE DONE LOOKING?
0314 94 FA                 BNZ     LBIN33         ;IF NZ, NOT YET
0316 42           LBIN35   LR      A,LCLCTL
0317 21 FB                 NI      RDBENM         ;DISABLE B READ
0319 52                    LR      LCLCTL,A
031A 53                    LR      EXTCTL,A
031B 29 00 60     LBIN40   JMP     SLCT05
                  *
                  * IS IT STILL RETURNED?
                  *
031E A0           LBIN50   INS     LCL
031F 15                    SL      4
0320 91 EE                 BM      LBIN33         ;IF M, NO
0322 70                    CLR                    ;LEAVE READY
0323 5C                    LR      S,A
0324 90 F6                 BR      LBIN40         ;YES, DON'T MARK FAILED
                  *
                  * TRANSITION FOUND ON EXT A
                  *
0326 2B           EXTAIN   NOP                    ;TIMING
0327 90 01                 BR      XAIN05         ;DYNAMIC NOP
0329 28 02 20     XAIN05   PI      STRDL          ;WAIT FOR MID START BIT
032C A1                    INS     EXT            ;STILL THERE?
032D 2B                    NOP
032E 90 01                 BR      *+2
0330 91 04                 BM      XAIN10         ;IF M, YES
0332 29 00 64              JMP     SELECT         ;FALSE START BIT
                  *
                  * PASS START BIT THRU
                  * INIT 7 DATA BITS LOOP
                  *
0335 20 03        XAIN10   LI      XMTA
0337 B0                    OUTS    LCL
0338 52                    LR      LCLCTL,A
0339 28 02 93              PI      LOPDUM         ;DUMMY DELAY FOR LOOPBACK CHECK
033C 77                    LIS     7
```

```
 PMD ADAPTOR
033D 50                 LR      BITCNT,A
033E A1                 INS     EXT             ;DYNAMIC NOP
033F 2B                 NOP
                *
                * NEXT DATA BIT
                *
0340 28 02 2C XAIN20    PI      BITDL           ;WAIT ONE BIT TIME
0343 A1                 INS     EXT             ;READ NEXT DATA BIT
0344 12                 SR      1
0345 12                 SR      1
0346 12                 SR      1               ;POSITION FOR OUTPUT
0347 21 10              NI      H"10"           ;GET IT ALONE
0349 23 10              XI      H"10"           ;INVERT FOR TRUE OUTPUT
034B 22 03              OI      XMTA            ;MERGE WITH CONTROL
034D B0                 OUTS    LCL             ;SEND DATA BIT
034E 52                 LR      LCLCTL,A        ;SAVE FOR CKRT
034F 28 02 93           PI      LOPDUM          ;DUMMY LOOPBACK CHECK
0352 30                 DS      BITCNT          ;DATA DONE?
0353 94 EC              BNZ     XAIN20          ;IF NZ, NOT YET
                *
                * CHECK RETURN FROM FAILURE WHILE WAITING FOR MIDDLE OF 8TH DATA BIT
                *
0355 28 00 E3           PI      CKRTB
0358 28 02 39           PI      DBDL            ;WAIT REST OF TIME TO MID 8TH DATA BIT
035B A1                 INS     EXT             ;GET INVERTED DATA BIT
035C 12                 SR      1
035D 12                 SR      1
035E 12                 SR      1               ;POSITION FOR OUTPUT
035F 21 10              NI      H"10"           ;GET IT ALONE
0361 23 10              XI      H"10"           ;INVERT IT FOR TRUE OUTPUT
0363 22 03              OI      XMTA            ;MERGE WITH CONTROL
0365 B0                 OUTS    LCL             ;SEND DATA BIT
0366 52                 LR      LCLCTL,A

0367 28 02 93           PI      LOPDUM          ;DUMMY LOOPBACK CHECK
                *
                * SET UP TO ENABLE LINES WHILE WAITING FOR MIDDLE OF STOP BIT
                *
036A 28 00 FB           PI      ENLN
036D 28 02 49           PI      STPDL           ;WAIT REST OF TIME FOR MID STOP BIT
0370 62                 LISU    INPDBU
0371 6A                 LISL    INPDBL+2        ;POINT TO INP FAILURE DATA BASE
0372 A1                 INS     EXT
0373 2B                 NOP                     ;TIMING DELAY
0374 90 01              BR      XAIN30          ;DYNAMIC NOP
0376 21 80    XAIN30    NI      H"80"
0378 5C                 LR      S,A             ;MARK FAILED IF FRAMING ERROR
0379 20 13              LI      XMTAS           ;SEND STOP BIT IN ANY CASE
037B B0                 OUTS    LCL
037C 2B                 NOP
                *
                * DID THIS INPUT FAIL?
                *
037D 70                 CLR
037E EC                 XS      S
037F 84 0F              BZ      XAIN40          ;IF Z, NO, GET READY FOR NEXT CHAR
                *
                * READ INP A FEW TIMES TO MAKE SURE IT REALLY FAILED.
                *
0381 73                 LIS     3
0382 50                 LR      BITCNT,A
0383 A1       XAIN35    INS     EXT
0384 2B                 NOP
0385 81 0C              BP      XAIN50          ;IF P, RETURNED
0387 30                 DS      BITCNT
0388 94 FA              BNZ     XAIN35          ;IF NZ, LOOK AGAIN
038A 42       XAIN33    LR      A,LCLCTL        ;DISABLE A READ
038B 21 BF              NI      RDAENM          ;DISABLE A READ
038D 52                 LR      LCLCTL,A
038E 53                 LR      EXTCTL,A
038F 29 00 6D XAIN40    JMP     SLCT05
                *
                * CHECK AGAIN FOR RETURN
                *
0392 A0       XAIN50    INS     LCL
0393 91 F6              BM      XAIN33          ;IF M, MARK FAILED
0395 70                 CLR
0396 5C                 LR      S,A
0397 90 F7              BR      XAIN40          ;OK, LEAVE IT ALONE
                *
                * TRANSITION FOUND ON EXT B
                *
0399 28 02 20 EXTBIN    PI      STRDL           ;WAIT FOR MID START BIT
039C A1                 INS     EXT             ;STILL THERE?
039D 15                 SL      4
039E 90 01              BR      *+2
03A0 91 04              BM      XBIN10          ;IF M, YES
03A2 29 00 64           JMP     SELECT          ;FALSE START BIT
                *
                * PASS START BIT THRU
                * INIT 7 DATA BITS LOOP
```

```
PHD ADAPTOR
                *
03A5 20 30      XBIN10  LI      XMTB
03A7 B0                 OUTS    LCL
03A8 52                 LR      LCLCTL,A
03A9 28 02 93           PI      LOPDUM          ;DUMMY LOOPBACK CHECK
03AC 77                 LIS     7
03AD 50                 LR      BITCNT,A
03AE A1                 INS     EXT             ;DYNAMIC NOP
03AF 2B                 NOP
                *
                * NEXT DATA BIT
                *
03B0 28 02 2C   XBIN20  PI      BITDL           ;DELAY 1 BIT TIME
03B3 A1                 INS     EXT             ;READ INVERTED INP
03B4 12                 SR      1
03B5 12                 SR      1
03B6 12                 SR      1
03B7 21 01              NI      1               ;GET IT ALONE
03B9 23 01              XI      1               ;INVERT IT FOR TRUE OUTPUT
03BB 22 30              OI      XMTB            ;MERGE WITH CONTROL
03BD B0                 OUTS    LCL
03BE 52                 LR      LCLCTL,A
03BF 28 02 93           PI      LOPDUM          ;DUMMY LOOPBACK CHECK
03C2 30                 DS      BITCNT          ;DATA DONE?
03C3 94 EC              BNZ     XBIN20          ;IF NZ, NOT YET
                *
                * CHECK FOR RETURN FROM FAILURE WHILE WAITING FOR MIDDLE OF 8TH DATA BIT
                *
03C5 28 00 CB           PI      CKRTA
03C8 28 02 39           PI      DBDL            ;WAIT REST OF TIME FOR MID 8TH DATA BIT
03CB A1                 INS     EXT             ;READ INVERTED INPUT
03CC 12                 SR      1
03CD 12                 SR      1
03CE 12                 SR      1               ;POSITION FOR OUTPUT
03CF 21 01              NI      1               ;GET IT ALONE
03D1 23 01              XI      1               ;INVERT FOR TRUE OUTPUT
03D3 22 30              OI      XMTB            ;MERGE WITH CONTROL
03D5 B0                 OUTS    LCL             ;SEND IT
03D6 52                 LR      LCLCTL,A
03D7 28 02 93           PI      LOPDUM          ;DUMMY LOOPBACK CHECK
                *
                * SET UP TO ENABLE LINES WHILE WAITING FOR MIDDLE OF STOP BIT TO COME IN
                *
03DA 28 00 FB           PI      ENLN
03DD 28 02 49           PI      STPDL           ;WAIT REST OF TIME FOR MID STOP BIT
03E0 62                 LISU    INPDBU          ;POINT TO INP FAILURE DATA BASE
03E1 6B                 LISL    INPDBL+3
03E2 A1                 INS     EXT             ;GET INVERTED STOP BIT
03E3 15                 SL      4
03E4 90 01              BR      XBIN30          ;DYNAMIC NOP
03E6 21 80      XBIN30  NI      LNFALD
03E8 5C                 LR      S,A             ;SET FAILED FLAG
03E9 20 31              LI      XMTBS           ;SEND STOP BIT IN ANY CASE
03EB B0                 OUTS    LCL
03EC 2B                 NOP
                *
                * DID THIS INPUT FAIL?
                *
03ED 70                 CLR
03EE EC                 XS      S
03EF 84 0F              BZ      XBIN40          ;IF Z, NO, GET READY FOR NEXT CHAR
                *
                * READ INP A FEW MORE TIMES TO MAKE SURE IT'S REALLY FAILED.
                *
03F1 73                 LIS     3
03F2 50                 LR      BITCNT,A
03F3 A1         XBIN35  INS     EXT
03F4 15                 SL      4
03F5 81 0C              BP      XBIN50          ;IF P, RETURNED
03F7 30                 DS      BITCNT
03F8 94 FA              BNZ     XBIN35
03FA 42         XBIN33  LR      A,LCLCTL        ;DISABLE B READ
03FB 21 FB              NI      RDBENM
03FD 52                 LR      LCLCTL,A
03FE 53                 LR      EXTCTL,A
03FF 29 00 6D   XBIN40  JMP     SLCT05
                *
                * CHECK RETURN ONCE MORE
                *
0402 A1         XBIN50  INS     EXT
0403 15                 SL      4
0404 91 F5              BM      XBIN33          ;IF M, MARK FAILED
0406 70                 CLR
0407 5C                 LR      S,A
0408 90 F6              BR      XBIN40          ;LEAVE READY
              END
NUMBER OF ERRORS=  0
```

```
ACCSAV=0008 BGND10 017E BGRND  0152 BITCNT=0000 BITDL  022C BITDL1 022E
BITDL2 0238 BSIFAL 0039 BSILED=0010 BSTSUC=0041 CKRTA  00C8 CKRTB  00E3
CKSMB  015B CKSMLP 0027 CKSML1 0160 CTRL   =0005 DATACT=0005 DATA12=0042
DATA24=0019 DLYCNT=0001 DSELIN=0033 DBCT   =0006 DBDL   0239 DBDL10 023B
DBDL20 0247 DBDL30 0248 DB12   =003B DB24   =0011 ENBEXT=0020 ENLN   00FB
ENLN05 010C ENLN10 010F ENLN15 011C ENLN20 011F ENLN30 0131 ENLN40 0134
ENLN50 0139 ENLN60 0149 ENLN70 014C ENLN80 0151 EXT    =0001 EXTAIN 0326
EXTBIN 0399 EXTCTL=0003 FAI    00C2 FAI10  00C5 FAI20  00C8 ICP    =0006
INPDBL=0000 INPDBU=0002 ISARSV=0000 KLUGE  =0004 LAIN05 0197 LAIN10 01A3
LAIN20 01AE LAIN33 0211 LAIN34 01E4 LAIN35 020A LAIN40 0216 LAIN45=0204
LAIN50 0219 LBIN10 02A9 LBIN20 02B4 LBIN30 02E9 LBIN33 030F LBIN35 0316
LBIN40 031B LBIN50 031E LBIN70=0309 LCL    =0000 LCLAIN 0192 LCLALP=0070
LCLBIN 029A LCLBLP=0007 LCLCTL=0002 LNFALD=0080 LOPA   0258 LOPA10 0270
LOPA20 0272 LOPA30 0275 LOPB   0276 LOPBKA=0080 LOPBKB=0040 LOPB10 028D
LOPB20 028F LOPB30 0292 LOPDUM 0293 MRBIT  =0020 PMDFAI=0040 PMDFAM=00BF
RAMGD  =0022 RAMTST 0009 RDAEN  =0040 RDAENM=00BF RDBEN  =0004 RDBENM=00FB
REDLNS=0077 SELECT 0064 SLCT05 006D SLCT10 0078 SPD10  0058 SPEED  =0001
STPCT  =0007 STPDL  0249 STPDL1 024B STPDL2 0256 STP12  =0030 STP24  =0006
STRDL  0220 STRDL1 0222 STRDL2 022A STRTCT=0004 STRT12=001C STRT24=0007
TMPDTA=0000 XAIN05 0329 XAIN10 0335 XAIN20 0340 XAIN30 0376 XAIN33 038A
XAIN35 0383 XAIN40 038F XAIN50 0392 XBIN10 03A5 XBIN20 03B0 XBIN30 03E6
XBIN33 03FA XBIN35 03F3 XBIN40 03FF XBIN50 0402 XINT10 00AD XINT20 00B3
XINT30 00B9 XINT40 00BF XMTA   =0003 XMTAS  =0013 XMTB   =0030 XMTBS  =0031
```

```
POI PROGRAM
            * POIALG.MAC
                    TITLE    POI PROGRAM
            *
            * ACC-POWERS
            *
            * 508 OLD   19-OCT-79
            *
            *
            * POI HARDWARE CONTROL BYTE
            *
            POICTL   EQU      1                 ;POI CONTROL PORT
            *                                   ;BIT 7 - FREQUENCY INP
            *                                   ;BIT 6 - FREQ SELECT HI
            *                                   ;BIT 5 - FREQ SELECT LO
            *                                   ;BIT 4 - VALVE ENABLE, ACTIVE HI
            *                                   ;BIT 3 - VALVE OPEN=0, CLOSED=1
            *                                   ;BIT 2 - CHANNEL SELECT HI
            *                                   ;BIT 1 - CHANNEL SELECT LO
            *                                   ;BIT 0 - SUPPLY CHANNEL = 0; EXHAUST = 1
            *
            VLVENB   EQU      H"10"
            VLVOFF   EQU      H"08"
            FREQM    EQU      H"60"             ;FREQUENCY SELECT MASK
            *
            * 8 BIT TIMER WITH 1 MILLESECOND RESOLUTION
            *
            MSTIMR   EQU      4                 ;TIMER PORT
            MSTMCK   EQU      21                ;DELAY COUNT FOR MS TIMER BST CHECK
            MSCK     EQU      15                ;DELAY COUNT TO MAKE SURE MSTIMR MOVES
            *
            * TIMER INTERRUPT EQUATES
            *
            TIMERD   EQU      7                 ;TIMER DATA PORT
            ICP      EQU      6                 ;INTERRUPT CONTROL PORT
            *                                   ;BIT 7 - DIV 20
            *                                   ;BIT 6 - DIV 5
            *                                   ;BIT 5 - DIV 2
            *                                   ;BIT 4 - PLS WIDTH/INTERVAL TIMER
            *                                   ;BIT 3 - START/STOP TIMER
            *                                   ;BIT 2 - EXT INT ACTIVE LEVEL - LOW
            *                                   ;BIT 1 - TIMER INT ENABLE
            *                                   ;BIT 0 - EXTERNAL INT ENABLE
            *
            PTREDC   EQU      H"28"             ;POINT READ CONTROL
            TIMSTP   EQU      H"21"             ;STOP TIMER
            TMISTP   EQU      H"29"             ;DISABLE TIMER INT BUT LEAVE COUNTER
            XTSTEN   EQU      H"20"             ;CLEAR PREVIOUS EXT INT'S
            MXPERD   EQU      240               ;MAX PERIOD OF PULSE 600 US
            MXPERC   EQU      H"48"             ;
            MAXCNT   EQU      200               ;MAX VALID PULSE LENGTH
            MINCNT   EQU      20                ;MIN VALID PULSE LENGTH
            MSCTRL   EQU      H"E4"             ;TENTH MS CTRL
            1STIMD   EQU      200               ;ONE MS TIME DELAY
            1STIMC   EQU      H"6A"             ;ONE MS TIME CONTROL
            DLTIMS   EQU      110               ;110 DS&BNZ'S IS 1 MS PLUS
            *
            * POINT READ EQU'S
            *
            OVRHED   EQU      65
            *
            * LINE CARD COMMUNICATION DATA
            *
            *
            * FBUS EQUATES
```

```
PUT PROGRAM
*
PBUSD   EQU     5               ;PORT # EQUATES - DATA
PBUSC   EQU     0               ;CONTROL
*                               ;BIT 7 - LCRDY INP, 0 AT REST
*                               ;BIT 6 - FCRDY OUT, NORMALLY 0
*                               ;BIT 5 - DATA BUS DIRECTION, 1-RCV, 0-XMIT
*                               ;BIT 4 - PBUS I/F ENABLE, ACTIVE HI
*                               ;BIT 3 - ID INP.
*                               ;BIT 2 -, ID INP.
*                               ;BIT 1 - UNUSED
*                               ;BIT 0 - UNUSED
*
PBINIR  EQU     H"F0"           ;CONTROL BYTE INIT FOR RECEIVE
PBRDCT  EQU     H"30"           ;PBUS I/F CTRL TO READ COUNT
DSELPB  EQU     H"20"           ;DE-SELECT THE P-BUS
LCRDY   EQU     H"80"           ;LCRDY INP BIT
FCRDY   EQU     H"40"           ;FCRDY OUT BIT
PBSDIR  EQU     H"20"           ;DATA BUS DIRECTION BIT
LCRDYM  EQU     H"7F"           ;LCRDY MASK
*
* LOWER SCRATCHPAD REGISTER SAVE AREA DURING INTERRUPTS
* STATUS GOES IN REG 9 AND DC GOES IN REG H
*
*ACCSAV EQU     7               ;ACCUMULATOR SAVE AREA
*ISARSV EQU     8               ;ISAR SAVE AREA
*
* THESE FIVE BYTES CONTROL COMMUNICATION WITH THE LINE CARD.
*
BFPLCU  EQU     2               ;PTR TO SCRATCHPAD BUFFER
BFPLCL  EQU     0
*
DLYCU   EQU     2               ;LCRDY TIME OUT COUNT
DLYCL   EQU     1
LCTO    EQU     50              ;APPROXIMATELY 1 MS.
*
PBCTLU  EQU     2               ;POWERS BUS CONTROL BYTE
PBCTLL  EQU     2
*
CNTLCU  EQU     2               ;MESSAGE COUNT BEING XFER'D
CNTLCL  EQU     3
*
CKSM    EQU     6               ;RUNNING CKSM ON MSG
*
* LINE CARD COMMUNICATION BUFFER
* USES OCTAL 3, O"37" IS THE FIRST BYTE OF THE BUFFER
*
LCBUFU  EQU     3
LCBUFL  EQU     7
LCBUFR  EQU     O"37"
*
* COSDAP COMMUNICATION EQUATES
*
* THESE ARE THE COMMANDS ACCEPTED, AND THE RESPONSES GIVEN, BY
* THE VARIOUS CARDS.
*
*
* GENERAL
*
SYN     EQU     H"16"           ;MESSAGE SYNCHRONIZATION CHARACTER
ACK     EQU     H"06"           ;POSITIVE ACKNOWLEDGE
*
NAK     EQU     H"15"           ;NEGATIVE ACKNOWLEDGE
*
*
*
*
* COMMANDS FROM THE LINE CARD TO THE FUNCTION CARDS
*
WRU     EQU     H"80"           ;GET MASK ID
*
GTCOVN  EQU     H"81"           ;GET NUMBER OF COV'S ON CARD
*
FGTCOV  EQU     H"82"           ;GET NEXT COV DATA FROM CARD
*
FAKCOV  EQU     H"83"           ;ACK COV DATA
*
*
*
* COMMANDS FROM THE HOST TO THE FUNCTION CARDS
*
*
GETPNT  EQU     H"06"           ;GET CURRENT VALUE FOR POINT
*
SETPNT  EQU     H"07"           ;SET NEW OUTPUT FOR POINT
*
RDFCRM  EQU     H"08"           ;READ FUNCTION CARD RAM
*
WTFCRM  EQU     H"09"           ;WRITE FUNCTION CARD RAM
*
ENPCOV  EQU     H"0B"           ;ENABLE/DISABLE POINT FOR COV REPORTING
*
SISCOV  EQU     H"0D"           ;SET SIGNIFICANT CHANGE OF VALUE NUMBER
```

```
POI PROGRAM
*
ENDCIL  EQU     H"0F"           ;ENABLE/DISABLE A POINT FROM CONTROL
*
CHARPT  EQU     H"11"           ;CHARACTERIZE A POINT
*
SETVLV  EQU     H"61"           ;SET ALL VALVES ON CARD COMMAND
*DUD
GETALL  EQU     H"E4"           ;GET ALL DATA FROM POINT
*DUD
*
*
* ERROR RESPONSES THE DAP SENDS TO THE HOST
*
DATAER  EQU     H"FE"           ;TOO LITTLE OR TOO MUCH DATA FOR THE COMMAND
*
CMDERR  EQU     H"FD"           ;COMMAND NOT RECOGNIZED
*
CHARED  EQU     H"FC"           ;CHARACTERIZATION REQUIRED
NOCOV   EQU     H"FB"           ;NO COV'S IN THIS COSDAP
FCFAIL  EQU     H"FA"           ;FUNCTION CARD FAILED
INVPNT  EQU     H"F9"           ;INVALID POINT NUMBER
PNTFAL  EQU     H"F8"           ;POINT FAILED
PNTRET  EQU     H"F7"           ;POINT RETURNED
INVCHR  EQU     H"E8"           ;INVALID CHARACTERIZATION DATA
GENERR  EQU     H"EE"           ;INCORRECT AMOUNT OF DATA IN MSG
CVERR   EQU     H"EF"           ;NOT ENOUGH COV'S FOR THIS COMMAND
POIERR  EQU     H"DF"           ;POI UNABLE TO MOVE TO SETPOINT
*
*
* FUNCTION CARD TO LINE CARD ERROR RESPONSES
*
FCRCKS  EQU     H"C0"           ;FC FOUND CKSM ERR ON THE COMMAND
*
LCRCKS  EQU     H"C1"           ;LC FOUND CKSM ERR ON THE FC'S RESPONSE
*
* MASK ID
*
POI     EQU     H"40"

*
* ISAR ASSIGNMENTS
*
CRNTPT  EQU     0               ;CURRENT POINT BACKGROUND IS WORKING ON
*                               ;BIT 7 - SET ON POWER UP, RESET ON ANY CHAR.CMD
PWRUP   EQU     H"80"
PWRUPM  EQU     H"7F"
TIMERH  EQU     1               ;MILLESECOND TIMER, HI BYTE
TIMERL  EQU     2               ;LO
TMPA    EQU     3               ;BACKGROUND LOCAL DATA
TMPB    EQU     4
TMPC    EQU     5
*CKSM   EQU     6               ;LCCOM CKSM
FTMPC   EQU     CKSM            ;FOREGROUND LOCAL DATA
FTMPA   EQU     10              ;FOREGROUND LOCAL DATA
FTMPB   EQU     11
*KU     EQU     12              ;BACKGROUND LOCAL DATA OR SUBROUTINE RET ADDR
*KL     EQU     13
*
* INTERRUPT SAVE AREA
*
ACCSAV  EQU     7               ;ACC
ISARSV  EQU     8               ;ISAR
*J      EQU     9               ;PROCESSOR STATUS SAVE
*QU     EQU     14              ;BACKGROUND TIMER INTERRUPT VECTOR AND TEMPORARY
*QL     EQU     15
*
* FIND IMMINENT EXACT TIME OUT - DATA BASE
*
CPT     EQU     TMPC            ;CURRENT POINT
*KL     EQU     13              ;TIME UPDATE FLAGS
MIXIMM  EQU     H"02"           ;BIT 1 - IMMINENT TIME OUT FOUND
LOHIGK  EQU     1               ;BIT 0 = LO TO HI OVRFLW
ROMCHK  EQU     4               ;IF SET UPON EXIT FROM TIME UPDATE,
ROMCKM  EQU     H"FB"           ;WE HAVE TIME FOR A ROM CKSM
*TMPC   EQU     5               ;RUNNING CKSM SAVE AREA
DLTAIL  EQU     TMPB            ;2'S COMPLEMENT OF TIME SINCE
*                               ;LAST CLOCK UPDATE
*TMPA                           ;DEBOUNCE TIME, LOW
*
*
* READ-A-POINT EQUATES
*
HICNT   EQU     TMPB
PLSCNT  EQU     TMPC
*
*
* TIM2SP - 8 BY 8 BIT MULTIPLY EQUATES
* INVERSE RATE TIMES DISTANCE TO SETPOINT GIVES
* MILLISECONDS OF AIR UNTIL SETPOINT
*
* MULTIPLIER = RATE = QL
MCNDLO  EQU     TMPC            ;DISTANCE TO SETPOINT
```

```
PDI PROGRAM
        MCHDHI  EQU     TMPB            ;0
        PRODLO  EQU     6               ;BYTE 6 OF POINT DATABASE
        PRODHI  EQU     5               ;BYTE 5 OF POINT DATABASE
        LPMCNT  EQU     TMPA            ;MULTIPLY LOOP COUNT
        *
        * PERIOD TO FREQUENCY DIVIDE EQUATES
        * SLOPE FOR FREQ TO 8-BIT ALREADY IN DIVIDEND (31.25)
        *
        * LOOP COUNT = K0
        * DNDLO = K6
        DNDAL   EQU     TMPA
        DNDAH   EQU     TMPB
        DNDHI   EQU     TMPC
        * DIVISOR LO = 0L
        * DIVISOR HI = 0H
        *
        *
        * RUNNING POINT EQUATES
        *
        ARITHH  EQU     TMPD            ;HOW LONG HAVE WE NOT BEEN MAKING HEADWAY?
        ARITHL  EQU     TMPC
        *
        DNDAHI  EQU     TMPA            ;FIND RATE DIVIDE
        DNDALO  EQU     TMPC
        LPDCNT  EQU     TMPB
        * DIVISOR = 0L
        *
        MINAIR  EQU     8               ;MINIMUM # OF MS VALVE IS OPEN
        DEADBD  EQU     1               ;PI MUST LEAK THIS MUCH AFTER IT'S SET
        RATCHK  EQU     8               ;OPEN VALVE FOR RATE CHECK
        *
        * THE BACKGROUND ROUTINE MONITORS ALL FOUR POINTS AND FINDS THEM IN
        * SOME STATE.  EACH POINT GETS SOMES EXECUTION TIME IN ROUND-ROBIN ORDER.
        * HOWEVER, A POINT THAT IS IN AN EXACT TIME-OUT STATE WITH LESS THAN 100 MS
        * TO GO GETS EXECUTED FIRST.
        *
        PUP     EQU     0               ;POWER-UP STATE - POINT IS READ AND MAY OR
        *                               ;MAY NOT BE CHARACTERIZED.  IT HAS NOT YET
        *                               ;BEEN GIVEN A SETPOINT SO IT IS NOT CONTROLED.
        *                               ;BYTE 2 AND BITS 3-1 OF BYTE 1 IS THE LAST
        *                               ;POSITION READ OF THE POINT.
        *
        *
        SET     EQU     1               ;A SETPOINT HAS BEEN ENTERED AND WE THINK
        *                               ;WE'RE THERE, BUT CHECK IT OUT ANYWAY.  IN THIS
        *                               ;STATE THE POINT IS UNCONTROLED AND IS WITHIN
        *                               ; .1 PSIG OF ITS SETPOINT.  THE FOURTH ENTRY IN
        *                               ;THE POINT'S DATABASE IS THE SETPOINT.
        *
        *
        RUN     EQU     7               ;THE POINT HAS A VALVE OPEN AND IS MOVING
        *                               ;TOWARD THE SETPOINT.  IT IS NOT YET WITHIN 1
        *                               ;SECOND OF THE SETPOINT.  THE FIFTH ENTRY IN
        *                               ;THE DATABASE IS THE TIME THE POINT WAS
        *                               ;LAST READ.'
        *
        *
        RND     EQU     8               ;THE POINT HAS BEEN STOPPED FROM RUNNING
        *                               ;AND WE'RE WAITING FOR THE PRESSURE TO SETTLE.
        *                               ;THE SIXTH ENTRY IN THE DATABASE IS THE ENDING
        *                               ;TIME OF THE SETTLING DELAY MODULO 256 MS.
        *
        RAX     EQU     9               ;LONG TIME OUT DONE
        *
        *
        HIXP    EQU     H"0A"           ;START SHORT TIME OUT SO DON'T DECREMENT
        HIX     EQU     H"0B"           ;HOMING IN WITH AN EXACT TIME DELAY.  END TIME
        *                               ;IS BYTE 4, BITS 5&4 AND BYTE 5.  BYTE 4, BITS
        *                               ;7&6 AND BYTE 6 IS THE TIME INTERVAL WE
        *                               ;OPENED THE VALVE.
        *
        *
        HID     EQU     H"0C"           ;HOMING IN - WAITING FOR LINE TO SETTLE.
        *                               ;ENDING TIME IN BYTE 6 MODULO 256 MS.
        *
        HDD     EQU     H"0D"           ;LONG DELAY DONE
        *
        *
        *
        * POINT DATA BASE
        *
        * X0 - FLAGS
        FLAGS   EQU     0
        *                               ;BIT 7 - CURRENT DIRECTION FLAG, 0-SUP, 1-EXH
        *                               ;BIT 6 - COV FOUND
        *                               ;BIT 5 - LINE CARD KNOWS OF THIS COV
        *                               ;BIT 4 - UNUSED
        *                               ;BIT 3 - FIRST TIME THRU RUN
        *                               ;BIT 2 - UNUSED
        *                               ;BIT 1 - POINT WAS FAILED BEFORE
        *                               ;BIT 0 - POINT FAILED
        COVFLG  EQU     H"40"           ;COV PRESENT
```

```
POI PROGRAM
                CVFLGM  EQU     H"6F"             ;MASK
                LCKNFG  EQU     H"20"             ;LINE CARD KNOWS
                ACKMSK  EQU     H"9F"             ;CLEAR CVFLAG AND LCKNFG UPON ACK
                *ODD
                FIRSTR  EQU     8                 ;SET AT SETRUN, CLEARED 1ST TIME THRU RUN
                FIRSTM  EQU     H"F7"
                DIRFLG  EQU     H"80"
                DRFLGM  EQU     H"7F"
                PTFAGD  EQU     1                 ;PT FAILED BIT
                PTFALB  EQU     2                 ;PT FAILED BEFORE BIT
                PTRSTM  EQU     H"FC"             ;PT RETURNED MASK
                * X1 - CURRENT STATE
                STATE   EQU     1                 ;CURRENT STATE OF POINT IN LO 4 BITS
                * X2 - CURRENT POSITION
                CRNT    EQU     2
                * X3 - CURRENT SETPOINT
                *
                SETPT   EQU     3
                *
                * X4 - TRY COUNT
                ERRCNT  EQU     4
                MAXTRY  EQU     32                ;MAX VALVE ACTUATIONS BEFORE FAILURE
                *
                * X5 -  LAST TIME READ (HI) DURING RUN
                *       LO BITS OF EXACT TIME OUT COUNTDOWN
                *       LONG TIME OUT COUNT FOR MAD,RMD, AND RTD
                LSTIMH  EQU     5
                EXACTL  EQU     5
                LONGOL  EQU     5
                SETDLY  EQU     9                 ;SETTLE DELAY COUNT 9 FOR REAL, 20 FOR TEST
                *
                * X6 -  LAST TIME READ (LO) DURING RUN
                *       LO BYTE OF EXACT TIME OUT SAVED
                LSTIML  EQU     6
                EXTSVL  EQU     6
                *
                * X7 - INVERSE RATE FOR CURRENT DIRECTION
                *
                RATE    EQU     7
                *
                * 40 - POINT 0
                * 50 - POINT 1
                * 60 - POINT 2
                * 70 - POINT 3
                *
                PTOBOU  EQU     4
                PTOHOL  EQU     0
                PTOB3U  EQU     7                 ;HI OCTET ADDR OF DB FOR PT 3
                *
                * POWER UP COMES HERE
                *
                        ORG     0
0000 70                 CLR
0001 B5                 OUTS    PRUSD
0002 B4                 OUTS    MSTIMR
                *
                * CLOSE VALVES
                *
0003 20 08              LI      VLVOFF
0005 53                 LR      TMPA,A
0006 43         CLLOOP  LR      A,TMPA
0007 B1                 OUTS    POICTL
0008 23 10              XI      VLVENB
000A B1                 OUTS    POICTL
000B 23 10              XI      VLVENB
000D B1                 OUTS    POICTL
000E 1F                 INC
000F 53                 LR      TMPA,A
0010 21 07              NI      7
0012 94 F3              BNZ     CLLOOP
0014 29 07 A6           JMP     INIT
                *
                * MAKE SURE THESE LOCATIONS ARE 0
                *
0017 00                 DC      0
0018 00                 DC      0
0019 00                 DC      0
001A 00                 DC      0
001B 00                 DC      0
001C 00                 DC      0
001D 00                 DC      0
001E 00                 DC      0
001F 00                 DC      0
                *
                * TIMER INTERRUPT COMES HERE
                *
                        ORG     H"20"
0020 1E                 LR      J,W               ;SAVE STATUS
0021 57                 LR      ACCSAV,A
0022 0D                 LR      P0,Q
                *
                * READ-A-POINT TIMEER INTERRUPT ROUTINE
```

```
   PD1 PROGRAM
                    *
0023 34         PTHEDI  DS       HICNT            ;UPDATE HI BYTE
0024 84 05              BZ       OVRNG            ;MARK RANGE ERROR FAILURE
                    *
                    * COMMON TIMER INTERRUPT RESTORE AND RETURN
                    *
0026 47         TIMTRT  LR       A,ACCSAV
0027 1D                 LR       W,J
0028 1B                 EI
0029 1C                 POP
                    *
                    * PULSE TOO LONG INTERRUPT
                    *
002A 20 21      OVRNG   LI       TIMSTP           ;STOP TIMER
002C B6                 OUTS     ICP
002D 1B                 EI                        ;ALLOW EXTERNAL INT'S
                    *
                    * TEST FOR INTERRUPTED
                    *
002E 70                 CLR
002F E8                 XS       ISARSV
0030 94 04              BNZ      *+5              ;IF NZ, YES
0032 29 04 6E           JMP      RGERR            ;NO, IT REALLY FAILED
0035 29 03 E8           JMP      RSTRED           ;TRY READING AGAIN

                    *
                    * MULTIPLY DISTANCE TO SETPOINT BY INVERSE RATE TO GET
                    * MILLISECONDS OF AIR TO GET TO SETPOINT.
                    *
                    * OL = RATE = MULTIPLIER
                    * MCNDLO = DISTANCE TO SETPOINT = TMPC
                    * MCNDHI = 0 = TMP3
                    * PRODLO = BYTE 6 OF PTOB
                    * PRODHI = BYTE 5 OF PTOB
                    * GPMCNT = MULTIPLY LOOP COUNT = TMPA
                    *
                TIM23P  EQU      *
0038 08                 LR       K,P
0039 5F                 LISL     RATE             ;GET MULTIPLIER
003A 4E                 LR       A,D
003B 07                 LR       OL,A
003C 70                 CLR
003D 5E                 LR       D,A              ;INIT PRODUCT
003E 50                 LR       I,A
003F 54                 LR       MCNDHI,A         ;AND HI BYTE OF OPERAND
0040 78                 LIS      8
0041 53                 LR       GPMCNT,A
0042 03         MPYLP   LR       A,OL             ;ADD MCAND TO PROD?
0043 21 01              NI       1
0045 84 08              BZ       MPY10            ;IF Z, NO
0047 45                 LR       A,MCNDLO         ;YES, LEAVE RESULT IN PRODUCT
0048 CC                 AS       S
0049 5E                 LR       D,A
004A 4C                 LR       A,S
004B 19                 LNK
004C C4                 AS       MCNDHI
004D 50                 LR       I,A
004E 45         MPY10   LR       A,MCNDLO         ;MULTIPLY MULTIPLICAND BY 2
004F C5                 AS       MCNDLO
0050 55                 LR       MCNDLO,A
0051 44                 LR       A,MCNDHI
0052 19                 LNK
0053 C4                 AS       MCNDHI
0054 54                 LR       MCNDHI,A
0055 03                 LR       A,OL             ;PUT NEXT BIT OF DIVISOR IN LSB POSITION
0056 12                 SR       1
0057 07                 LR       OL,A
0058 43                 DS       GPMCNT
0059 94 E8              BNZ      MPYLP
                    *
                    * DIVIDE RESULT BY 2 FOR DOUBLE RATE
                    *
005B 4C                 LR       A,S              ;DIV PRODLO
005C 12                 SR       1
005D 5E                 LR       D,A
005E 71                 LIS      1                ;BIT 0 OF PRODHI SET?
005F FC                 NS       S
0060 84 05              BZ       MPY20            ;IF Z, NO
0062 5E                 LISL     PRODLO           ;YES, PUT IT IN PRODLO
0063 20 80              LI       H'80'
0065 CC                 AS       S
0066 5E                 LR       D,A
0067 4C         MPY20   LR       A,S              ;DIV PRODHI
0068 12                 SR       1
0069 5C                 LR       S,A
006A 0C                 PK                        ;RETURN
```

```
PDI PROGRAM
                  *
                  * DIVIDE DELTA-TIME BY DELTA-POSITION
                  * IF QUOTIENT .GT. 255 WE'RE GOING VERY SLOW
                  *
                  * DNDAHI = TMPA
                  * DNDALO = TMPC
                  * LPDCNT = TMPB
                  * DIVISOR = QL
                  *
006B 08          PNORAT  LR      K,P             ;SAVE RETURN ADDRESS
                  *
                  * MULTIPLY TIME BY 2 FOR DOUBLE RATE
                  *
006C 43                  LR      A,DNDAHI        ;MUL HI
006D 13                  SL      1
006E 53                  LR      DNDAHI,A
006F 70                  CLR
0070 E5                  AS      DNDALO          ;SHOULD BIT 0 OF HI BE SET?
0071 81 05               BP      DIVA05          ;IF P, NO
0073 43                  LR      A,DNDAHI        ;YES
0074 1F                  INC                     ;SET IT
0075 53                  LR      DNDAHI,A
0076 45                  LR      A,DNDALO        ;MUL LO
0077 13          DIVA05  SL      1
0078 55                  LR      DNDALO,A
                  *
                  * CHECK OVERFLOW
                  *
0079 03                  LR      A,QL            ;WILL QUOTIENT FIT IN ONE BYTE?
007A C3                  AS      DNDAHI          ;IF NOT, GOING VERY SLOWLY
007B 82 17               BC      OVFA
007D 78                  LIS     8               ;SET LOOP COUNT
007E 54                  LR      LPDCNT,A
007F 45          DIVALP  LR      A,DNDALO        ;SHIFT DIVIDENT AND QUOTIENT LEFT 1 BIT
0080 C5                  AS      DNDALO
0081 55                  LR      DNDALO,A
0082 43                  LR      A,DNDAHI
0083 19                  LNK
0084 C3                  AS      DNDAHI
0085 53                  LR      DNDAHI,A
                  * TRIAL SUBTRACT
0086 03                  LR      A,QL
0087 C3                  AS      DNDAHI
0088 92 05               BNC     DIVA10          ;IF NC, NO FIT
008A 53                  LR      DNDAHI,A        ;UPDATE DIVIDEND
008B 71                  LIS     1               ;AND QUOTIENT
008C E5                  XS      DNDALO
008D 55                  LR      DNDALO,A
                  * NEXT BIT
008E 34          DIVA10  DS      LPDCNT          ;DIVIDE DONE?
008F 94 EF               BNZ     DIVALP          ;IF NZ, NOT YET
0091 90 04               BR      DIVA20
0093 20 FF       OVFA.   LI      -1              ;SET SLOW RATE

0095 55                  LR      DNDALO,A
0096 6E          DIVA20  LISL    RATE            ;ENTER NEW RATE
0097 70                  CLR                     ;CHECK FOR 0
0098 E5                  XS      DNDALO
0099 94 02               BNZ     DIVA30
009B 71                  LIS     1               ;IF Z, MAKE IT ONE
009C 5C          DIVA30  LR      S,A
009D 0C                  PK
                  *
                  * MAKE SURE THESE UNUSED LOCATIONS ARE 0
                  *
009E 00                  DC      0
009F 00                  DC      0

                  ********
                  ********
                  *
                  * EXTERNAL INTERRUPT STARTS HERE
                  * THE LINE CARD WANTS SOMETHING
                  *
                  ********
                  ********
                         ORG     H"A0"
00A0 1E                  LR      J,W             ;SAVE STATUS,
00A1 57                  LR      ACCSAV,A        ;ACCUMULATOR,
00A2 0A                  LR      A,IS            ;ISAR,
00A3 58                  LR      ISARSV,A
00A4 2C                  XDC                     ;AND DC
                  *
                  * SET UP TO RECEIVE MSG
                  *
00A5 62                  LISU    BFPLCU          ;INIT BUF PTR
00A6 68                  LISL    BFPLCL
00A7 20 1F               LI      LCBUFR
00A9 5D                  LR      I,A
00AA 20 32               LI      LCTO            ;SET TIMEOUT COUNT
```

```
FUI PROGRAM
00AC 5D                 LR      I,A
00AD 20 F0              LI      PBINIR          ;INIT BUS CTRL BYTE
00AF 5D                 LR      I,A
00B0 70                 CLR                     ;READY PORT FOR INPUT
00B1 B5                 OUTS    PBUSD
00B2 20 30              LI      PBRDCT          ;ENABLE BUS TO GET COUNT ONLY
00B4 B0                 OUTS    PBUSC
00B5 A5                 INS     PBUSD           ;READ COUNT
00B6 5E                 LR      D,A             ;SAVE MSG CNT FOR COUNT DOWN
00B7 54                 LR      FTMPA,A         ;SAVE MSG COUNT FOR LENGTH ERROR CHECK
00B8 56                 LR      CKSM,A          ;ENTER INTO CKSM
00B9 C6                 AS      CKSM
00BA 19                 LNK
00BB 56                 LR      CKSM,A
                *
                * ACK RECEIPT OF LAST BYTE AND WAIT FOR NEXT
                *
00BC 4C         ACKLC   LR      A,S
00BD 21 7F              NI      LCRDYA          ;READY BIT OF PORT FOR READ
00BF B0                 OUTS    PBUSC
00C0 A0         LCWAIA  INS     PBUSC           ;DATA RDY?
00C1 EE                 XS      D               ;I.E. HAS LCRDY CHANGED?
00C2 91 07              BM      LCWAIB          ;IF MI, YES
00C4 3D                 DS      I               ;TIMEOUT?,
00C5 94 FA              BNZ     LCWAIA          ;IF NZ, NOT YET
00C7 29 01 A8           JMP     LCFAL           ;ABORT MSG RCV ON TIMEOUT
00CA 20 32      LCWAIB  LI      LCTO            ;RESET TIMEOUT COUNT
00CC 5D                 LR      I,A
00CD 4C                 LR      A,S             ;UPDATE BUS CTRL
00CE 23 C0              XI      LCRDY+FCRDY
00D0 5C                 LR      S,A
                *
                * GET DATA AND SAVE
                *
00D1 58                 LISL    BFPLCL
00D2 4C                 LR      A,S
00D3 0B                 LR      IS,A
00D4 A5                 INS     PBUSD
00D5 5E                 LR      D,A
00D6 E6                 XS      CKSM            ;ENTER INTO CKSM
00D7 56                 LR      CKSM,A
00D8 C6                 AS      CKSM
00D9 19                 LNK
00DA 56                 LR      CKSM,A
00DB 0A                 LR      A,IS            ;UPDATE BUF PTR SAVE
                * GET BUF PTR WRAP AROUND IN THIS 8 BYTE BUFFER IF THE
                * LINE CARD IS SO FOOLISH AS TO SEND MORE THAN 8 BYTES.
00DC 62                 LISU    BFPLCU
00DD 68                 LISL    BFPLCL
00DE 5C                 LR      S,A
                *
                * MSG DONE?
                *
00DF 6B                 LISL    CNTLCL
00E0 3E                 DS      D
00E1 94 DA              BNZ     ACKLC           ;IF NZ, NOT YET
                *
                * ACK LAST BYTE
                *
00E3 4C                 LR      A,D
00E4 21 7F              NI      LCRDYA
00E6 B0                 OUTS    PBUSC
00E7 20 32              LI      LCTO            ;RE-LOAD SHOT CLOCK WHILE WE'RE HERE
00E9 5C                 LR      S,A
                *
                * CKSM OK?
                *
00EA 70                 CLR
00EB E6                 XS      CKSM
00EC 84 04              BZ      RCVDON          ;IF Z, MSG OK, PROCESS COMMAND
00EE 29 01 4F           JMP     CKSERR          ;NAK FOR CKSM ERR
                RCVDON  EQU     *
                ********
                ********
                *
                * PROCESS FUNCTION CARD COMMAND HERE
                *
                ********
                *
                * PROCESS COMMAND
                *
00F1 63         PROCMD  LISU    LCBUFU
00F2 6F                 LISL    LCBUFL
00F3 20 A0              LI      WRO             ;WRO
00F5 EC                 XS      S
00F6 94 04              BNZ     PRCMD1
00F8 29 01 A4           JMP     WROCMD          ;DO IT
                *
00FB 20 A1      PRCMD1  LI      GTCOVN          ;GET COV COUNT?
00FD EC                 XS      S
00FE 94 04              BNZ     PRCMD2
0100 29 01 BD           JMP     GTCNT
```

```
POI PROGRAM
                *
0103 20 82      PRCMD2  LI      FGTCOV          ;GET SOME COV?
0105 EC                 XS      S
0106 94 04              BNZ     PRCMD4
0108 29 01 E0           JMP     GTCV
                *
0109 20 83      PRCMD4  LI      FAKCOV          ;ACK COV
010D EC                 XS      S
010E 94 04              BNZ     PRCMD5
0110 29 02 67           JMP     AKCVD5
                *
                * MAKE SURE WE HAVE A VALID POINT NUMBER
                *
0113 6E         PRCMD5  LISL    LCBUFL-1
0114 7C                 LIS     H"0C"
0115 FD                 NS      I
0116 94 33              BNZ     NKBADP          ;IF NZ, INVALID POINT NUMBER
0118 20 11              LI      CHARPT          ;CHARACTERIZE POINT
011A EC                 XS      S
011B 94 04              BNZ     PCMD5
011D 29 02 AC           JMP     CHRPT
                *DDD
0120 20 E4      PCMD6   LI      H"E4"           ;READ ALL PT DB?
0122 EC                 XS      S
0123 94 04              BNZ     PRCMD6
0125 29 02 D8           JMP     GTALL
                *
0128 70         PRCMD6  CLR                     ;AT POWER-UP?
0129 E0                 XS      CRNTPT
012A 91 14              BM      NKCR            ;IF M, NAK, CHAREQ
                *
012C 76                 LIS     GETPNT          ;READ PT?
012D EC                 XS      S
012E 94 04              BNZ     PRCMD7
0130 29 02 A5           JMP     GTPT
                *
0133 77         PRCMD7  LIS     SETPNT          ;SET PT
0134 EC                 XS      S
0135 94 04              BNZ     PRCMD8
0137 29 02 AC           JMP     STPT
                PRCMD8  EQU     *
                *
                * UNRECOGNIZED COMMAND
                * COMMAND ERROR RESPONSE
                *
                PRCMD9  EQU     *
013A 63                 LISU    LCBUFU
013B 6E                 LISL    LCBUFL-1
013C 20 F0              LI      CMDERR
013E 5D         NAKRSP  LR      I,A
013F 20 15      NKRSP   LI      NAK
0141 5C                 LR      S,A
0142 90 14      RSP3    BR      RSP3AG
                *
                * NAK CHARSO
                *
0144 63         NKCR    LISU    LCBUFU
0145 6E                 LISL    LCBUFL-1
0146 20 FC              LI      CHAREQ
0148 90 F5              BR      NAKRSP
                *
                * INVALID POINT *
                *
014A 6E         NKBADP  LISL    LCBUFL-1
014B 20 F9              LI      INVPNT
014D 90 F0              BR      NAKRSP
                *
                * CHECKSUM ERROR ON COMMAND, NAK IT
                *
014F 63         CKSERR  LISU    LCBUFU          ;PUT RESPONSE INTO BUFFER
0150 6F                 LISL    LCBUFL
0151 20 15              LI      NAK
0153 5E                 LR      D,A
0154 20 C0              LI      FCRCKS
0156 5C                 LR      S,A
0157 73         RSP3AG  LIS     3
0158 13                 SL      1
0159 56                 LR      CKSM,A
                COMRET  EQU     *
015A 62                 LISU    BFPLCU          ;INIT BUFFER PTR
015B 68                 LISL    BFPLCL
015C 20 1F              LI      LCBUFR
015E 5C                 LR      S,A
015F 68         GTALRT  LISL    CNTLCL          ;INIT MSG CNT LESS CKSM PLUS COUNT BYTE
0160 46                 LR      A,CKSM
0161 12                 SR      1
0162 5E                 LR      D,A
0163 65                 OUTS    PBUSD           ;PUT MSG CNT INCLUDING CKSM ON BUS
                *
                * FALL THRU TO COMMON XMIT ROUTINE
                *
```

PDI PROGRAM

```
                *********
                *********
                *
                * FUNCTION CARD COMMAND PROCESSING ROUTINES COME HERE WHEN THEY ARE DONE
                * TO GET THEIR RESPONSES SENT TO THE LINE CARD.
                *
                * NOTE:  IT IS THE RESPONSIBILITY OF THE COMMAND PROCESSING ROUTINE TO
                *        PUT THE RESPONSE DATA IN THE BUFFER, SET THE BUFFER PTR IN BFPLCD,
                *        PUT THE COUNT OF THE NUMBER OF BYTES TO BE TRANSMITTED (NOT INCLUDING
                *        COUNT BYTE, INCLUDING CKSM) INTO CNTLCD AND ON THE POWERS BUS DATA
                *        PORT, PBUSD, AND INITIALIZE THE CKSM.  THE CKSM ERROR RESPONSE ABOVE
                *        GIVES YOU AN IDEA OF WHAT YOU HAVE TO DO.
                *
                *********
                *********
                *
                * WAIT HERE TO MAKE SURE THE BUS IS TURNED AROUND
                *
0164 A0         LCXMIT  INS     PBUSC
0165 EE                 XS      D
0166 91 07              BM      LCWATT          ;IF M, BUS IS TURNED
0168 3D                 DS      I               ;TIME OUT?
0169 94 FA              BNZ     LCXMIT          ;NOT YET
016B 29 01 A8           JMP     LCFAL           ;ABORT
016E 20 32      LCWATT  LI      LCTO            ;RESET TIMER AS LONG AS WE'RE HERE
0170 5D                 LR      I,A
0171 4C                 LR      A,S             ;UPDATE PBUS CTRL, CHANGE DIRECTION OF BUS
0172 23 E0              XI      LCRDY+FCRDY+PBSDIR
0174 5C                 LR      S,A
                *
                * ACKNOWLEDGE TURN AROUND AND TELL LC THAT COUNT IS ON THE BUS
                *
0175 4C         LCXMTL  LR      A,S
0176 21 7F              NI      LCRDYM
0178 B0                 OUTS    PBUSC
                *
                * WAIT UNTIL LC GETS THIS BYTE
                *
0179 A0         LCWATC  INS     PBUSC
017A EE                 XS      D               ;LCRDY?
017B 91 07              BM      LCWATD          ;IF MI, YES
017D 3D                 DS      I               ;TIMEOUT?
017E 94 FA              BNZ     LCWATC          ;IF NZ, NOT YET
0180 29 01 A8           JMP     LCFAL           ;ABORT SEND ON TIMEOUT
0183 20 32      LCWATD  LI      LCTO            ;RESET TO
0185 5D                 LR      I,A
0186 4C                 LR      A,S             ;UPDATE CTRL BYTE
0187 23 C0              XI      LCRDY+FCRDY
0189 5D                 LR      I,A
                *
                * MSG ALL OUT?
                *
018A 3E                 DS      D
018B 91 1C              BM      XMITDN          ;IF MI, CKSM OUT, WE'RE DONE
018D 94 05              BNZ     NXTLCX          ;IF NZ, GET NEXT CHAR FROM BUF
                *
                * UPON COUNT GOING TO ZERO, SEND CHECKSUM
                *
018F 46                 LR      A,CKSM          ;PUT IT ON BUS
0190 B5                 OUTS    PBUSD
0191 90 E3              BR      LCXMTL
                *
                * GET NEXT BYTE
                *
0193 68         NXTLCX  LISL    BFPLCD
0194 4C                 LR      A,S
0195 0B                 LR      IS,A
0196 4E                 LR      A,D
0197 B5                 OUTS    PBUSD           ;PUT NEXT BYTE ON BUS
0198 E6                 XS      CKSM            ;ENTER INTO CKSM
0199 56                 LR      CKSM,A
019A C6                 AS      CKSM
019B 19                 LNK
019C 56                 LR      CKSM,A
019D 0A                 LR      A,IS            ;UPDATE BUFFER PTR
019E 8F 03              BR7     ISOVFA          ;XMIT WILL GO ACROSS OCTET BOUNDARIES
01A0 24 F8              AI      -O"10"
01A2 62         ISOVFA  LISU    BFPLCD
01A3 68                 LISL    BFPLCD
01A4 5C                 LR      S,A
01A5 6A                 LISL    PBCTLL          ;SET ISAR FOR TOP OF LOOP
01A6 90 CE              BR      LCXMTL
                *
                * XMIT IS DONE, DE-SELECT BUS AND RETURN TO WORK
                *
                XMITDN  EQU     *
                LCFAL   EQU     *
01A8 20 20              LI      DSELPB
01AA B0                 OUTS    PBUSC
01AB 70                 CLR
01AC B5                 OUTS    PBUSD
```

```
                *
                * RESTORE AND RETURN FROM INTERRUPT
                *
01AD 2C                 XDC                     ;RESTORE DC;
01AE 48                 LR      A,ISARSV        ;ISAR,
01AF 0B                 LR      IS,A
01B0 47                 LR      A,ACCSAV        ;ACCUMULATOR,
01B1 1D                 LR      W,J             ;AND STATUS
01B2 1B                 EI
01B3 1C                 POP

                *
                * WRU COMMAND
                *
01B4 6E         WRUCMD  LISL    LCBUFL-1
01B5 20 49              LI      POI
01B7 5D                 LR      I,A
01B8 76         ACKRSP  LIS     ACK
01B9 5C                 LR      S,A
01BA 29 01 42           JMP     RSP3
                *
                * GET COV COUNT COMMAND
                *
01BD 6E         GTCNT   LISL    LCBUFL-1
01BE 70                 CLR
01BF E0                 XS      CRNTPT          ;POWER-UP FLAG SET?
01C0 81 06              BP      GTCNT1          ;IF P, NO
                *
                * WE'RE AT POWER-UP, ONLY COV IS CHAR REQ
                *
01C2 71                 LIS     1
01C3 5D                 LR      I,A
01C4 29 01 B8           JMP     ACKRSP
                *
                * NOT AT POWER-UP, DOES ANY POINT HAVE A COV?
                *
01C7 70         GTCNT1  CLR                     ;INIT COV COUNT
01C8 5A                 LR      FTMPA,A
01C9 64                 LISU    PTDBOU          ;POINT TO DATA BASE
01CA 6B                 LISL    FLAGS
                * CHECK NEXT POINT
01CB 20 40      GTCNT2  LI      COVFLG          ;COV PRESENT
01CD FC                 NS      S
01CE 84 06              BZ      GTCNT3          ;IF Z, NO
01D0 3A                 DS      FTMPA           ;DECR COUNT
01D1 4C                 LR      A,S             ;SET LINE CARD KNOWS FLAG
01D2 22 20              OI      LCKNFG
01D4 5C                 LR      S,A
01D5 0A         GTCNT3  LR      A,IS            ;NEXT POINT
01D6 24 08              AI      O"10"
01D8 0B                 LR      IS,A
01D9 21 38              NI      O"70"           ;ALL 4 DONE?
01DB 94 EF              BNZ     GTCNT2          ;IF NZ, NOT YET
01DD 63                 LISU    LCBUFU          ;SET UP ANSWER IN OUTPUT BUFFER
01DE 6E                 LISL    LCBUFL-1
01DF 4A                 LR      A,FTMPA         ;GET NEGATIVE COUNT
01E0 18                 COM                     ;MAKE IT POSITIVE
01E1 1F                 INC
01E2 5D                 LR      I,A
01E3 29 01 B8           JMP     ACKRSP

                *
                * GET CHANGE OF VALUE DATA
                *
                * CMD,ADDR,WHICH COV
                * ACK,ADDR,COV TYPE,0,ADDR,COV,0
                *
01E6 74         GTCV    LIS     4               ;CHECK MSG LENGTH
01E7 EA                 XS      FTMPA
01E8 84 08              BZ      GTCV10          ;IF Z, LENGTH OK
01EA 6E                 LISL    LCBUFL-1
01EB 20 6E              LI      LENERR          ;SET NOT-ENOUGH-DATA ERROR
01ED 5D                 LR      I,A
01EE 29 01 3F           JMP     NKRSP
                *
                * SET-UP BUFFER FOR RESPONSE
                *
01F1 6F         GTCV10  LISL    LCBUFL          ;SET ACK
01F2 76                 LIS     ACK
01F3 5E                 LR      D,A
01F4 4C                 LR      A,S             ;SET ADDR OF 1ST
01F5 21 70              NI      H"70"
01F7 22 80              OI      H"80"           ;ALL STATUS COV'S
01F9 5C                 LR      S,A
01FA 6B                 LISL    LCBUFL-4
01FB 5E                 LR      D,A             ;SET ADDR OF 2ND
01FC 20 0F              LI      POIERR
01FE 5E                 LR      D,A
01FF 70                 CLR
0200 5C                 LR      S,A
0201 6C                 LISL    LCBUFL-3
```

```
    POI PROGRAM
0202 50            LR     I,A
0203 4C            LR     A,S              ;SAVE WHICH COV TO START WITH
0204 5A            LR     FTMPA,A
0205 20 DF         LI     POIERR
0207 5C            LR     S,A
                *
                * DO WE REQUIRE CHARACTERIZATION?
                *
0208 70            CLR
0209 E0            XS     CRRIPT
020A 81 0B         BP     GTCV20           ;IF P, NO
020C 6D            LISL   LCBUFL-2         ;SET CHAR REQ CODE
020D 20 FC         LI     CHAREQ           ;REQUEST CHARACTERIZATION
020F 5E            LR     D,A
            GTCV18 EQU    *
0210 75            LIS    5
0211 13            SL     1
0212 56            LR     CKSM,A           ;CHECKSUM
0213 29 01 5A      JMP    CORRET
                *
                * CHECK WHICH COV THE LINE CARD WANTS
                *
0216 70     GTCV20 CLR

0217 EA            XS     FTMPA            ;IF Z, LC WANT'S FIRST TWO
                *
                * SKIP OVER C(ACC) COV'S
                *
0218 73            LIS    3                ;LOOK THRU 4 POINTS STARTING AT 3
0219 56            LR     FTMPC,A
021A 67            LISU   PT0330
021B 68            LISL   FLAGS
021C 84 1F         BZ     GTCV70           ;IF Z, LC WANTS FIRST TWO
021E 20 20  GTCV30 LI     LCKNFG           ;DOES THIS PT HAVE A COV THAT THE
0220 FC            NS     S                ;LINE CARD KNOWS OF?
0221 84 04         BZ     GTCV40           ;IF Z, NOTHING HERE
0223 3A            DS     FTMPA            ;SKIP THIS COV
0224 84 10         BZ     GTCV60           ;IF Z, WE'VE SKIPPED ENOUGH
                * CHECK NEXT POINT
0226 0A     GTCV40 LR     A,IS             ;UPDATE ISAR
0227 24 F8         AI     -O"10"
0229 0B            LR     IS,A
022A 36            DS     FTMPC            ;CHECKED ALL POINTS?
022B 82 F2         BC     GTCV30           ;IF C, NOT YET
                *
                * NOT ENOUGH COV'S HERE TO SKIP FOR LINE CARD
                *
022D 63     GTCV45 LISU   LCBUFU
022E 6E            LISL   LCBUFL-1         ;SET ERROR MSG
022F 20 EF         LI     CVERR
0231 5D            LR     I,A
0232 29 01 3F      JMP    NKRSP
                * WE'VE FOUND THE REQUIRED NUMBER OF COV'S TO SKIP
                *
0235 36     GTCV60 DS     FTMPC            ;NEXT PT
0236 92 F6         BNC    GTCV45           ;IF NC, NO PT'S LEFT!
0238 0A     GTCV65 LR     A,IS             ;UPDATE ISAR
0239 24 F8         AI     -O"10"
023B 0B            LR     IS,A
                *
                * CHECK NEXT POINT
                * ISAR AT FLAGS
                *
023C 20 20  GTCV70 LI     LCKNFG
023E FC            NS     S
023F 84 12         BZ     GTCV80           ;IF Z, NONE THERE
0241 70            CLR                     ;IF WE'VE ALREADY ENTERED ONE IN
0242 EA            XS     FTMPA            ;THE RSP BUFFER, FTMPA IS NON-ZERO
0243 94 17         BNZ    GTCV95
                *
                * WE'VE FOUND A COV TO RETURN
                *
0245 71            LIS    1
0246 5A            LR     FTMPA,A          ;MARK IT SO
                *
                * GET COV DATA TO RETURN FROM OCTET 20
                *
0247 63            LISU   LCBUFU           ;SET PT ADDR

0248 6E            LISL   LCBUFL-1         ;SET PT ADDR
0249 73            LIS    3
024A F6            NS     FTMPC
024B EC            XS     S
024C 5C            LR     S,A
                *
                * RESET ISAR TO FLAGS FOR THIS POINT
                *
024D 15            SL     4
024E 12            SR     1
024F 22 20         OI     O"40"
0251 0B            LR     IS,A
                *
```

```
                * NEXT POINT
                *
0252 36         GTCV80  DS      FTMPC           ;DONE WITH PT'S?
0253 82 E4              BC      GTCV65          ;IF C, NOT YET
                *
                * CHECKED ALL POINTS'S, DID WE FIND SOME TO SEND BACK?
                *
0255 70                 CLR
0256 EA                 XS      FTMPA
0257 84 D5              BZ      GTCV45          ;IF Z, NO , SEND ERROR
0259 90 35              BR      GTCV18          ;YES, SEND ONLY ONE BACK
                *
                * ENTER 2ND COV INTO DATA AND SEND RESPONSE
                *
025B 63         GTCV95  LISU    LCBUFU
025C 68                 LISL    LCBUFL-4
025D 73                 LIS     3
025E F6                 NS      FTMPC
025F EC                 XS      S
0260 5C                 LR      S,A
                *
                * SET FOR 2 COV RESPONSE
                *
0261 78                 LIS     8
0262 13                 SL      1
0263 56                 LR      CKSM,A
0264 29 01 5A           JMP     CORRET
                *
                * ACKNOWLEDGE COV
                *
0267 74         AKCV05  LIS     4               ;DO ALL 4 POINTS
0268 5A                 LR      FTMPA,A
0269 64                 LISU    PTUB00
026A 68                 LISL    FLAGS
026B 4C         AKCV10  LR      A,S             ;WAS THIS ONE REPORTED?
026C 21 20              NI      LCKNFG
026E 84 05              BZ      AKCV20          ;IF Z, NO
0270 4C                 LR      A,S
0271 21 9F              NI      ACKMSK          ;CLEAR COV PRESENT AND LC KNOWS FLAG
0273 5C                 LR      S,A
0274 0A         AKCV20  LR      A,IS
0275 24 08              AI      O"10"
0277 0B                 LR      IS,A
0278 3A                 DS      FTMPA
0279 94 F1              BNZ     AKCV10
027B 63         AKCV    LISU    LCBUFU
027C 6F                 LISL    LCBUFL
027D 76                 LIS     ACK
027E 5C                 LR      S,A
027F 72                 LIS     2
0280 13                 SL      1
0281 56                 LR      CKSM,A
0282 29 01 5A           JMP     CORRET
                *
                * GET POINT
                *
                GTPT    EQU     *
0285 6E                 LISL    LCBUFL-1
0286 73                 LIS     3
0287 FC                 NS      S
0288 24 04              AI      4
028A 13                 SL      1
028B 13                 SL      1
028C 13                 SL      1
028D 0B                 LR      IS,A
                *
                * CHECK FOR FAILED POINT
                *
028E 68                 LISL    FLAGS
028F 4C                 LR      A,S
0290 21 01              NI      PTFALD
0292 94 11              BNZ     GTPT10          ;IF NZ, IT'S FAILED
0294 6A                 LISL    CRNT
0295 4C                 LR      A,S
0296 63                 LISU    LCBUFU
0297 6E                 LISL    LCBUFL-1
0298 5E                 LR      D,A
0299 70                 CLR
029A 5C                 LR      S,A
029B 6F                 LISL    LCBUFL
029C 76                 LIS     ACK
029D 5C                 LR      S,A
029E 74                 LIS     4
029F 13                 SL      1
02A0 56                 LR      CKSM,A
02A1 29 01 5A           JMP     CORRET
                *
                * RESPOND WITH NAK, PNTFAL
                *
02A4 63         GTPT10  LISU    LCBUFU          ;POINT TO RESPONSE BUFFER
02A5 6E                 LISL    LCBUFL-1
02A6 20 F3              LI      PNTFAL          ;SET REASON
02A8 5D                 LR      I,A
02A9 29 01 3F           JMP     NKRSP           ;FINISH ELSEWHERE
                *
```

```
POI PROGRAM
                * CHARACTERIZE POINT ROUTINE
                * CMD, PT #, SETPT
                *
                CHRPT   EQU     *
                *
                * MARK NEW SETPOINT
                *
02AC 75         SIPT    LIS     5               ;VALID COMMAND LENGTH?
02AD EA                 XS      FIMPA
02AE 94 22              BNZ     STPT20          ;IF NZ, NO
02B0 6D                 LISL    LCBUFL-2        ;GET NEW SETPOINT
02B1 4D                 LR      A,I
02B2 5B                 LR      FIMPB,A         ;SAVE IT
                * RANGE CHECK IT
02B3 24 F8              AI      -8              ;GREATER THAN 7?
02B5 92 1B              BNC     STPT20          ;NO, TOO LOW
02B7 24 OF              AI      -241            ;LESS THAN 249?
02B9 82 17              BC      STPT20          ;IF C, NO TOO HI
02BB 73                 LIS     3               ;GET POINT NUMBER
02BC FC                 NS      S
02BD 15                 SL      4
02BE 12                 SR      1
02BF 22 20              OI      O"40"
02C1 0B                 LR      IS,A            ;POINT TO PTDB
02C2 6E                 LISL    SETPT
02C3 4B                 LR      A,FIMPB
02C4 5C                 LR      S,A
02C5 69                 LISL    STATE           ;SET SET STATE IF IN POWER UP
02C6 70                 CLR
02C7 EC                 XS      S
02C8 94 03              BNZ     STPT10          ;IF NZ, ALREADY MOVING
02CA 71                 LIS     SET
02CB 5C                 LR      S,A
02CC 73         STPT10  LIS     3               ;CLEAR POWER-UP FLAG
02CD F0                 NS      CRNTPT
02CE 50                 LR      CRNTPT,A
02CF 90 A5              BR      AKCV
                *
                * SETPOINT OUT-OF-RANGE
                * CHECK BOUNDARY CONDITIONS
                *
02D1 6E         STPT20  LISL    LCBUFL-1
02D2 20 EE              LI      DATAER
02D4 5D                 LR      I,A
02D5 29 01 3E           JMP     NKRSP
                *
                * GET ALL PT DB.     CMD,PT#
                *
02D8 6E         GTALL   LISL    LCBUFL-1
02D9 73                 LIS     3
02DA FC                 NS      S
02DB 15                 SL      4
02DC 12                 SR      1
02DD 22 27              OI      O"47"
02DF 62                 LISU    BFPLCU
02E0 68                 LISL    BFPLCL
02E1 5C                 LR      S,A
02E2 79                 LIS     9
02E3 13                 SL      1
02E4 56                 LR      CKSM,A
02E5 29 01 5E           JMP     GTADRT
                *
                * BACKGROUND ROUTINE
                * READ INPUTS AND PROCESS ANY COMMANDS
                *
                BGRND   EQU     *
                *
                * UPDATE MILLISECOND CLOCK AND FIND MS SINCE LAST READ
                *
02E8 7F         TIMCHK  LIS     MSCK            ;MAKE SURE MSTIMER IS MOVING
02E9 55                 LR      IMPC,A
02EA 20 04      IMCK05  LI      ROMCHK          ;CLEAR TIME FLAGS AND SET ROM CHECK FLAG
02EC 05                 LR      KU,A
02ED 1A                 DI                      ;;;HOLD OFF EXT INT WHILE WE DO IT
02EE A4                 INS     MSTIMR          ;;;
02EF 53                 LR      IMPA,A          ;;;STABILIZE RIPPLE COUNTER
02F0 A4                 INS     MSTIMR          ;;;SOFTWARE ALWAYS COVERS FOR HARDWARE
02F1 E3                 XS      IMPA            ;;;
02F2 84 03              BZ      IMCK10          ;;;
02F4 A4                 INS     MSTIMR          ;;;
02F5 53                 LR      IMPA,A          ;;;
02F6 1B         IMCK10  EI                      ;;;
02F7 13                 LR      A,IMPA          ;;;
02F8 18                 COM                     ;MAKE IT COUNT UP
02F9 53                 LR      IMPA,A
                *
                * SUBTRACT CURRENT TIME FROM LAST READ
                *
02FA 18                 COM
02FB 1F                 INC
```

```
02FC C2                 AS      TIMEL
02FD 54                 LR      DLTATL,A      ;SAVE MINUS DELTA T
02FE 43                 LR      A,TMPA        ;UPDATE CURRENT TIME
02FF 52                 LR      TIMEL,A
0300 94 07              BNZ     TMCK13        ;IF NZ, TIME HAS CHANGED
0302 35                 DS      TMPC          ;IT BETTER CHANGE SOME TIME
0303 94 E9              BNZ     TMCK05        ;IF NZ, DON'T KILL IT YET
0305 29 07 DB           JMP     BSTFAL        ;HSTIMER IS DEAD
0308 92 06     TMCK13   BNC     TMCK20        ;IF NC, POSSIBLY NO INCR FOR HI TIME
030A 41        TMCK15   LR      A,TIMEH
030B 1F                 INC
030C 51                 LR      TIMEH,A       ;UPDATE HI TIME
030D 71                 LIS     LONGTK
030E 05                 LR      KL,A          ;SET LONG TICK HAPPENED FLAG
030F 90 05              BR      TMCK25
               TMCK20   EQU     *
0311 70                 CLR                   ;READ A ZERO?
0312 E3                 XS      TMPA
0313 84 F6              BZ      TMCK15        ;IF Z, YES, MUST HAVE ROLLED OVER.
                *
                * UPDATE ANY TIME DELAYS IN POINT DB
                *
0315 70        TMCK25   CLR
0316 55                 LR      CPT,A         ;SET CURRENT POINT NUMBER
                *
0317 64                 LISU    PTDB00        ;POINT TO FIRST POINT'S DATA BASE
0318 69        TMUPLP   LISL    STATE         ;IS THIS A SETTLING TIME DELAY STATE?
0319 70                 CLR
031A EC                 XS      S
031B 84 1F              BZ      TMUPC2        ;IF Z, POWER UP
031D 25 01              CI      SET
031F 84 1B              BZ      TMUPC2        ;IF Z, SET STATE, LEAVE ROMCHK FLAG SET
0321 01                 LR      A,KL          ;NOT AT A TIME WHEN WE CAN DO ROM CKSM
0322 21 F4              NI      ROMCKH
0324 05                 LR      KL,A
0325 4C                 LR      A,S
0326 25 08              CI      RND           ;RUN DELAY?
0328 84 05              BZ      TMUP10        ;IF Z, YES
032A 25 0C              CI      HID           ;HOMING IN DELAY?
032C 94 10              BNZ     TMUP20        ;IF NZ, NO
                *
                * THIS POINT HAS A LONG TIME OUT ACTIVE
                *
032E 01        TMUP10   LR      A,KL
032F 21 01              NI      LONGTK        ;DID HI BYTE CHANGE?
0331 84 50              BZ      TMUPCY        ;IF Z, NO, NO UPDATE
0333 6D                 LISL    LONGDL        ;POINT TO LONG DELAY
0334 3C                 DS      S
0335 94 4C              BNZ     TMUPCY        ;IF NZ, DELAY NOT DONE
0337 69                 LISL    STATE         ;MARK DELAY DONE
0338 4C                 LR      A,S
0339 1F                 INC
033A 5C                 LR      S,A
033B 90 46     TMUPC2   BR      TMUPCY        ;NEXT POINT
                *
                * START A SHORT TIME OUT?
                *
033D 25 0A     TMUP20   CI      HIXP
033F 94 09              BNZ     TMUP29
                *
                * SET NEXT STATE, DON'T DECREMENT TIME, BUT DO CHECK FOR IMMINENT TIME OUT
                *
0341 4C        TMUP25   LR      A,S
0342 1F                 INC
0343 5C                 LR      S,A
0344 6D                 LISL    EXACTL
0345 70                 CLR
0346 EC                 XS      S
0347 90 34              BR      TMUP59
                *
                * ANY SHORT TIME-OUT ACTIVE?
                *
0349 25 0B     TMUP29   CI      HIX
034B 94 36              BNZ     TMUPCY        ;IF NZ, NO, NEXT POINT
                *
                * UPDATE SHORT COUNT
                *
034D 6D        TMUP30   LISL    EXACTL
034E 44                 LR      A,DLTATL
034F CC                 AS      S
0350 5C                 LR      S,A
0351 84 0C              BZ      TMUP40        ;IF Z, COUNT JUST DONE
0353 82 28              BC      TMUP59        ;IF C, NOT DONE YET
0355 6E                 LISL    EXTSVL        ;ADD OVERFLOW
0356 18                 COM
0357 1F                 INC
0358 CC                 AS      S             ;CHECK OVERFLOW
0359 92 03              BNC     TMUP35
035B 20 FF              LI      -1
035D 5C        TMUP35   LR      S,A
                *
                * COUNT IS DONE
                *
```

```
035E 73        THUP40  LIS    3           ;TURN OFF VALVE
035F F5                NS     CPT         ;GET CHANNEL #
0360 13                SL     1
0361 53                LR     TMPA,A
0362 68                LISL   FLAGS       ;GET DIRECTION
0363 4C                LR     A,S
0364 CC                AS     S
0365 43                LR     A,TMPA
0366 19                LNK                ;MERGE
0367 22 08             OI     VLVOFF      ;TURN VALVE OFF
0369 1A                DI                 ;;;HOLD OFF L.C.
036A B1                OUTS   POICTL      ;;;PRESET LATCHES
036B 22 10             OI     VLVENB      ;;;ENABLE LATCH
036D B1                OUTS   POICTL      ;;;
036E 23 10             XI     VLVENB      ;;;DISABLE LATCH
0370 1B                EI                 ;;;L.C. OK
0371 B1                OUTS   POICTL      ;;;
0372 69                LISL   STATE       ;SET POINT TO NEXT STATE, SETTLE DELAY
0373 4C                LR     A,S
0374 1F                INC
0375 5C                LR     S,A
0376 6D                LISL   LONGDD      ;SET SETTLE TIME DELAY
0377 20 09             LI     SETDLY
0379 5C                LR     S,A
037A 90 07             BR     THUPCY      ;NEXT POINT
               *
               * SHORT NOT TIMED OUT
               *
               *
               * IS THIS TIME OUT IMMINENT?
               *
               THUP50  EQU    *
037C 91 05             BM     THUPCY      ;IF M, NO
037E 01                LR     A,KL        ;SET TIMEOUT IMMINENT FLAG
037F 22 02             OI     HIXIMM
0381 05                LR     KL,A
               *
               * NEXT POINT
               *
0382 0A        THUPCY  LR     A,IS        ;UPDATE ISAR
0383 24 08             AI     O'10'
0385 0B                LR     IS,A
0386 45                LR     A,CPT       ;UPDATE CURRENT POINT
0387 1F                INC
0388 21 03             NI     3
038A 55                LR     CPT,A
038B 84 04             BZ     THUP90      ;IF Z, NO MORE UPDATE?
038D 29 03 16          JMP    THUPLP      ;CHECK ANOTHER PT
               *
               * IF ANY TIMEOUT IS IMMINENT THEN HANG AROUND UNTIL IT ENDS.
               *
0390 01        THUP90  LR     A,KL        ;GET TIMER FLAGS
0391 21 02             NI     HIXIMM
0393 84 04             BZ     THUP99      ;IF Z, NONE READY
0395 29 02 E8          JMP    TIMCHK
               THUP99  EQU    *
               *
               * CHECK NEXT POINT FOR READY TO READ
               *
0398 74                LIS    4           ;CHECK ALL 4 POINTS
0399 55                LR     CPT,A
039A 1A        LEXIPT  DI                 ;BUMP POINT
039B 40                LR     A,CRNTPT
039C 1F                INC
039D 21 83             NI     H'83'
039F 1B                EI
03A0 50                LR     CRNTPT,A
03A1 21 03             NI     3           ;AT POINT 0?
03A3 94 23             BNZ    NXTPTS      ;IF NZ, NO
03A5 01                LR     A,KL        ;YES, NO EXACT T.O. WAITING
03A6 21 04             NI     ROMCHK      ;ALL PT'S INACTIVE?
03A8 84 1E             BZ     NXTPTS      ;IF Z, NO, WAIT ROM CHECKSUM UNTIL LATER
               *
               * CALCULATE ROM CHECKSUM
               *
               * XOR AND ROTATE LEFT ALL BYTES IN ROM
               *
03AA 2A 00 00          DCI    0           ;START AT 0
03AD 70                CLR                ;INIT CKSM TO 0
03AE 55                LR     TMPC,A
03AF 1B        CKSMLP  EI
03B0 45                LR     A,TMPC      ;GET CURRENT CKSM
03B1 8C                XM                 ;XOR NEXT BYTE AND BUMP DC
03B2 55                LR     TMPC,A
03B3 C5                AS     TMPC
03B4 19                LNK
03B5 55                LR     TMPC,A      ;SAVE CKSM
03B6 1A                DI
03B7 11                LR     H,DC        ;PUT DC WHERE ACCUMULATOR CAN GET TO IT ALL
03B8 70                CLR                ;LO BYTE OF ROM PTR EQUAL 0?
03B9 EB                XS     11
03BA 94 F4             BNZ    CKSMLP      ;NO, NOT DONE YET.
03BC 77                LIS    7           ;YES, HI BYTE 0, TOO?
03BD FA                NS     10
```

```
03BE 18                EI
03BF 94 EF             BNZ    CKSMLP        ;NOT YET
03C1 E5                XS     TMPC          ;CKSM = 0?
03C2 84 04             BZ     NXTPT5
03C4 29 07 D5          JMP    BSTFAL        ;BYE
03C7 40       NXTPT5   LR     A,CRNTPT
03C8 15                SL     4             ;POINT TO DATA BASE OF CURRENT POINT
03C9 12                SR     1
03CA 22 20             OI     O'40'
03CC 0B                LR     IS,A
03CD 69                LISL   STATE         ;GET STATE
03CE 70                CLR
03CF EC                XS     S
03D0 84 17             BZ     RSTRED
03D2 25 01             CI     SET
03D4 84 13             BZ     RSTRED
03D6 25 07             CI     R04
03D8 84 0F             BZ     RSTRED
03DA 25 09             CI     RHX
03DC 84 0B             BZ     RSTRED
03DE 25 0D             CI     ADD
03E0 94 07             BZ     RSTRED
              *
              * THIS POINT NOT READY TO READ
              *
03E2 35       NORDRD   DS     CPT           ;HAVE WE CHECKED ALL 4?
03E3 94 B6             BNZ    NEXTPT        ;IF NZ, NOT YET
03E5 29 02 E8          JMP    TIMCHK        ;NO ONE READY TO READ, UPDATE CLOCK

              *
              * READ-A-POINT
              *
              * RANGE CHECK
              * IS PERIOD WITHIN RANGE?
              * 97 TO 577 US
              *
03E8 20 21    RSTRED   LI     TIMSTP        ;STOP TIMER
03EA B6                OUTS   ICP
03EB 20 2A             LI     OVRNG         ;SET OVER RANGE TIME-OUT VECTOR
03ED 07                LR     QL,A
03EE 70                CLR
03EF 06                LR     QU,A
03F0 40                LR     A,CRNTPT      ;SELECT FREQ INPUT
03F1 13                SL     1
03F2 15                SL     4
03F3 21 60             NI     FREQM
03F5 B1                OUTS   POICTL
03F6 70                CLR
03F7 58                LR     ISARSV,A      ;CLEAR INTERRUPTED FLAG
              *
              * ARE WE AT A LOW OR A HI.
              * SYNCHRONIZE WITH INP. THE HI AFTER THE SECOND LOW IS CHECKED
              * FOR A VALID PERIOD.
              *
03F8 A1                INS    POICTL
03F9 91 0D             BM     HIB4CK        ;WATCH HI BEFORE CHECK
03FB 20 F0             LI     MXPERD
03FD B7                OUTS   TIMERD
03FE 20 48             LI     MXPERC
0400 B6                OUTS   ICP
0401 A1                INS    POICTL
0402 81 FE             BP     *-1
0404 20 21             LI     TIMSTP
0406 B6                OUTS   ICP
0407 20 F0    HIB4CK   LI     MXPERD        ;SET MAX PERIOD DELAY AND WAIT FOR A LOW
0409 B7                OUTS   TIMERD
040A 20 48             LI     MXPERC
040C B6                OUTS   ICP
040D A1                INS    POICTL
040E 91 FE             BM     *-1
0410 20 21             LI     TIMSTP        ;RESET TIMER
0412 B6                OUTS   ICP
              *
              * LOW FOUND, WAIT FOR A HI TO TIME
              *
0413 20 F0    RNGCK1   LI     MXPERD        ;SET MAX PERIOD DELAY
0415 B7                OUTS   TIMERD
0416 20 48             LI     MXPERC
0418 B6                OUTS   ICP
0419 A1                INS    POICTL        ;WAIT FOR HI
041A 81 FE             BP     *-1
041C 20 21             LI     TIMSTP

041E B6                OUTS   ICP           ;RESET TIMER
041F 70                CLR
0420 E8                XS     ISARSV        ;INTERRUPTED?
0421 94 C6    RSTRD2   BNZ    RSTRED        ;IF NZ, YES
              *
              * FOUND HI
              * DETECT RISING EDGE TO START TIMER IS 49 US + 5.5 US UNCERTAINTY
              * DETECT FALLING EDGE TO STOP TIMER IS 23 US + 5.5 US UNCERTAINTY
              * PULSE PERIOD IS TIMERD PLUS 54.5 - 28.5 US = TIMERD +26 US +- 11 US.
```

```
                 * THE WORST CASE VALID TIMER DATA READING FOR THE MAXIMUM PERIOD IS 65 US
                 * OR 26 COUNTS, FOR THE MINIMUM PERIOD 497 US OR 199 COUNTS.
                 *
                 ****************************** NOT EXACTLY RIGHT*********************
0423 20 F0               LI      MXPERD          ;START TIMER
0425 B7                  OUTS    TIMERD
0426 20 4B               LI      MXPERC
0428 B6                  OUTS    ICP
0429 A1                  INS     POICIO          ;WAIT FOR GO
042A 91 FE               BM      *-1
042C 20 21               LI      TIMSTP          ;STOP TIMER
042E B6                  OUTS    ICP
042F 70                  CLR
0430 E8                  XS      ISARSV          ;INTERRUPTED?
0431 94 36               BNZ     RSTRED          ;IF NZ, YES
0433 A7                  INS     TIMERD
0434 25 EC               CI      236             ;CHECK ALMOST INTERRUPTED
0436 92 37               BNC     RGERL           ;YES, FREQ TOO LOW
0438 25 DC               CI      220             ;FREQ OUT-OF-RANGE HI?
043A 92 36               BNC     RGERH           ;IF NC, YES
043C 25 13               CI      19              ;FREQ OUT-OF-RANGE LO?
043E 82 2F               BC      RGERL           ;IF C, YES
                 *
                 * RANGE IS VALID, INIT READ AND WAIT FOR 1ST EDGE
                 *
0440 20 F0               LI      MXPERD          ;SET MAX TIME OUT
0442 B7                  OUTS    TIMERD
0443 20 4B               LI      MXPERC
0445 B6                  OUTS    ICP
0446 A1                  INS     POICIO          ;WAIT FOR HI
0447 81 FF               BP      *-1
0449 20 21               LI      TIMSTP
044B B6                  OUTS    ICP
044C 20 23               LI      PTREDI          ;SET PT READ INT VECTOR
044E 07                  LR      QL,A
044F 20 FF               LI      H'FF'           ;INIT HI-ORDER BYTE OF TIME
0451 54                  LR      HICNT,A
0452 70                  CLR                     ;START 1 US TIMER FOR POINT READ
0453 B7                  OUTS    TIMERD
0454 20 28               LI      PTREDC          ;READ-A-POINT CONTROL
0456 B6                  OUTS    ICP
0457 20 1F               LI      31              ;CURRENT PULSE COUNT
0459 55                  LR      PLSCNT,A
                 *
                 * WAIT FOR GO
                 *
045A A1          WAITGO  INS     POICIO
045B 91 FE               BM      WAITGO
045D 35                  DS      PLSCNT          ;DONE COUNTING?
045E 84 54               BZ      LSTCNT          ;IF Z, YES
0460 70                  CLR                     ;INTERRUPTED?
0461 E8                  XS      ISARSV
0462 94 0E               BNZ     RSTRD2          ;IF NZ, YES, RETRY
0464 A1          WAITHI  INS     POICIO          ;WAIT FOR HI
0465 81 FF               BP      *-1
0467 70                  CLR                     ;INTERRUPTED?
0468 E8                  XS      ISARSV
0469 94 07               BNZ     RSTRD2          ;IF NZ, YES, RETRY
046B 35                  DS      PLSCNT          ;SHOULD NEVER FINISH COUNTING HERE
046C 90 ED               BR      WAITGO
                 *
                 * FREQ OUT OF RANGE
                 *
046E 70          RGERL   CLR                     ;TOO LOW
046F 90 03               BR      RGERC
0471 20 FF       RGERH   LI      -1              ;TOO HI
0473 53          RGERC   LR      TMPA,A
0474 6A                  LISL    CRNT            ;SET DATA BASE
0475 5C                  LR      S,A
                 *
                 * MARK PT FAILED AND UPDATE PT FAILED BEFORE FLAG
                 *
0476 68                  LISL    FLAGS
0477 71                  LIS     1               ;SAVE PREVIOUS FAILURE STATE
0478 1A                  DI
0479 FC                  NS      S
047A 13                  SL      1
047B 1F                  INC                     ;SET FAILED BIT
047C 54                  LR      TMPB,A
047D 20 FC               LI      PTRETM          ;CLEAR PREVIOUS FLAGS
047F FC                  NS      S
0480 E4                  XS      TMPB
0481 1B                  EI
0482 5D                  LR      I,A             ;UPDATE FLAGS
                 *
                 * IN POWER UP?
                 *
0483 70                  CLR
0484 EE                  XS      D
0485 94 04               BNZ     RNGER2          ;IF NZ, NO
0487 29 05 9B            JMP     PROPUP          ;YES, DO IT
                 *
048A 25 07       RNGER2  CI      RUN             ;RUN?
```

```
048C 84 13               BZ      RNGER3          ;IF Z, YES
                   *
                   * IN ALL OTHER STATES SET PROPER DIRECTION AND START RUNNING
                   * ISAR AT FLAGS
                   *
048E 20 80               LI      DIRFLG          ;GET CORRECT DIRECTION FROM CRNT POS
0490 F3                  NS      TMPA
0491 54                  LR      TMPB,A
0492 20 7F               LI      DRFLGM
0494 1A                  DI
0495 FC                  NS      S
0496 E4                  XS      TMPB
0497 1B                  EI
0498 5C                  LR      S,A             ;SET DIRECTION
0499 6C                  LISL    ERRCNT          ;RESET ERROR COUNT
049A 20 20               LI      MAXTRY
049C 5C                  LR      S,A
049D 29 05 63            JMP     SETRUN
                   *
                   * THIS FAILED POINT IS IN THE RUN OR RUNP STATE
                   *
04A0 72          RNGER3  LIS     PIFALB          ;FAILED BEFORE?
04A1 FC                  NS      S
04A2 94 04               BNZ     RNGER4          ;IF NZ, YES
04A4 29 06 C8            JMP     PRUN35          ;NO, STOP MOVING IT
                   *
                   * STILL MOVING IN PROPER DIRECTION?
                   *
04A7 20 80       RNGER4  LI      DIRFLG
04A9 FC                  NS      S
04AA C3                  AS      TMPA
04AB 81 04               BP      RNGER5          ;IF P, OK
04AD 29 06 6E            JMP     PRUN22          ;NO KILL IT
04B0 29 05 81    RNGER5  JMP     USPTCH
                   *
                   * CHOOSE A TIME DELAY TO ENSURE NO INTERRUPTION OF LAST EDGE READ
                   *
04B3 44          LSTCNT  LR      A,HICNT         ;2'S COMPLEMENT HICNT
04B4 18                  COM
04B5 14                  SR      4
04B6 84 24               BZ      LSTC13
04B8 25 01               CI      1
04BA 84 20               BZ      LSTC13
04BC 25 02               CI      2
04BE 84 16               BZ      LSTC11
04C0 25 03               CI      3
04C2 94 05               BNZ     LSTC14
04C4 20 0F               LI      15              ;DELAY AN EXTRA 150 US
04C6 90 10               BR      LSTC12
04C8 25 04       LSTC14  CI      4
04CA 84 06               BZ      LSTC15
04CC 20 21               LI      TIMSTP          ;FREQ OUT OF RANGE LOW
04CE 66                  OUTS    ICP
04CF 90 55               BR      RGERL2          ;TROD
04D1 20 19       LSTC15  LI      25              ;WAIT EXTRA 250 US
04D3 90 03               BR      LSTC12
04D5 20 05       LSTC11  LI      5               ;DELAY AN EXTRA 50 US
04D7 53          LSTC12  LR      TMPA,A
04D8 33                  DS      TMPA            ;DELAY 10 US PER TABLE ENTRY COUNT
04D9 94 FE               BNZ     *-1
                   *
                   * WE'RE WITHIN 255 US OF READING THE LAST EDGE.
                   * READ CURRENT TIME AND SAVE.
                   * DISABLE TIMER INT'S SO THEY DON'T INTERFERE WITH FINDING
                   * LAST EDGE.
                   *
                 LSTC13  EQU     *
04DB 20 29               LI      TMISTP          ;DISABLE TIMER INT BUT LET COUNTER RUN
04DD 66                  OUTS    ICP
04DE A7                  INS     TIMERD
04DF 53                  LR      TMPA,A
                   *
                   * WAIT FOR LAST EDGE
                   *
04E0 A1                  INS     POICTL          ;WAIT FOR HI
04E1 81 FE               BP      *-1
04E3 A7                  INS     TIMERD          ;GET CURRENT TIME
04E4 05                  LR      KL,A            ;SAVE IT
04E5 20 21               LI      TIMSTP          ;STOP TIMER
04E7 66                  OUTS    ICP
04E8 70                  CLR                     ;HAVE WE BEEN INTERRUPTED?
04E9 E8                  XS      ISARSV
04EA 84 04               BZ      *+5             ;IF Z, NO, CONTINUE
04EC 29 03 EB            JMP     RSTRED          ;YES, RETRY
04EF 43                  LR      A,TMPA          ;IF ELAPSED TIME AS REFLECTED IN TIMERD IS
04F0 24 28               AI      40              ;LESS THAN MIN TIME TO BE FOUND WITH INT'S
                   *                             ;ENABLED, INT'S WERE DISABLED JUST BEFORE
                   *                             ;ROLL-OVER SO UPDATE HICNT
04F2 92 04               BNC     LSTC16          ;IF NC, NO UPDATE
04F4 34                  DS      HICNT
04F5 84 2F               BZ      RGERL2          ;IF Z, FREQ OUT OF RANGE LO
04F7 01          LSTC16  LR      A,KL            ;SUBTRACT CURRENT FROM LAST TO
```

```
04F8 14             COM                 ;SEE IF TIMER ROLLED OVER
04F9 1F             INC
04FA C3             AS      TMPA
04FB 82 04          BC      TMADJ1      ;IF C, IT DIDN'T
04FD 34             DS      HICNT       ;IT DID, ADJUST HICNT
04FE 84 26          BZ      RGERL2      ;IF Z, FREQ TOO LOW
                *
                * MAKE PERIOD POSITIVE, ADD OVERHEAD ADJUSTMENT,
                *
0500 44     TMADJ1  LR      A,HICNT     ;2'S COMPLEMENT
0501 18             COM
0502 54             LR      HICNT,A
0503 01             LR      A,KL
0504 18             COM
0505 1F             INC
0506 53             LR      TMPA,A
0507 44             LR      A,HICNT
0508 2B             NOP                 ;ABOVE CALCULATION TAKES CARE OF LINK
0509 54             LR      HICNT,A
                * ADD OVERHEAD
050A 20 41          LI      OVRHED
050C C3             AS      TMPA
050D 53             LR      TMPA,A
050E 44             LR      A,HICNT
050F 19             LNK
0510 54             LR      HICNT,A
0511 82 13          BC      RGERL2      ;FREQ TOO LOW
                *
                * HI VALUE IN HICNT, LOW IN TMPA
                *
            TMADJ3  EQU     *
                * RANGE CHECK THIS RESULT:  3117.<=PERIOD<=18461.
                * SUBTRACT 3117, IF RESULT GIVES CARRY, GOOD
                *
0513 43             LR      A,TMPA
0514 24 D3          AI      H"D3"
0516 20 F3          LI      H"F3"
0518 19             LNK
0519 C4             AS      HICNT
051A 92 00          BNC     RGERH2      ;IF NC, FREQ TOO HI
                *
                * SUBTRACT 18462, IF RESULT GIVES NO CARRY, RANGE OK
                *
051C 43             LR      A,TMPA
051D 24 E2          AI      H"E2"
051F 20 B7          LI      H"B7"
0521 19             LNK
0522 C4             AS      HICNT
0523 92 07          BNC     DIVCNG      ;IF NC, FREQ NOT TOO LO
0525 29 04 6E RGERL2  JMP   RGERL
0528 29 04 71 RGERH2  JMP   RGERH
                *
                *
                * DIVIDE INTO 960,000 TO GET FREQUENCY-RELATED NUMBER
                * RESULT IN TMPA/KL
                * LOOP COUNT = KU
                * DNDLO = KL
                * DVDML = TMPA
                * DNDMH = TMPB
                * DNDHI = TMPC
                * DVISRL = QL
                * DVISRH = QU
                *
                * TAKE 2'S COMPLEMENT OF PERIOD
                *
052B 44     DIVCNG  LR      A,HICNT
052C 18             COM
052D 06             LR      QU,A
052E 43             LR      A,TMPA
052F 18             COM
0530 1F             INC
0531 07             LR      QL,A
0532 02             LR      A,QU
0533 19             LNK
0534 06             LR      QU,A
                *
                * SET DIVIDEND TO 960,000
                *
0535 70             CLR
0536 55             LR      DNDHI,A
0537 7E             LIS     H"0E"
0538 54             LR      DNDMH,A
0539 20 A6          LI      H"A6"
053B 53             LR      DNDML,A
053C 70             CLR
053D 05             LR      KL,A
053E 20 F0          LI      -16         ;INIT LOOP COUNT
0540 04             LR      KU,A
                * MPY DIVIDEND AND QUOTIENT BY 2
0541 01     DIVLP   LR      A,KL
0542 22 00          OI      0
0544 81 09          BP      DIV02
```

```
0546 13                   SL      1
0547 05                   LR      KL,A
0548 43                   LR      A,DNDML
0549 1F                   INC
054A 82 08                BC      DIV06
054C 90 04                BR      DIV05
054E 13         DIV04     SL      1
054F 05                   LR      KL,A
0550 43                   LR      A,DNDML
0551 C3         DIV05     AS      DNDML
0552 53                   LR      DNDML,A
0553 44         DIV06     LR      A,DNDMH
0554 19                   LNK
0555 82 03                BC      *+4
0557 C4                   AS      DNDMH
0558 54                   LR      DNDMH,A
0559 45                   LR      A,DNDHI
055A 19                   LNK
055B C5                   AS      DNDHI
055C 55                   LR      DNDHI,A
                * COMPARE
055D 03                   LR      A,DL
055E C4                   AS      DNDMH
055F 02                   LR      A,DU
0560 19                   LNK
0561 92 04                BNC     DIV07
0563 C5                   AS      DNDHI
0564 90 04                BR      DIV08
0566 C5         DIV07     AS      DNDHI
0567 92 09                BNC     DIV10          ;IF NC, NO UPDATE
0569 55         DIV08     LR      DNDHI,A
056A 03                   LR      A,DL
056B C4                   AS      DNDMH          ;UPDATE DIVIDEND
056C 54                   LR      DNDMH,A
056D 01                   LR      A,KL           ;SET BIT IN QUOTIENT
056E 22 01                OI      1
0570 05                   LR      KL,A
0571 00         DIV10     LR      A,KU           ;DIVIDE DONE?
0572 1F                   INC
0573 04                   LR      KU,A
0574 94 CC                BNZ     DIVLP
                *
                * SUBTRACT OFFSET OF 52 FROM KL
                *
0576 01                   LR      A,KL
0577 24 CC                AI      -52
0579 53                   LR      TMPA,A
                *
                * CLEAR PT FAILED AND WAS FAILED LAST TIME
                *
057A 68                   LISL    FLAGS
057B 20 FC                LI      PTFLIM
057D 1A                   DI
057E FC                   NS      S
057F 1B                   EI
0580 5C                   LR      S,A
                *
                * DISPATCH ON CURRENT STATE
                *
0581 69         DSPTCH    LISL    STATE
0582 70                   CLR
0583 EC                   XS      S
0584 84 16                BZ      PROPUP
0586 25 01                CI      SET
0588 84 1?                BZ      PROSET
                *
058A 25 07      DSPCH2    CI      RUN
058C 94 04                BNZ     DSPCH4
058E 29 05 2E             JMP     PRORUN
                *
0591 25 09      DSPCH4    CI      RNX
0593 94 04                BNZ     DSPCH6
0595 29 06 ED             JMP     PRORDX
                *
0598 29 07 33   DSPCH6    JMP     PROHOD
                *
                * PROCESS POINT FROM POWER UP
                *
                PROPUP    EQU     *
                *
                * SET CURRENT POSITION
                *
059B 43         PPUPIO    LR      A,TMPA
059C 6A                   LISL    CRNT
059D 5C                   LR      S,A
059E 29 02 E8             JMP     BGRND
                *
                * CHECK EDGE POINT
                *
                PROSET    EQU     *
                *
```

```
                * MOVE CURRENT READ TO CURRENT DB
                *
05A1 6A         PSET10  LISL    CRNT
05A2 43                 LR      A,IMPA
05A3 5C                 LR      S,A
                *
                * 2'S COMPLEMENT CURRENT POSITION
                *
05A4 18                 COM
05A5 1F                 INC
                *
                * SUBTRACT CURRENT FROM SETPOINT
                *
05A6 6B                 LISL    SETPT
05A7 CC                 AS      S
05A8 84 61              BZ      CLSEND          ;RIGHT ON SETPOINT
05AA 55                 LR      IMPC,A          ;SAVE DIFFERENCE
                * TENTH POUND ERROR
05AB 82 19              BC      PSET15          ;IF C, DIFF IS POSITIVE
05AD 24 01              AI      DEADBD          ;IF OFF BY .05 PSIG OR LESS, OK
05AF 82 58              BC      CLSEND
05B1 45                 LR      A,IMPC          ;MAKE DISTANCE TO SETPOINT POSITIVE
05B2 18                 COM
05B3 1F                 INC
05B4 55                 LR      IMPC,A
                *
                * DIFFERENCE IS NEGATIVE
                * EXHAUST IS CALLED FOR
                *
05B5 68                 LISL    FLAGS           ;EXHAUSTING BEFORE?
05B6 70                 CLR
05B7 EC                 XS      S
05B8 81 06              BP      PSET12          ;IF P, NO
05BA 6F                 LISL    RATE            ;YES, IS RATE KNOWN?
05BB 70                 CLR
05BC EC                 XS      I
05BD 94 1F              BNZ     PSET20          ;IF NZ, YES
05BF 1A         PSET12  DI                      ;SET DIRECTION FOR EXHAUST
05C0 4C                 LR      A,S
05C1 22 80              OI      DIRFLG
05C3 1B                 EI
05C4 5C                 LR      S,A
05C5 90 58              BR      PSET50
                *
                * DIFF IS POSITIVE
                * SUPPLY IS CALLED FOR
                *
05C7 24 FF      PSET15  AI      -DEADBD         ;IF OFF BY .05 PSIG OR LESS, OK

05C9 84 40              BZ      CLSEND
05CB 68                 LISL    FLAGS           ;SUPPLYING BEFORE?
05CC 70                 CLR
05CD FC                 XS      S
05CF 91 06              BM      PSET17          ;IF M, NO
05D0 6F                 LISL    RATE            ;YES, IS RATE KNOWN?
05D1 70                 CLR
05D2 ED                 XS      I
05D3 94 09              BNZ     PSET20          ;IF NZ, YES
05D5 1A         PSET17  DI                      ;SET SUPPLY DIRECTION
05D6 4C                 LR      A,S
05D7 21 7F              NI      DRFLGA
05D9 1B                 EI
05DA 5C                 LR      S,A
05DB 90 42              BR      PSET50
                *
                * MULTIPLY DISTANCE TO SETPOINT BY INVERSE RATE TO GET
                * MILLISECONDS OF AIR TO GET TO SETPOINT.
                * IMPC = ABS(DISTANCE TO SETPOINT)
                *
05DD 6C         PSET20  LISL    ERRCNT          ;CLEAR ERROR COUNT
05DE 20 20              LI      MAXTRY
05E0 5C                 LR      S,A
05E1 28 00 38   PSET22  PI      TIM2SP
                *
                * NO OVERFLOW, ARE WE FURTHER THAN 1/4 SECOND FROM SETPOINT?
                *
05E4 6D                 LISL    PRODHI
05E5 70                 CLR
05E6 EC                 XS      S
05E7 84 25              BZ      PSET30          ;IF Z, NO
                *
                * WE'RE SO FAR FROM SETPOINT, JUST START IT RUNNING
                *
                SETRUN  EQU     *
05E9 6E                 LISL    LSTIME          ;SET TIME IT STARTED RUNNING
05EA 42                 LR      A,TIMEL
05EB 5E                 LR      D,A
05EC 41                 LR      A,TIMEH
05ED 5C                 LR      S,A
05EE 59                 LISL    STATE
05EF 77                 LIS     RUN
05F0 5E                 LR      D,A
05F1 1A                 DI
05F2 4C                 LR      A,S
```

```
05F3 22 08              OI      FIRSTR          ;SET 1ST TIME THRU RUN FLAG
05F5 1B                 EI
05F6 5C                 LR      S,A
                *
                * START POINT MOVING
                * ISAR AT FLAGS
                *
05F7 73         OPEN    LIS     3               ;GET POI CONTROL BYTE TO OPEN VALVE
05F8 F0                 NS      CRNTPT
05F9 13                 SL      1
05FA 53                 LR      TMPA,A
05FB 1A                 DI
05FC 4C                 LR      A,S
05FD 1B                 EI
05FE CC                 AS      S
05FF 43                 LR      A,TMPA
0600 19                 LNK
0601 1A                 DI
0602 B1                 OUTS    POICTL
0603 22 10              OI      VLVENB
0605 B1                 OUTS    POICTL
0606 23 10              XI      VLVENB
0608 B1                 OUTS    POICTL
0609 1B                 EI
060A 29 02 E8   CLSEND  JMP     BGRND           ;THIS GUY'S DONE, UPDATE TIME
                *
                * WITHIN 1/4 SECOND OF SETPOINT
                *
                * HOME POINT IN.
                * TEST MINIMUM VALVE ACTUATION TIME
                * ISAR AT PRODHI
                *
060D 6E         PSET30  LISL    PRODLO
060E 20 F8              LI      -MINAIR         ;NO, IS DELTA-TIME LESS THAN MINIMUM?
0610 CC                 AS      S
0611 4C                 LR      A,S
0612 82 04              BC      PSET33          ;IF C, NO
0614 20 08              LI      MINAIR
0616 5C         PSET32  LR      S,A
0617 6D         PSET33  LISL    EXACTL
0618 5C                 LR      S,A
0619 69         PSET40  LISL    STATE           ;SET STATE
061A 7A                 LIS     MIXP
061B 5E                 LR      D,A
061C 90 DA              BR      OPEN            ;OPEN VALVE
                *
                * RATE CHECK
                *
                * TMPC - DISTANCE TO SETPOINT
                * ISAR AT FLAGS, WITH CORRECT DIRECTION SET
                *
061E 6C         PSET50  LISL    ERRCNT          ;CLEAR ERROR COUNT
061F 20 20              LI      MAXIMT
0621 5C                 LR      S,A
0622 6F         PSET55  LISL    RATE            ;CLEAR RATE ON TURNAROUND
0623 70                 CLR
0624 5E                 LR      D,A             ;TO LSTIME FOR SHORT SHOT
0625 20 C0              LI      H'C0'           ;PRETTY FAR FROM SETPOINT?
0627 F5                 NS      TMPC
0628 94 C0              BNZ     SETRUN          ;IF NZ, YES, JUST RUN IT
062A 20 0B              LI      RATCHK
062C 90 E9              BR      PSET32
                *
                * PROCESS RUNNING POINT
                *
                * CURRENT POSITION IN TMPDTB
                *
                PRORUN  EQU     *
                *
                * IF FIRST TIME THRU RUN, HANG AROUND
                *
062E 6B                 LISL    FLAGS
062F 4C                 LR      A,S
0630 21 08              NI      FIRSTR
0632 84 0A              BZ      PRUN10          ;IF Z, NO
0634 1A                 DI
0635 4C                 LR      A,S             ;CLEAR FIRST TIME FLAG
0636 21 F7              NI      FIRSTR
0638 1B                 EI
0639 5C                 LR      S,A
063A 29 02 E8           JMP     BGRND           ;NO ACTION YET
                *
                * IS THE POINT MOVING AT ALL?
                *
063D 43         PRUN10  LR      A,TMPA          ;SUBTRACT CURRENT FROM LAST
063E 18                 COM
063F 1F                 INC
0640 6A                 LISL    CRNT
0641 CC                 AS      S
0642 54                 LR      TMPB,A          ;SAVE DELTA-P
0643 6B                 LISL    FLAGS
0644 70                 CLR
```

```
0645 94 11          BZ      PRUN20          ;IF Z, NO HEADWAY
0647 82 0A          BC      PRUN15          ;IF C, DELTA-P IS POSITIVE
0649 EC             XS      S               ;DELTA-P IS NEGATIVE, MAKE SURE WE'RE SUPPLYING
064A 91 0C          BM      PRUN20          ;IF M, MOVING BACKWARD
064C 44             LR      A,TMPB          ;MAKE DELTA-POS POSITIVE
064D 18             COM
064E 1F             INC
064F 54             LR      TMPB,A
0650 90 3F          BR      PRUN25
             *
             * DELTA-POSITION IS POSITIVE, ARE WE EXHAUSTING?
             *
0652 EC     PRUN15  XS      S
0653 81 03          BP      PRUN20          ;IF P, MOVING BACKWARD
0655 90 3A          BR      PRUN25
             *
             * WE'RE NOT MAKING MUCH HEADWAY.  HOW LONG HAS THIS BEEN GOING ON?
             *
0657 6D     PRUN20  LISL    LSTIMH          ;SUBTRACT START TIME FROM CURRENT TIME
0658 4D             LR      A,I
0659 18             COM
065A 54             LR      ARITHH,A
065B 4C             LR      A,S
065C 18             COM
065D 1F             INC
065E 55             LR      ARITHL,A
065F 44             LR      A,ARITHH
0660 19             LNK
0661 54             LR      ARITHH,A
0662 42             LR      A,TIMEL
0663 C5             AS      ARITHL
0664 41             LR      A,TIMEH
0665 19             LNK
0666 C4             AS      ARITHH
0667 21 80          NI      H'80'           ;NO HEADWAY IN 32 SECONDS?
0669 94 04          BNZ     PRUN22          ;IF NZ, NO, FAIL IT
066B 29 02 E8       JMP     BGRND           ;GIVE IT MORE TIME
             *
             * MAKING NO HEADWAY OVER THE LAST 16 SECONDS.  MARK IT FAILED.
             *
066E 68     PRUN22  LISL    FLAGS           ;TURN OFF VALVE
066F 73             LIS     3
0670 F0             NS      CRWTP1
0671 13             SL      1
0672 53             LR      TMPA,A
0673 4C             LR      A,S
0674 CC             AS      S
0675 43             LR      A,TMPA
0676 19             LNK
0677 22 08          OI      VLVOFF
0679 1A             DI                      ;;;
067A B1             OUTS    POTCTL          ;;;
067B 22 10          OI      VLVENA          ;;;
067D B1             OUTS    POTCTL          ;;;
067E 23 10          XI      VLVENB          ;;;
0680 1B             EI                      ;;;
0681 B1             OUTS    POTCTL          ;;;
0682 1A             DI
0683 4C             LR      A,S             ;MARK IT FAILED
0684 22 40          OI      COVFLG
0686 1B             EI
0687 5D             LR      I,A
0688 70             CLR                     ;SET POWER-UP STATE
0689 5C             LR      S,A
068A 6F             LISL    RATE            ;CLEAR RATE
068B 70             CLR
068C 5C             LR      S,A
068D 29 02 E8       JMP     BGRND
             *
             * WE'RE MAKING HEADWAY, CHECK RATE
             *
             * TMPB - DELTA-POSITION SINCE LAST READ
             * TMPA - CURRENT POSITION
             *
0690 43     PRUN25  LR      A,TMPA          ;SAVE CURRENT POSITION
0691 6A             LISL    CRW1
0692 5C             LR      S,A
             * FIND DELTA-TIME
0693 6D             LISL    LSTIMH          ;SUBTRACT LAST TIME FROM CURRENT TIME
0694 4D             LR      A,I
0695 18             COM
0696 53             LR      DNDAHI,A
0697 4C             LR      A,S
0698 18             COM
0699 1F             INC
069A 55             LR      DNDALO,A
069B 43             LR      A,DNDAHI
069C 19             LNK
069D 53             LR      DNDAHI,A
             * CURRENT TIME + (-LAST TIME)
069E 42             LR      A,TIMEL
069F C5             AS      DNDALO
06A0 55             LR      DNDALO,A
```

```
06A1 41              LR     A,TIMEH
06A2 19              LNK
06A3 C3              AS     DNDAHI
06A4 53              LR     DNDAHI,A
               * CHECK 0 TIME?
               * ALWAYS SOME DELTA TIME?
               *
               *
               * DIVIDE DELTA-TIME BY DELTA-POSITION
               * IF QUOTIENT .GT. 255 WE'RE GOING VERY SLOW
               *
               * DNDAHI = TMPA
               * DNDALO = TMPC
               * DPOCNT = TMPB
               * DIVISOR = QL
               *
06A5 44              LR     A,TMPB
06A6 18              COM
06A7 1F              INC
06A8 07              LR     QL,A              ;QL = 2'S COMPLEMENT OF DELTA-POSITION
06A9 28 00 6B        PI     FNDRAT
               *
               * DATABASE NOW REFLECTS CURRENT RATE AND POSITION
               *
               *
               * FIND DIFFERENCE BETWEEN CURRENT POSITION AND SETPOINT
               *
06AC 64              LISL   CRNT              ;SUBTRACT CURRENT FROM SETPOINT
06AD 4C              LR     A,S
06AE 18              COM
06AF 1F              INC
06B0 6B              LISL   SETPT
06B1 CC              AS     S
06B2 55              LR     TMPC,A            ;SAVE DIFFERENCE
06B3 84 14           BZ     PRUN35            ;WE'RE THERE, SHUT VALVE
06B5 82 0D           BC     PRUN30            ;IF C, DIFF IS POSITIVE
06B7 68              LISL   FLAGS             ;DIFF IS NEGATIVE, ARE WE EXHAUSTING?
06B8 20 80           LI     DIRFLG
06BA FC              NS     S
06BB 84 0C           BZ     PRUN35            ;IF Z, NO, WE'RE PAST SETPOINT
06BD 45              LR     A,TMPC            ;MAKE DIFFERENCE POSITIVE
06BE 18              COM
06BF 1F              INC
06C0 55              LR     TMPC,A
06C1 90 23           BR     PRUN50
               *
               * ARE WE SUPPLYING?
               *
06C3 68        PRUN30 LISL   FLAGS
06C4 70              CLR
06C5 EC              XS     S
06C6 81 1E           BP     PRUN50            ;IF P, YES, SO FAR SO GOOD
               *
               * WE'VE MOVED PAST SETPOINT
               *
06C8 68        PRUN35 LISL   FLAGS
06C9 73              LIS    3
06CA F0              NS     CRNTPT
06CB 13              SL     1
06CC 53              LR     TMPA,A
06CD 4C              LR     A,S               ;GET DIR FLAG
06CE CD              AS     I
06CF 43              LR     A,TMPA
06D0 19              LNK
06D1 22 08           OI     VLVOFF
06D3 14              DI
06D4 B1              OUTS   POICTL
06D5 22 10           OI     VLVENA
06D7 B1              OUTS   POICTL
06D8 23 10           XI     VLVENB
06DA 1B              EI
06DB B1              OUTS   POICTL
06DC 78              LIS    RND               ;MARK SETTLE DELAY
06DD 5C              LR     S,A
06DE 6D              LISL   LONGDL            ;SET LONG TIME OUT
06DF 20 09           LI     SETDLY
06E1 5C              LR     S,A
06E2 29 02 E8        JMP    BGRND             ;NEXT?
               *
               * KEEP RUNNING
               *
06E5 6E        PRUN50 LISL   LSTIML            ;UPDATE CURRENT TIME
06E6 42              LR     A,TIMEL
06E7 5E              LR     D,A
06E8 41              LR     A,TIMEH
06E9 5C              LR     S,A
06EA 29 02 E8        JMP    BGRND             ;LET IT RUN
               *
               * RUNNING SETTLE DELAY DONE
               *
               * CURRENT POSITION IN TMPA
```

```
                    *
                    PRORDX  EQU     *
                    *
                    * PUT CURRENT POSITION INTO PI DATA BASE
                    *
06ED 6A             PROX10  LISL    CRNT
06EE 43                     LR      A,IMPA
06EF 5D                     LR      I,A
                    *
                    * HOW FAR ARE WE FROM SETPOINT?
                    *
06F0 18                     COM                     ;SUBTRACT CURRENT FROM SETPOINT
06F1 1F                     INC
06F2 CC                     AS      S
06F3 55                     LR      IMPC,A          ;SAVE DIFF
06F4 84 12                  BZ      PROX20          ;IF Z, WE'RE THERE
06F6 82 16                  BC      PROX25          ;IF C, RESULT IS POSITIVE
06F8 24 01                  AI      DEADBD          ;WITHIN DEAD BAND
06FA 82 0C                  BC      PROX20          ;IF C, YES
06FC 45                     LR      A,IMPC
                    *
                    * CURRENT PRESSURE IS HIGHER THAN SETPOINT PRESSURE
                    * IF WE WERE SUPPLYING AIR, WE'VE MOVED PAST SETPOINT.
                    *
06FD 18                     COM                     ;MAKE PRESSURE DIFF POSITIVE
06FE 1F                     INC
06FF 55                     LR      IMPC,A
0700 68                     LISL    FLAGS
0701 70                     CLR
0702 EC                     XS      S
0703 81 23                  BP      PROX30          ;IF P, PAST SETPOINT
0705 90 10                  BR      PROX29          ;CONTINUE
                    *
                    * SUCCESS!!
                    * WE'RE WITHIN DEADBAND OF SETPOINT
                    *
0707 69             PROX20  LISL    STATE           ;MARK SET STATE
0708 71                     LIS     SET
0709 5C                     LR      S,A
070A 29 02 E8               JMP     BGRND           ;NEXT?
                    *
                    * CURRENT PRESSURE IS LESS THAN SETPOINT PRESSURE
                    * IF WE WERE EXHAUSTING AIR, WE'VE MOVED PAST SETPOINT.
                    *
070D 24 FF          PROX25  AI      -DEADBD         ;WITHIN DEAD BAND?
070F 84 F7                  BZ      PROX20
0711 68                     LISL    FLAGS
0712 70                     CLR
0713 EC                     XS      S

0714 91 12                  BM      PROX80          ;IF M, OOPS!!
                    *
                    * MULTIPLY DISTANCE TO SETPOINT BY INVERSE RATE TO GET
                    * MILLISECONDS OF AIR TO GET TO SETPOINT
                    * IMPC = ABS(DIST TO SP)
                    *
0716 28 07 EA PROX29        PI      CTLERR          ;ADD TO ERROR TRY COUNT
0719 28 00 38 PROX30        PI      TIM25P
                    *
                    * ARE WE STILL WITHIN 1/4 SECOND OF THE SETPOINT?
                    *
071C 6D             PROX35  LISL    PRODHI
071D 70                     CLR
071E EC                     XS      S
071F 94 04                  BNZ     PROX50          ;IF NZ, NO, CHECK BACKPRESSURE ERROR
                    *
                    * SET SHORT TIME OUT
                    * CHECK MINIMUM TIME-OUT AND ADD TIME SINCE LAST TIME UPDATE
                    *
0721 29 06 0D               JMP     PSET30
                    *
                    * BACK PRESSURE ERROR
                    *
                    PROX50  EQU     *
                    *
                    * IF MORE THAN MAX BPE THEN FAIL IT
                    * ELSE SET RUN
                    *
0724 29 05 E9               JMP     SETRUN
                    *
                    * IF ON HI DELTA-PRESSURE SIDE INCREMENT AND TEST OSCERR CONT
                    *     IF TOO MANY ERRORS THEN FAIL IT
                    *     ELSE RATE CHECK IT
                    *
0727 28 07 EA PROX80        PI      CTLERR          ;OVERRUN ERROR WHEN RUN DONE
072A 1A             PROX81  DI                      ;SWITCH DIRECTION FLAG
072B 4C                     LR      A,S
072C 23 80                  XI      DIRFLG
072E 1B                     EI
072F 5C                     LR      S,A
0730 29 06 22               JMP     PSET55
```

```
                  *
                  * AN EXACT SHOT OF AIR HAS BEEN GIVEN TO THE BRANCH LINE AND
                  * IT HAS HAD A CHANCE TO SETTLE AND BE READ.
                  *
                  PHOHDD  EQU       *
                  *
                  * PASSED SETPOINT?
                  *
0733 43           PHDD10  LR        A,TMPA
0734 18                   COM                     ;SUBTRACT CURRENT FROM SETPOINT
0735 1F                   INC
0736 6B                   LISL      SETPT
0737 CC                   AS        S
0738 55                   LR        TMPC,A
0739 94 0A                BNZ       PHDD15        ;IF NZ, NOT ON
                  *
                  * SUCCESS!!!
                  * WE'VE REACHED SETPOINT
                  *
073B 6A           PHDD12  LISL      CRNT          ;SET CURRENT POSITION
073C 43                   LR        A,TMPA
073D 5C                   LR        S,A
073E 69                   LISL      STATE         ;SET SET STATE
073F 71                   LIS       SET
0740 5C                   LR        S,A
0741 29 02 E8             JMP       BGRND
                  *
0744 82 18        PHDD15  BC        PHDD20        ;IF C, DIFF IS POSITIVE
0746 24 01                AI        DEADBD        ;WITHIN DEADBAND?
0748 82 F2                BC        PHDD12
074A 45                   LR        A,TMPC
                  *
                  * CURRENT IS GREATER THAN SETPOINT
                  * IF WE'RE SUPPLYING THEN WE'VE MOVED PAST SETPOINT
                  *
074B 18                   COM                     ;MAKE DISTANCE TO SETPOINT POSITIVE
074C 1F                   INC
074D 55                   LR        TMPC,A
074E 68                   LISL      FLAGS
074F 70                   CLR
0750 EC                   AS        S
0751 81 37                BP        PHDD80        ;IF P, PASSED SETPOINT
                  *
                  * DID IT MOVE ANY?
                  *
0753 6A                   LISL      CRNT          ;SUBTRACT LAST FROM CURRENT
0754 4C                   LR        A,S
0755 18                   COM
0756 1F                   INC
0757 C3                   AS        TMPA
0758 07                   LR        QL,A          ;SAVE DIVISOR
0759 82 39                BC        PHDD90        ;IF C, NO OR EVEN FELL BACK
075B 90 12                BR        PHDD25
                  *
                  * CURRENT IS LESS THAN SETPOINT
                  * IF WE'RE EXHAUSTING THEN WE'VE MOVED PAST SETPOINT
                  *
075D 24 FF        PHDD20  AI        -DEADBD       ;WITHIN DEADBAND?
075F 84 DB                BZ        PHDD12        ;IF Z, YES
0761 68                   LISL      FLAGS
0762 70                   CLR
0763 EC                   AS        S
0764 91 24                BM        PHDD80        ;IF M, THAT! PAST SETPOINT
                  *
                  * DID IT MOVE ANY?
                  *
0766 6A                   LISL      CRNT
0767 43                   LR        A,TMPA        ;SUBTRACT CURRENT FROM LAST
0768 18                   COM
0769 1F                   INC
076A CC                   AS        S
076B 07                   LR        QL,A
076C 82 26                BC        PHDD90        ;IF C, NO OR EVEN FELL BACK
                  *
                  * FIND NEW RATE
                  * DIVIDE DELTA-POSITION INTO TIME VALVE WAS OPEN
                  *
076E 43           PHDD25  LR        A,TMPA        ;UPDATE CURRENT VALUE
076F 6A                   LISL      CRNT
0770 5C                   LR        S,A
0771 6E                   LISL      EXTSVL        ;SET DIVIDEND LO
0772 4C                   LR        A,S
0773 55                   LR        ONDALO,A
0774 70                   CLR
0775 53                   LR        ONDAHI,A
                  *
                  * DIVIDE DELTA-TIME BY DELTA-POSITION
                  * IF QUOTIENT .GT. 255 WE'RE GOING VERY SLOW
                  *
                  * ONDAHI = TMPA
                  * ONDALO = TMPC
                  * LPOCNT = TMPB
                  * DIVISOR = QL
```

```
                   *
0776 28 00 68           PI       FMORAT
                   *
                   * GET DISTANCE TO SETPOINT IN TMPC
                   *
0779 6A                 LISL     CRNT
077A 4D                 LR       A,I
077B 18                 COM
077C 1F                 INC
077D CC                 AS       S
077E 82 03              BC       PHDD30          ;IF C, ALREADY POSITIVE
0780 18                 COM
0781 1F                 INC
0782 55        PHDD30   LR       TMPC,A
                   *
                   * INC TRY COUNT AND MARK FAILED IF OVERFLOW
                   *
                   * MULTIPLY DISTANCE TO SETPOINT BY RATE AND SET SHORT TIME OUT IF
                   * WITHIN 1/4 SECOND.  IF OUTSIDE 1/4 SECOND WE'RE DOING POORLY.
                   *
0783 28 07 EA           PI       CTLERR
0786 29 05 E1  PHDD31   JMP      PSET22
                   *
                   * UPDATE CURRENT POSITION
                   * DISTANCE TO SETPOINT IN TMPC
                   *
0789 28 07 EA  PHDD80   PI       CTLERR          ;OVERRUN ERROR ON EXACT SHOT
078C 6A        PHDD81   LISL     CRNT
078D 43                 LR       A,TMPA
078E 5C                 LR       S,A
078F 68                 LISL     FLAGS
0790 29 07 2A           JMP      PRDX81          ;FIND NEW RATE
                   *
                   * DIDN'T MAKE IT TOO FAR, TRY TWICE AS LONG
                   *
0793 28 07 EA  PHDD90   PI       CTLERR
0796 6E        PHDD91   LISL     EXTSVL          ;GET TOTAL AIR GIVEN
0797 4C                 LR       A,S
0798 CE                 AS       D               ;MULT BY 2
0799 82 09              BC       STRUNA          ;TOO LONG, RUN IT
079B 5D                 LR       I,A             ;SET COUNT DOWN
079C CC                 AS       S               ;ADD TO TOTAL
079D 82 05              BC       STRUNA          ;TOO LONG, RUN IT
079F 5C                 LR       S,A
07A0 29 06 19           JMP      PSET40          ;START SHORT SHOT
07A3 29 05 E9  STRUNA   JMP      SETRUN          ;RUN IT
                   *
                   * BST TESTS
                   *
                   *
                   * CLEAR RAM
                   *
               INIT     EQU      *
07A6 67                 LISU     7
07A7 6F                 LISL     7
07A8 20 AA     RAMTST   LI       H"AA"
07AA 5C                 LR       S,A
07AB 12                 SR       1
07AC EC                 XS       S
07AD 5C                 LR       S,A
07AE 1F                 INC
07AF 94 28              BNZ      BSTFAL
07B1 18                 COM
07B2 EC                 XS       S
07B3 5C                 LR       S,A
07B4 70                 CLR
07B5 EE                 XS       D
07B6 94 24              BNZ      BSTFAL
07B8 8F EF              BR7      RAMTST
07BA 0A                 LR       A,IS
07BB 24 F8              AI       -D"10"
07BD 92 04              BNC      RAMGD
07BF 0B                 LR       IS,A
07C0 90 E7              BR       RAMTST
               RAMGD    EQU      *
                   *
                   * TEST INTERNAL TIMER
                   *
                   * SET 1 MS TIME DELAY AND START COUNTING FOR 1 MS.
                   * IF COUNT FINISHES BEFORE INTERRUPT OR INTERRUPT COMES
                   * BEFORE IT SHOULD, THE TEST FAILS.
                   *
07C2 2A 07 D6           DCI      TMTST           ;SET TIMER VECTOR FOR TEST
07C5 0E                 LR       Q,DC
07C6 20 C8              LI       ISTIMD          ;SET COUNT FOR 1 MS.
07C8 B7                 OUTS     TIMERD
07C9 20 6A              LI       ISTIMC          ;SET CONTROL FOR 1 MS.
07CB B6                 OUTS     ICP
07CC 1B                 EI
07CD 20 0E              LI       DLY1MS          ;SET DELAY COUNT
07CF 53                 LR       TMPA,A
07D0 33        DLYLP    DS       TMPA
```

```
07D1 94 FE          BNZ     DLYLP
07D3 1A             DI                 ;IF WE GET HERE, TIMER DIDN'T FINISH IN TIME
07D4 90 06          BR      BSTFAL
07D6 43     INTS1   LR      A,TMPA
07D7 25 10          CI      H'10'      ;TIMER INT HAPPENED, WAS IT TOO FAST?
07D9 82 04          BC      INITDN     ;IF C, COUNT LE 10, TIMER PASSES
07DB 1A     BSTFAL  DI
07DC 90 FE          BR      *-1
            INITDN  EQU     *
            *
            * SET POWER-UP FLAG
            *
07DE 20 80          LI      PWRUP
07E0 50             LR      CRNTPT,A
07E1 20 20          LI      XINTEN     ;CLEAR ANY PREVIOUS EXTERNAL INTERRUPT
07E3 B6             OUTS    ICP
07E4 1F             INC
07E5 B6             OUTS    ICP        ;ENABLE EXTERNAL INTERRUPTS
07E6 1B             EI
07E7 29 02 E8       JMP     BGRND
            *
            * PROCESS POI CONTROL ERROR
            *
            * INCREMENT THIS POINT'S CURRENT ERROR COUNT
            * IF NO OVERFLOW THEN RETURN; ELSE SET COV, SET
            * POINT TO POWER UP STATE AND GO TO NEXT POINT (BGRND).
            *
            * UPON EXIT: ISAR POINTS TO CURRENT POINT'S FLAGS
            *
07EA 08     CTLERR  LR      K,P        ;SAVE RETURN ADDRESS
07EB 6C             LISL    ERRCNT     ;INCREMENT ERROR COUNT
07EC 3C             DS      S
07ED 68             LISL    FLAGS
07EE 84 02          BZ      CTER10     ;IF Z, FAIL IT
07F0 0C             PK                 ;LEAVE CARRY CLEAR AND ISAR AT FLAGS
            *
            * SET POINT ERROR
            *
            CTER10  EQU     *
07F1 1A             DI
07F2 4C             LR      A,S
07F3 22 40          OI      COVFLG     ;SET COV FOUND
07F5 5D             LR      I,A
07F6 70             CLR                ;SET POWER UP STATE
07F7 5C             LR      S,A
07F8 6E             LISL    RATE       ;CLEAR RATE
07F9 1B             EI
07FA 5C             LR      S,A
07FB 29 02 E8       JMP     BGRND
07FE 00             DC      0          ;MAKE SURE THIS UNUSED LOCATION IS 0
            *
            * ROM CHECKSUM GOES HERE
            *
                    ORG     H'7FF'
07FF 33             DC      H'33'
            END
NUMBER OF ERRORS=  0


ACCSAV=0007 ACK   =0006 ACKLC  00BC ACKMSK=009F ACKRSP 01B8 AKCV   027B
AKCV05 0267 AKCV10 026B AKCV20 0274 ARITHH=0004 ARITHL=0005 BFPLCL=0000
BFPLCU=0002 BGRND =02E8 BSTFAL 07DB CHAREQ=00FC CHARPT=0011 CHRPT =02AC
CKSERR 014F CKSM  =0006 CKSMLP 03AF CLLOOP 0006 CLSEND 060A CMDERR=00FD
CNTLCL=0003 CNTLCU=0002 COMRET=015A COVFLG=0040 CPI   =0005 CRNT  =0002
CRNTPT=0000 CTER10=07F1 CTLERR 07EA CVERR =00EF CVFLGM=00BF DATAER=00FE
DEADBD=0031 DIRFLG=0080 DIVALP 007F DIVA05 0077 DIVA10 008E DIVA20 0096
DIVA30 009C DIVLNG 052B DIVLP  0541 DIV02  054E DIV05  0551 DIV06  0553
DIV07  0566 DIV08  0569 DIV10  0571 DLTATL=0004 DLYCL =0001 DLYCU =0002
DLYLP  07D0 DLYTMS=006E DNDAHI=0003 DNDALO=0005 DNDHI =0005 DNDMH =0004
DNDML =0003 DRFLGM=007F DSFLPR=0020 DSPCH2 058A DSPCH4 0591 DSPCH6 0598
DSPTCH 0581 EOBCOV=0003 ENBCTL=000F ERRCNT=0004 EXACTL=0005 EXTSVL=0006
FAKCOV=0083 FCFALR=00FA FCRCKS=00C0 FCRDY =0040 FGTCOV=0082 FIRSTM=00F7
FIRSTR=0008 FLAGS =0000 FNDRAT 006B FREQM =0060 FTMPA =000A FTMPB =0008
FTMPC =0006 GETALL=00E4 GETPNT=0005 GTALL  0208 GTALRT 015F GTCNT  01BD
GTCNT1 01C7 GTCNT2 01CB GTCNT3 01D5 GTCOVN=0081 GTCV   01E6 GTCV10 01F1
GTCV1B=0210 GTCV20 0216 GTCV30 021E GTCV40 0226 GTCV45 022D GTCV60 0235
GTCV65 0238 GTCV70 023C GTCV80 0252 GTCV95 025B GTPT  =0285 GTPT10 02A4
HDD   =0000 HIB4CK 0497 HICNT =0004 HID   =000C HIX   =000B HIXTMM=0002
HIXP  =000A ICP   =0006 INIT  =07A6 INITDN=07DE INVCHR=00E8 INVPNT=00F9
ISARSV=0008 ISOVFA 01A2 LCBUFL=0007 LCBUFR=001F LCBUFU=0003 LCFAL =01A8
LCRNEG=0020 LCRCKS=00C1 LCRDY =0080 LCRDYM=007F LCTO  =0032 LCWATA 00C0
LCWATB 00CA LCWATC 0179 LCWATD 0183 LCWATE 016E LCXMIT 0164 LCXMTL 0175
LENERR=00FE LONGOL=0005 LONGTK=0001 LPDCNT=0004 LPNCNT=0003 LSTCNT 04B3
LSTCT1 0485 LSTCT2 0487 LSTCT3=04D3 LSTCT4 04C8 LSTCT5 04D1 LSTCT6 04F7
LSTIMH=0005 LSTIML=0006 MAXCNT=00C8 MAXTRY=0020 MCNDHI=0004 MCNDLO=0005
MINATR=0098 MINCNT=0014 MPYLP  0042 MPY10  004E MPY20  0067 MSCK  =000F
MSCTRL=00EB MSTTMR=0004 MSTACK=0015 MXPERC=004B MXPERD=00F0 NAK   =0015
```

```
NAKRSP 013E NEXTPT 039A NKBADP 014A NKCR   0144 NKRSP  013F NOCOV =00F8
NORDRO 03E2 NXTLCK 0193 NXTP15 03C7 OPEN   05F7 OVFA   0093 OVRHED=0041
OVRUG  007A PACTLL=0002 PACTLU=0002 PBINIR=00F0 PBRDCT=0030 PBSDIR=0020
P3USC =0000 P9USD =0005 PCMDG  0120 PHDD10 0733 PHDD12 073B PHDD15 0744
PHDD20 075D PHDD25 076E PHDD30 0782 PHDD31 0786 PHDD80 0769 PHDD81 078C
PHDD90 0793 PHDD91 0796 PLSCNT=0005 PNIFAG=00F8 PNTRET=00F7 POI   =0040
POICIL=0001 POIERR=000F PPOPT0 059B PRCM01 00FB PRCM02 0103 PRCM04 0108
PRCMD5 0113 PRCMD6 0124 PRCMD7 0133 PRCMD8=013A PRCMD9=013A PRDX10 06ED
PRDX20 0707 PRDX25 0700 PRDX29 0716 PRDX30 0719 PRDX35 071C PRDX50=0724
PRDX80 0727 PRDX81 072A PROCMD 00F1 PRODHI=0005 PRODLO=0006 PROMDD=0733
PROPOP=0598 PRORUX=06ED PRORUN=062E PROSEI=05A1 PRUN10 063D PRUN15 0652
PRUN20 0637 PRUN22 066E PRUN25 0690 PRUN30 06C3 PRUN35 06C8 PRUN50 06E5
PSET10 05A1 PSET12 05BF PSET15 05C7 PSET17 05D5 PSET20 05DD PSET22 05E1
PSET30 05ED PSET32 0516 PSET33 0617 PSET40 0619 PSET50 061E PSET55 0622
PT0B0L=0000 PTD80U=0004 PTD830=0007 PTFALH=0002 PTFALO=0001 PTREDC=0028
PTREDI 0023 PTRETR=00FC PUP   =0000 PWRUP =0080 PWRUPM=007F RAMGD =07C2
RAMTSI 07A8 RATCHK=0008 RATE  =0007 RCVDUN=00F1 RDFCRM=0008 RGERC  0473
RGERM  0471 RGERM2 0528 RGERL  040E RGERL2 0525 RND   =0008 RNGCK1 0413
RNGER2 048A RNGER3 04A0 RNGER4 04A7 RNGER5 0480 RNX   =0009 RUNCHK=0004
RUMCKM=00FB RSP3   0142 RSP3AG 0157 RSTRD2 0421 RSTRED 03E8 RUN   =0007
SET   =0001 SETDBL=0009 SETPNT=0007 SETPT =0003 SETRUN=05E9 SETVLV=00E1
STATE =0001 STFT   02AC STPT10 02CC STPT20 02D1 STRUNA 07A3 STSCOV=0000
STR   =0016 TIMCHK 0288 TIMEH =0001 TIMEL =0002 TIMERD=0007 TIMSTP=0021
TIM2SF=0038 TINTRT 0026 TMADJ1 0500 TMADJ3=0513 TMCK05 02EA TMCK10 02F6
TMCK13 0308 TMCK15 030A TMCK20=0311 TMCK25 0315 TMISTP=0029 TMFA  =0003
TMPB  =0004 TMPC  =0005 TMTS1  0706 TMUPCY 0382 TMUPC2 0338 TMUPLP 0318
TMUP10 032E TMUP20 033D TMUP25 0341 TMUP29 0349 TMUP30 034D TMUP35 035D
TMUP40 035E TMUP50=037C TMUP90 0390 TMUP99=0398 TSTIMC=006A TSTIMD=00C8
VLVEND=0010 VLVOFF=0008 WAIHI  0464 WAITLO 045A WRD   =0080 WRUCMD 0164
WTFCRM=0009 XINTEN=0020 XMITDN=01A8
```

```
"ORION DIGITAL FUNCTION CARD"
          *
          *
          ******************************************************************************
          *
          *                        MCC POWERS
          *                        COPYRIGHT  MARCH 1979
          *                        KEN BELAU
          *                        LINE CARD COMMUNICATION COURTESY OF BOB OLD
          *
          ******************************************************************************
          *
          *
          *               RELEASE NOTES AND REVISIONS
          *
          *
          *
          *THIS IS A PROGRAM TO SUPPORT THE DIGITAL FUNCTION CARDS IN AN ORION SYSTEM. IT
          *TO SEND AND RECEIVE MESSAGES FROM THE DAP BACKPLANE AND RESPOND TO SPECIFIC
          *QUERRIES FROM THE DAP LINE CARD. THERE ARE TWO DIGITAL FUNCTION CARDS IN AN
          *ORION SYSTEM. ONE CARD HANDLES ALL DIGITAL INPUT FUNCTIONS, WHILE THE OTHER
          *CARD CONTROLS ALL DIGITAL OUTPUT FUNCTION CARDS. BOTH OF THESE FUNCTIONS
          *ARE ACCOMPLISHED THROUGH SOFTWARE PROGRAMS RESIDENT ON THE RESPECTIVE CARDS.
          *HOWEVER, BOTH PROGRAMS WHILE SOMEWHAT INDEPENDENT, SHARE MANY COMMON ROUTINES.
          *SINCE THE PROGRAMS RESIDE IN A SINGLE CHIP MICROCOMPUTER, THE DECESION WAS MADE
          *TO PLACE BOTH PROGRAMS IN THE SAME MICROCOMPUTER MASK. THEREFORE, THERE IS A CO
          *PROGRAM FOR THE TWO SEPARATE FUNCTIONS. FOR THE SAKE OF FURTHER DISCUSSION, THI
          *PROGRAM WILL BE DIVIDED INTO ITS DI AND DO FUNCTIONS, HOWEVER, CAREFUL EXAMINAT
          *OF THE CODE WILL ILLUSTRATE THEIR INTERELATIONSHIP.
          *
          *
          *THE DIGITAL OUTPUT FUNCTION CARD
          *
          *THIS CARD UTILIZES MUCH OF THE PROGRAMS FOUND ON OTHER
          *ORION CARDS. SUCH AS: BASIC DAP COMMINICATION PROTOCOL, ROM AND RAM CHECKSUMS,
          *BASIC TEST FOR CARD INTEGRITY, INITIALIZATION SEQUENCE, ETC. UNIQUE PROGRAMS
          *RELATING TO THIS CARD CENTER AROUND CONTROL OF THE DIGITAL INTERFACE.
          *
          *THE DIGITAL OUTPUT CARD IS EQUIPPED TO CONTROL 16 OR 32 DISCRETE POINTS. A HARD
          *STRAP ON THE BOARD INDICATES THE CAPACITY OF THE FUNCTION CARD. IN ADDITION TO
          *MULTI-POINT CAPABILITY, THE CARD IS ABLE TO CONTROL STEADY-STATE
          *AND PULSED POINT APPLICATIONS. IN A STEADY-STATE APPLICATION, THE CARD SENDS
          *AN "ON" OR "OFF" COMMAND TO A SELECTED POINT. THE LAST COMMAND RECEICED IS LATC
          *HARDWARE LOGIC ON THE CARD AND WILL REMAIN IN THAT STATE INDEFINITELY UNTIL A
          *COMPLIMENTARY COMMAND IS ISSUED TO THAT POINT. IN THE PULSED MODE OF OPERATION,
          *THE CARD WILL TURN A SELECTED POINT "ON" BASED ON A COMMAND FROM THE LINECARD.
          *AT THE SAME TIME, A COUNTER IS INITIALIZED THAT SUBSEQUENTLY
          *TRACKS ELAPSED TIME. WHEN THIS COUNTER REACHES A PREDETERMINED VALUE, THE FUNCT
          *CARD WILL TURN THE POINT "OFF".
          *
          *IN ORDER FOR THE DIGITAL OUTPUT CARD TO DETERMINE THE DIFFERENCE BETWEEN PULSED
          *POINTS, IT MUST BE CHARACTERIZED FOR THE VARIOUS OPTIONS. THIS SEQUENCE IS
          *INITIATED FROM THE CENTRAL CPU AND IS SENT REMOTELY TO THE FUNCTION CARD
          *FROM THE CPU. THE CARD WILL CEASE TO FUNCTION UNLESS IT HAS RECEIVED
```

```
"ORION DIGITAL FUNCTION CARD"
        *CHARACTERIZATION DATA PRIOR TO AN "ON" OR "OFF" COMMAND.
        *
        *
        *THE DIGITAL INPUT FUNCTION CARD
        *
        *THIS CARD UTILIZES MUCH OF THE PROGRAMS FOUND ON OTHER
        *ORION CARDS. SUCH AS: BASIC DAP COMMINICATION PROTOCOL, ROM AND RAM CHECKSUMS,
        *BASIC TEST FOR CARD INTEGRITY, INITIALIZATION SEQUENCE, ETC. UNIQUE PROGRAMS
        *RELATING TO THIS CARD CENTER AROUND CONTROL OF THE DIGITAL INTERFACE.
        *
        *THE DIGITAL INPUT CARD IS EQUIPPED TO MONITOR 16 OR 32 DISCRETE POINTS. A HARDW
        *STRAP ON THE BOARD INDICATES THE CAPACITY OF THE FUNCTION CARD.
        *OUT OF A POSSIBLE 32 POINTS, 2 POINTS MAY BE DESIGNATED AS PULSE ACCUMULATORS.
        *THE PRIME PURPOSE OF THE SOFTWARE PROGRAM IS TO PERFORM CONTACT DEBOUNCING
        *AND CHANGE-OF-STATE DETECTION. WHEN A COS OCCURS, THIS INFORMATION IS RELAYED
        *TO THE LINE CARD WHEN REQUESTED.
        *
        *LIKE THE DO CARD; POINTS MUST BE CHARACTERIZED FOR OPERATION AND COS REPORTING.
        *
        *
"ORION DIGITAL FUNCTION CARD"
                TITLE   "ORION DIGITAL FUNCTION CARD"
        *
        *
        ***     EQUATES    ***
        *
        ***     EQUATES FOR CONTROLLING THE POWERS DAP BUS   ***
        *
        PBUSC   EQU     H"00"   ;DAP BUS CONTROL PORT
        *                       ;BIT 7 - LINE CARD READY INPUT, 0 = INACTIVE
        *                       ;BIT 6 - FUNCTION CARD READY OUTPUT, NORMALLY 0
        *                       ;BIT 5 - DATA BUS DIRECTION, 1=RCV, 0=XMIT
        *                       ;BIT 4 - PBUS I/F ENABLE, ACTIVE HI
        *                       ;BIT 3 - I.D. INPUT
        *                       ;BIT 2 - I.D. INPUT
        *                       ;BIT 1 - UNUSED
        *                       ;BIT 0 - UNUSED
        *
        PBINIR  EQU     H"F0"   ;CONTROL BYTE INIT FOR RECEIVE
        PBRDCT  EQU     H"30"   ;BUF I/F CTRL TO READ COUNT
        LCRDY   EQU     H"80"   ;LINE CARD READY INPUT BIT
        FCRDY   EQU     H"40"   ;FUNCTION CARD READY OUTPUT BIT
        PBSDIR  EQU     H"20"   ;POWERS DATA BUS DIRECTION BIT
        DSELPB  EQU     H"20"   ;DE-SELECT THE POWERS BUS
        LCRDYM  EQU     H"7F"   ;LINE CARD READY BIT MASK
        MASKID  EQU     H"E0"   ;READ MASK TO DETERMINE FUNCTION CARD TYPE
        *
        *
        ***     EQUATES FOR POWERS DAP DATA BUS   ***
        *
        PBUSD   EQU     H"05"   ;PORT ADDRESS FOR DAP DATA BUS
        *
        *
        ***     EQUATES FOR DO LATCH MODE: READ/WRITE   ***
        *
        LMODE   EQU     H"01"   ;PORT FOR HARDWARE LATCH MODE
        *                       ;BIT 7 - DO CAPACITY: 16 OR 32
        *                       ;BIT 6 - UNUSED
        *                       ;BIT 5 - UNUSED
        *                       ;BIT 4 - UNUSED
        *                       ;BIT 3 - UNUSED
        *                       ;BIT 2 - UNUSED
        *                       ;BIT 1 - READ OR WRITE FROM LATCH
        *                       ;BIT 0 - RESET THE LATCHES
        *
        LRSET   EQU     H"00"   ;RESET THE DO LATCHES
        LWRT    EQU     H"01"   ;ENABLE WRITING TO THE LATCHES
        LREAD   EQU     H"03"   ;ENABLE READING FROM THE LATCHES
        *
        ***     EQUATES FOR DO LATCH ADDRESSING   ***
        *
        LDATA   EQU     H"04"   ;PORT ADDRESS FOR HARDWARE LATCH DATA
        *                       ;BIT 7 - DATA TO/FROM HARDWARE LATCH
        *                       ;BIT 6 - MSB LATCH ADDRESS: A2
"ORION DIGITAL FUNCTION CARD"
        *                       ;BIT 5 -     LATCH ADDRESS: A1
        *                       ;BIT 4 - LSB LATCH ADDRESS: A0
        *                       ;BIT 3 - ENABLE FOR DO POINT 24 - 31
```

```
*                                 ;BIT 2 - ENABLE FOR DO POINT 16 - 23
*                                 ;BIT 1 - ENABLE FOR DO POINT 08 - 15
*                                 ;BIT 0 - ENABLE FOR DO POINT 00 - 07
*
***   EQUATES FOR DI READ MODE    ***
*
RMODE   EQU     H"04"   ;PORT ADDRESS FOR HARDWARE READ MODE
*                                 ;BIT 7 - DI CAPACITY:"1" = 16, "0" = 32
*                                 ;BIT 6 - UNUSED
*                                 ;BIT 5 - UNUSED
*                                 ;BIT 4 - UNUSED
*                                 ;BIT 3 - UNUSED
*                                 ;BIT 2 - UNUSED
*                                 ;BIT 1 - UNUSED
*                                 ;BIT 0 - UNUSED
*
*
***   EQUATES FOR DI MULTIPLEXOR ADDRESSING   ***
*
RDATA   EQU     H"01"   ;PORT ADDRESS TO READ HARDWARE DATA
*                                 ;BIT 7 - DATA INPUT FROM MULTIPLEXOR
*                                 ;BIT 6 - MSB MUX ADDRESS: A2
*                                 ;BIT 5 -     MUX ADDRESS: A1
*                                 ;BIT 4 - LSB MUX ADDRESS: A0
*                                 ;BIT 3 - ENABLE FOR DI POINT 24 - 31
*                                 ;BIT 2 - ENABLE FOR DI POINT 16 - 23
*                                 ;BIT 1 - ENABLE FOR DI POINT 08 - 15
*                                 ;BIT 0 - ENABLE FOR DI POINT 00 - 07
*
*
*
***   EQUATES FOR INTERRUPT CONTROL PORT    ***
*
ICP     EQU     H"06"   ;PORT ADDRESS FOR ICP PORT
*
***   EQUATES FOR DO CONTROL OF INTERRUPT   ***
*
*                                 ;BIT 7 - PRESCALE DIVIDE BY 20
*                                 ;BIT 6 - PRESCALE DIVIDE BY 5
*                                 ;BIT 5 - PRESCALE DIVIDE BY 2
*                                 ;BIT 4 - TIMER MODE; 0 = INTERVAL, 1 = PULSE WIDTH
*                                 ;BIT 3 - TIMER ENABLE; 0 = STOP, 1 = START
*                                 ;BIT 2 - EXT INT ACTIVE LEVEL;
*                                           0 = HIGH TO LOW, 1 = LOW TO HIGH
*                                 ;BIT 1 - TIMER INT ENABLE; 0 = DISBL, 1 = ENBL
*                                 ;BIT 0 - EXT INT ENABLE; 0 = DISBL, 1 =ENBL
*
*                                 ;   ***   NORMAL CONDITION OF ICP PORT    ***
*
*                                 ;PRESCALER: DIVIDE BY 200
*                                 ;TIMER MODE: INTERVAL
"ORION DIGITAL FUNCTION CARD"
*                                 ;TIMER STATUS: CONTINUOUS RUN
*                                 ;ACTIVE LEVEL EXT INT: HIGH TO LOW
*                                 ;TIMER INT ENABLE: ACTIVE
*                                 ;EXT INT ENABLE: ACTIVE
*
INTCT1  EQU     H"E8"   ;NORMAL MODE OF ICP
INTCT2  EQU     H"E9"   ;NORMAL MODE OF ICP WITH TIMER INT DISABLED
INTCT3  EQU     H"EA"   ;NORMAL MODE OF ICP WITH EXT INT DISABLED
INTCT4  EQU     H"6A"   ;TEST MODE OF ICP FOR TIMER INTERRUPT TEST
*
*
***   EQUATES FOR DI INTERRUPT CONTROL PORT    ***
*
*
*
***   EQUATES FOR TIMER PORT    ***
*
TIMER   EQU     H"07"   ;PORT ADDRESS FOR TIMER
*
***   EQUATES FOR DO TIMER    ***
*                                 ;TIMER IS SET UP FOR 20 MSEC COUNTDOWN, THERFORE:
*                                 ;PRESCALER = 200, TIMER = 200
COUNT   EQU     D"200"  ;NUMBER OF COUNTS BEFORE INTERRUPT
CNTEST  EQU     D"200"  ;NUMBER OF COUNTS FOR TIMER TEST
DLY1MS  EQU     H"68"   ;SET DELAY COUNT
*
***   EQUATES FOR DI TIMER    ***
*
*
```

```
***   EQUATES FOR PROGRAM INITIALIZATION   ***
*
RAMTOP  EQU     H"3F"   ;TOP OF RAM SCRATCHPAD
RAMBTM  EQU     H"FF"   ;BOTTOM OF RAM SCRATCHPAD
CKSMHI  EQU     H"00"   ;HIGH BYTE OF "END OF ROM DATA"
CKSMLW  EQU     H"00"   ;LOW BYTE OF "END OF ROM DATA"
CAP32   EQU     H"24"   ;SET FC CAPACITY IN PWRUP WORD
*
*
***   LOWER SCRATCHPAD REGISTER SAVE AREA DURING INTERRUPTS   ***
*
* STATUS GOES IN REG 9 AND DC GOES IN REG H
*
ACCSAV  EQU     8               ;ACCUMULATOR SAVE AREA
ISARSV  EQU     7               ;ISAR SAVE AREA
CKSM    EQU     6               ;RUNNING CHECKSUM ON BUS MESSAGE
RMCKSM  EQU     5               ;ROM CHECKSUM SAVE AREA
ISINIT  EQU     4               ;ISAR POINTER SAVE AREA TO TOP OF RAM DATABASE
PWRUP   EQU     3               ;POWER-UP/CHARACTERIZATION WORD
COSCNT  EQU     2               ;NUMBER OF COV'S ON CARD
*
*                               ;EQUATES FOR RAM SAVE AREA DURING CMND PROCESSIN
*
DATSV   EQU     H"01"           ;SAVE AREA FOR BUFFER DATA WORD
ADRSV   EQU     H"00"           ;SAVE AREA FOR COMMAND POINT ADDRESS BUFFER WORD
"ORION DIGITAL FUNCTION CARD"
CNTMP   EQU     H"00"           ;SAVE AREA FOR BYTE COUNT ON XMIT
*
*
***   THESE FIVE BYTES CONTROL COMMUNICATION WITH THE LINE CARD.   ***
*
BFPLCU  EQU     2               ;PTR TO SCRATCHPAD BUFFER
BFPLCL  EQU     0
*
DLYCU   EQU     2               ;LCRDY TIME OUT COUNT
DLYCL   EQU     1
LCTO    EQU     50              ;APPROXIMATELY 1 MS.
*
PBCTLU  EQU     2               ;POWERS BUS CONTROL BYTE
PBCTLL  EQU     2
*
CNTLCU  EQU     2               ;MESSAGE COUNT BEING XFER'D
CNTLCL  EQU     3
*
*
* LINE CARD COMMUNICATION BUFFER
* USES OCTET 3, O"37" IS THE FIRST BYTE OF THE BUFFER
*
LCBUFU  EQU     3
LCBUFL  EQU     7
LCBUFR  EQU     O"37"
*
***   COMMUNICATION CODES   ***
*
ACK     EQU     H"06"           ;VALID ACKNOWLEDGE
NAK     EQU     H"15"           ;NEGATIVE ACKNOWLEDGE
CKSMER  EQU     H"C0"           ;REASON FOR NAK IS CHECKSUM ERROR
SETER1  EQU     H"E0"           ;TRIED TO COMMAND AN UNCHARACTERIZED DO
SETER2  EQU     H"E1"           ;ATTEMPTED TO TURN OFF A PULSED POINT
SETER3  EQU     H"E2"           ;HARDWARE MALFUNCTION, WOULD NOT ACCEPT CMND
RNGERR  EQU     H"E3"           ;POINT COMMAND OUT OF RANGE FOR FC CAPACITY
ADRERR  EQU     H"E4"           ;POINT ADDRESSING ERROR
DATERR  EQU     H"E5"           ;INVALID DATA SENT TO FUNCTION CARD
CVDTER  EQU     H"E6"           ;CHAR' CMND TO PA REQUIRES SCOV DATA
PACCER  EQU     H"E7"           ;SCOV DATA VALID, POINT NOT DEFINED AS PA
OVRERR  EQU     H"ED"           ;OVERRUN ERROR - BUFFER CAPACITY EXCEEDED
CNTERR  EQU     H"EE"           ;INCORRECT NUMBER OF BYTES FOR MESSAGE
CVERR   EQU     H"EF"           ;FAILURE TO FIND COV'S
CHAREQ  EQU     H"FC"           ;FUNCTION CARD REQUIRES CHARACTERIZATION
CMNDER  EQU     H"FD"           ;COMMAND TO FC NOT APPLICABLE
*
*
*
***   EQUATES FOR DO STATUS TABLE ***
*
PTS16   EQU     H"2F"   ;ESTABLISH UPPER LIMIT FOR 16 POINT ISAR TABLE
TLBTM   EQU     H"1F"   ;IDENTIFY BOTTOM OF DO POINT TABLE
PASCNT  EQU     O"2"    ;UPPER ISAR DIGIT POINTING TO CKSM PASS COUNT
ST16CH  EQU     H"40"   ;SET CHAR' FLAG FOR LOWER 16 POINTS
ST32CH  EQU     H"10"   ;SET CHAR' FLAG FOR UPPER 16 POINTS
```

```
"ORION DIGITAL FUNCTION CARD"
*
*
***   EQUATES FOR DI STATUS TABLE   ***
*
CLFLGS  EQU     H"77"   ;CLEAR "'KNOWS OF CHANGE FLAG" AND COS FLAG"
CLLCF   EQU     H"7F"   ;CLEAR "LINE CARD KNOWS OF CHANGE" FLAG
CLCOS   EQU     H"F7"   ;CLEAR "CHANGE-OF-STATE" FLAG
CLLTDF  EQU     H"EF"   ;CLEAR "LAST TIME WAS DIFFERENT" FLAG
STCOS   EQU     H"08"   ;SET THE COS FLAG
STLTDF  EQU     H"10"   ;SET "LAST TIME WAS DIFFERENT" FLAG
STLCF   EQU     H"80"   ;SET "LINE CARDS KNOWS OF CHANGE" FLAG
STINPT  EQU     H"20"   ;CHANGE POINT STATE
PACNTU  EQU     2       ;UPPER OCTAL DIGIT OF ISAR POINTING TO PA'S COUNT
PACNTL  EQU     7       ;LOWER OCTAL DIGIT OF ISAR POINTING TO PA'S COUNT
PADATU  EQU     5       ;UPPER OCTAL DIGIT OF ISAR POINTING TO PA STATUS BITS
PADATL  EQU     7       ;LOWER OCTAL DIGIT OF ISAR POINTING TO PA STATUS BITS
PANUM2  EQU     O"56"   ;ISAR ADDRESS OF DATA FIELD FOR SECOND PA
SCVPA1  EQU     O"25"   ;ISAR POINTER TO PA #1'S SCOV COUNTDOWN REGISTER
CHARDI  EQU     H"01"   ;CHARACTERIZE A DI POINT
CHARPA  EQU     H"20"   ;ENABLE POINT AS A PULSE ACCUMULATOR
DINBLE  EQU     H"04"   ;ENABLE A DI POINT FOR COS REPORTING
DIDSBLE EQU     H"FB"   ;DISABLE A DI POINT FOR COS REPORTING
*
*
***   EQUATES FOR CMND PROCESSING   ***
*
RPTCMD  EQU     H"06"   ;READ A POINT'S STATUS
SETCMD  EQU     H"07"   ;SET DO
SIGCOV  EQU     H"0A"   ;SET SIGNIFICANT CHANGE OF VALUE FOR POINT
CVNABLE EQU     H"0B"   ;ENABLE A POINT FOR COV REPORTING
RDFCRM  EQU     H"0C"   ;READ FUNCTION CARD RAM
WTFCRM  EQU     H"0D"   ;WRITE TO FUNCTION CARD ROM
CHRCMD  EQU     H"11"   ;CHARACTERIZE FUNCTION CARD
WRUCMD  EQU     H"80"   ;REQUEST FUNCTION CARD MASK ID
COVCNT  EQU     H"81"   ;REQUEST ANY COS COUNT
COSDAT  EQU     H"82"   ;REQUEST FOR COS DATA
CVAKCMD EQU     H"83"   ;ACKNOWLEDGE RECEIPT OF COV'S
SETCHR  EQU     H"80"   ;SET CHAR' REQUIRED FLAG
*
*
"ORION DIGITAL FUNCTION CARD"
*
****************************************************************
*
*                   DIGITAL INPUT CARD STATUS BYTE BIT MAP
*
****************************************************************
*
*
*
*    BIT 8           BIT 7           BIT 6           BIT 4
*
******************************************************************
*              *              *              *              *
*  LINE CARD   *              *   CURRENT    *  LAST TIME   *
*              *              *              *              *
*   KNOWS OF   *    0 = DI    *    STATE     *     WAS      *
*              *              *              *              *
*    CHANGE    *    1 = PA    *   OF INPUT   *  DIFFERENT   *
*              *              *              *              *
*     FLAG     *              *              *    FLAG      *
*              *              *              *              *
******************************************************************
*
*
*                  BIT 3           BIT 2           BIT 1          BIT 0
*
*              *****************************************************************
*              *              *              *              *              *
*              *  COS FOUND   *  E/D FLAG    *   PA EDGE    *    POINT     *
*              *              *              *              *              *
*              *              *   FOR COS    * SENSITIVITY  * CHARACTERIZED*
*              *              *              *              *              *
*              *              *  REPORTING   * 0=CNT 1 EDGE *     FLAG     *
*              *              *              *              *              *
*              *              *              * 1=CNT 2 EDGES*              *
*              *              *              *              *              *
*              *****************************************************************
*
*
*
```

```
"ORION DIGITAL FUNCTION CARD"
         *
         **************************************************
         *                                                *
         ***   DIGITAL INPUT FUNCTION CARD MEMORY MAP   ***
         *                                                *
         **************************************************
         *
         *
         *        ISAR ADDRESS                            FUNCTION
         *
         ***********************************************************************
         *
         *     DEC      HEX      OCTAL
         *
         *     63       3F       077      ;
         *
         *     62       3E       076      ;
         *
         *     61       3D       075      ;
         *
         *     60       3C       074      ;
         *
         *     59       3B       073      ;
         *
         *     58       3A       072      ;
         *
         *     57       39       071      ;
         *
         *     56       38       070      ;
         *
         *     55       37       067      ;
         *
         *     54       36       066      ;
         *
         *     53       35       065      ;
         *
         *     52       34       064      ;
         *
         *     51       33       063      ;
         *
         *     50       32       062      ;
         *
         *     49       31       061      ;
         *
         *     48       30       060      ;
         *
         *     47       2F       057      ;
         *
         *     46       2E       056      ;
         *
         *     45       2D       055      ;
         *
         *     44       2C       054      ;

"ORION DIGITAL FUNCTION CARD"
         *
         *     43       2B       053      ;
         *
         *     42       2A       052      ;
         *
         *     41       29       051      ;
         *
         *     40       28       050      ;
         *
         *     39       27       047      ;
         *
         *     38       26       046      ;
         *
         *     37       25       045      ;
         *
         *     36       24       044      ;
         *
         *     35       23       043      ;
         *
         *     34       22       042      ;
         *
         *     33       21       041      ;
         *
         *     32       20       040      ;
         *
```

```
*        31      1F      037      ;TOP OF I/O BUFFER - FIRST BYTE
*
*        30      1E      036      ;I/O BUFFER - SECOND BYTE
*
*        29      1D      035      ;I/O BUFFER - THIRD BYTE
*
*        28      1C      034      ;I/O BUFFER - FOURTH BYTE
*
*        27      1B      033      ;I/O BUFFER - FIFTH BYTE
*
*        26      1A      032      ;I/O BUFFER - SIXTH BYTE
*
*        25      19      031      ;I/O BUFFER - SEVENTH BYTE
*
*        24      18      030      ;BOTTOM OF I/O BUFFER - EIGHTH BYTE
*
*        23      17      027      ;CURRENT COUNT FOR PA #1 - MAPS TO POINT 15
*
*        22      16      026      ;CURRENT COUNT FOR PA #2 - MAPS TO POINT 14
*
*        21      15      025      ;SIGNIFICANT COV COUNT FOR PA #1
*
*        20      14      024      ;SIGNIFICANT COV COUNT FOR PA #2
*
*        19      13      023      ;NUMBER OF BYTES TO SEND/RECEIVE
*
*        18      12      022      ;CURRENT BUS STATUS
*
*        17      11      021      ;BUS TIMEOUT - COUNTDOWN TO ZERO
"ORION DIGITAL FUNCTION CARD"
*
*        16      10      020      ;BUFFER POINTER TO CURRENT WORD TO REC/SEND
*
*        15      0F      017      ;TIMER INTERRUPT VECTOR ADDRESS - LOW BYTE
*
*        14      0E      016      ;TIMER INTERRUPT VECTOR ADDRESS - HIGH BYTE
*
*        13      0D      015      ;SCOV VALUE FOR PA #17
*
*        12      0C      014      ;SCOV VALUE FOR PA #16
*
*        11      0B      013      ;DATA COUNTER SAVE AREA - LOWER BYTE
*
*        10      0A      012      ;DATA COUNTER SAVE AREA - HIGH BYTE
*
*         9      09      011      ;STATUS REGISTER SAVE AREA
*
*         8      08      010      ;ACCUMULATOR SAVE AREA
*
*         7      07      007      ;ISAR SAVE AREA
*
*         6      06      006      ;BUS CKSM SAVE AREA
*
*         5      05      005      ;ROM CKSM SAVE AREA
*
*         4      04      004      ;ISAR POINTER TO TOP OF RAM DATABASE SAVE AREA
*
*         3      03      003      ;POWER FAIL AND CHARACTERIZATION STATUS WORD
*
*         2      02      002      ;NUMBER OF COV'S ON CARD
*
*         1      01      001      ;MISCELLANEOUS SAVE AREA FOR DATA
*
*         0      00      000      ;MISCELLANEOUS SAVE AREA FOR POINT ADDRESS
*
*
"ORION DIGITAL FUNCTION CARD"
*
*
**************************************************
*                                                *
***   DIGITAL OUTPUT FUNCTION CARD MEMORY MAP    ***
*                                                *
**************************************************
*
*
*       ISAR ADDRESS                             FUNCTION
*
****************************************************************************
*
*     DEC     HEX     OCTAL
*
```

```
*    63    3F    077    ;
*
*    62    3E    076    ;
*
*    61    3D    075    ;
*
*    60    3C    074    ;
*
*    59    3B    073    ;
*
*    58    3A    072    ;
*
*    57    39    071    ;
*
*    56    38    070    ;
*
*    55    37    067    ;
*
*    54    36    066    ;
*
*    53    35    065    ;
*
*    52    34    064    ;
*
*    51    33    063    ;
*
*    50    32    062    ;
*
*    49    31    061    ;
*
*    48    30    060    ;
*
*    47    2F    057    ;
*
*    46    2E    056    ;
*
*    45    2D    055    ;
*

'ORION DIGITAL FUNCTION CARD"
*    44    2C    054    ;
*
*    43    2B    053    ;
*
*    42    2A    052    ;
*
*    41    29    051    ;
*
*    40    28    050    ;
*
*    39    27    047    ;
*
*    38    26    046    ;
*
*    37    25    045    ;
*
*    36    24    044    ;
*
*    35    23    043    ;
*
*    34    22    042    ;
*
*    33    21    041    ;
*
*    32    20    040    ;
*
*    31    1F    037    ;TOP OF I/O BUFFER - FIRST BYTE
*
*    30    1E    036    ;I/O BUFFER - SECOND BYTE
*
*    29    1D    035    ;I/O BUFFER - THIRD BYTE
*
*    28    1C    034    ;I/O BUFFER - FOURTH BYTE
*
*    27    1B    033    ;I/O BUFFER - FIFTH BYTE
*
*    26    1A    032    ;I/O BUFFER - SIXTH BYTE
*
*    25    19    031    ;I/O BUFFER - SEVENTH BYTE
*
```

```
        *       24      18      030     ;BOTTOM OF I/O BUFFER - EIGHTH BYTE
        *
        *       23      17      027     ;# OF SCAN PASSES LEFT BEFORE CKSM PERFORMED
        *
        *       22      16      026     ;
        *
        *       21      15      025     ;
        *
        *       20      14      024     ;
        *
        *       19      13      023     ;NUMBER OF BYTES TO SEND/RECEIVE
        *
        *       18      12      022     ;CURRENT BUS STATUS
        *
  "ORION DIGITAL FUNCTION CARD"
        *       17      11      021     ;BUS TIMEOUT - COUNTDOWN TO ZERO
        *
        *       16      10      020     ;BUFFER POINTER TO CURRENT WORD TO REC/SEND
        *
        *       15      0F      017     ;
        *
        *       14      0E      016     ;
        *
        *       13      0D      015     ;
        *
        *       12      0C      014     ;
        *
        *       11      0B      013     ;DATA COUNTER SAVE AREA - LOWER BYTE
        *
        *       10      0A      012     ;DATA COUNTER SAVE AREA - HIGH BYTE
        *
        *       9       09      011     ;STATUS REGISTER SAVE AREA
        *
        *       8       08      010     ;ACCUMULATOR SAVE AREA
        *
        *       7       07      007     ;ISAR SAVE AREA
        *
        *       6       06      006     ;BUS CKSM SAVE AREA
        *
        *       5       05      005     ;ROM CKSM SAVE AREA
        *
        *       4       04      004     ;ISAR POINTER TO TOP OF RAM DATABASE SAVE AREA
        *
        *       3       03      003     ;POWER FAIL AND CHARACTERIZATION STATUS WORD
        *
        *       2       02      002     ;NUMBER OF COV'S ON CARD
        *
        *       1       01      001     ;MISCELLANEOUS SAVE AREA FOR DATA
        *
        *       0       00      000     ;MISCELLANEOUS SAVE AREA FOR POINT ADDRESS
        *
        *
  "ORION DIGITAL FUNCTION CARD"
        *
        *
        *
        *
        ***********************************
        *                                 *
        ***     PROGRAM INITIALIZATION    ***
        *                                 *
        ***********************************
        *
                ORG     H"00"
        *
        *
        ***     SET UP TURN-ON DELAY TIME     ***
        *
0000 73         START   LIS     H"03"           ;LOAD DELAY TIME
0001 50                 LR      0,A             ;
0002 51                 LR      1,A             ;
        *
        *
        ***     START APPROX 15 MILLISECOND DELAY AND INIT HARDWARE     ***
        *
0003 20 00      START1  LI      LRSET           ;LET'S RESET THOSE HARDWARE LATCHES
0005 B1                 OUTS    LMODE           ;GO DO IT!
0006 20 20              LI      DSELPB          ;DEACTIVATE THE POWERS BUS - LESS I LOAD IT DOWN
0008 B0                 OUTS    PBUSC           ;
0009 30                 DS      0               ;DECREMENT LSB BYTE
000A 94 F8              BNZ     START1          ;IF 0, CONTINUE DELAY
```

```
000C 31            DS      1             ;DECREMENT MSB BYTE
000D 94 F5         BNZ     START1        ;IF 0,, CONTINUE DELAY
000F 29 05 18      JMP     RAMCHK        ;GO AND CHECK RAM FOR INTEGRITY
             *
             *
             ********************
             *                  *
             ***   IDLE LOOP  ***
             *                  *
             ********************
             *
             *                  ;THE PROGRAM NORMALLY LOOPS ON THIS PIECE OF CODE IN
             *                  ;ANTICIPATION OF A TIMER OR EXTERNAL INTERRUPT.
             *
0012 90 FF   IDLE    BR      IDLE      ; AGAIN AND AGAIN...
             *
             *
             *
             *
             ************************************************
             ************************************************
             *                                              *
             ***   VECTOR ADDRESS FOR TIMER INTERRUPT ROUTINE   ***
             *                                              *
             ************************************************

   "ORION DIGITAL FUNCTION CARD"
             ************************************************
             *
                     ORG     H"20"
             *
0020 0D      TIMST   LR      P0,Q      ;LOAD PROGRAM COUNTER - EXECUTE DI,DO, OR TIMER TEST
             *
             *
             ********************************************
             *                                          *
             ***   DIGITAL OUTPUT TIMER INTERRUPT ROUTINE   ***
             *                                          *
             ********************************************
             *
0021 20 E9   TIMDO   LI      INTCT2    ;DISABLE TIMER INTERRUPT
0023 B6              OUTS    ICP       ;SEND IT AWAY!
0024 0A              LR      A,IS      ;GET THE CURRENT VALUE OF THE ISAR POINTER
0025 25 1F           CI      TLBTM     ;CHECK TO SEE IF I GOT TO THE BOTTOM OF THE TABLE.IF I
0027 91 03           BM      SCAN      ;DIDN"T MAKE IT,CONTINUE WHERE I LEFT OFF
             *                         ;OTHERWISE I WILL RESTART THIS PROGRAM TOO SOON
             *
             ***   LOAD ISAR TO TOP OF RAM DATABASE BASED ON CARD CAPACITY   ***
             *
0029 44              LR      A,ISINIT        ;GET ISAR POINTER - (COMPUTED AT INIT)
002A 0B              LR      IS,A            ;INIT THE ISAR
             *                               ;VALUE LOADED IS AT THE TOP OF THE TABLE FOR THE
             *                               ;POINT CAPACITY
             *
             *
             ***   TABLE SCAN FOR PULSED POINTS COUNTING DOWN   ***
             *
002B 1A      SCAN    DI                ;DISABLE INT'S WHILE PLAYING WITH DATABASE
002C 4C              LR      A,S       ;GET THE CURRENT POINT FOR EXAMINATION.
002D 24 F8           AI      D"248"    ;SUBTRACT 08 FROM THE ACCUM TO DETERMINE WHETHER I AM
             *                         ;A PULSED OR STEADY STATE POINT
002F 91 10           BM      NXTPT     ;IF I JUMP, MY COUNT HAS EXPIRED OR I AM SS
0031 94 0D           BNZ     CTDWN     ;IF I JUMP, I"M COUNTING DOWN
             *                         ;THE COUNTDOWN HAS EXPIRED, TURN OFF THE POINT.
             *
             *
             *
             ***   PULSED POINT HAS TIMED OUT - TURN IT OFF!!!   ***
             *
0033 71      PTOFF   LIS     LWRT      ;ENABLE LATCHES TO ACCEPT DATA
0034 B1              OUTS    LMODE     ;GO DO IT!
0035 0A              LR      A,IS      ;GET THE CURRENT ISAR POINTER
0036 24 E0           AI      D"224"    ;FIND THE ABSOLUTE BINARY VALUE
0038 2A 00 59        DCI     CNVTB     ;INIT ROM POINTER TO BIT MAP CONVERSION TABLE
003B 8E              ADC               ;OFFSET THE DC BY THE ACCUM SUM
003C 16              LM                ;GET THE DO POINT HARDWARE ADDRESS
003D 18              COM               ;INVERT DATA FOR INVERTING OUTPUT PORT
003E B4              OUTS    LDATA     ;TURN THE POINT "OFF"
             *
             *
             ***   DECREMENT A DO'S PULSE COUNT   ***
```

```
"ORION DIGITAL FUNCTION CARD"
               ******************************************************
               *
                         ORG       H"20"
               *
0020 0D        TIMST     LR        P0,Q      ;LOAD PROGRAM COUNTER - EXECUTE DI,DO, OR TIMER TEST
               *
               *
               ***********************************************
               *                                             *
               ***   DIGITAL OUTPUT TIMER INTERRUPT ROUTINE  ***
               *                                             *
               ***********************************************
               *
0021 20 E9     TIMDO     LI        INTCT2    ;DISABLE TIMER INTERRUPT
0023 B6                  OUTS      ICP       ;SEND IT AWAY!
0024 0A                  LR        A,IS      ;GET THE CURRENT VALUE OF THE ISAR POINTER
0025 25 1F               CI        TLBTM     ;CHECK TO SEE IF I GOT TO THE BOTTOM OF THE TABLE.IF I
0027 91 03               BM        SCAN      ;DIDN"T MAKE IT,CONTINUE WHERE I LEFT OFF
               *                             ;OTHERWISE I WILL RESTART THIS PROGRAM TOO SOON
               *
               ***   LOAD ISAR TO TOP OF RAM DATABASE BASED ON CARD CAPACITY   ***
               *
0029 44                  LR        A,ISINIT          ;GET ISAR POINTER - (COMPUTED AT INIT)
002A 0B                  LR        IS,A              ;INIT THE ISAR
               *                                     ;VALUE LOADED IS AT THE TOP OF THE TABLE FOR THE
               *                                     ;POINT CAPACITY
               *
               *
               ***   TABLE SCAN FOR PULSED POINTS COUNTING DOWN   ***
               *
002B 1A        SCAN      DI                  ;DISABLE INT'S WHILE PLAYING WITH DATABASE
002C 4C                  LR        A,S       ;GET THE CURRENT POINT FOR EXAMINATION.
002D 24 F8               AI        D"248"    ;SUBTRACT 08 FROM THE ACCUM TO DETERMINE WHETHER I AM
               *                             ;A PULSED OR STEADY STATE POINT
002F 91 10               BM        NXTPT     ;IF I JUMP, MY COUNT HAS EXPIRED OR I AM SS
0031 94 0D               BNZ       CTDWN     ;IF I JUMP, I"M COUNTING DOWN
               *                             ;THE COUNTDOWN HAS EXPIRED, TURN OFF THE POINT.
               *
               *
               *
               ***   PULSED POINT HAS TIMED OUT - TURN IT OFF!!!   ***
               *
0033 71        PTOFF     LIS       LWRT      ;ENABLE LATCHES TO ACCEPT DATA
0034 B1                  OUTS      LMODE     ;GO DO IT!
0035 0A                  LR        A,IS      ;GET THE CURRENT ISAR POINTER
0036 24 E0               AI        D"224"    ;FIND THE ABSOLUTE BINARY VALUE
0038 2A 00 59            DCI       CNVTB     ;INIT ROM POINTER TO BIT MAP CONVERSION TABLE
003B 8E                  ADC                 ;OFFSET THE DC BY THE ACCUM SUM
003C 16                  LM                  ;GET THE DO POINT HARDWARE ADDRESS
003D 18                  COM                 ;INVERT DATA FOR INVERTING OUTPUT PORT
003E B4                  OUTS      LDATA     ;TURN THE POINT "OFF"
               *
               *
               ***   DECREMENT A DO'S PULSE COUNT   ***
"ORION DIGITAL FUNCTION CARD"
               *
003F 3C        CTDWN     DS        S         ;DECREMENT THE ELAPSED TIME COUNTER
               *
               *
               ***   ADJUST ISAR FOR NEXT DO GROUP TO BE PROCESSED   ***
               *
0040 1B        NXTPT     EI                  ;ENABLE INTERRUPTS TO SEE IF MESSAGE PENDING
0041 4E                  LR        A,D       ;DECREMENT THE ISAR
0042 8F E8               BR7       SCAN      ;IF I JUMP, MORE POINTS NEED TO BE CHECKED WITHIN
               *                             ;THE SAME HARDWARE CHIP GROUP
0044 0A                  LR        A,IS      ;GET THE ISAR POINTER
0045 24 F8               AI        D"248"    ;DECREMENT UPPER ISAR DIGIT
0047 0B                  LR        IS,A      ;LOAD NEW VALUE INTO ISAR. (THE NEXT CHIP PROCESSED)
0048 25 1F               CI        TLBTM     ;HAVE I REACHED THE BOTTOM OF THE TABLE
004A 91 E0               BM        SCAN      ;IF I JUMP, PROCESS NEXT CHIP GROUP
004C 20 EB               LI        INTCT1    ;ENABLE TIMER INT
004E B6                  OUTS      ICP       ;DO IT!!
               *
               ***   UPDATE CHECKSUM COUNTER FOR ROM TEST   ***
               *
004F 62                  LISU      PASCNT            ;POINT ISAR TO CKSM PASS COUNT!
0050 3C                  DS        S                 ;DECREMENT THE ROM CHECK PASS COUNT
0051 94 C0               BNZ       IDLE              ;IF B., DO IDLE LOOP
0053 20 E9               LI        INTCT2            ;IT'S TIME TO CHECK ROM. DISABLE TIMER INT
               *                                     ;SO I CAN FINISH THIS ROUTINE, OTHERWISE I HAVE
```

```
          *                                        ;TO DO MULTIPLE NESTING!!
0055 86                   OUTS    ICP              ;DISABLE TIMER INT
0056 29 05 7A             JMP     ROMCHK           ;TIME TO DO A ROM CHECKSUM TEST!!
          *
          *
          *
          *
          *
          *

"ORION DIGITAL FUNCTION CARD"
          *
          ************************************************
          *                                              *
          ***   ROM DATABASE FOR DIGITAL OUTPUT CARD   ***
          *                                              *
          ************************************************
          *
          *
          ***   ADDRESS OF OCTAL HARDWARE LATCHES ON DO CARD   ***
          *
0059 01   CNVTB   DC      H"01"
005A 11           DC      H"11"
005B 21           DC      H"21"
005C 31           DC      H"31"
005D 41           DC      H"41"
005E 51           DC      H"51"
005F 61           DC      H"61"
0060 71           DC      H"71"
0061 02           DC      H"02"
0062 12           DC      H"12"
0063 22           DC      H"22"
0064 32           DC      H"32"
0065 42           DC      H"42"
0066 52           DC      H"52"
0067 62           DC      H"62"
0068 72           DC      H"72"
0069 04           DC      H"04"
006A 14           DC      H"14"
006B 24           DC      H"24"
006C 34           DC      H"34"
006D 44           DC      H"44"
006E 54           DC      H"54"
006F 64           DC      H"64"
0070 74           DC      H"74"
0071 08           DC      H"08"
0072 18           DC      H"18"
0073 28           DC      H"28"
0074 38           DC      H"38"
0075 48           DC      H"48"
0076 58           DC      H"58"
0077 68           DC      H"68"
0078 78           DC      H"78"
          *
          *

"ORION DIGITAL FUNCTION CARD"
          *
          ********************************************
          *                                          *
          *** ROM DATABASE FOR DIGITAL INPUT CARD  ***
          *                                          *
          ********************************************
          *
          ***   ADDRESS FOR HARDWARE OCTAL MULTIPLEXORS   ***
          *
0079 08   DITBL   DC      H"08"
007A 18           DC      H"18"
007B 28           DC      H"28"
007C 38           DC      H"38"
007D 48           DC      H"48"
007E 58           DC      H"58"
007F 68           DC      H"68"
0080 78           DC      H"78"
0081 04           DC      H"04"
0082 14           DC      H"14"
0083 24           DC      H"24"
0084 34           DC      H"34"
0085 44           DC      H"44"
0086 54           DC      H"54"
0087 64           DC      H"64"
```

```
0088 74                 DC       H"74"
0089 02        PATBL    DC       H"02"
008A 12                 DC       H"12"
008B 22                 DC       H"22"
008C 32                 DC       H"32"
008D 42                 DC       H"42"
008E 52                 DC       H"52"
008F 62                 DC       H"62"
0090 72                 DC       H"72"
0091 01                 DC       H"01"
0092 11                 DC       H"11"
0093 21                 DC       H"21"
0094 31                 DC       H"31"
0095 41                 DC       H"41"
0096 51                 DC       H"51"
0097 61                 DC       H"61"
0098 71                 DC       H"71"
               *
               *

"ORION DIGITAL FUNCTION CARD"
               *
               ********
               ********
               *
               * EXTERNAL INTERRUPT STARTS HERE
               * THE LINE CARD WANTS SOMETHING
               *
               ********
               ********
                        ORG      H"A0"
00A0 1E                 LR       J,W              ;SAVE STATUS,
00A1 58                 LR       ACCSAV,A         ;ACCUMULATOR,
00A2 0A                 LR       A,IS             ;ISAR,
00A3 57                 LR       ISARSV,A
00A4 11                 LR       H,DC             ;AND DC
               *
               * SET UP TO RECEIVE MSG
               *
00A5 62                 LISU     BFPLCU           ;INIT BUF PTR
00A6 68                 LISL     BFPLCL
00A7 20 1F              LI       LCBUFR
00A9 5D                 LR       I,A
00AA 20 32              LI       LCTO             ;SET TIMEOUT COUNT
00AC 5D                 LR       I,A
00AD 20 F0              LI       PBINIR           ;INIT BUS CTRL BYTE
00AF 5D                 LR       I,A
00B0 70                 CLR                       ;READY PORT FOR INPUT
00B1 B5                 OUTS     PBUSD
00B2 50                 LR       CNTMP,A          ;CLEAR REG TO COUNT BYTES PASSED TO FUNCTION CAR
00B3 20 30              LI       PBRDCT           ;ENABLE BUS TO GET COUNT ONLY
00B5 B0                 OUTS     PBUSC
00B6 A5                 INS      PBUSD            ;READ COUNT
00B7 5E                 LR       D,A              ;SAVE MSG CNT
00B8 56                 LR       CKSM,A           ;INIT CKSM
00B9 C6                 AS       CKSM
00BA 19                 LNK
00BB 56                 LR       CKSM,A           ;
               *
               * ACK RECEIPT OF LAST BYTE AND WAIT FOR NEXT
               *
00BC 4C        ACKLC    LR       A,S
00BD 21 7F              NI       LCRDYM           ;READY BIT OF PORT FOR READ
00BF B0                 OUTS     PBUSC
00C0 A0        LCWATA   INS      PBUSC            ;DATA RDY?
00C1 EE                 XS       D                ;I.E. HAS LCRDY CHANGED?
00C2 91 07              BM       LCWATB           ;IF MI, YES
00C4 3D                 DS       1                ;TIMEOUT?
00C5 94 FA              BNZ      LCWATA           ;IF NZ, NOT YET
00C7 29 07 06           JMP      LCFAL            ;ABORT MSG RCV ON TIMEOUT
00CA 20 32     LCWATB   LI       LCTO             ;RESET TIMEOUT COUNT
00CC 5D                 LR       I,A
00CD 4C                 LR       A,S              ;UPDATE BUS CTRL
00CE 23 C0              XI       LCRDY+FCRDY

"ORION DIGITAL FUNCTION CARD"
00D0 5C                 LR       S,A
               *
               * GET DATA AND SAVE
               *
```

```
00D1 30            DS      CNTMP           ;BUMP BYTE COUNT
00D2 68            LISL    BFPLCL
00D3 4C            LR      A,S
00D4 0B            LR      IS,A
00D5 A5            INS     PBUSD
00D6 5E            LR      D,A
00D7 E6            XS      CKSM            ;ENTER INTO CKSM
00D8 56            LR      CKSM,A
00D9 C6            AS      CKSM
00DA 19            LNK
00DB 56            LR      CKSM,A
00DC 0A            LR      A,IS            ;UPDATE BUF PTR SAVE
               * LET BUF PTR WRAP AROUND IN THIS 8 BYTE BUFFER IF THE
               * LINE CARD IS SO FOOLISH AS TO SEND MORE THAN 8 BYTES.
00DD 62            LISU    BFPLCU
00DE 68            LISL    BFPLCL
00DF 5C            LR      S,A
               *
               * MSG DONE?
               *
00E0 68            LISL    CNTLCL
00E1 3E            DS      D
00E2 94 D9         BNZ     ACKLC           ;IF NZ, NOT YET
               *
               * ACK LAST BYTE
               *
00E4 4E            LR      A,D
00E5 21 7F         NI      LCRDYM
00E7 B0            OUTS    PBUSC
00E8 20 32         LI      LCTO            ;RE-LOAD SHOT CLOCK WHILE WE'RE HERE
00EA 5C            LR      S,A
               *
               * CKSM OK?
               *
00EB 70            CLR
00EC E6            XS      CKSM
00ED 84 65         BZ      RCVDON          ;IF Z, MSG OK, PROCESS COMMAND
               *
               *
               ********************************
               *                              *
               ***    PROCESS CKSM ERROR    ***
               *                              *
               ********************************
               *
00EF 20 C0     CKSERR  LI      CKSMER          ;
00F1 51            LR      DATSV,A         ;STORE ERROR CODE
00F2 29 06 A2      JMP     ERROR           ;GO TO COMMON XMIT ROUTINE
               *
               *

    "ORION DIGITAL FUNCTION CARD"
               ************************************
               *                                  *
               ***    READ FUNCTION CARD RAM    ***
               *                                  *
               ************************************
               *
               *          **************
               *          MESSAGE FORMAT
               *          **************
               *
               *          RECEIVE:        BYTE 0 - TYPE OF COMMAND
               *                          BYTE 1 - FUNCTION CARD ADDRESS
               *                          BYTE 2 - RAM LOCATION TO BE READ
               *                          BYTE 3 -
               *                          BYTE 4 -
               *                          BYTE 5 -
               *                          BYTE 6 -
               *                          BYTE 7 -
               *
               *          TRANSMIT:       BYTE 0 - "ACK"
               *                          BYTE 1 - CONTENTS OF RAM MEMORY LOCATION
               *                          BYTE 2 - "ZERO BYTE"
               *                          BYTE 3 -
               *                          BYTE 4 -
               *                          BYTE 5 -
               *                          BYTE 6 -
               *                          BYTE 7 -
               *
00F5 40        RDRAM   LR      A,CNTMP         ;RECALL BYTE COUNT
```

```
00F6 25 03                CI      H"03"        ;CORRECT NUMBER OF BYTES?
00F8 84 04                BZ      RDRAM1       ;IF B., OKAY!
00FA 29 06 90             JMP     ERRCNT       ;TOO MANY...OR TOO LITTLE
00FD 6D         RDRAM1    LISL    LCBUFL-2     ;POINT TO RM TO BE READ
00FE 4C                   LR      A,S          ;GET RAM ADDRESS
00FF 21 C0                NI      H"C0"        ;CHECK FOR EXTRANEOUS DATA
0101 84 04                BZ      RDRAM2       ;IF B., OKAY!
0103 29 06 9F             JMP     ERRDAT       ;PROCESS DATA ERROR
0106 4C         RDRAM2    LR      A,S          ;RECALL ADDRESS
0107 0B                   LR      IS,A         ;INIT ISAR
0108 4C                   LR      A,S          ;GET DATA
0109 51                   LR      DATSV,A      ;SAVE FOR JUST A BIT
010A 63                   LISU    LCBUFU       ;INIT ISAR TO OUTPUT BUFFER
010B 6F                   LISL    LCBUFL       ;
010C 20 06                LI      ACK          ;
010E 5E                   LR      D,A          ;STUFF ACK
010F 41                   LR      A,DATSV      ;RECALL RAM DATA
0110 5E                   LR      D,A          ;STUFF
0111 70                   CLR                  ;THROW IN A ZERO BYTE
0112 5C                   LR      S,A          ;
0113 29 06 B0             JMP     SEND         ;XMIT TIME!!
                *
                *
                *
"ORION DIGITAL FUNCTION CARD"
                **************************************
                *                                    *
                ***    WRITE TO FUNCTION CARD RAM    ***
                *                                    *
                **************************************
                *
                *        **************
                *        MESSAGE FORMAT
                *        **************
                *
                *        RECEIVE:          BYTE 0 - TYPE OF COMMAND
                *                          BYTE 1 - FUNCTION CARD ADDRESS
                *                          BYTE 2 - RAM LOCATION TO BE WRITTEN
                *                          BYTE 3 - DATA TO BE WRITTEN
                *                          BYTE 4 -
                *                          BYTE 5 -
                *                          BYTE 6 -
                *                          BYTE 7 -
                *
                *        TRANSMIT:         BYTE 0 - "ACK"
                *                          BYTE 1 -
                *                          BYTE 2 -
                *                          BYTE 3 -
                *                          BYTE 4 -
                *                          BYTE 5 -
                *                          BYTE 6 -
                *                          BYTE 7 -
                *
                *
0116 40         WRTRM     LR      A,CNTMP      ;RECALL BYTE COUNT
0117 25 04                CI      H"04"        ;
0119 84 04                BZ      WRTRM1       ;IF B., OKAY
011B 29 06 90             JMP     ERRCNT       ;PROCESS BYTE ERROR
011E 6D         WRTRM1    LISL    LCBUFL-2     ;POINT TO LOCATION WRITTEN
011F 4E                   LR      A,D          ;GET RAM ADDRESS, POINT TO DATA
0120 21 C0                NI      H"C0"        ;CHECK FOR INVALID ADDRESS
0122 84 04                BZ      WRTRM2       ;IF B., OKAY
0124 29 06 9F             JMP     ERRDAT       ;
0127 4D         WRTRM2    LR      A,I          ;GET DATA
0128 51                   LR      DATSV,A      ;SAVE IT
0129 4C                   LR      A,S          ;RECALL ADDRESS
012A 0B                   LR      IS,A         ;INIT ISAR
012B 41                   LR      A,DATSV      ;RECALL DATA
012C 5C                   LR      S,A          ;PUT DATA AWAY
012D 29 06 AB             JMP     CMDACK       ;ALL DONE!!!
                *
                *
                *
                ******************************************
                *                                        *
                ***    PROCESS "WHO ARE YOU" COMMAND     ***
                *                                        *
                ******************************************
"ORION DIGITAL FUNCTION CARD"
                *        **************
                *        MESSAGE FORMAT
```

```
                *         **************
                *
                *         RECEIVE:        BYTE 0 - TYPE OF COMMAND
                *                         BYTE 1 - CARD ADDRESS (OPTIONAL)
                *                         BYTE 2 -
                *                         BYTE 3 -
                *                         BYTE 4 -
                *                         BYTE 5 -
                *                         BYTE 6 -
                *                         BYTE 7 -
                *
                *         TRANSMIT:       BYTE 0 - "ACK"
                *                         BYTE 1 - FUNCTIION CARD MASK I.D.:
                *                                   H"00" = 16 POINT DO
                *                                   H"10" = 32 POINT DO
                *                                   H"20" = 16 POINT DI
                *                                   H"30" = 32 POINT DI
                *                         BYTE 2 -
                *                         BYTE 3 -
                *                         BYTE 4 -
                *                         BYTE 5 -
                *                         BYTE 6 -
                *                         BYTE 7 -
                *
                *         ERRORS CHK'D:   1. INCORRECT BYTE COUNT
                *
                *
0130 30         GETID   DS      CNTMP           ;DID I RECEIVE CORRECT NUMBER OF BYTES?
0131 84 07              BZ      GETID1          ;IF B., EVERYTING IS KOSHER!
0133 30                 DS      CNTMP           ;ONE MORE TIME; IN CASE HOST ORG' MSG
0134 84 04              BZ      GETID1          ;
                *                               ;(PRGM NOTE: I ACCEPT ONE OR TWO BYTES ON THIS
                *                               ;CMND SINCE IT IS ORIGINATED BY THE LINE CARD
                *                               ;OR HOST!)
0136 29 06 90           JMP     ERRCNT          ;INCORRECT # OF BYTES FOR CMND, PROCESS ERROR!
0139 43         GETID1  LR      A,PWRUP         ;GET CHAR' WORD
013A 15                 SL      4               ;TEST FOR FC TYPE
013B 91 07              BM      IDENDO          ;IF I JUMP, THIS IS A DO CARD
013D 13         IDENDI  SL      1               ;TEST FOR POINT CAPACITY
013E 72                 LIS     H"02"           ;LOAD DI CODE, SIGN FLAGS STILL SET
013F 81 08              BP      IN16            ;IF I JUMP, THIS IS 16 DI
0141 90 05              BR      IDEN32          ;32 POINT CAPACITY
0143 13         IDENDO  SL      1               ;TEST FOR POINT CAPACITY
0144 70                 CLR                     ;LOAD DO CODE, SIGN FLAGS STILL SET
0145 81 03              BP      OUT16           ;IF I JUMP, THIS IS A 16 DO
0147 1F         IDEN32  INC                     ;ADD +1 TO ID CODE
0148 15         IN16    SL      4               ;ALIGN CODE INTO UPPER BYTE
0149 63         OUT16   LISU    LCBUFU          ;POINT ISAR TO TOP OF XMIT BUFFER
014A 6E                 LISL    LCBUFL-1        ;POINT ISAR TO SECOND WORD IN BUFFER
014B 5D                 LR      I,A             ;LOAD MASK I.D. INTO BUFFER
014C 20 06              LI      ACK             ;
014E 5C                 LR      S,A             ;STUFF ACK INTO BUFFER
    "ORION DIGITAL FUNCTION CARD"
014F 6E                 LISL    LCBUFL-1        ;ALIGN BUFFER POINTER
0150 29 06 B0           JMP     SEND            ;GO AND XMIT!!!
                *
                *
                ***     IS THIS A DI OR DO COMMAND?     ***
                *
0153 40         RCVDON  LR      A,CNTMP         ;GET # OF BYTES XMITED TO FUNCTION CARD
0154 18                 COM                     ;FIND ABSOLUTE VALUE! WE DON'T CORRECT FOR TWO'S
                *                               ;COMPLEMENT, SINCE I WANT TO IGNORE THE CKSM BYT
0155 50                 LR      CNTMP,A         ;RETURN NEW VALUE SO COMMANDS CAN USE IT!
0156 25 07              CI      H"07"           ;DID I OVERWRITE BUFFER?
0158 81 07              BP      RCV1            ;IF B., OKAY!
015A 20 ED              LI      OVRERR          ;LOAD ERROR CODE
015C 51                 LR      DATSV,A         ;SAVE FOR XMIT,
015D 29 06 A2           JMP     ERROR           ;PROCESS ERROR
0160 63         RCV1    LISU    LCBUFU          ;INIT UPPER ISAR DIGIT
0161 6F                 LISL    LCBUFL          ;INIT LOWER ISAR POINTER TO INPUT BUFFER
0162 4C                 LR      A,S             ;GET COMMAND BYTE
0163 25 0C              CI      RDFCRM          ;SHOULD I READ RAM?
0165 84 8F              BZ      RDRAM           ;
0167 25 0D              CI      WTFCRM          ;SHOULD I WRITE TO RAM?
0169 84 AC              BZ      WRTRM           ;
016B 25 80              CI      WRUCMD          ;IS THIS A "WHO ARE YOU" COMMAND
016D 84 C2              BZ      GETID           ;IF JUMP, GET ID
016F 43                 LR      A,PWRUP         ;RECALL CHARACTERIZATION WORD
0170 15                 SL      4               ;ALIGN FOR FC TEST
0171 91 6E              BM      CMDOUT          ;IF I JUMP, THIS IS A DO
0173 29 03 67           JMP     CMDIN           ;GO PROCESS DI COMMANDS
```

```
         *
         *
"ORION DIGITAL FUNCTION CARD"
         *
         ************************************************
         *                                              *
         *                                              *
         *        PROCESS AREA FOR ALL DO COMMANDS      *
         *                                              *
         ************************************************
         *
         *
         *******************************************
         *                                         *
         ***    SEND DO'S COS COUNT TO LINE CARD   ***
         *                                         *
         *******************************************
         *
         *        **************
         *        MESSAGE FORMAT
         *        **************
         *
         *        RECEIVE:        BYTE 0 - TYPE OF COMMAND
         *                        BYTE 1 - CARD ADDRESS (OPTIONAL)
         *                        BYTE 2 -
         *                        BYTE 3 -
         *                        BYTE 4 -
         *                        BYTE 5 -
         *                        BYTE 6 -
         *                        BYTE 7 -
         *
         *        TRANSMIT:       BYTE 0 - "ACK"
         *                        BYTE 1 - NUMBER OF COS'
         *                        BYTE 2 -
         *                        BYTE 3 -
         *                        BYTE 4 -
         *                        BYTE 5 -
         *                        BYTE 6 -
         *                        BYTE 7 -
         *
         *        ERRORS CHK'D:   1. INCORRECT BYTE COUNT
         *
         *
0176 30          DOCVNT   DS     CNTMP          ;CORRECT COUNT REC'D?
0177 84 07                BZ     DOCVN1         ;IF B., EVERYTING IS KOSHER!
0179 30                   DS     CNTMP          ;
017A 84 04                BZ     DOCVN1         ;
017C 29 06 90             JMP    ERRCNT         ;INCORRECT # OF BYTES FOR CMND, PROCESS ERROR!
017F 72          DOCVN1   LIS    H"02"          ;CARD CAN HAVE A MAXIMUM OF TWO COS'
0180 52                   LR     COSCNT,A       ;STORE COUNT
0181 43                   LR     A,PWRUP        ;DETERMINE THE STATE OF CHARACTERIZATION
0182 13                   SL     1              ;TEST IF LOWER 16 POINTS HAVE BEEN CHAR'
0183 81 02                BP     DOCVN2         ;IF B., NOT CHAR', SO LEAVE COSCNT ALONE
0185 32                   DS     COSCNT         ;REMOVE ONE COS COUNT
0186 13          DOCVN2   SL     1              ;TEST IF CARD HAS EXTENDED CAPACITY
0187 81 04                BP     DOCVN3         ;IF B., CARD HAS 16 DO'S ONLY - REMOVE ONE COSCN

"ORION DIGITAL FUNCTION CARD"
0189 13                   SL     1              ;ARE UPPER 16 POINTS CHAR'?
018A 81 02                BP     DOCTSN         ;IF B., NOT CHAR', LEAVE COSCNT ALONE
018C 32          DOCVN3   DS     COSCNT         ;REMOVE ONE COS COUNT
         *
         *
         ***   COUNT DETERMINED - PLACE VALUE IN BUFFER   ***
         *
018D 63          DOCTSN   LISU   LCBUFU         ;POINT ISAR TO OUTPUT BUFFER
018E 6F                   LISL   LCBUFL         ;
018F 20 06                LI     ACK            ;
0191 5E                   LR     D,A            ;STUFF ACK IN BUFFER
0192 42                   LR     A,COSCNT       ;GET COUNT
0193 5C                   LR     S,A            ;STUFF COS COUNT IN BUFFER
0194 29 06 B0             JMP    SEND           ;GO XMIT!!
         *
         *
         ****************************************************
         *                                                  *
         ***   ACKNOWLEDGE LINE CARD'S RECEIPT OF COV DATA   ***
         *                                                  *
         ****************************************************
         *
```

```
                *           **************
                *           MESSAGE FORMAT
                *           **************
                *
                *           RECEIVE:        BYTE 0 - TYPE OF COMMAND
                *                           BYTE 1 - CARD ADDRESS (OPTIONAL)
                *                           BYTE 2 -
                *                           BYTE 3 -
                *                           BYTE 4 -
                *                           BYTE 5 -
                *                           BYTE 6 -
                *                           BYTE 7 -
                *
                *           TRANSMIT:       BYTE 0 - "ACK"
                *                           BYTE 1 -
                *                           BYTE 2 -
                *                           BYTE 3 -
                *                           BYTE 4 -
                *                           BYTE 5 -
                *                           BYTE 6 -
                *                           BYTE 7 -
                *
                *
0197 30         DOCVAK  DS      CNTMP           ;DID I RECEIVE CORRECT NUMBER OF BYTES?
0198 84 07              BZ      DOCVI           ;IF B., EVERYTING IS KOSHER!
019A 30                 DS      CNTMP           ;
019B 84 04              BZ      DOCVI           ;
019D 29 06 90           JMP     ERRCNT          ;INCORRECT # OF BYTES FOR CMND, PROCESS ERROR!
01A0 29 06 A8   DOCVI   JMP     CMDACK          ;THIS IS ALL!!
                *
                *
                *

  "ORION DIGITAL FUNCTION CARD"
                *
                *
                ***********************************
                *                                 *
                ***   CHARACTERIZE DO COMMAND   ***
                *                                 *
                ***********************************
                *
                *           **************
                *           MESSAGE FORMAT
                *           **************
                *
                *           RECEIVE:        BYTE 0 - TYPE OF COMMAND
                *                           BYTE 1 - ADDRESS OF POINT TO BE CHARACTERIZED
                *                                    BITS 0-3: POINT ADDRESS
                *                                    BITS 4-6: FUNCTION CARD ADDRESS
                *                                    BIT 7: UNUSED
                *                           BYTE 2 - CHARACTERIZATION DATA
                *                                    0 = CHARACTERIZE A LATCHED POINT
                *                                    1 = CHARACTERIZE A PULSED POINT
                *                           BYTE 3 -
                *                           BYTE 4 -
                *                           BYTE 5 -
                *                           BYTE 6 -
                *                           BYTE 7 -
                *
                *
                *
                *           TRANSMIT:       BYTE 0 - "ACK"
                *                           BYTE 1 -
                *                           BYTE 2 -
                *                           BYTE 3 -
                *                           BYTE 4 -
                *                           BYTE 5 -
                *                           BYTE 6 -
                *                           BYTE 7 -
                *
                *
                *           ERRORS CHK'D:   1. INCORRECT BYTE COUNT
                *                           2. ADDRESS ERROR (WRONG ADDRESS FOR CARD)
                *                           3. IMPROPER DATA FIELD
                *
                *
                *
01A3 40         CHRDO   LR      A,CNTMP         ;RECALL BYTE COUNT
01A4 25 03              CI      H"03"           ;DID I RECEIVE CORRECT NUMBER OF BYTES?
01A6 84 04              BZ      CHRDO1          ;IF B., EVERYTING IS KOSHER!
01A8 29 06 90           JMP     ERRCNT          ;INCORRECT # OF BYTES FOR CMND, PROCESS ERROR!
```

```
01AB 4E        CHRD01  LR      A,D       ;DO A DUMMY LOAD TO DECREMENT ISAR
01AC 4D                LR      A,I       ;GET THE DATA FROM THE INPUT BUFFER
01AD 51                LR      DATSV,A   ;SAVE DATA FROM INPUT BUFFER
01AE 21 FE             NI      H"FE"     ;MASK OFF DATA BIT - IS DATA VALID?
01B0 84 04             BZ      CHRD02    ;IF B., DATA OKAY!!!
01B2 29 06 9E          JMP     ERRDAT    ;PROCESS DATA ERROR
    "ORION DIGITAL FUNCTION CARD"
01B5 A1        CHRD02  INS     LMODE     ;READ CARD CAPAITY
01B6 4C                LR      A,S       ;GET POINT ADDRESS
01B7 91 03             BM      CHRD03    ;IF B., CARD HAS 32 DO'S
01B9 21 0F             NI      H"0F"     ;MASK OFF CARD ADDRESS
01BB 21 1F     CHRD03  NI      H"1F"     ;MASK OFF FUNCTION CARD ADDRESS, BUT LEAVE LSB
01BD 2A 00 59          DCI     CNVTB     ;SET UP DC TO TURN OFF THE POINT
01C0 8E                ADC               ;
01C1 24 20             AI      D"32"     ;OFFSET TO MAP INTO DO STATUS TABLE
01C3 0B                LR      IS,A      ;POINT ISAR TO DO
               *
               *
               ***   IS THIS CHAR' COMMAND TO UPPER DO'S?   ***
               *
01C4 25 2F             CI      D"47"          ;IS ISAR POINTING TO UPPER 16 DO'S?
01C6 43                LR      A,PWRUP        ;GET CHAR' WORD - SIGN FLAGS STILL SET
01C7 91 05             BM      CHRD04         ;IF B., CARD HAS UPPER 32 DO'S
               *
               *
               ***   COMMAND IS TO LOWER 16 DO'S - SET LOWER 16 CHAR FLAG   ***
               *
01C9 22 40             OI      ST16CH         ;SET CHAR' FLAG FOR LOWER 16 POINTS
01CB 90 03             BR      CHRD05         ;GO AND CHARACTERIZE THE POINT
               *
               *
               ***   SET UPPER 16 CHAR' FLAG   ***
               *
01CD 22 10     CHRD04  OI      ST32CH         ;SET "UPPER 32 CHAR" BIT
01CF 53        CHRD05  LR      PWRUP,A        ;RETURN NEW CHAR' STATUS TO MEMORY
               *
               *
               ***   COMMAND IN RANGE - UPDATE CHAR' STATUS OF POINT   ***
               *
01D0 71                LIS     LWRT      ;ENABLE LATCHES
01D1 B1                OUTS    LMODE     ;
01D2 16                LM                ;GET HARDWARE ADDRESS
01D3 18                COM               ;CORRECT FOR INVERTING PORT
01D4 B4                OUTS    LDATA     ;IN CASE SOMEONE CHANGES CHARACTER OF POINT WHILE ITS
               *                         ;STILL ON, TURN IT OFF TO PREVENT ANY POSSIBLE DAMAGE
01D5 41                LR      A,DATSV   ;RECALL DATA
01D6 1F                INC               ;BUMP COUNT TO BE SURE VALUE ISN'T ZERO
01D7 25 01             CI      H"01"     ;IS THIS A SS POINT
01D9 84 02             BZ      CHRSS     ;IF YES, CHARACTERIZE A NON-PULSED POINT
01DB 77        CHRPLS  LIS     H"07"     ;CHARACTERIZE A PULSED POINT
01DC 5C        CHRSS   LR      S,A       ;STORE NEW STATUS IN POINT TABLE
01DD 29 06 AB          JMP     CHOACK    ;PROCESS ACK TO LINE CARD
               *
               *
               ***************************************************
               *                                                 *
               ***   DETERMINE TYPE OF DIGITAL OUTPUT COMMAND    ***
               *                                                 *
               ***************************************************
               *
01E0 4E        CHDOUT  LR      A,D       ;GET COMMAND FROM BUFFER
    "ORION DIGITAL FUNCTION CARD"
01E1 25 81             CI      COVCNT    ;IS THIS REQUEST FOR COS COUNT?
01E3 84 92             BZ      DOCVNT    ;
01E5 25 82             CI      COSDAT    ;IS THIS REQUEST TO SEND COV DATA?
01E7 84 17             BZ      DOCVDAT   ;
01E9 25 07             CI      SETCMD    ;SET DO CMND?
01EB 84 10             BZ      SETDOA    ;IF I JUMP, PROCESS DO.
01ED 25 83             CI      CVAKCMD   ;"HOST ACKNOWLEDGED COV DATA" COMMAND?
01EF 84 A7             BZ      DOCVAK    ;
01F1 25 11             CI      CHRCMD    ;CHARACTERIZE DO?
01F3 84 AF             BZ      CHRDO     ;
01F5 25 06             CI      RPTCMD    ;SHOULD I GET STATUS OF HARDWARE LATCH?
01F7 84 44             BZ      READDO    ;
01F9 29 06 88          JMP     CMDERR    ;COMMAND NOT APPLICABLE, GO PROCESS ERROR!
01FC 29 02 7A  SETDOA  JMP     SETDO     ;PROCESS DO
               *
               *
               *********************************************
               *                                           *
```

```
***   SEND "DO" COV DATA TO LINE CARD   ***
*                                         *
*******************************************
*
*          ***************
*          MESSAGE FORMAT
*          ***************
*
*          RECEIVE:       BYTE 0 - TYPE OF COMMAND
*                         BYTE 1 - FUNCTION CARD "BASE" ADDRESS IN BITS 4-6
*                         BYTE 2 - POINTER TO COV'S SEND (PRGM NOTE: IGNORE)
*                         BYTE 3 -
*                         BYTE 4 -
*                         BYTE 5 -
*                         BYTE 6 -
*                         BYTE 7 -
*
*          TRANSMIT:      BYTE 0 - "ACK" OR "NAK"
*                         BYTE 1 - FUNCTION CARD ADDRESS
*                                  BITS 0-3: ZERO
*                                  BITS 4-6: FUNCTION CARD ADDRESS
*                                  BIT 7: "1"
*                         BYTE 2 - "CHARACTERIZATION REQUEST"
*                         BYTE 3 - ZERO BYTE
*                         BYTE 4 -
*                         BYTE 5 -
*                         BYTE 6 -
*                         BYTE 7 -
*
*          ERRORS CHK'D:  1. INCORRECT BYTE COUNT
*                         2. ADDRESS ERROR NOT ANNUNCIATED, BUT FIXED!
*                         3. IMPROPER DATA FIELD
*
*
*
01FF 40       DOCVDAT LR    A,CNTMP        ;RECALL BYTE COUNT

 "ORION DIGITAL FUNCTION CARD"
0200 25 03            CI    H"03"          ;DID I RECEIVE CORRECT NUMBER OF BYTES?
0202 84 04            BZ    DOCVD1         ;IF B., EVERYTING IS KOSHER!
0204 29 06 90         JMP   ERRCNT         ;INCORRECT # OF BYTES FOR CMND, PROCESS ERROR!
0207 63       DOCVD1  LISU  LCBUFU         ;LOAD ISAR TO POINT TO TOP OF OUTPUT BUFFER
0208 6F               LISL  LCBUFL         ;POINT TO FIRST WORD IN BUFFER
0209 20 06            LI    ACK            ;
020B 5E               LR    D,A            ;STUFF "ACK" INTO BUFFER
020C 4C               LR    A,S            ;GET FUNCTION CARD ADDRESS
020D 21 70            NI    H"70"          ;LEAVE ADDRESS ONLY!
020F 50               LR    ADRSV,A        ;SAVE IT!
               *
               *
               ***   FIND THE STATE OF CHARACTERIZATION   ***
               *
0210 43               LR    A,PWRUP        ;GET CHAR' DATA
0211 13               SL    1              ;TEST IF LOWER 16 DO'S CHAR'
0212 91 0C            BM    DOCAP          ;IF B., LOWER 16 CHAR'
               *
               *
               ***   REQUEST CHARACTERIZATION FOR LOWER 16 DO'S   ***
               *
0214 40               LR    A,ADRSV        ;RECALL ADDRESS
0215 22 80            OI    SETCHR         ;SET CHAR' REQUIRED FLAG
0217 5E               LR    D,A            ;LOAD MODIFIED ADDRESS IN BUFFER
0218 20 FC            LI    CHAREQ         ;LOAD CHARACTERIZATION REQUEST
021A 5E               LR    D,A            ;LOAD REQUEST IN BUFFER
021B 70               CLR                  ;
021C 5E               LR    D,A            ;LOAD "ZERO" BYTE IN BUFFER
021D 43               LR    A,PWRUP        ;RECALL POWER-UP FLAG
021E 13               SL    1              ;
               *
               *
               ***   TEST IF CARD HAS 32 POINT CAPACITY   ***
               *
021F 13       DOCAP   SL    1              ;TEST CAPACITY
0220 81 17            BP    CVSND1         ;IF B., SEND ONE CHAR' REQUEST ONLY
               *
               *
               ***   TEST IF UPPER 16 DO'S CHAR'   ***
               *
0222 13               SL    1              ;TEST FOR CHAR'
0223 91 14            BM    CVSND1         ;IF B., UPPER DO'S ARE CHAR'
               *
               *
```

```
              ***  REQUEST CHARACTERIZATION FOR UPPER 16 DO'S  ***
              *
0225 40                LR      A,ADRSV        ;RECALL FUNCTION CARD ADDRESS
0226 21 10             NI      H"10"          ;AM I ODD OR EVEN SLOT?
0228 84 04             BZ      DOCAP1         ;IF B., I MUST BE EVEN
022A 29 06 95          JMP     ERRADR         ;SOMEONE FOULED UP ALONG THE WAY - PROCESS ERROI
022D 40       DOCAP1   LR      A,ADRSV        ;RECALL LEGITIMATE ADDRESS
022E 24 10             AI      H"10"          ;ADJUST FOR UPPER CARD ADDRESS
0230 22 80             OI      SETCHR         ;SET CHAR' REQUEST FLAG
0232 5E                LR      D,A            ;STUFF REQUEST IN BUFFER
   "ORION DIGITAL FUNCTION CARD"
0233 20 FC             LI      CHAREQ         ;
0235 5E                LR      D,A            ;STUFF CHAR' REQUEST IN BUFFER
0236 70                CLR                    ;
0237 5E                LR      D,A            ;STUFF "ZERO" BYTE IN BUFFER
              *
              *
              ***  SEND COV DATA TO LINE CARD  ***
              *
0238 4D       CVSND1   LR      A,I            ;CORRECT BUFFER POINTER
0239 29 06 80          JMP     SEND           ;GO AND XMIT
              *
              *
              ***********************************************
              *                                             *
              ***  READ STATUS OF HARDWARE DO LATCH       ***
              *                                             *
              ***********************************************
              *
              *        ***************
              *        MESSAGE FORMAT
              *        ***************
              *
              *        RECEIVE:         BYTE 0 - TYPE OF COMMAND
              *                         BYTE 1 - POINT ADDRESS
              *                                  BITS 0-3: POINT ADDRESS
              *                                  BITS 4-6: FUNCTION CARD ADDRESS
              *                                  BIT 7: UNUSED
              *                         BYTE 2 -
              *                         BYTE 3 -
              *                         BYTE 4 -
              *                         BYTE 5 -
              *                         BYTE 6 -
              *                         BYTE 7 -
              *
              *        TRANSMIT:        BYTE 0 - "ACK"
              *                         BYTE 1 - CURRENT STATE OF DO LATCH
              *                         BYTE 2 - ZERO BYTE
              *                         BYTE 3 -
              *                         BYTE 4 -
              *                         BYTE 5 -
              *                         BYTE 6 -
              *                         BYTE 7 -
              *
              *        ERRORS CHK'D:    1. INCORRECT BYTE COUNT
              *                         2. POINT NOT CHARACTERIZED
              *
              *
023C 40       READDO   LR      A,CNTMP        ;RECALL MESSAGE LENGTH
023D 25 02             CI      H"02"          ;CORRECT NUMBER OF BYTES?
023F 84 04             BZ      READO1         ;IF B., OKAY
0241 29 06 90          JMP     ERRCNT         ;PROCESS ERROR
0244 A1       READO1   INS     LMODE          ;READ CARD CAPACITY
0245 4C                LR      A,S            ;GET POINT AND CARD ADDRESS
0246 91 03             BM      READO2         ;IF B., CAPACITY IS 32 DO'S
   "ORION DIGITAL FUNCTION CARD"
0248 21 0F             NI      H"0F"          ;GET RID OF CARD ADDRESS
024A 21 1F    READO2   NI      H"1F"          ;MASK CARD ADDRESS, LEAVE LSB
024C 2A 0D 59          DCI     CNVTB          ;INIT DATA COUNTER
024F 8E                ADC                    ;OFFSET DATA COUNTER
0250 24 20             AI      D"32"          ;POINT TO MEMORY
0252 0B                LR      IS,A           ;ADJUST ISAR
0253 4C                LR      A,S            ;GET POINT STATUS
0254 25 00             CI      H"00"          ;IS POINT CHARACTERIZED?
0256 94 04             BNZ     READO3         ;IF B., POINT CHAR'
0258 29 02 E1          JMP     DOERR1         ;PROCESS ERROR
              *
              *
              ***  PLACE LATCHES IN READ MODE  ***
              *
025B 16       READO3   LM                     ;GET CHIP ADDRESS
```

```
025C 22 80        LI     H"80"          ;SET BIT TO READ DATA
025E 50           LR     ADRSV,A        ;SAVE IT TO USE AGAIN
025F 21 F0        NI     H"F0"          ;DESELECT ALL CHIPS
0261 18           COM                   ;FIX
0262 B4           OUTS   LDATA          ;
0263 73           LIS    LREAD          ;
0264 B1           OUTS   LMODE          ;CHIPS IN READ STATE
            *
            *
            ***  READ LATCH DATA   ***
            *
0265 40           LR     A,ADRSV        ;RECALL CHIP ADDRESS
0266 18           COM                   ;FIX
0267 B4           OUTS   LDATA          ;SELECT CHIP TO READ
0268 A4           INS    LDATA          ;GET DATA IN MSB
0269 18           COM                   ;MAKE IT TRUE
026A 14           SR     4              ;ALIGN FOR XMIT
026B 12           SR     1              ;
026C 12           SR     1              ;
026D 12           SR     1              ;
            *
            *
            ***  SEND LATCH DATA TO LINE CARD   ***
            *
026E 63           LISU   LCBUFU         ;POINT ISAR TO OUTPUT BUFFER
026F 6E           LISL   LCBUFL-1       ;POINT TO SECOND BYTE
0270 5D           LR     I,A            ;STUFF DATA, POINT TO FIRST BYTE
0271 20 06        LI     ACK            ;
0273 5C           LR     S,A            ;
0274 6D           LISL   LCBUFL-2       ;POINT TO THIRD BYTE
0275 70           CLR                   ;ADD ZERO BYTE
0276 5C           LR     S,A            ;
0277 29 06 80     JMP    SEND           ;
            *
            *
            ********************************************
            *                                          *
            ***  SET DO COMMAND PROCESSING ROUTINE   ***
            *                                          *
   "ORION DIGITAL FUNCTION CARD"
            ********************************************
            *
            *    **************
            *    MESSAGE FORMAT
            *    **************
            *
            *    RECEIVE:       BYTE 0 - TYPE OF COMMAND
            *                   BYTE 1 - ADDRESS OF DO THAT IS MODIFIED
            *                            BITS 0-3: POINT ADDRESS
            *                            BITS 4-6: FUNCTION CARD ADDRESS
            *                            BIT 7: UNUSED
            *                   BYTE 2 - STATE TO WHICH THE POINT IS COMMANDED
            *                            0 = TURN POINT OFF; MAINTAINED CONTACT ONLY
            *                            1 = TURN POINT ON; MAINTAINED OR MOMENTARY CONT
            *                   BYTE 3 -
            *                   BYTE 4 -
            *                   BYTE 5 -
            *                   BYTE 6 -
            *                   BYTE 7 -
            *
            *    TRANSMIT:      BYTE 0 - "ACK" OR "NAK"
            *                   BYTE 1 - ERROR CODE IF NAK
            *                   BYTE 2 -
            *                   BYTE 3 -
            *                   BYTE 4 -
            *                   BYTE 5 -
            *                   BYTE 6 -
            *                   BYTE 7 -
            *
            *    ERRORS CHK'D:  1. INCORRECT BYTE COUNT
            *                   2. ADDRESS ERROR (WRONG ADDRESS FOR CARD)
            *                   3. IMPROPER DATA FIELD
            *
            *
027A 40     SETDO LR     A,CNTMP        ;RECALL BYTE COUNT
027B 25 03        CI     H"03"          ;DID I RECEIVE CORRECT NUMBER OF BYTES?
027D 84 04        BZ     SETDO1         ;IF B., EVERYTING IS KOSHER!
027F 29 06 90     JMP    ERRCNT         ;INCORRECT # OF BYTES FOR CMND, PROCESS ERROR!
0282 71     SETDO1 LIS   LWRT    ;ENABLE LATCHES TO ACCEPT DATA
0283 B1           OUTS   LMODE   ;GO DO IT!!!
0284 A1           INS    LMODE   ;READ  CARD CAPACITY
0285 4E           LR     A,D     ;GET POINT ADDRESS FROM RECEIVE BUFFER
```

```
0286 91 03               BM      SETDO2  ;IF B., CAPACITY IS 32 DO'S
0288 21 0F               NI      H"0F"   ;GET RID OF CARD ADDRESS
028A 21 1E     SETDO2    NI      H"1F"   ;MASK OFF FUNCTION CARD ADDRESS, BUT LEAVE LSB.
028C 50                  LR      ADRSV,A ;SAVE FOR FUTURE USE
028D 4C                  LR      A,S     ;GET DATA
028E 21 FE               NI      H"FE"   ;MASK OFF DATA BIT - IS DATA VALID?
0290 84 04               BZ      SETDO3  ;IF B., DATA OKAY!
0292 29 06 9F            JMP     ERRDAT  ;PROCESS DATA ERROR
0295 4C        SETDO3    LR      A,S     ;GET DATA
0296 15                  SL      4       ;ALIGN INTO MSB
0297 13                  SL      1       ;
0298 13                  SL      1       ;
   "ORION DIGITAL FUNCTION CARD"
0299 13                  SL      1       ;
029A 51                  LR      DATSV,A ;SAVE FOR FUTURE USE
029B 2A 00 59            DCI     CNVTB   ;INIT DC TO OUTPUT COMMAND CONVERSION TABLE
029E 40                  LR      A,ADRSV ;GET POINT ADDRESS
029F 8E                  ADC             ;ADJUST DC TO POINT OFFSET
02A0 24 20               AI      D"32"   ;ADJUST FOR ISAR MEMORY MAP
02A2 0B                  LR      IS,A    ;INIT ISAR POINTER
02A3 4C                  LR      A,S     ;GET DO POINT STATUS
02A4 25 00               CI      H"00"   ;IS POINT CHARACTERIZED???
02A6 84 3A               BZ      DOERR1  ;IF I BRANCH, DO RECEIVED CMND BEFORE CHARACTERIZATION
02A8 25 03               CI      H"03"   ;TEST FOR POINT TPYE
02AA 91 0F               BM      DOPLS   ;IF I JUMP, MUST BE A PULSED POINT
                *
                *
                ***   PROCESS NON-PULSED DIGITAL OUTPUT   ***
                *
02AC 41                  LR      A,DATSV ;RECALL DATA
02AD 14                  SR      4       ;REALIGN FOR MEMORY UPDATE
02AE 12                  SR      1       ;
02AF 12                  SR      1       ;
02B0 12                  SR      1       ;
02B1 1F                  INC             ;BUMP COUNT FOR COMPATABILITY WITH CHARACTERIZATION!
02B2 5C                  LR      S,A     ;PLACE NEW VALUE INTO DATABASE
02B3 41                  LR      A,DATSV ;RECALL DATA
02B4 8B                  OM              ;GET OUTPUT CONFIGURATION
02B5 50                  LR      ADRSV,A ;SAVE CHIP ADDRESS
02B6 18                  COM             ;COMPLEMENT FOR INVERTING OUTPUT PORT
02B7 B4                  OUTS    LDATA   ;GO TWIDDLE THE POINT
02B8 90 12               BR      SETDO4  ;GO CLEAN UP
                *
                *
                ***   PROCESS PULSED POINT HERE   ***
                *
02BA 41        DOPLS     LR      A,DATSV ;RECALL DATA
02BB 25 00               CI      H"00"   ;IS THIS AN OFF COMMAND??
02BD 84 29               BZ      DOERR2  ;I AM NOT PERMITTED TO TURN OFF A PULSED POINT
02BF 4C                  LR      A,S     ;GET THE CURRENT STATE OF THE POINT
02C0 25 07               CI      H"07"   ;IS IT FINISHED COUNTING DOWN?
02C2 91 18               BM      SETDO5  ;IF BR, STILL COUNTING DOWN, ABORT COMMAND
02C4 41                  LR      A,DATSV ;RECALL DATA
02C5 8B                  OM              ;GET OUTPUT HARDWARE ADDRESS
02C6 50                  LR      ADRSV,A ;SAVE CHIP ADDRESS
02C7 18                  COM             ;FIX FOR INVERTING OUTPUT PORT
02C8 B4                  OUTS    LDATA   ;STROBE THAT POINT!!
02C9 7E                  LIS     H"0E"   ;LOAD UP COUNTDOWN FOR PULSE
02CA 5C                  LR      S,A     ;INIT STATUS IN MEMORY
                *
                *
                ***   CHECK TO SEE IF HARDWARE RECEIVED DATA   ***
                *
02CB 40        SETDO4    LR      A,ADRSV         ;RECALL CHIP ADDRESS
02CC 21 F0               NI      H"F0"           ;TURN OFF ALL CHIPS
02CE 22 80               OI      H"80"           ;SET DATA BIT FOR READ
02D0 18                  COM                     ;FIX FOR INVERTING PORT
   "ORION DIGITAL FUNCTION CARD"
02D1 B4                  OUTS    LDATA           ;ALL CHIPS ARE NOW OFF
02D2 73                  LIS     LREAD           ;GET READY TO READ
02D3 B1                  OUTS    LMODE           ;ALL CHIPS IN READ STATE
02D4 40                  LR      A,ADRSV         ;RECALL ADDRESS
02D5 22 80               OI      H"80"           ;SET BIT FOR READ
02D7 18                  COM                     ;FIX
02D8 B4                  OUTS    LDATA           ;SET UP THE CHIP TO READ
02D9 A4                  INS     LDATA           ;READ THE CHIP
02DA 18                  COM                     ;FIX
02DB E1                  XS      DATSV           ;ARE THE VALUES DIFFERENT?
02DC 91 10               BM      DOEPR3          ;IF B., HARDWARE HAS FAULT
02DE 29 06 AB  SETDO5    JMP     CMDACK  ;
                *
```

```
                *
                *
                ******************************
                *                            *
                ***   DO ERROR ROUTINES    ***
                *                            *
                ******************************
                *
02E1 20 E0      DOERR1  LI      SETER1          ;POINT NOT CHAR'
02E3 51                 LR      DATSV,A         ;STUFF AWAY
02E4 29 06 A2           JMP     ERROR           ;
                *
                *
02E7 20 E1      DOERR2  LI      SETER2          ;TRIED TO TURN OFF PULSE POINT
02E9 51                 LR      DATSV,A         ;STUFF
02EA 29 06 A2           JMP     ERROR           ;GO XMIT
                *
                *
02ED 20 E2      DOERR3  LI      SETER3          ;HARDWARE FOULED UP
02EF 51                 LR      DATSV,A         ;STUFF
02F0 29 06 A2           JMP     ERROR           ;GO XMIT
                *
                *
   "ORION DIGITAL FUNCTION CARD"
                *********************************************
                *                                           *
                ***   PROCESS AREA FOR ALL DI COMMANDS    ***
                *                                           *
                *********************************************
                *
                *
                *
                ***********************************************************
                *                                                         *
                ***   SET SIGNIFICANT COV COUNT FOR PULSE ACCUMULATOR   ***
                *                                                         *
                ***********************************************************
                *
                *
                *       **************
                *       MESSAGE FORMAT
                *       **************
                *
                *       RECEIVE:          BYTE 0 - TYPE OF COMMAND
                *                         BYTE 1 - PULSE ACCUMULATOR ADDRESS
                *                         BYTE 2 - SIGNIFICANT COV COUNT
                *                         BYTE 3 - ZERO BYTE
                *                         BYTE 4 -
                *                         BYTE 5 -
                *                         BYTE 6 -
                *                         BYTE 7 -
                *
                *       TRANSMIT:         BYTE 0 - "ACK"
                *                         BYTE 1 -
                *                         BYTE 2 -
                *                         BYTE 3 -
                *                         BYTE 4 -
                *                         BYTE 5 -
                *                         BYTE 6 -
                *                         BYTE 7 -
                *
                *       ERRORS CHK'D:     1. INCORRECT BYTE COUNT
                *                         2. RANGE ERROR - CMND TO NON-APPLICABLE DI'S
                *                         3. IMPROPER DATA FIELD
                *                         4. POINT DEFINITION INVALID TO ACCEPT DATA
                *
                ***   GET COV DATA FROM BUFFER   ***
                *
02F3 40         SETCOV  LR      A,CNTMP         ;RECALL BYTE COUNT
02F4 25 04              CI      H"04"           ;DID I RECEIVE CORRECT NUMBER OF BYTES?
02F6 84 04              BZ      SETCV1          ;IF B., EVERYTING IS KOSHER!
02F8 29 06 90           JMP     ERRCNT          ;INCORRECT # OF BYTES FOR CMND, PROCESS ERROR!
02FB 6D         SETCV1  LISL    LCBUFL-2        ;POINT TO DATA BYTE IN BUFFER
02FC 4D                 LR      A,I             ;GET DATA
02FD 51                 LR      DATSV,A         ;SAVE IT
02FE A4                 INS     RMODE           ;GET CARD CAPACITY
02FF 4C                 LR      A,S             ;GET POINT ADDRESS

   "ORION DIGITAL FUNCTION CARD"
0300 91 03              BM      SETCV2          ;IF B., CARD HAS 32 DI'S
0302 21 0F              NI      H"0F"           ;GET RID OF CARD ADDRESS
```

```
0304 21 1F     SETCV2  NI     B"1F"        ;MASK OFF FUNCTION CARD ADDRESS, BUT LEAVE LSB
0306 24 FE             AI     -D"2"        ;ADJUST ISAR TO POINT TO SIGNIFICANT COV DATA
0308 50                LR     ADRSV,A      ;SAVE ADDRESS TILL LATER
0309 24 22             AI     D"34"        ;GET POINT STATUS BYTE
030B 0B                LR     IS,A         ;INIT ISAR
030C 4C                LR     A,S          ;I GOT IT!
030D 13                SL     1            ;GET PA/DI STATUS BIT
030E 13                SL     1            ;
030F 91 07             BM     SETCV3       ;IF B., POINT IS PA, ACCEPT DATA
0311 20 E7             LI     PACCER       ;LOAD ERROR CODE
0313 51                LR     DATSV,A      ;SAVE FOR XMIT
0314 29 06 A2          JMP    ERROR        ;
0317 40        SETCV3  LR     A,ADRSV      ;RECALL SCOV ADDRESS
0318 0B                LR     IS,A         ;INIT ISAR ABSOLUTE POINT ADDRESS
0319 24 F4             AI     -D"12"       ;FIND ABSOLUTE VALUE - ASGNMT ABOVE DATABASE?
031B 81 04             BP     SETCV4       ;IF B., VALUE NOT ABOVE
031D 29 06 9A          JMP    RANGERR      ;PROCESS ERROR
0320 24 FE     SETCV4  AI     -D"2"        ;IS VALUE BELOW DATABASE?
0322 91 04             BM     SETCV5       ;IF B., VALUE OKAY!
0324 29 06 9A          JMP    RANGERR      ;PROCESS ERROR
               *
               *
               ***   ADDRESS IS VALID - STUFF DATA AWAY
               *
0327 41        SETCV5  LR     A,DATSV      ;RECALL DATA
0328 5C                LR     S,A          ;PUT AWAY
0329 62                LISU   PACNTU       ;POINT TO DECREMENTING COV REGISTER
032A 5C                LR     S,A          ;INIT THE NEW COUNT
032B 29 06 AB          JMP    CMDACK       ;ALL DONE - GEE, THAT WAS QUICK!
               *
               *
               ******************************
               ***    GET THE COS COUNT    ***
               ******************************
               *
               *           **************
               *           MESSAGE FORMAT
               *           **************
               *
               *           RECEIVE:        BYTE 0 - TYPE OF COMMAND
               *                           BYTE 1 - CARD ADDRESS (OPTIONAL)
               *                           BYTE 2 -
               *                           BYTE 3 -
               *                           BYTE 4 -
               *                           BYTE 5 -
               *                           BYTE 6 -
               *                           BYTE 7 -
               *
               *           TRANSMIT:       BYTE 0 - "ACK"
               *                           BYTE 1 - NUMBER OF COV'S
               *                           BYTE 2 -
               *                           BYTE 3 -
   "ORION DIGITAL FUNCTION CARD"
               *                           BYTE 4 -
               *                           BYTE 5 -
               *                           BYTE 6 -
               *                           BYTE 7 -
               *
               *           ERRORS CHK'D:   1. INCORRECT BYTE COUNT
               *
               *
               ***   CLEAR THE COV COUNTER   ***
               *
032E 30        COVD1   DS     CNTMP        ;DID I RECEIVE CORRECT NUMBER OF BYTES?
032F 84 07             BZ     COVDI1       ;IF B., EVERYTHING IS KOSHER!
0331 30                DS     CNTMP        ;
0332 84 04             BZ     COVDI1       ;
0334 29 06 90          JMP    ERRCNT       ;INCORRECT # OF BYTES FOR CMND, PROCESS ERROR!
0337 70        COVDI1  CLR                 ;ZERO ACCUM
0338 52                LR     COSCNT,A     ;INIT COV
               *
               *
               ***   DETERMINE STATE OF CHARACTERIZATION   ***
               *
0339 43                LR     A,PWRUP      ;GET CHAR' WORD
033A 13                SL     1            ;CHAR' STATE FOR LOWER 16 DI'S
033B 91 02             BM     DICVN1       ;IF B., LOWER 16 ARE CHAR'
033D 32                DS     COSCNT       ;ADD 1 COS CNT SINCE LOW 16 NOT CHAR'
033E 13        DICVN1  SL     1            ;ALIGN TO TEST CARD CAPACITY
033F 81 05             BP     COVDI2       ;IF B., CARD HAS 16 POINTS ONLY
0341 13                SL     1            ;CHAR' STATE FOR UPPER 32 DI'S
```

```
0342 91 02              BM      COVDI2          ;IF B., UPPER 16 CHAR'
0344 32                 DS      COSCNT          ;ADD 1 COS CNT SINCE UPPPER 16 NOT CHAR'
                *
                *
                ***   INIT THE ISAR'   ***
                *
0345 44         COVDI2  LR      A,ISINIT        ;GET ISAR POINTER COMPUTED AT INIT
0346 0B                 LR      IS,A            ;INIT THE ISAR
                *                               ;VALUE LOADED IS AT THE TOP OF THE TABLE FOR THE
                *                               ;RESPECTIVE POINT CAPACITY
                *
                *
                ***   DOES THIS POINT HAVE A CHANGE-OF-STATE   ***
                *
0347 4C         COV     LR      A,S     ;GET POINT DATA!
0348 15                 SL      4       ;TEST COS FLAG
0349 81 06              BP      DCRPTR  ;IF 1 JUMP, NO COS, GET NEXT POINT
                *
                *
                ***   COS FOUND - SET "LINE CARD KNOWS OF CHANGE FLAG"   ***
                *
034B 4C                 LR      A,S     ;GET POINT DATA
034C 22 80              OI      STLCE   ;SET THE FLAG
034E 5C                 LR      S,A     ;STUFF IT AWAY
                *
                *
"ORION DIGITAL FUNCTION CARD"
                ***   INCREMENT THE COV COUNT   ***
                *
034F 32                 DS      COSCNT          ;INCREMENT THE COV COUNT
                *
                *
                ***   DECREMENT ISAR TO ACCESS NEXT DI   ***
                *
                *
0350 4E         DCRPTR  LR      A,D     ;DECREMENT THE ISAR
0351 8F F5              BR7     COV     ;IF 1 JUMP, MORE POINTS NEED TO BE CHECKED WITHIN
                *                       ;THE SAME HARDWARE CHIP GROUP
0353 0A                 LR      A,IS    ;GET ISAR POINTER
0354 24 F8              AI      D"248"  ;DECREMENT UPPER ISAR DIGIT
0356 0B                 LR      IS,A    ;LOAD NEW VALUE INTO ISAR. (THE NEXT CHIP PROCESSED)
0357 25 1F              CI      TLBTM   ;HAVE I REACHED THE BOTTOM OF THE TABLE
0359 91 ED              BM      COV     ;IF 1 JUMP, PROCESS NEXT CHIP GROUP
                *
                *
                ***   SEND COV COUNT TO LINE CARD   ***
                *
035B 63                 LISU    LCBUFU          ;LOAD ISAR TO POINT TO TOP OF BUFFER
035C 6F                 LISL    LCBUFL          ;
035D 20 06              LI      ACK             ;
035F 5E                 LR      D,A             ;STUFF "ACK" INTO BUFFER
0360 42                 LR      A,COSCNT        ;GET THE NUMBER OF COV'S
0361 18                 COM                     ;FIX COV COUNT TO REFLECT TRUE DATA
0362 1F                 INC                     ;ADD 1 FOR TWO'S COMPLEMENT
0363 5C                 LR      S,A             ;STUFF VALUE IN BUFFER
0364 29 06 B0           JMP     SEND            ;GO AND XMIT!
                *
                *
                ************************************************
                *                                              *
                ***   DETERMINE TYPE OF DIGITAL INPUT COMMAND   ***
                *                                              *
                ************************************************
                *
0367 4E         CMDIN   LR      A,D     ;GET COMMAND FROM BUFFER
0368 25 0A              CI      SIGCOV  ;IS THIS SET SIGNIFICANT COV COMMAND?
036A 84 88              BZ      SETCOV  ;
036C 25 81              CI      COVCNT  ;IS THIS A REQUEST FOR COS INFO?
036E 84 BF              BZ      COVDI   ;
0370 25 0B              CI      CVNABLE ;ENABLE FOR COV REPORTING?
0372 84 07              BZ      ENBLDI  ;
0374 25 06              CI      RPTCMD  ;READ THE POINT STATUS?
0376 84 38              BZ      READPT  ;
0378 90 6C              BR      CMDIN1  ;BR TO NEXT SECTION TO DECODE MORE COMMANDS
                *
                *
                ************************************************
                *                                              *
                ***   ENABLE/DISABLE DI POINT FOR COV REPORTING   ***
                *                                              *
                ************************************************
```

```
"ORION DIGITAL FUNCTION CARD"
                   *
                   *       **************
                   *       MESSAGE FORMAT
                   *       **************
                   *
                   *       RECEIVE:        BYTE 0 - TYPE OF COMMAND
                   *                       BYTE 1 - POINT ADDRESS
                   *                                BITS 0-3: POINT ADDRESS
                   *                                BITS 4-6: FUNCTION CARD ADDRESS
                   *                                BIT 7: UNUSED
                   *                       BYTE 2 - ENABLE/DISABLE DATA
                   *                                0 = DISABLE POINT FROM COV REPORTING
                   *                                1 = ENABLE POINT FOR COV REPORTING
                   *                       BYTE 3 -
                   *                       BYTE 4 -
                   *                       BYTE 5 -
                   *                       BYTE 6 -
                   *                       BYTE 7 -
                   *
                   *       TRANSMIT:       BYTE 0 - "ACK" OR "NAK" IF NOT CHAR'
                   *                       BYTE 1 - CHAR' ERROR IF NOT CHARACTERIZED
                   *                       BYTE 2 -
                   *                       BYTE 3 -
                   *                       BYTE 4 -
                   *                       BYTE 5 -
                   *                       BYTE 6 -
                   *                       BYTE 7 -
                   *
                   *       ERRORS CHK'D:   1. INCORRECT BYTE COUNT
                   *                       2. IMPROPER DATA FIELD
                   *                       3. POINT NOT CHARACTERIZED
                   *
                   *
037A 49            ENBLDI  LR      A,CNTMP         ;RECALL BYTE COUNT
037B 25 03                 CI      H"03"           ;DID I PECEIVE CORRECT NUMBER OF BYTES?
037D 84 04                 BZ      ENBL1           ;IF B., EVERYTING IS KOSHER!
037F 29 06 90              JMP     ERRCNT          ;INCORRECT # OF BYTES FOR CMND, PROCESS ERROR!
0382 4E            ENBL1   LR      A,D             ;DUMMY DECREMENT
0383 4D                    LR      A,I             ;GET E/D DATA
0384 51                    LR      DATSV,A         ;SAVE DATA
0385 21 FE                 NI      H"FE"           ;CHECK IF DATA VALID
0387 84 04                 BZ      ENBL2           ;IF B., DATA OKAY!
0389 29 06 9F              JMP     ERRDAT          ;PROCESS ERROR
038C A4            ENBL2   INS     RMODE           ;GET CARD CAPACITY
038D 4C                    LR      A,S             ;GET POINT ADDRESS
038E 91 03                 BM      ENBL3           ;IF B., CARD HAS 32 DI'S
0390 21 0F                 NI      H"0F"           ;GET RID OF CARD ADDRESS
0392 21 1F         ENBL3   NI      H"1F"           ;MASK OFF FUNCTION CARD ADDRESS, BUT LEAVE LSB
0394 24 20                 AI      D"32"           ;CORRECT FOR MEMORY OFFSET
0396 0B                    LR      IS,A            ;INIT ISAR TO POINT
0397 4C                    LR      A,S             ;GET DI'S STATUS
0398 21 01                 NI      H"01"           ;TEST CHAR' BIT
039A 84 11                 BZ      ENBLERR         ;IF B., POINT NOT CHAR'
039C 41                    LR      A,DATSV         ;GET DATA
"ORION DIGITAL FUNCTION CARD"
039D 21 01                 NI      H"01"           ;GET RID OF ANY JUNK - THERE SHOULDN'T BE ANY
039F 4C                    LR      A,S             ;GET POINT STATUS - SIGN FLAGS STILL SET
03A0 94 05                 BNZ     ENBLE           ;IF B., ENABLE POINT FOR COS REPORTING
03A2 21 FB         DISBL   NI      DIDSBLE         ;CLEAR COS ENABLE BIT
03A4 90 03                 BR      ENBL4           ;
03A6 22 04         ENBLE   OI      DINBLE          ;SET COS ENABLE BIT
03A8 5C            ENBL4   LR      S,A             ;RETURN STATUS TO MEMORY!
03A9 29 06 AB              JMP     CMDACK
                   *
                   *
                   ***  POINT NOT CHARACTERIZED - SEND ERROR   ***
                   *
03AC 29 02 E1      ENBLERR JMP     DOERR1          ;PROCESS CHAR' REQUIRED ERROR
                   *
                   *
                   *********************************
                   *                               *
                   ***    READ A POINT'S STATUS  ***
                   *                               *
                   *********************************
                   *
                   *       **************
                   *       MESSAGE FORMAT
                   *       **************
```

```
                *
                *     RECEIVE:          BYTE 0 - TYPE OF COMMAND
                *                       BYTE 1 - POINT ADDRESS
                *                                BITS 0-3: POINT ADDRESS
                *                                BITS 4-6: FUNCTION CARD ADDRESS
                *                                BIT 7: UNUSED
                *                       BYTE 2 -
                *                       BYTE 3 -
                *                       BYTE 4 -
                *                       BYTE 5 -
                *                       BYTE 6 -
                *                       BYTE 7 -
                *
                *     TRANSMIT:         BYTE 0 - "ACK"
                *                       BYTE 1 - CURRENT STATE OF DI INPUT OR PA COUNT
                *                       BYTE 2 - ZERO BYTE
                *                       BYTE 3 -
                *                       BYTE 4 -
                *                       BYTE 5 -
                *                       BYTE 6 -
                *                       BYTE 7 -
                *
                *     ERRORS CHK'D:     1. INCORRECT BYTE COUNT
                *                       2. POINT NOT CHARACTERIZED
                *
                *
                ***   INIT ISAR TO POINT   ***
                *
03AF 40         READPT  LR     A,CNTMP          ;RECALL BYTE COUNT
03B0 25 02              CI     H"02"            ;DID I RECEIVE CORRECT NUMBER OF BYTES?
   "ORION DIGITAL FUNCTION CARD"
03B2 84 04              BZ     READP1           ;IF B., EVERYTING IS KOSHER!
03B4 29 06 90           JMP    ERRCNT           ;INCORRECT # OF BYTES FOR CMND, PROCESS ERROR!
03B7 A4         READP1  INS    RMODE            ;GET CARD CAPACITY
03B8 4C                 LR     A,S              ;GET POINT NUMBER
03B9 91 03              BM     READP2           ;IF B., CARD HAS 32 POINTS
03BB 21 0F              NI     H"0F"            ;GET RID OF CARD ADDRESS
03BD 21 1F      READP2  NI     H"1F"            ;MASK OFF FUNCTION CARD ADDRESS, LEAVE LSB
03BF 24 20              AI     D"32"            ;OFFSET TO MAP INTO STATUS TABLE
03C1 0B                 LR     IS,A             ;INIT ISAR
03C2 4C                 LR     A,S              ;GET POINT DATA WORD
03C3 21 01              NI     H"01"            ;TEST IF POINT CHAR'
03C5 94 04              BNZ    READP3           ;IF B., EVERYTHING FINE!
03C7 29 02 E1           JMP    DOERR1           ;PROCESS CHAR ERROR
03CA 4C         READP3  LR     A,S              ;GET POINT STATUS
                *
                *
                ***   IS THIS A DI OR PULSE ACCUMULATOR   ***
                *
03CB 13                 SL     1                ;ALIGN TO TEST FOR PA BIT
03CC 81 07              BP     READDI           ;IF B., GET DI DATA
                *
                *
                ***   GET PULSE ACCUMULATOR DATA   ***
                *
03CE 62         READPA  LISU   PACNTU           ;ALIGN ISAR TO POINT TO PA DATA
03CF 4C                 LR     A,S              ;GET THE PA COUNT
03D0 18                 COM                     ;GET ABSOLUTE VALUE
03D1 1F                 INC                     ;ADJUST FOR TWO'S COMPLEMENT
03D2 90 06              BR     SNDSTS           ;SEND THE STATUS
                *
                *
                ***   GET DIGITAL INPUT DATA   ***
                *
03D4 21 40      READDI  NI     H"40"            ;GET RID OF ALL THE JUNK
03D6 14                 SR     4                ;ALIGN INTI LSB
03D7 12                 SR     1                ;
03D8 12                 SR     1                ;
                *
                *
                ***   SEND POINT STATUS   ***
                *
03D9 63         SNDSTS  LISU   LCBUFU           ;INIT ISAR TO OUTPUT BUFFER
03DA 6E                 LISL   LCBUFL-1         ;
03DB 5D                 LR     I,A              ;STUFF POINT STATUS IN BUFFER
03DC 20 06              LI     ACK              ;
03DE 5C                 LR     S,A              ;STUFF ACK INTO BUFFER
03DF 6D                 LISL   LCBUFL-2         ;ALIGN BUFFER PTR
03E0 70                 CLR                     ;
03E1 5C                 LR     S,A              ;STUFF ZERO BYTE IN BUFFER
03E2 29 06 B0           JMP    SEND             ;WE'RE OFF!!!
```

```
                  *
                  *
                  ************************************************************
                  *                                                          *
  "ORION DIGITAL FUNCTION CARD"
                  ***   DETERMINE TYPE OF DIGITAL INPUT COMMAND - CONTINUED   ***
                  *                                                          *
                  ************************************************************
                  *
03E5 25 83        CMDIN1  CI     CVAKCMD ;COV'S ACKNOWLEDGED!
03E7 84 07                BZ     COVACK  ;
03E9 25 11                CI     CHRCMD  ;CHARACTERIZATION COMMAND?
03EB 84 2A                BZ     CHRDI   ;
03ED 90 21                BR     CMDIN2  ;GO GET THE LAST COMMAND
                  *
                  *
                  *
                  **********************************************
                  *                                            *
                  ***   ACKNOWLEDGE LC'S RECEIPT OF COV'S    ***
                  *                                            *
                  **********************************************
                  *
                  *       **************
                  *       MESSAGE FORMAT
                  *       **************
                  *
                  *       RECEIVE:        BYTE 0 - TYPE OF COMMAND
                  *                       BYTE 1 - CARD ADDRESS (OPTIONAL)
                  *                       BYTE 2 -
                  *                       BYTE 3 -
                  *                       BYTE 4 -
                  *                       BYTE 5 -
                  *                       BYTE 6 -
                  *                       BYTE 7 -
                  *
                  *       TRANSMIT:       BYTE 0 - "ACK"
                  *                       BYTE 1 -
                  *                       BYTE 2 -
                  *                       BYTE 3 -
                  *                       BYTE 4 -
                  *                       BYTE 5 -
                  *                       BYTE 6 -
                  *                       BYTE 7 -
                  *
                  *       ERRORS CHK'D:   1. INCORRECT BYTE COUNT
                  *
                  *
                  *
                  ***   INIT THE ISAR   ***
                  *
03EF 30           COVACK  DS     CNTMP          ;DID I RECEIVE CORRECT NUMBER OF BYTES?
03F0 84 07                BZ     COVAK1         ;IF B., EVERYTING IS KOSHER!
03F2 30                   DS     CNTMP          ;IN CASE HOST ORG' MESS, CHECK FOR 2ND BYTE
03F3 84 04                BZ     COVAK1         ;
03F5 29 06 90             JMP    ERRCNT         ;INCORRECT # OF BYTES FOR CMND, PROCESS ERROR!
03F8 44           COVAK1  LR     A,ISINIT       ;GET ISAR POINTER COMPUTED AT INIT
03F9 0B                   LR     IS,A           ;INIT THE ISAR
                  *                             ;VALUE LOADED IS AT THE TOP OF THE TABLE FOR THE
  "ORION DIGITAL FUNCTION CARD"
                  *                             ;RESPECTIVE POINT CAPACITY
                  *
                  *
                  ***   CLEAR THE LINE CARD ACK FLAGS   ***
                  *
03FA 70           COVCLR  CLR    A              ;ZERO ACCUM
03FB EC                   XS     S              ;SET CONDITION FLAGS
03FC 81 04                BP     DCVPTR         ;IF B., POINT DID NOT RELAY COS TO LC
03FE 21 77                NI     CLFLGS         ;CLEAR COV AND ASSOC! FLAGS
0400 5C                   LR     S,A            ;RETURN UPDATED STATE TO MEMORY
                  *
                  *
                  ***   DECREMENT ISAR TO ACCESS NEXT DI   ***
                  *
                  *
0401 4E           DCVPTR  LR     A,D      ;DECREMENT THE ISAR
0402 8F F7                BR7    COVCLR   ;IF I JUMP, MORE POINTS NEED TO BE CHECKED WITHIN
                  *                       ;THE SAME HARDWARE CHIP GROUP
0404 0A                   LR     A,IS     ;GET ISAR POINTER
0405 24 F8                AI     D"248"   ;DECREMENT UPPER ISAR DIGIT
0407 0B                   LR     IS,A     ;LOAD NEW VALUE INTO ISAR. (THE NEXT CHIP PROCESSED)
```

```
0408 25 1F           CI      TLBTM   ;HAVE I REACHED THE BOTTOM OF THE TABLE
040A 91 EF           BM      COVCLR  ;IF I JUMP, PROCESS NEXT CHIP GROUP
040C 29 06 AB        JMP     CMDACK  ;SEND RESPONSE
                *
                *
                **********************************************************
                *                                                        *
                ***  DETERMINE TYPE OF DIGITAL INPUT COMMAND - CONTINUED  ***
                *                                                        *
                **********************************************************
                *
040F 25 82      CMDIN2  CI      COSDAT  ;REQUEST FOR COS DATA?
0411 84 0F           BZ      FNDCOV  ;
0413 29 06 8B        JMP     CMDERR  ;COMMAND NOT APPLICABLE, PROCESS ERROR
                *
                *
                *
                ********************************************
                *                                          *
                ***  CHARACTERIZE A DIGITAL INPUT POINT  ***
                *                                          *
                ********************************************
                *
                *       **************
                *       MESSAGE FORMAT
                *       **************
                *
                *       RECEIVE:       BYTE 0 - TYPE OF COMMAND
                *                      BYTE 1 - POINT ADDRESS
                *                               BITS 0-3: POINT ADDRESS
                *                               BITS 4-6: FUNCTION CARD ADDRESS
                *                               BIT 7: UNUSED
                *                      BYTE 2 - CHARACTERIZATION DATA
   "ORION DIGITAL FUNCTION CARD"
                *                      BYTE 3 - SIGNIFICANT COV COUNT FOR PA (ONLY ON PA)
                *                      BYTE 4 - ZERO (ONLY ON PA)
                *                      BYTE 5 -
                *                      BYTE 6 -
                *                      BYTE 7 -
                *
                *       TRANSMIT:      BYTE 0 - "ACK"
                *                      BYTE 1 -
                *                      BYTE 2 -
                *                      BYTE 3 -
                *                      BYTE 4 -
                *                      BYTE 5 -
                *                      BYTE 6 -
                *                      BYTE 7 -
                *
                *       ERRORS CHK'D:  1. INCORRECT BYTE COUNT
                *                      2. IMPROPER DATA FIELD IN BYTE 2
                *
0416 40         CHRDI   LR      A,CNTMP         ;RECALL BYTE COUNT
0417 25 03              CI      H"03"           ;DID I RECEIVE CORRECT NUMBER OF BYTES?
0419 84 08              BZ      CHRDI5          ;IF B., EVERYTING IS KOSHER!
041B 25 05              CI      H"05"           ;I MIGHT BE A PA...
041D 84 04              BZ      CHRDI5          ;
041F 29 06 90           JMP     ERRCNT          ;INCORRECT # OF BYTES FOR CMND, PROCESS ERROR!
0422 4E         CHRDI5  LR      A,D             ;DO A DUMMY LOAD TO DECREMENT ISAR
0423 4C                 LR      A,S             ;GET DATA FROM INPUT BUFFER
0424 21 B9              NI      H"B9"           ;CHECK FOR INVALID DATA
0426 84 04              BZ      CHRD5A          ;IF B., OKAY
0428 29 06 9F           JMP     ERRDAT
                *
                ***  IF THIS IS DATA FOR PA, CHECK IF I RECEIVED SCOV DATA  ***
                *
042B 4C         CHRD5A  LR      A,S             ;RECALL DATA
042C 13                 SL      1               ;PA BIT SET?  -  SET CONDITION FLAGS
042D 4E                 LR      A,D             ;RECALL DATA
042E 51                 LR      DATSV,A         ;SAVE
042F 81 0E              BP      CHRD5C          ;IF B., NOT A PA
0431 40                 LR      A,CNTMP         ;RECALL COUNT
0432 25 05              CI      H"05"           ;DID I RECEIVE SCOV DATA?
0434 84 07              BZ      CHRD5B          ;IF B., I GOT WHAT I NEEDED!
0436 20 C6              LI      CVDTER          ;I NEED MORE DATA - SEND AN ERROR MSG
0438 51                 LR      DATSV,A         ;STORE
0439 29 06 A2           JMP     ERROR           ;GO DO IT
                *
                *
                ***  STORE SCOV DATA  ***
                *
```

```
043C 4C         CHRD5B  LR      A,S             ;GET SCOV DATA
043D 50                 LR      CNTMP,A         ;SAVE TILL LATER
                *
                ***  TEST CARD CAPACITY   ***
                *
043E 6E         CHRD5C  LISL    LCBUFL-1        ;POINT TO ADDRESS
  "ORION DIGITAL FUNCTION CARD"
043F A4                 INS     RMODE           ;GET CARD CAPACITY
0440 4C                 LR      A,S             ;GET THE POINT ADDRESS
0441 91 03              BM      CHRDI4          ;IF B., CARD HAS 32 POINTS
0443 21 0F              NI      H"0F"           ;GET RID OF ADDRESS
0445 21 1F      CHRDI4  NI      H"1F"           ;MASK OFF FUNCTION CARD ADDRESS, BUT LEAVE LSB
0447 24 20              AI      D"32"           ;OFFSET TO MAP INTO STATUS TABLE
0449 0B                 LR      IS,A            ;POINT ISAR TO POINT
                *
                *
                ***  IS THIS CHAR' COMMAND TO UPPER DI'S?   ***
                *
044A 25 2F              CI      D"47"           ;IS ISAR POINTING TO UPPER 16 DI'S?
044C 43                 LR      A,PWRUP         ;GET CHAR' WORD - SIGN FLAGS STILL SET
044D 91 05              BM      CHRDI1          ;IF B., TEST IF CARD HAS UPPER 32 DI'S
                *
                *
                ***  COMMAND IS TO LOWER 16 DI'S - SET LOWER 16 CHAR FLAG   ***
                *
044F 22 40              OI      ST16CH          ;SET CHAR' FLAG FOR LOWER 16 POINTS
0451 90 03              BR      CHRDI2          ;GO AND CHARACTERIZE THE POINT
                *
                *
                ***  SET UPPER 16 CHAR' FLAG   ***
                *
0453 22 10      CHRDI1  OI      ST32CH          ;SET "UPPER 32 CHAR" BIT
0455 53         CHRDI2  LR      PWRUP,A         ;RETURN NEW CHAR' STATUS TO MEMORY
                *
                *
                ***  IS CHAR' DATA FOR DI OR PULSE ACCUMULATOR   ***
                *
0456 41                 LR      A,DATSV         ;RECALL DATA
0457 13                 SL      1               ;ALIGN TO TEST PA BIT
0458 81 0A              BP      CHRDI3          ;IF B., POINT IS NOT A PA - PROCESS
                *
                *
                ***  IS THE PULSE ACCUMULATOR CHAR' DATA IN RANGE   ***
                *
045A 0A                 LR      A,IS            ;GET POINTER
045B 24 D2              AI      -D"46"          ;FIND ABSOLUTE VALUE - ASGNMT ABOVE PA DATABASE
045D 91 1D              BM      RNGER1          ;IF B., COMMAND OUT OF RANGE
045F 24 FE              AI      -D"2"           ;ASSIGNMENT BELOW PA DATABASE?
0461 81 19              BP      RNGER1          ;IF B., COMMAND OUT OF RANGE
                *
                *
                ***  CHAR' DATA IN RANGE - PLACE IN MEMORY
                *
0463 4C         CHRDI3  LR      A,S             ;GET POINT CHAR' DATA
0464 21 B9              NI      H"B9"           ;CLR ONLY THE BITS WE ALLOW TO BE CHARACTERIZED
0466 E1                 XS      DATSV           ;"OR" THE NEW CHARACTERIZATION DATA
0467 22 01              OI      CHARDI          ;SET CHAR' FLAG
0469 5C                 LR      S,A             ;SET BIT IN DATABASE
                *
                *
                ***  IF THIS IS A PA, I STILL HAVE MORE DATA TO PROCESS!   ***
  "ORION DIGITAL FUNCTION CARD"
                *
046A 13                 SL      1               ;ALIGN TO TEST PA BIT
046B 91 04              BM      CHRPA           ;IF B., THIS IS PA
046D 29 06 AB           JMP     CMDACK          ;SINCE NOT A PA, SEND ACK TO LINE CARD
                *
                *
                ***  SET THE SCOV FOR PA   ***
                *
0470 0A         CHRPA   LR      A,IS            ;RECALL ISAR POINTER
0471 24 DE              AI      -D"34"          ;CORRECT POINTER TO PA SCOV BYTE STORAGE
0473 0B                 LR      IS,A            ;RETURN FOR UPDATE
0474 40                 LR      A,CNTMP         ;GET SCOV DATA
0475 5C                 LR      S,A             ;STORE SCOV
0476 62                 LISU    PACNTU          ;INITIALIZE SCOV DECREMENTING REGISTER
0477 5C                 LR      S,A             ;DO IT!
0478 29 06 AB           JMP     CMDACK          ;GO AND XMIT
                *
                *
```

```
                *
                *******************************
                *                             *
                ***   PROCESS DI ERRORS     ***
                *                             *
                *******************************
                *
                ***   PROCESS RANGE ERROR   ***
                *
047B 29 06 9A RNGER1  JMP     RANGERR        ;PROCESS POINT OUT OF RANGE ERROR
047E 29 06 95 ADRER1  JMP     ERRADR         ;BAD ADDRESS
                *
                *
                ***************************************
                *                                     *
                ***   SEND COV DATA TO LINE CARD    ***
                *                                     *
                ***************************************
                *
                *       **************
                *       MESSAGE FORMAT
                *       **************
                *
                *       RECEIVE:        BYTE 0 - TYPE OF COMMAND
                *                       BYTE 1 - FUNCTION CARD BASE ADDRESS
                *                                BITS 0-3: POINT ADDRESS
                *                                BITS 4-6: FUNCTION CARD ADDRESS
                *                                BIT 7: UNUSED
                *                       BYTE 2 - POINTER TO COV'S TO SEND
                *                       BYTE 3 -
                *                       BYTE 4 -
                *                       BYTE 5 -
                *                       BYTE 6 -
                *                       BYTE 7 -
                *
                *       TRANSMIT:       BYTE 0 - "ACK"
    "ORION DIGITAL FUNCTION CARD"
                *                       BYTE 1 -
                *                       BYTE 2 -
                *                       BYTE 3 -
                *                       BYTE 4 -
                *                       BYTE 5 -
                *                       BYTE 6 -
                *                       BYTE 7 -
                *
                *       ERRORS CHK'D:   1. INCORRECT BYTE COUNT
                *                       2. ADDRESS ERROR NOT ANNUNCIATED BUT FIXED
                *
                ***   INITIALIZE PARAMETERS   ***
                *
0481 40       FNDCOV  LR      A,CNTMP        ;RECALL BYTE COUNT
0482 25 03            CI      H"03"          ;DID I RECEIVE CORRECT NUMBER OF BYTES?
0484 84 04            BZ      FNDCV1         ;IF B., EVERYTING IS KOSHER!
0486 29 06 90         JMP     ERRCNT         ;INCORRECT # OF BYTES FOR CMND, PROCESS ERROR!
0489 6F       FNDCV1  LISL    LCBUFL         ;POINT TO FIRST WORD IN BUFFER
048A 20 06            LI      ACK            ;
048C 5E               LR      D,A            ;STUFF ACK IN BUFFER
048D 0A               LR      A,IS           ;GET ISAR BUFFER POINTER
048E 56               LR      CKSM,A         ;USE CKSM COUNT AS TEMPORARY STORAGE
048F 6D               LISL    LCBUFL-2       ;POINT TO SECOND BYTE IN BUFFER
0490 4D               LR      A,I            ;GET COV INIT COUNT FROM BUFFER
0491 52               LR      COSCNT,A       ;SAVE FOR LATER
0492 4C               LR      A,S            ;GET FUNCTION CARD ADDRESS
0493 21 70            NI      H"70"          ;GET RID OF ANY JUNK
0495 5C               LR      S,A            ;UPDATE "JUNK FREE" WORD
0496 6B               LISL    LCBUFL-4       ;POINT TO FOURTH BYTE IN BUFFER
0497 5C               LR      S,A            ;STORE ADDRESS THERE IF 2ND XMIT REQ'
0498 6E               LISL    LCBUFL-1       ;RESTORE BUFFER POINTER TO FIRST BYTE
                *
                *
                ***   FIND THE STATE OF CHARACTERIZATION   ***
                *
0499 43               LR      A,PWRUP        ;GET CHAR' DATA
049A 13               SL      1              ;TEST IF LOWER 16 DI'S CHAR'
049B 91 11            BM      DICAP          ;IF B., LOWER 16 CHAR'
                *
                *
                ***   REQUEST CHARACTERIZATION FOR LOWER 16 DI'S   ***
                *
049D 32               DS      COSCNT         ;BUMP COV COUNT
049E 81 0E            BP      DICAP          ;IF B., THIS CHAR' REQUEST WAS SENT
04A0 4C               LR      A,S            ;RECALL ADDRESS FROM BUFFER
```

```
04A1 22 80              OI      SETCHR          ;SET CHAR' REQUIRED FLAG
04A3 5E                 LR      D,A             ;LOAD MODIFIED ADDRESS IN BUFFER
04A4 20 FC              LI      CHAREQ          ;LOAD CHARACTERIZATION REQUEST
04A6 5E                 LR      D,A             ;LOAD REQUEST IN BUFFER
04A7 70                 CLR                     ;
04A8 5E                 LR      D,A             ;LOAD "ZERO" BYTE IN BUFFER
04A9 0A                 LR      A,IS            ;GET NEW BUFFER POINTER
04AA 56                 LR      CKSM,A          ;SAVE IT FOR LATER USE
04AB 43                 LR      A,PWRUP         ;RECALL POWER-UP FLAG
     "ORION DIGITAL FUNCTION CARD"
04AC 13                 SL      1               ;
              *
              *
              ***   TEST IF CARD HAS 32 POINT CAPACITY   ***
              *
04AD 13       DICAP     SL      1               ;TEST CAPACITY
04AE 81 20              BP      FNDCV2          ;IF B., SEE IF ANY COV DATA TO SEND
              *
              *
              ***   TEST IF UPPER 16 DI'S CHAR'   ***
              *
04B0 13                 SL      1               ;TEST FOR CHAR'
04B1 91 1D              BM      FNDCV2          ;IF B., UPPER DO'S ARE CHAR'
              *
              *
              ***   REQUEST CHARACTERIZATION FOR UPPER 16 DI'S   ***
              *
04B3 32                 DS      COSCNT          ;BUMP COUNT, IS CHAR' REQ WHAT I WANT TO SEND
04B4 81 F8              BP      DICAP           ;IF B., CHAR' REQ ALREADY SENT
04B6 4C                 LR      A,S             ;RECALL FUNCTION CARD ADDRESS FROM BUFFER
04B7 21 10              NI      H"10"           ;AM I ODD OR EVEN SLOT?
04B9 84 04              BZ      DICAP1          ;IF B., I MUST BE EVEN
04BB 29 06 95           JMP     ERRADR          ;SOMEONE FOULED UP ALONG THE WAY - PROCESS ERROR
04BE 4C       DICAP1    LR      A,S             ;RECALL LEGITIMATE ADDRESS
04BF 24 10              AI      H"10"           ;BUMP CARD ADDRESS FOR UPPER 16 DI'S
04C1 22 80              OI      SETCHR          ;SET CHAR' REQUEST FLAG
04C3 5E                 LR      D,A             ;STUFF REQUEST IN BUFFER
04C4 20 FC              LI      CHAREQ          ;
04C6 5E                 LR      D,A             ;STUFF CHAR' REQUEST IN BUFFER
04C7 70                 CLR                     ;
04C8 5E                 LR      D,A             ;LOAD "ZERO" BYTE IN BUFFER
04C9 0A                 LR      A,IS            ;GET BUFFER POINTER
04CA 56                 LR      CKSM,A          ;SAVE NEW BUFFER POINTER
04CB 25 18              CI      O"30"           ;AM I AT THE BOTTOM OF THE BUFFER????
04CD 84 44              BZ      COVSND          ;IF B., I GUESS I AM!
              *
              *
              ***   INIT ISAR FOR START OF COV SCAN   ***
              *
04CF 44       FNDCV2    LR      A,ISINIT        ;GET ISAR POINTER TO DATABASE
04D0 0B                 LR      IS,A            ;INIT THE ISAR
              *
              *
              ***   TEST BYTE - IS "LINE CARD KNOWS OF CHANGE" FLAG SET?   ***
              *
04D1 70       COVDAT    CLR                     ;ZERO ACCUM TO PERFORM "OR"
04D2 EC                 XS      S               ;SET CONDITION FLAGS
04D3 81 28              BP      DCRCOV          ;IF B., POINT TO NEXT POINT
              *
              *
              ***   COV FOUND   ***
              *
04D5 32                 DS      COSCNT          ;BUMP THE COV COUNT
04D6 81 25              BP      DCRCOV          ;IF B., THIS IS A POINT TO REPORT
     "ORION DIGITAL FUNCTION CARD"
              *
              *
              ***   VALID COV FOUND - IS THIS STANDARD INPUT OR PA DATA   ***
              *
04D8 13       COVN1     SL      1               ;ALIGN TO TEST PA BIT
04D9 0A                 LR      A,IS            ;GET POINT MEMORY ADDRESS
04DA 50                 LR      ADRSV,A         ;SAVE FOR LATER
04DB 81 07              BP      COVN2           ;IF B., PROCESS STANDARD INPUT
              *
              *
              ***   PROCESS PULSE ACCUMULATOR DATA   ***
              *
04DD 62                 LISU    PACNTU          ;ADJUST ISAR TO GET PA DATA BYTE
04DE 4C                 LR      A,S             ;GET PA DATA
04DF 18                 COM                     ;GET ABSOLUTE VALUE
```

```
04E0 1F              INC                    ;ADJUST FOR TWO'S COMPLEMENT
04E1 90 06           BR       COVN3         ;GO AND STORE DATA
                *
                *
                ***  PROCESS NON-PULSE ACCUM DATA   ***
                *
04E3 4C         COVN2  LR     A,S           ;GET POINT STATUS
04E4 21 20           NI       H"20"         ;MASK ALL JUNK, BUT THE POINT STATUS BIT
04E6 14              SR       4             ;ALIGN INTO LSB
04E7 12              SR       1             ;
                *
                *
                ***  SAVE DATA   ***
                *
04E8 51         COVN3  LR     DATSV,A       ;SAVE POINT DATA
                *
                *
                ***  PLACE COV DATA IN BUFFER  ***
                *
04E9 46              LR       A,CKSM        ;RECALL BUFFER POINTER
04EA 0B              LR       IS,A          ;RESTORE IT!
04EB 40              LR       A,ADRSV       ;GET POINT MEMORY ADDRESS
04EC 24 E0           AI       -D"32"        ;FIND "TRUE" POINT ADDRESS
04EE CC              AS       S             ;ADJUST FUNCTION CARD ADDRESS IF DOUBLE WIDE
04EF 5E              LR       D,A           ;STUFF POINT ADDRESS IN BUFFER
04F0 41              LR       A,DATSV       ;GET POINT STATUS
04F1 5E              LR       D,A           ;STUFF POINT STATE IN BUFFER
04F2 70              CLR                    ;
04F3 5E              LR       D,A           ;LOAD "ZERO" BYTE IN BUFFER
                *
                *
                ***  TEST TO SEE IF BUFFER IS FULL   ***
                *
04F4 0A              LR       A,IS          ;GET BUFFER POINTER
04F5 56              LR       CKSM,A        ;SAVE IT IN CASE I'M NOT READY FOR XMIT!
04F6 25 18           CI       D"30"         ;AM I AT THE BOTTOM OF OUTPUT BUFFER?
04F8 84 19           BZ       COVSND        ;IF B., SEND DATA AWAY
                *
                *
  "ORION DIGITAL FUNCTION CARD"
                ***  MORE COV'S TO PROCESS - RESTORE ISAR PTR TO DATABASE   ***
                *
04FA 40              LR       A,ADRSV       ;GET CURRENT ISAR POINTER TO MEMORY
04FB 0B              LR       IS,A          ;RESTORE IT
                *
                *
                ***  DECREMENT TO NEXT DATA BYTE   ***
                *
04FC 4E         DCRCOV LR     A,D           ;DUMMY DECREMENT
04FD 8F 03           BR7      COVDAT        ;IF B., GO TEST FOR ANOTHER COV
04FF 0A              LR       A,IS          ;GET ISAR POINTER
0500 24 F8           AI       D"248"        ;DECREMENT UPPER ISAR DIGIT
0502 0B              LR       IS,A          ;RESTORE ISAR
0503 25 1F           CI       TLBTM         ;HAVE I REACHED THE BOTTOM OF RAM DATABASE
0505 91 CB           BM       COVDAT        ;IF B., MORE DATA TO TEST
                *
                *
                ***  SINCE THIS IS BOTTOM OF THE TABLE, CHECK IF COV'S EXPIRED   ***
                *
0507 42              LR       A,COSCNT      ;GET COV COUNT
0508 22 00           OI       H"00"         ;SET CONDITION FLAGS
050A 91 07           BM       COVSND        ;IF M., THERE IS AT LEAST ONE COV TO SEND
050C 20 EF           LI       CVERR         ;LOAD ERROR CODE
050E 51              LR       DATSV,A       ;SAVE FOR XMIT
050F 29 06 A2        JMP      ERROR         ;
                *
                ***  SEND COV DATA TO LINE CARD   ***
                *
0512 46         COVSND LR     A,CKSM        ;RECALL BUFFER PTR
0513 0B              LR       IS,A          ;INIT ISAR FOR XMIT ROUTINE
0514 4D              LR       A,I           ;DO DUMMY INC TO ADJUST ISAR TO LAST DATA BYTE
0515 29 06 B0        JMP      SEND          ;NOW WE'RE READY!
                *
                *
  "ORION DIGITAL FUNCTION CARD"
                ***********************************************
                *                                             *
                ***  PROGRAM INITIALIZATION CONTINUED   ***
                *                                             *
                ***********************************************
                *
```

```
             ***    COMPUTE CHECKSUM OF RAM.    ***
             *
0518 67      RAMCHK  LISU    7              ;START AT TOP OF SCRATCHPAD
0519 6F              LISL    7
051A 20 AA   RAMTST  LI      H"AA"          ;LOAD AN AA
051C 5C              LR      S,A
051D 20 55           LI      H"55"
051F EC              XS      S
0520 5C              LR      S,A            ;LOAD AN FF
0521 20 FF           LI      H"FF"
0523 EC              XS      S
0524 5C              LR      S,A            ;LOAD A 0
0525 70              CLR
0526 EE              XS      D
0527 94 24           BNZ     BSTFAL         ;IF NZ, FAIL TEST
0529 8F F0           BR7     RAMTST
052B 0A              LR      A,IS           ;TAKE CARE OF UNDERFLOW
052C 24 F8           AI      -O"10"
052E 92 04           BNC     RAMGD          ;IF NC, ALL RAM CHECKED GOOD
0530 0B              LR      IS,A
0531 90 E8           BR      RAMTST
             RAMGD   EQU     *
             *
             *
             *
             ***    TEST TIMER    ***
             *
             * SET 1 MS TIME DELAY AND START COUNTING FOR 1 MS.
             * IF COUNT FINISHES BEFORE INTERRUPT OR INTERRUPT COMES
             * BEFORE IT SHOULD, THE TEST FAILS.
             * THE TEST ACCEPTS A TIMER ERROR OF PLUS-OR-MINUS 50 MICROSECONDS.
             *
0533 2A 05 47        DCI     TMTST          ;LOAD PROGRAM ADDRESS OF TIMER TEST INT
0536 0E              LR      Q,DC           ;
0537 20 C8           LI      CNTEST         ;SET COUNT FOR 1 MS.
0539 B7              OUTS    TIMER
053A 20 6A           LI      INTCT4         ;SET CONTROL FOR 1 MS.
053C B6              OUTS    ICP
053D 1B              EI
053E 20 68           LI      DLY1MS         ;SET DELAY COUNT
0540 51              LR      DATSV,A        ;USE DATSV REG AS TEMP STORAGE
0541 31      DLYLP   DS      DATSV
0542 94 FE           BNZ     DLYLP
0544 1A              DI                     ;IF WE GET HERE, TIMER DIDN'T FINISH IN TIME
0545 90 06           BR      BSTFAL
0547 41      TMTST   LR      A,DATSV        ;RECALL COUNTDOWN DATA
0548 25 0A           CI      D"10"          ;TIMER INT HAPPENED, WAS IT TOO FAST?

  "ORION DIGITAL FUNCTION CARD"
054A 82 04           BC      RAMINIT        ;IF C, COUNT LE 10., TIMER PASSES
             *
             ***    BASIC SANITY TEST FAILED    ***
             *
054C 29 05 4C BSTFAL JMP     BSTFAL         ;DO, UNTIL RESET, THIS IS A FAILURE COND.
             *                              ;SINCE JUMP IS A PRIVILEDGED INSTRUCTION,
             *                              ;INTERRUPTS CANNOT BE SERVICED.
             *
             *
             ***    INITIALIZE SCRATCHPAD RAM AFTER POWER-UP    ***
             *
054E 67      RAMINIT LISU    H"07"   ;INIT UPPER ISAR TO RAM TOP
0550 6F              LISL    H"07"   ;INIT LOWER ISAR TO RAM TOP
0551 70      RAMCLR  CLR             ;ZERO ACCUM
0552 5E      RAMCL1  LR      D,A     ;CLR RAM LOCATION AND DECREMENT
0553 8F FE           BR7     RAMCL1  ;IF OCTAL GROUP NOT DONE, DO AGAIN!!
0555 0A              LR      A,IS    ;RECALL ISAR POINTER
0556 24 F8           AI      D"248"  ;DECREMENT UPPER ISAR DIGIT
0558 0B              LR      IS,A    ;RETURN NEW VALUE TO ISAR
0559 25 FF           CI      RAMBTM  ;AM I AT THE BOTTOM OF RAM??
055B 94 F5           BNZ     RAMCLR  ;IF NOT TO THE BOTTOM, CLEAR THE NEXT OCTAL RAM GROUP
             *
             *
             ***    READ FUNCTION CARD TYPE: DI OR DO?    ***
             *
055D 20 E0   FCTYPE  LI      MASKID  ;SET UP FOR PORT READ
055F B0              OUTS    PBUSC   ;INITIALIZE THE PORT
0560 A0              INS     PBUSC   ;READ THE CARD TYPE
0561 21 08           NI      H"08"   ;GET RID OF UNIMPORTANT INFORMATION
0563 53              LR      PWRUP,A ;STORE CARD TYPE IN PWRUP CHARACTERIZATION WORD
             *
             *
```

```
                 ***   DETERMINE FUNCTION CARD CAPACITY   ***
                 *
0564 15                   SL     4          ;ALIGN FOR FC TEST
0565 91 04                BM     FCOUT      ;IF BR., THIS IS A DO
0567 A4          FCIN     INS    RMODE      ;READ DI CAPACITY
0568 90 02                BR     FCCAP      ;
056A A1          FCOUT    INS    LMODE      ;READ DO CAPACITY
056B 21 80       FCCAP    NI     H'80'      ;GET RID OF NON-ESSENTIALS'
056D 67                   LISU   7          ;SET ISAR TO TOP OF RAM DATA FOR 32 POINTS
056E 6F                   LISL   7          ;
056F 91 02                BM     FCCAP1     ;IF B., CARD HAS 32 POINT CAPACITY
0571 6D          FC16     LISL   5          ;ADJUST ISAR TO REFLECT 16 POINT FUNCTION
0572 43          FCCAP1   LR     A,PWRUP    ;GET POWER FAIL WORD
0573 81 04                BP     FCCAP2     ;IF B., CAPACITY IS 16 POINTS
0575 22 24                OI     CAP32      ;SET CAPACITY FLAGS
0577 53                   LR     PWRUP,A    ;STORE CARD CAPACITY IR POWER-UP WORD
0578 0A          FCCAP2   LR     A,IS       ;GET ISAR POINTER COMPUTED ABOVE
0579 54                   LR     ISINIT,A;STORE FOR USE DURING PROGRAM EXECUTION
                 *
                 *
                 *
                 ***   CALCULATE ROM CHECKSUM   ***
                 *
                 * XOR AND ROTATE LEFT ALL BYTES IN ROM
                 *
                 * PRGM NOTE: ROUTINE IS 55 - 60 MSEC IN LENGTH
057A 2A 00 00 ROMCHK  DCI    0                    ;START AT 0
057D 70                   CLR                       ;INIT CKSM TO 0
057E 55                   LR     RMCKSM,A
057F 45          CKSMLP   LR     A,RMCKSM           ;GET CURRENT CKSM
0580 8C                   XM                        ;XOR NEXT BYTE AND BUMP DC
0581 55                   LR     RMCKSM,A           ;STORE CKSM
0582 C5                   AS     RMCKSM             ;
0583 19                   LNK
0584 55                   LR     RMCKSM,A           ;SAVE CKSM
0585 11                   LR     H,DC               ;PUT DC WHERE ACCUMULATOR CAN GET TO IT ALL
0586 4B                   LR     A,11
**OPERAND EXCEEDS RANGE
0587 25 13                CI     ROMEND+1           ;HAVE I REACHED LOW BYTE OF END ROM DATA
0589 94 F5                BNZ    CKSMLP             ;NO, NOT DONE YET.
058B 4A                   LR     A,10               ;CHECK THE HIGH BYTE
058C 25 07                CI     ROMEND:            ;HAVE I REACHED HIGH BYTE OF ROM DATA END
058E 94 F0                BNZ    CKSMLP             ;NOT YET
0590 70                   CLR                       ;ZERO TO SET FLAGS FOR NEXT INSTRUCTION
0591 E5                   XS     RMCKSM             ;CKSM DONE, DID IT END UP 0?
0592 94 B9                BNZ    BSTFAL             ;IF NZ, NO, FAIL ROM CKSM
                 *
                 *
                 ***   COMPUTE PROGRAM BRANCH FOLLOWING CHECKSUM   ***
                 *
                 *                          ;THE ROM CHKSUM ROUTINE IS PERIODICALLY EXECUTED BY THE
                 *                          ;DI AND DO PROGRAMS. THE FOLLOWING CODE DETERMINES THE
                 *                          ;NEXT TASK FOR EXECUTION UPON COMPLETION OF THIS ROUTINE
                 *                          ;
0594 43                   LR     A,PWRUP    ;RECALL CHARACTERIZATION WORD
0595 15                   SL     4          ;ALIGN FOR TEST
0596 81 0C                BP     DI         ;IF I JUMP, THIS MUST BE A DI
0598 13          DO       SL     1          ;ALIGN INIT FLAG INTO MSB
0599 13                   SL     1          ;
059A 13                   SL     1          ;
059B 81 0E                BP     INITDO     ;GO INIT TIMER FOR DO FUNCTION
059D 20 EB                LI     INTCT1     ;ENABLE TIMER INTERRUPTS
059F B6                   OUTS   ICP        ;DO IT!
05A0 29 00 12             JMP    IDLE       ;GO AND WAIT FOR INTERRUPTS
05A3 13          DI       SL     1          ;ALIGN INIT FLAG INTO MSB
05A4 13                   SL     1          ;
05A5 13                   SL     1          ;
05A6 81 16                BP     INITDI     ;FINISH DI INITIALIZATION
05A8 29 05 CC             JMP    SCANIN     ;GO SCAN DI'S FOR COS
                 *
                 ***   INITIALIZATION FOR DO   ***
                 *
05AB 2A 00 21 INITDO  DCI    TIMDO              ;FIND START OF DO TIMER INT ROUTINE
05AE 0E                   LR     Q,DC               ;STORE LOCATION FOR DIRECT PROGRAM JUMP
05AF 20 C8                LI     COUNT              ;GET THE VALUE FOR TIMER
05B1 B7                   OUTS   TIMER              ;GO DO IT!

05B2 20 EB                LI     INTCT1             ;SET UP THE ICP PORT
05B4 B6                   OUTS   ICP                ;
05B5 43                   LR     A,PWRUP            ;RECALL CHAR' WORD
05B6 22 01                OI     H'01'              ;SET "INIT COMPLETE" FLAG
05B8 53                   LR     PWRUP,A            ;STORE IT AWAY!
05B9 1B                   EI                        ;ENABLE INTERRUPTS
05BA 29 00 12             JMP    IDLE               ;GO AND WAIT FOR INTERRUPTS
```

```
                   *
                   *
                   ***   INIT FOR DI COS SCAN   ***
                   *
05BD 20 C8         INITDI  LI      COUNT    ;GET COUNT FOR TIMER
05BF B7                    OUTS    TIMER    ;SET COUNT
05C0 20 E8                 LI      INTCT1   ;ENABLE TIMER INT
05C2 B6                    OUTS    ICP      ;
05C3 43                    LR      A,PWRUP  ;RECALL CHAR' WORD
05C4 22 01                 OI      H"01"    ;SET "INIT COMPLETE" FLAG
05C6 53                    LR      PWRUP,A  ;STORE FOR THE FUTURE
05C7 2A 06 13              DCI     TIMPA,   ;FIND START OF PA TIMER INT ROUTINE
05CA 0E                    LR      Q,DC     ;STORE LOCATION FOR DIRECT PROGRAM JUMP
05CB 1B                    EI               ;
                   *
                   *
                   ***   PROGRAM INITIALIZATION COMPLETE   ***
                   *********************************************
                   *********************************************
                   *
                   *
                   *
                   *****************************************************
                   *                                                   *
                   ***   PROCESSING AREA FOR DI BACKROUND ROUTINES   ***
                   *                                                   *
                   *****************************************************
                   *
                   ***   SCAN FOR DI POINT   ***
                   *
05CC 2A 00 79 SCANIN  DCI     DITBL           ;SET DATA COUNTER TO FIRST HARDWARE READ ADDRESS
05CF 6F               LISL    H"07"           ;INIT LOWER ISAR TO TOP OF RAM
05D0 67               LISU    H"07"           ;INIT UPPER ISAR TO TOP OF RAM
05D1 1A       SCNIN   DI                      ;DISABLE INTERRUPTS WHILE I TINKER WITH DATABASE
05D2 16               LM                      ;GET HARDARE ADDRESS (REMEMBER AUTO INC OF DATA
05D3 51               LR      DATSV,A         ;SAVE STUFF
05D4 21 F0            NI      H"F0"           ;OUTPUT SELECT, BUT LEAVE TRI-STATE
05D6 B1               OUTS    RDATA           ;
05D7 41               LR      A,DATSV         ;RECALL CHIP ADDRESS
05D8 B1               OUTS    RDATA           ;
05D9 A1               INS     RDATA           ;INPUT THE DATA
05DA 21 80            NI      H"80"           ;GET RID OF ALL JUNK EXCEPT FOR DATA
                   *
                   *
                   ***   XOR INPUT WITH CURRENT STATE   ***
                   *
05DC 12               SR      1               ;ALIGN DATA TO COINCIDE WITH MEMORY
05DD 12               SR      1               ;
05DE EC               XS      S               ;COMPARE INPUT TO MEMORY
                   *
                   *
                   ***   TEST FOR PULSE ACCUMULATOR   ***
                   *
05DF 13               SL      1               ;TEST PA BIT
05E0 91 17            BM      NXTPT1          ;IF B., THIS IS PA, LEAVE UNCHANGED
                   *
                   *
                   ***   TEST FOR COS CONDITION   ***
                   *
05E2 13               SL      1               ;COMPARE INPUT TO CURRENT STATE
05E3 81 10            BP      CLRFLG          ;IF B., THERE IS NO CHANGE
                   *
                   ***   SINCE COS IS VALID, SET THE APPROPRIATE FLAGS   ***
                   *
05E5 13               SL      1               ;IS THE LTDF FLAG SET
05E6 81 26            BP      SETFLG          ;IF 1 JUMP, I BEGIN ... SEQUENCE. SET LTDF
05E8 13               SL      1               ;CHECK IF COS SET
05E9 91 0E            BM      NXTPT1          ;IF 1 JUMP, POINT ...
                   *                          ;SO I WILL IGNORE ...
05EB 13               SL      1               ;ENABLED FOR COS ...
05EC 20 20            LI      STINPT          ;PREPARE FOR STA...
05EE 81 03            BP      UPDATE          ;IF 1 JUMP, ...
05F0 20 28            LI      STINPT+STCOS    ;CHANGE ...
05F2 EC       UPDATE  XS      S               ;DO IT!
05F3 5C               LR      S,A             ;RETURN UPDATED STATUS TO MEMORY
05F4 4C       CLRFLG  LR      A,S             ;GET POINT DATA
05F5 21 EF            NI      CLLTDF          ;CLR LTDF FLAG
05F7 5C               LR      S,A             ;RETURN STATUS TO MEMORY
                   *
                   *
                   ***   ADJUST ISAR FOR NEXT DI PROCESSED   ***
                   *
```

```
05F8 A1        NXTPTI  INS     RDATA            ;TURN OFF MULTIPLEXORS!
05F9 21 70             NI      H"70"            ;
05FB B1                OUTS    RDATA            ;THIS WILL KEEP THE HARDWARE HAPPY
05FC 1B                EI                       ;ENABLE INTERRUPTS TO DETECT BACKPLANE MSG
05FD 4E                LR      A,D              ;DECREMENT THE ISAR
05FE 8F D2             BR7     SCNIN            ;IF I JUMP, MORE POINTS NEED TO BE CHECKED WITHI
               *                                ;THE SAME HARDWARE CHIP GROUP
0600 0A                LR      A,IS             ;GET ISAR POINTER
0601 24 F8             AI      D"248"           ;DECREMENT UPPER ISAR DIGIT
0603 0B                LR      IS,A             ;LOAD NEW VALUE INTO ISAR. (THE NEXT CHIP PROCES
0604 25 1F             CI      TLBTM            ;HAVE I REACHED THE BOTTOM OF THE TABLE
0606 91 CA             BM      SCNIN            ;IF I JUMP, PROCESS NEXT CHIP GROUP
0608 70                CLR                      ;TRI-STATE THE DECODERS
0609 B1                OUTS    RDATA            ;WHILE NOT REQUIRED, THIS LOOKS MUCH BETTER ON O
060A 29 05 7A          JMP     ROMCHK           ;DO A CKSM. THIS GIVES CONTACT DEBOUNCE TIME
               *
               *
               ***   SET LAST TIME WAS DIFFERENT FLAG   ***
               *
060D 4C        SETFLG  LR      A,S      ;GET DATA
060E 22 10             OI      STLTDF   ;SET THE FLAG
0610 5C                LR      S,A      ;RETURN NEW STATUS TO MEMORY
0611 90 E6             BR      NXTPTI   ;GO AND PROCESS NEXT POINT
               *
               *
               *****************************************************
               *                                                   *
               ***   TIMER INTERRUPT ROUTINE FOR PULSE ACCUMULATOR   ***
               *                                                   *
               *****************************************************
               *
               *       PROGRAMMER NOTE: INTERRUPTS MUST BE HELD OFF FOR THE ENTIRE DURATION
               *                        OF THIS ROUTINE. SINCE THIS MAY SLOW DOWN LINE CARD
               *                        COMMUNICATIONS, THIS ROUTINE IS OPTIMIZED FOR SPEED
               *                        WITHOUT CONCERN FOR MEMORY REQUIREMENTS!!
               *
               *
               ***   SAVE THE ENVIRONMENT   ***
               *
0613 1E        TIMPA   LR      J,W              ;SAVE STATUS
0614 58                LR      ACCSAV,A         ;SAVE ACCUM
0615 0A                LR      A,IS             ;GET ISAR
0616 57                LR      ISARSV,A         ;SAVE IT
0617 11                LR      H,DC             ;SAVE DATA COUNTER
               *
               *
               ***   READ CURRENT POINT STATUS   ***
               *
0618 2A 00 89          DCI     PATBL            ;SET DATA COUNTER TO FIRST HARDWARE READ ADDRESS
061B 65                LISU    PADATU           ;ALIGN ISAR TO PA POINT STATUS
061C 6F                LISL    PADATL           ;
061D 16        PA1     LM                       ;GET HARDARE ADDRESS (REMEMBER AUTO INC OF DATA
061E 51                LR      DATSV,A          ;SAVE STUFF
061F 21 F0             NI      H"F0"            ;OUTPUT SELECT, BUT LEAVE TRI-STATE
0621 B1                OUTS    RDATA            ;
0622 41                LR      A,DATSV          ;RECALL CHIP ADDRESS
0623 B1                OUTS    RDATA            ;
0624 A1                INS     RDATA            ;INPUT THE DATA
0625 21 80             NI      H"80"            ;GET RID OF ALL JUNK EXCEPT FOR DATA
               *
               *
               ***   XOR INPUT WITH CURRENT STATE   ***
               *
0627 12                SR      1                ;ALIGN DATA TO COINCIDE WITH MEMORY
0628 12                SR      1                ;
0629 EC                XS      S                ;DO COMPARE
               *
               *
               ***   IS THIS POINT A PULSE ACCUMULATOR   ***
               *
062A 13                SL      1                ;CHECK PA BIT?
062B 81 42             BP      NXTPA            ;IF B., POINT IS A DI, IGNORE
               *
               *
               ***   TEST FOR COS CONDITION   ***
               *
062D 13                SL      1                ;ALIGN FOR TEST
062E 81 56             BP      CLFLG            ;IF B., LOOK FOR ANOTHER PA!
```

```
               *
               ***   SINCE COS HAS OCCURRED, SET THE APPROPRIATE FLAGS   ***
               *
0630 13                  SL      1             ;IS THE LTDF FLAG SET
0631 81 4D               BP      STFLG1        ;IF I JUMP, I BEGIN DEBOUNCE SEQUENCE. SET LTDF
0633 13                  SL      1             ;SKIP THE COS BIT
0634 13                  SL      1             ;IGNORE COS E/D FLAG FOR NOW
0635 13                  SL      1             ;TEST PA EDGE SENSITIVITY
0636 81 0B               BP      EDGE1         ;IF B., ONLY COUNT ON ONE EDGE
               *
               *
               ***   GENERATE A PULSE ON BOTH EDGES   ***
               *
0638 20 20     EDGE2     LI      STINPT        ;CHANGE INPUT STATE
063A EC                  XS      S             ;
063B 21 EF               NI      CLLTDF        ;CLEAR "LAST TIME WAS DIFFERENT" FLAG
063D 5C                  LR      S,A           ;RETURN UPDATED POINT TO MEMORY
063E 62                  LISU    PACNTU        ;ALIGN TO PA COUNT
063F 3E                  DS      D             ;INCREMENT PA COUNT
0640 90 0D               BR      COMCOS        ;
               *
               *
               ***   GENERATE A PULSE ON POSITIVE EDGE ONLY   ***
               *
0642 20 20     EDGE1     LI      STINPT        ;CHANGE INPUT STATE
0644 EC                  XS      S             ;
0645 21 EF               NI      CLLTDF        ;CLEAR "LAST TIME WAS DIFFERENT" FLAG
0647 5C                  LR      S,A           ;RETURN UPDATED STATUS TO MEMORY
0648 13                  SL      1             ;SHOULD I COUNT ON THIS EDGE
0649 13                  SL      1             ;
064A 81 23               BP      NXTPA         ;IF B., DON'T COUNT - ANY MORE PA'S?
064C 62                  LISU    PACNTU        ;POINT TO PA COUNT
064D 3E                  DS      D             ;INCREMENT COUNT AND DECREMENT BUFFER POINTER
               *
               *
               ***   TEST FOR SIGNIFICANT CHANGE OF VALUE   ***
               *
064E 4E        COMCOS    LR      A,D           ;DUMMY DECREMENT - NOW POINTING AT SIGNIFICANT
               *                               ;COV VALUE
064F 3C                  DS      S             ;BUMP IT!
0650 84 06               BZ      LDSCOV        ;IF B., POINT HAS SCOV
0652 4D                  LR      A,I           ;INCREMENT LOWER ISAR TO POINT BACK AT DATA
0653 4D                  LR      A,I           ;ONE MORE TIME!
0654 65                  LISU    PADATU        ;NOW, LOOK AT THE DATA
0655 90 18               BR      NXTPA         ;ANY MORE?
               *
               *
               ***   SCOV OCCURRED - INIT NEW COV COUNT   ***
               *
0657 0A        LDSCOV    LR      A,IS          ;USE ISAR TO POINT TO SCOV COUNT
0658 25 15               CI      SCVPA1        ;AM I POINTING AT PA#1
065A 94 05               BNZ     SCV2          ;
065C 01        SCV1      LR      A,KL          ;GET SCOV FOR PA #1
065D 5C                  LR      S,A           ;STORE COUNT IN PA'S DECREMENTING REGISTER
065E 90 03               BR      SCOVPA        ;
0660 00        SCV2      LR      A,KU          ;
0661 5C                  LR      S,A           ;
               *
               *
               ***   SCOV OCCURRED - UPDATE FLAGS IN DATABASE - SET COS   ***
               *
0662 4D        SCOVPA    LR      A,I           ;INCREMENT LOWER ISAR DIGIT TO POINT TO PA DATA
0663 4D                  LR      A,I           ;DONE!
0664 65                  LISU    PADATU        ;ADJUST ISAR TO POINT TO DATABASE
0665 4C                  LR      A,S           ;GET PA'S STATUS BYTE
0666 15                  SL      4             ;ALIGN TO CHECK COS E/D BIT
0667 13                  SL      1             ;ENABLED FOR COS REPORTING?
0668 81 05               BP      NXTPA         ;IF B., POINT DISABLED, LOOK FOR OTHER PA
066A 4C                  LR      A,S           ;RECALL DATA
066B 22 08               OI      STCOS         ;SET COS FLAG
066D 5C                  LR      S,A           ;RETURN TO MEMORY
               *
               *
               ***   MAKE THE HARDWARE HAPPY   ***
               *
066E A1        NXTPA     INS     RDATA         ;TURN OFF MULTIPLEXORS!
066F 21 70               NI      H"70"         ;
0671 B1                  OUTS    RDATA         ;THIS WILL KEEP THE HARDWARE HAPPY
               *
               *
               ***   ADJUST ISAR TO OTHER PA   ***
               *
```

```
0672 4E                 LR      A,D      ;DECREMENT THE ISAR
0673 0A                 LR      A,IS     ;GET ISAR POINTER
0674 25 2E              CI      PANUM2   ;IS THIS THE OTHER PA?
0676 84 A6              BZ      PA1      ;IF B.,THIS IS THE LAST PA TO TEST
                *
                *
                ***  PA PROCESSING FINISHED - RESTORE ENVIRONMENT   ***
                *
0678 10                 LR      DC,H             ;RESTORE DATA COUNTER
0679 47                 LR      A,ISARSV         ;
067A 0B                 LR      IS,A             ;RESTORE ISAR
067B 48                 LR      A,ACCSAV         ;RESTORE ACCUM
067C 1D                 LR      W,J              ;RESTORE STATUS FLAGS
067D 1B                 EI                       ;ENABLE ALL INTERRUPTS!
067E 1C                 POP                      ;GO ON OUR WAY!!!
                *
                *
                ***  SET LAST TIME WAS DIFFERENT FLAG   ***
                *
067F 4C         STFLG1  LR      A,S      ;GET DATA
0680 22 10              OI      STLTDF   ;SET THE FLAG
0682 5C                 LR      S,A      ;RETURN NEW STATUS TO MEMORY
0683 90 EA              BR      NXTPA    ;GO AND PROCESS NEXT POINT
                *
                *
                ***  CLEAR "LAST TIME WAS DIFFERENT" FLAG   ***
                *
0685 4C         CLFLG   LR      A,S              ;GET STATUS
0686 21 EF              NI      CLLTDF           ;CLEAR "LAST TIME WAS DIFFERENT" FLAG
0688 5C                 LR      S,A              ;RETURN TO MEMORY
0689 90 E4              BR      NXTPA            ;ANY MORE???
                *
                *
                *
                *
                ********************************
                *                              *
                ***        XMIT ROUTINES     ***
                *                              *
                ********************************
                *
                ***  PROCESS COMMAND ERROR TO LINE CARD   ***
                *
068B 20 ED      CMDERR  LI      CMNDER           ;
068D 51                 LR      DATSV,A          ;STUFF "COMMAND ERROR" INTO BUFFER
068E 90 13              BR      ERROR            ;GO AND XMIT
                *
                *
                ***  PROCESS INCORRECT BYTE COUNT ERROR   ***
                *
0690 20 EE      ERRCNT  LI      CNTERR           ;
0692 51                 LR      DATSV,A          ;
0693 90 0E              BR      ERROR            ;
                *
                *
                ***  PROCESS ADDRESSING ERROR   ***
                *
0695 20 E4      ERRADR  LI      ADRERR           ;
0697 51                 LR      DATSV,A          ;
0698 90 09              BR      ERROR            ;
                *
                *
                ***  PROCESS RANGE ERROR   ***
                *
069A 20 E3      RANGERR LI      RNGERR           ;
069C 51                 LR      DATSV,A          ;SAVE FOR XMIT
069D 90 04              BR      ERROR            ;
                *
                *
                ***  PROCESS DATA ERROR   ***
                *
069F 20 E5      ERRDAT  LI      DATERR           ;
06A1 51                 LR      DATSV,A          ;
                *
                *
                ***  ERROR PROCESSING ROUTINE   ***
                *
06A2 63         ERROR   LISU    LCBUFU           ;POINT ISAR TO TOP OF OUTPUT BUFFER
06A3 6F                 LISL    LCBUFL           ;
06A4 20 15              LI      NAK              ;
06A6 5E                 LR      D,A              ;STUFF NAK INTO BUFFER
06A7 41                 LR      A,DATSV          ;GET ERROR CODE
06A8 5C                 LR      S,A              ;STUFF ERROR CODE INTO BUFFER
06A9 90 06              BR      SEND             ;GO DO IT!
```

```
                *
                *
                ***    PPOCESS "ACK" TO LINE CARD    ***
                *
06AB 63         CMDACK  LISU    LCBUFU  ;LOAD ISAR TO POINT TO TOP OF OUTPUT BUFFER
06AC 6F                 LISL    LCBUFL  ;
06AD 20 06              LI      ACK     ;
06AF 5C                 LR      S,A     ;STUFF "ACK" INTO BUFFER
                *
                *
                ***    COMMON XMIT ROUTINE    ***
                *
                * FUNCTION CARD COMMAND PROCESSING ROUTINES COME HERE WHEN THEY ARE DONE
                * TO GET THEIR RESPONSES SENT TO THE LINE CARD.
                * NOTE:  IT IS THE RESPONSIBILITY OF THE COMMAND PROCESSING ROUTINE TO
                *        PUT THE RESPONSE DATA IN THE BUFFER, SET THE BUFFER PTR IN BFPLCU,
                *        PUT THE COUNT OF THE NUMBER OF BYTES TO BE TRANSMITTED (NOT INCLUDING
                *        COUNT BYTE, INCLUDING CKSM) INTO CNTLCU AND ON THE POWERS BUS DATA
                *        PORT, PBUSD, AND INITIALIZE THE CKSM.
                *
                *
06B0 0A         SEND    LR      A,IS            ;GET BUFFER POINTER
06B1 21 07              NI      H"07"           ;LEAVE LOWER OCTAL DIGIT ONLY
06B3 18                 COM                     ;ADJUST TO FIND ABSOLUTE VALUE
06B4 24 0A              AI      D"10"           ;
06B6 50                 LR      CNTMP,A         ;SAVE COUNT
06B7 62                 LISU    BFPLCU          ;INIT BUFFER PTR
06B8 68                 LISL    BFPLCL
06B9 20 1F              LI      LCBUFR
06BB 5C                 LR      S,A
06BC 6B                 LISL    CNTLCL          ;INIT MSG CNT LESS CKSM PLUS COUNT BYTE
06BD 40                 LR      A,CNTMP         ;GET NUMBER OF BYTES TO XMIT
06BE 5E                 LR      D,A
06BF B5                 OUTS    PBUSD           ;PUT MSG CNT INCLUDING CKSM ON BUS
06C0 13                 SL      1               ;ENTER INTO CKSM
06C1 56                 LR      CKSM,A
                *
                *
                *
                ***    WAIT HERE TO MAKE SURE BUS IS TURNED AROUND    ***
                *
06C2 A0         LCXMIT  INS     PBUSC
06C3 EE                 XS      D
06C4 91 07              BM      LCWATF          ;IF M, BUS IS TURNED
06C6 3D                 DS      1               ;TIME OUT?
06C7 94 FA              BNZ     LCXMIT          ;NOT YET
06C9 29 07 06           JMP     LCFAL           ;THUD!
06CC 20 32      LCWATF  LI      LCTO            ;RESET TIMER AS LONG AS WE'RE HERE
06CE 5D                 LR      I,A
06CF 4C                 LR      A,S             ;UPDATE PBUS CTRL, CHANGE DIRECTION OF BUS
06D0 23 E0              XI      LCRDY+FCRDY+PBSDIR
06D2 5C                 LR      S,A
                *
                * ACKNOWLEDGE TURN AROUND AND TELL LC THAT COUNT IS ON THE BUS
                *
                *
06D3 4C         LCXMTL  LR      A,S
06D4 21 7F              NI      LCRDYM
06D6 B0                 OUTS    PBUSC
                *
                *
                * WAIT UNTIL LC GETS THIS BYTE
                *
06D7 A0         LCWATC  INS     PBUSC
06D8 EE                 XS      D               ;LCRDY?
06D9 91 07              BM      LCWATD          ;IF MI, YES
06DB 3D                 DS      1               ;TIMEOUT?
06DC 94 FA              BNZ     LCWATC          ;IF NZ, NOT YET
06DE 29 07 06           JMP     LCFAL           ;ABORT SEND ON TIMEOUT
06E1 20 32      LCWATD  LI      LCTO            ;RESET TO
06E3 5D                 LR      I,A
06E4 4C                 LR      A,S             ;UPDATE CTRL BYTE
06E5 23 C0              XI      LCRDY+FCRDY
06E7 5D                 LR      I,A
                *
                * MSG ALL OUT?
                *
06E8 3E                 DS      D
06E9 91 1C              BM      XMITDN          ;IF MI, CKSM OUT, WE'RE DONE.
06EB 94 05              BNZ     NXTLCX          ;IF NZ, GET NEXT CHAR FROM BUF
                *
                * UPON COUNT GOING TO ZERO, SEND CHECKSUM
                *
06ED 46                 LR      A,CKSM          ;PUT IT ON BUS
06EE B5                 OUTS    PBUSD
```

```
06EF 90 E3             BR     LCXMTL
               *
               * GET NEXT BYTE
               *
06F1 68        NXTLCX  LISL   BFPLCL
06F2 4C                LR     A,S
06F3 0B                LR     IS,A
06F4 4E                LR     A,D
06F5 B5                OUTS   PBUSD            ;PUT NEXT BYTE ON BUS
06F6 E6                XS     CKSM             ;ENTER INTO CKSM
06F7 56                LR     CKSM,A
06F8 C6                AS     CKSM
06F9 19                LNK
06FA 56                LR     CKSM,A
06FB 0A                LR     A,IS             ;UPDATE BUFFER PTR
06FC 8F 03             BR7    ISOVFA           ;XMIT WILL GO ACROSS OCTET BOUNDARIES
06FE 24 F8             AI     -D"10"
0700 62        ISOVFA  LISU   BFPLCU
0701 68                LISL   BFPLCL
0702 5C                LR     S,A
0703 6A                LISL   PBCTLL           ;SET ISAR FOR TOP OF LOOP
0704 90 CE             BR     LCXMTL
               *
               * XMIT IS DONE. DE-SELECT BUS AND RETURN TO WORK
               *
               XMITDN  EQU    *
               LCFAL   EQU    *
0706 20 20             LI     DSELPB
0708 B0                OUTS   PBUSC
0709 70                CLR
070A B5                OUTS   PBUSD
               *
               * RESTORE AND RETURN FROM INTERRUPT
               *
070B 10                LR     DC,H             ;RESTORE DC;
070C 47                LR     A,ISARSV         ;ISAR,
070D 0B                LR     IS,A
070E 48                LR     A,ACCSAV         ;ACCUMULATOR,
070F 1D                LR     W,J              ;AND STATUS
0710 1B                EI                      ;ENABLE INT'S
0711 1C                POP                     ;BAAI
               *
               *
               ***   TIDY THINGS UP!!!   ***
               *
               ROMEND  EQU    *                ;END OF PROGRAM
0712 67        CHKWORD DC     H"67"            ;VALUE FOR ROMCHK TO GO TO ZERO
               *
               *
               END
NUMBER OF ERRORS=  1

ACCSAV=0008 ACK   =0006 ACKLC  00BC ADRERR=00E4 ADRER1 047E ADRSV =0000
BFPLCL=0000 BFPLCU=0002 BSTEAL 054C CAP32 =0024 CHARDI=0001 CHAREQ=00EC
CHARPA=0020 CHKWOR 0712 CHRCMD=0011 CHRDI  0416 CHRDI1 0453 CHRDI2 0455
CHRDI3 0463 CHRDI4 0445 CHRDI5 0422 CHRDO  01A3 CHRDO1 01AB CHRDO2 01B5
CHRDO3 01BB CHRDO4 01CD CHRDO5 01CE CHRD5A 0428 CHRD5B 043C CHRD5C 043E
CHRPA  0470 CHRPLS 01DB CHRSS  01DC CKSERR 00FF CKSM  =0006 CKSMER=00C0
CKSMHI=0000 CKSMLP 057F CKSMLW=0000 CLCOS =00F7 CLFLG  0685 CLFLGS=0077
CLLCF =007E CLLIDF=00EF CLRFLG 05F4 CMDACK 06AB CMDERR 06BB CMDIN  0367
CMDIN1 03E5 CMDIN2 040F CMDOUT 01E0 CMNDER=00FD CNTERR=00EE CNTEST=00C8
CNTLCL=0003 CNTLCU=0002 CNTMP =0000 CNVTB  0059 COMCOS 064E COSCNT=0002
COSDAT=0082 COUNT =00C8 COV    0347 COVACK 03EF COVAK1 03F8 COVCLR 03FA
COVCNT=0081 COVDAT 04D1 COVDI  032E COVDI1 0337 COVDI2 0345 COVN1  04D8
COVN2  04E3 COVN3  04E8 COVSND 0512 CTDWN  003F CVAKCM=0083 CVDTER=00E6
CVERR =00EF CVNABL=0008 CVSND1 0238 DATERR=00E5 DATSV =0001 DCRCOV 04FC
DCRPTR 0350 DCVPTR 0401 DI     05A3 DICAP  04AD DICAP1 04BE DICVN1 033E
DIDSBL=00FB DINBLE=0004 DISBL  03A2 DITBL  0079 DLYCL =0001 DLYCU =0002
DLYLP  0541 DLY1MS=0068 DO     0598 DOCAP  021F DOCAP1 022D DOCTSN 018D
DOCVAK 0197 DOCVDA 01FF DOCVD1 0207 DOCVNT 0176 DOCVN1 017F DOCVN2 0186
DOCVN3 018C DOCV1  01A0 DOERR1 02E1 DOERR2 02E7 DOERR3 02ED DOPLS  02BA
DSELPB=0020 EDGE1  0642 EDGE2  0638 ENBLDI 037A ENBLE  03A6 ENBLER 03AC
ENBL1  0382 ENBL2  038C ENBL3  0392 ENBL4  03A8 ERRADR 0695 ERRCNT 0690
ERRDAT 069F ERROR  06A2 FCCAP  056B FCCAP1 0572 FCCAP2 0578 FCIN   0567
FCOUT  056A FCRDY =0040 FCTYPE 055D FC16   0571 FNDCOV 0481 FNDCV1 0489
FNDCV2 04CF GETID  0130 GETID1 0139 ICP   =0006 IDENDI 013D IDENDO 0143
IDEN32 0147 IDLE   0012 INITDI 05BD INITDO 05A8 INTCT1=00E8 INTCT2=00E9
INTCT3=00EA INTCT4=006A IN16   0148 ISARSV=0007 ISINIT=0004 ISOVFA 0700
LCBUFL=0007 LCBUFR=001F LCBUFU=0003 LCFAL =0706 LCRDY =0080 LCRDYM=007F
LCTO  =0032 LCWATA 00C0 LCWATB 00CA LCWATC 06D7 LCWATD 06E1 LCWATF 06CC
LCXMIT 06C2 LCXMTL 06D3 LDATA =0004 LDSCOV 0657 LMODE =0001 LREAD =0003
LRSET =0000 LWRT  =0001 MASKID=00E0 NAK   =0015 NXTLCX 06F1 NXTPA  066E
NXTPI  0040 NXTPT1 05F6 OUT16  0149 OVRERR=00ED PACCER=00E7 PACNTL=0007
PACNTU=0002 PADATL=0007 PADATU=0005 PANUM2=002E PASCNT=0002 PATBL  0089
```

```
PA1    061D PBCILL=0002 PBCILU=0002 PBINIR=00F0 PBRDCT=0030 PBSDIR=0020
PBUSC =0000 PBUSD =0005 PTOFF  0033 PTS16 =002F PWRUP =0003 RAMBTM=00FF
RAMCHK 0518 RAMCLR 0551 RAMCL1 0552 RAMGD =0533 RAMINI 054E RAMTOP=003F
RAMTST 051A RANGER 069A RCVDON 0153 RCV1   0160 RDATA =0001 RDECRM=000C
RDRAM  00F5 RDRAM1 00FD RDRAM2 0106 READD1 03D4 READD0 023C READ01 0244
READ02 024A READ03 025B READPA 03CE READPT 03AF READP1 0387 READP2 03BD
READP3 03CA RMCKSM=0005 RMODE =0004 RNGERR=00E3 RNGER1 0478 ROMCHK 057A
ROMEND=0712 RPTCMD=0006 SCAN   002B SCANIN 05CC SCNIN  05D1 SCOVPA 0662
SCVPA1=0015 SCV1   065C SCV2   0660 SEN0   06B0 SETCHR=0080 SETCMD=0007
SETCOV 02F3 SETCV1 02FB SETCV2 0304 SETCV3 0317 SETCV4 0320 SETCV5 0327
SETD0  027A SETD0A 01FC SETD01 0262 SETD02 028A SETD03 0295 SETD04 02CB
SETD05 02DE SETER1=00E0 SETER2=00E1 SETER3=00E2 SETFLG 060D SIGCOV=000A
SNDSTS 03D9 START  0000 START1 0003 STCOS =0008 STFLG1 067F STINPT=0020
STLCF =0080 STLTDF=0010 ST16CH=0040 ST32CH=0010 TIMDO  0021 TIMER =0007
TIMPA  0613 TIMST  0020 TLBTM =001F TMTST  0547 UPDATE 05F2 WRTRM  0116
WRTRM1 011E WRTRM2 0127 WRDCMD=0080 WTFCRM=000D XMITDN=0706
S0000
S0000
X7350512000B120207
X803094F63194F5292
X051890FF000000005
S0020
X0D20E9B60A251F912
X03440B1A4C24E8918
X10940D71B10A24E0D
X2A0059BE1618B43CE
X1B4E8FE80A24FB0BD
X251F91E020EBB6623
X3C94C020E9B629052
X7A01112131415161D
X71021222324252628
X72041424344454б4A
X740818283848586B8
X780818283848586BC
X78041424344454640
X74021222324252б2E
X7201112131415161S
X7100000000000000008
S00A0
X1E5B0A5711626820C
X1F5D20325D20F050E
X7065502030B0A55EE
X56C619564C217FB06
XA0EE91073D94FA298
X070620325D4C23C07
X5C30684C0BA55EE63
X56C61956 0A62685C3
X6E3E94E94E217FB0B
X20325C70E6846520C
XC0512906A2402503D
X8404290690бD4C210
XC0840429069F4C0B0
X4C51636F20065E414
X5E705C2906B040252
X048404290690бD4E3
X21C084042906 9F4D9
X514C08415C2906ABD
X308407308404290бA
X904315910713728lD
X0E900513708103lFD
X15636E5D20065C6E2
X2906B0401850250 7C
X810720ED512906A20
X636F4C250C848F258
X0D84AC258084C243F
X15916E290367308 4E
X07308404290690 72D
X52431381023213 81F
X04138102326 36F20B
X065E425C2906B030F
X840730840429069 00
X2906AB4025038 4044
X29069 04E4D5121FE3
X84042906 9FA14C91E
X03210F211E2A00592
X8E24200B252F43912
X05221D900322105 3F
```

X0184027750290bAB9
X4E2581849225B2646
X1725078410258364l
XA72511B4AE250084B
X442906BB29027A40E
X250384042906906 3D
X6F20065E4C21705OF
X4313910C402280SE4
X20FC5E705E4313139
X811713911440211OC
X8404290695402410A
X22805E20FC5E705E9
X4D29068040250284b
X0429069OA14C91036
X210F211E2A0059BE5
X242008AC250094048
X2502E1162280S0217
XE018B473B1401BB49
XA4181412121263bE2
X5D20065C6D705C291
X06B0402503840429A
X069071B1A14E9103D
X210F211F504C21FEA
X84042906 9F4C15133
X1313512A0059408E2
X242008AC250084 3A3
X2503910F411412123
X121F5C41BB5018B49
X901241250084294CF
X2507911B41BB501BA
XB47F5C4021F022808
X18B473B1402280187
XB4A418E1911029061
XAB20E0512906A220A
XE1512906A220E251A
X2906A2402504840 4C
X2906906D4D51A44C2
X9103210F211F24FE5
X5024220B4C131391C
X0720E7512906A2405
X0B24F481042906 9A5
X24EE910429069A41A
X5C625C2906AB3084F
X07308404290690 70B
X52481391023213810
X0513910232440B4CD
X1581064C22805C327
X4E8EE50A24F808256
X1F91ED636F20065EE
X42181F5C29068O4EE
X250AB468258184BE3
X250B840725068438 9
X906C40250384O4294
X06904E405121EE844
X0429069FA44C91038
X210F211F24200B4C8
X21018411412101 4CB
X940521FB900322043
X5C2906AB2902E1407
X250284094290690A41
X4C9103210F211F248
X2008 4C21019404 29D
X02E14C138107 624CD
X181F9006214014127
X12636E5020065C6DE
X0725116 42A9021307
XB40730 640429O6900
X440B70ECB10421772
X5C4E8EF70A24F80B2
X251F91EF2906AB25B
X8264bE29068B4025A
X03840825058404 29E
X06904E4C21B9B4048
X29069F4C134E5181E
X0E402505840720E57
X512906A24C506EA4A
X1C9103210F211E248
X200B252F43910522F
X409003221053411 36
X810A0A24D2911D240
XFE81194C21B9E122A
X915C13910 42906ABA
X0A24DE0B405C625C4

X2906AB29069A2906B
X9540250384042906D
X906F20065E0A566D1
X4D524C21705C6B5C5
X6E4313911132810E7
X4C22805E20FC5E706
X5E0A5643131381202
X13911D3281F84C214
X1084042906954C246
X1022805E20FC5E707
X5E0A5625188444444
X0B70EC81283281254
X130A508107624C184
X1F90064C21201412C
X51460B4024E0CC5EE
X415E705E0A5625187
X841940084E8FD30AB
X24F60B251F91C8426
X2200910720EF51295
X06A2460B4D2906B04
X676F20AA5C2055ECF
X5C20FFEC5C70EE94C
X248FF00A24F892042
X0B90E62A05470E206
XC8B7206AB61620685
X513194FE1A9006413
X250A820429054C67C
X6F705E8FFE0A24F8A
X0825FF94F520E080C
XA0210853159104A4F
X9002A12180676F91D
X026D438104222453B
X0A542A00007055459
X8C55C51955114B25B
X1394F54A250794F0D
X70E594B94315810CD
X131313810F20EBB60
X2900121313138116A
X2905CC2A00210E207
XC8B720E6B6432201E
X531B29001220C8B7A
X20E6B6432201532AC
X06130E1B2A00796F5
X671A165121F0B1418
X81A121801212EC136
X91171381101381265
[illegible]
XA12170B1104E8ED25
X0A24FB0B251F91CA9
X70B129057A4C22109
X5C90E61E580A57112
X2A0089656F165121D
XFDB141B1A1218D125
X12EC138142138156B
X13814D1313138108E
X2020EC21EF5C623E8
X900D2020FC21EF5C5
X13138123623E4E3C0
X84064D4D6590180AB
X25159405015C9003D
X005C4D4D654C15138
X81054C22085CA1219
X70B14E0A252E84A62
X10470B481D181C4CA
X22105C90EA4C21EE7
X5C90E420FD519013D
X20EE51900E20E4515
X900920E351900420A
XE551636F20155E417
X5C9006636F20065C7
X0A210718240A5062A
X68201F5C6B405EB59
X1356A0EE91073D943
XFA29070620325D4CA
X23E05C4C217FB0A02
XEE91073D94FA29075
X0620325D4C23C05D2
X3E911C940546B590D
XE3684C0B4EB5E6568
XC619560A8E0324E88
X62685C6A90CE2020E
XB070B510470B481D3
S1B1C6700000000006
*

What is claimed is:

1. In a system for monitoring and controlling a plurality of control point apparatus which sense environmental, temperature and other parameters and which control equipment which affects the same, the system being of the type which has at least one central control computer means and a plurality of said control point apparatus, a distribution means for receiving and transmitting data signals from and to said central control computer means and from and to said control point apparatus, said distribution means comprising:

means for interfacing at least one function means, each of which interacts with at least one of said control point apparatus operatively associated therewith, said interfacing means processing data signals to and from said function means and processing data signals to and from said central control computer means;

said function means including at least one means for receiving digital input signals from at least one of said control point apparatus, said digital input receiving means having processing means which receives characterizing signals originating from said central control computer means for characterizing the same to operate in one of first and second modes with respect to each associated control point apparatus, said first mode causing the same to receive signal pulses and retain an accumulated total of said pulses, said processing means also being adapted while in said first mode to receive characterizing commands for defining a predetermined accumulated total for each control point apparatus which represents a significant change of value from said control point apparatus, said processing means also being adapted while in said first mode to receive command signals from said central control computer means to characterize the same to provide an output signal for transmission to said central control computer means when said predetermined total is reached, said second mode causing said processing means to receive signal pulses which are indicative of the change of state of an electrical switch contact associated with said associated control point apparatus and provide an output signal for transmission to said central control computer means indicating a change in the state of said switch contact.

2. A distribution means as defined in claim 1 wherein said function means further includes means for transmitting digital output signals to said control point apparatus, said digital output transmitting means having processing means which receives characterizing and command signals originating from said central control computer means, said characterizing signals characterizing the same to operate in one of first and second modes with respect to each associated control point apparatus, each of said modes causing the same to receive command signals for transmission to said associated control point apparatus, said command signals being in the form of signal pulses when said pulsing means is operating in said first mode with respect to an associated control point apparatus, and said command signals being in the form of steady state signal levels when said pulsing means is characterized to operate in said second mode with respect to an associated control point apparatus.

3. A distribution means as defined in claim 1 wherein said function means further includes means for selectively transmitting and receiving pneumatic pressure levels to and from a pneumatically controlled control point apparatus, said pneumatic transmitting and receiving means having processing means which receive characterizing signals originating from said central control computer means for characterizing the same with respect to each associated pneumatically controlled control point apparatus in one of first and second modes, said first mode causing the same to receive a pneumatic pressure level from an associated pneumatically controlled control point apparatus and to transmit a digital electrical signal corresponding thereto to said central control computer means when the said level changes by a predetermined amount when said processing means is enabled with respect to said control point apparatus, said processing means being adapted while in said first mode to receive from said central control computer means characterizing commands for each associated control point apparatus for selectively enabling and disabling the same to transmit a digital electrical signal indicative of said changed level when enabled and to receive and store a digital electrical signal corresponding to said changed level when disabled, said processing means transmitting said digital electrical signal when requested when said processing means for said control point apparatus is disabled, said second mode causing the same to receive command signals originating from said central control computer means for controlling the pressure level in a pneumatic control line to the associated pneumatic controlled control point apparatus.

4. A distribution means as defined in claim 3 wherein said predetermined value is approximately zero.

5. A distribution means as defined in claim 3 wherein said predetermined value is plus or minus approximately 2 to approximately 8 percent of the total range of said pneumatic pressure.

6. A distribution means as defined in claim 1 further including means for receiving analog input signals from at least one of said control point apparatus, said analog input receiving means having processing means which receives characterizing signals with respect to each associated control point apparatus, said characterizing signals originating from said central control computer means for characterizing the same in one of first and second modes, said first mode causing the same to receive an analog input signal from an associated control point apparatus and store a digital signal that is equivalent to said analog input signal and, when said processing means is enabled with respect to an associated control point apparatus, to transmit said digital electrical signal to said central control computer means when the value of said analog input signal has changed relative to a prior analog input signal, said processing means being adapted while in said first mode to receive from said central control computer means characterizing commands for each associated control point apparatus for selectively enabling and disabling the same to transmit said changed value when enabled and to receive and store said value when disabled, said processing means transmitting the digital equivalent of said changed value when requested when said processing means is characterized for said associated control point apparatus as disabled in said first mode, said second mode causing the same to receive an analog input signal from an associated control point apparatus and to store a digital signal that is equivalent to said analog signal and to effect a resulting transmission of a digital signal that is the equivalent of the analog input signal to said central control computer means when the value of said analog input signal has changed beyond a predetermined incremental amount, said processing means being adapted while in said second mode to receive characterizing commands for each associated control point apparatus from said central control computer means for defining said predetermined amount of change for which said transmission is effected.

7. A distribution means as defined in claim 6 wherein said analog input signal is a variable frequency signal.

8. A distribution means as defined in claim 6 wherein said analog input signal is a variable current signal.

9. A distribution means as defined in claim 6 wherein said analog input signal is a variable pneumatic pressure.

10. A distribution means as defined in claim 1 wherein each of said function means has means defining a unique address signal therefor, said interfacing means including processing means which receives address and command data signals from said central control computer means and transmits the same to the particular function means for which the address data signals identifies, said interfacing means having means for defining a unique address signal therefor, and being adapted to receive address and command data signals for commanding the same to interrogate each of said function means to obtain any change of values and change of state from said function means with respect to associated control point apparatus.

11. A distribution means as defined in claim 1 further including an enclosure means and a main printed circuit board having connecting means attached thereto for receiving other printed circuit boards, each of said function means comprising electrical components that are mounted to a printed circuit board that is releasibly connected to said connecting means of said main printed circuit board.

12. A distribution means as defined in claim 11 wherein said interfacing means comprises electrical components that are mounted to a single printed circuit board that is releasibly connected to said connecting means of said main printed circuit board.

13. In a system for monitoring and controlling a plurality of control point apparatus which sense environmental, temperature and other parameters and which control equipment which affects the same, the system being of the type which has at least one central control computer means and a plurality of said control point apparatus, a distribution means for receiving and transmitting data signals from and to said central control computer means and from and to said control point apparatus, said distribution means comprising:

means for interfacing at least one function means, each of which interacts with at least one of said control point apparatus operatively associated therewith, said interfacing means processing data signals to and from said function means and processing data signals to and from said central control computer means;

said function means including at least one means for transmitting digital output signals to said control point apparatus, said digital output transmitting means having processing means which receives characterizing and command signals originating from said central control computer means, said characterizing signals characterizing the same to operate in one of first and second modes with respect to each associated control point apparatus, each of said modes causing the same to receive command signals for transmission to said associated control point apparatus, said command signals being in the form of signal pulses when said pulsing means is operating in said first mode with respect to an associated control point apparatus, and said command signals being in the form of steady state signal levels when said pulsing means is characterized to operate in said second mode with respect to an associated control point apparatus.

14. A distribution means as defined in claim 13 wherein said function means further includes means for receiving digital input signals from at least one of said control point apparatus, said digital input receiving means having processing means which receives characterizing signals originating from said central control computer means for characterizing the same to operate in one of first and second modes with respect to each associated control point apparatus, said first mode causing the same to receive signal pulses and retain an accumulated total of said pulses, said processing means also being adapted while in said first mode to receive characterizing commands for defining a predetermined accumulated total for each control point apparatus which represents a significant change of value from said control point apparatus, said processing means also being adapted while in said first mode to receive command signals from said central control computer means to characterize the same to provide an output signal for transmission to said central control computer means when said predetermined total is reached, said second mode causing said processing means to receive signal pulses which are indicative of the change of state of an electrical switch contact associated with said associated control point apparatus and provide an output signal for transmission to said central control computer means indicating a change in the state of said switch contact.

15. A distribution means as defined in claim 13 wherein said function means further includes means for selectively transmitting and receiving pneumatic pressure levels to and from a pneumatically controlled control point apparatus, said pneumatic transmitting and receiving means having processing means which receive characterizing signals originating from said central control computer means for characterizing the same with respect to each associated pneumatically controlled control point apparatus in one of first and second modes, said first mode causing the same to receive a pneumatic pressure level from an associated pneumatically controlled control point apparatus and to transmit a digital electrical signal corresponding thereto to said central control computer means when the said level changes by a predetermined amount when said processing means is enabled with respect to said control point apparatus, said processing means being adapted while in said first mode to receive from said central control computer means characterizing commands for each associated control point apparatus for selectively enabling and disabling the same to transmit a digital electrical signal indicative of said changed level when enabled and to receive and store a digital electrical signal corresponding to said changed level when disabled, said processing means transmitting said digital electrical signal when requested when said processing means for said control point apparatus is disabled, said second mode causing the same to receive command signals originating from said central control computer means for controlling the pressure level in a pneumatic control line to the associated pneumatic controlled control point apparatus.

16. A distribution means as defined in claim 15 wherein said predetermined value is approximately zero.

17. A distribution means as defined in claim 15 wherein said predetermined value is plus or minus approximately 2 to approximately 8 percent of the total range of said pneumatic pressure.

18. A distribution means as defined in claim 13 further including means for receiving analog input signals from at least one of said control point apparatus, said analog input receiving means having processing means which receives characterizing signals with respect to each associated control point apparatus, said characterizing signals originating from said central control computer means for characterizing the same in one of first and second modes, said first mode causing the same to receive an analog input signal from an associated control point apparatus and store a digital signal that is equivalent to said analog input signal and, when said processing means is enabled with respect to an associated control point apparatus, to transmit said digital electrical signal to said central control computer means when the value of said analog input signal has changed relative to a prior analog input signal, said processing means being adapted while in said first mode to receive from said central control computer means characterizing commands for each associated control point apparatus for selectively enabling and disabling the same to transmit said changed value when enabled and to receive and store said value when disabled, said processing means transmitting the digital equivalent of said changed value when requested when said processing means is characterized for said associated control point apparatus as disabled in said first mode, said second mode causing the same to receive an analog input signal from an associated control point apparatus and to store a digital signal that is equivalent to said analog signal and to effect a resulting transmission of a digtal signal that is the equivalent of the analog input signal to said central control computer means when the value of said analog input signal has changed beyond a predetermined incremental amount, said processing means being adapted while in said second mode to receive characterizing commands for each associated control point apparatus from said central control computer means for defining said predetermined amount of change for which said transmission is effected.

19. A distribution means as defined in claim 18 wherein said analog input signal is a variable frequency signal.

20. A distribution means as defined in claim 18 wherein said analog input signal is a variable current signal.

21. A distribution means as defined in claim 18 wherein said analog input signal is a variable pneumatic pressure.

22. A distribution means as defined in claim 13 wherein each of said function means has means defining a unique address signal therefor, said interfacing means including processing means which receives address and command data signals from said central control computer means and transmits the same to the particular function means for which the address data signals identifies, said interfacing means having means for defining a unique address signal therefor, and being adapted to receive address and command data signals for commanding the same to interrogate each of said function means to obtain any change of values and change of state from said function means with respect to associated control point apparatus.

23. A distribution means as defined in claim 13 further including an enclosure means and a main printed circuit board having connecting means attached thereto for receiving other printed circuit boards, each of said function means comprising electrical components that are mounted to a printed circuit board that is releasibly connected to said connecting means of said main printed circuit board.

24. In a system for monitoring and controlling a plurality of control point apparatus which sense environmental, temperature and other parameters and which control equipment which affects the same, the system being of the type which has at least one central control computer means and a plurality of said control point apparatus, a distribution means for receiving and transmitting data signals from and to said central control computer means and from and to said control point apparatus, said distribution means comprising:

means for interfacing at least one function means, each of which interacts with at least one of said control point apparatus operatively associated therewith, said interfacing means processing data signals to and from said function means and processing data signals to and from said central control computer means;

said function means including at least one means for receiving analog input signals from at least one of said control point apparatus, said analog input receiving means having processing means which receives characterizing signals with respect to each associated control point apparatus, said characterizing signals originating from said central control computer means for characterizing the same in one of first and second modes, said first mode causing the same to receive an analog input signal from an associated control point apparatus and store a digital signal that is equivalent to said analog input signal and, when said processing means is enabled with respect to an associated control point apparatus, to transmit said digital electrical signal to said central control computer means when the value of said analog input signal has changed relative to a prior analog input signal, said processing means being adapted while in said first mode to receive from said central control computer means characterizing commands for each associated control point apparatus for selectively enabling and disabling the same to transmit said changed value when enabled and to receive and store said value when disabled, said processing means transmitting the digital equivalent of said changed value when requested when said processing means is characterized for said associated control point apparatus as disabled in said first mode, said second mode causing the same to receive an analog input signal from an associated control point apparatus and to store a digital signal that is equivalent to said analog signal and to effect a resulting transmission of a digital signal that is the equivalent of the analog input signal to said central control computer means when the value of said analog input signal has changed beyond a predetermined incremental amount, said processing means being adapted while in said second mode to receive characterizing commands for each associated control point apparatus from said central control computer means for defining said predetermined amount of change for which said transmission is effected.

25. A distribution means as defined in claim 24 wherein said analog input signal is a variable frequency signal.

26. A distribution means as defined in claim 24 wherein said analog input signal is a variable current signal.

27. A distribution means as defined in claim 24 wherein said analog input signal is a variable pneumatic pressure.

28. A distribution means as defined in claim 24 wherein said function means further includes means for transmitting digital output signals to said control point apparatus, said digital output transmitting means having processing means which receives characterizing and command signals originating from said central control computer means, said characterizing signals characterizing the same to operate in one of first and second modes with respect to each associated control point apparatus, each of said modes causing the same to receive command signals for transmission to said associated control point apparatus, said command signals being in the form of signal pulses when said pulsing means is operating in said first mode with respect to an associated control point apparatus, and said command signals being in the form of steady state signal levels when said pulsing means is characterized to operate in said second mode with respect to an associated control point apparatus.

29. A distribution means as defined in claim 24 wherein said function means further includes means for receiving digital input signals from at least one of said control point apparatus, said digital input receiving means having processing means which receives characterizing signals originating from said central control computer means for characterizing the same to operate in one of first and second modes with respect to each associated control point apparatus, said first mode causing the same to receive signal pulses and retain an accumulated total of said pulses, said processing means also being adapted while in said first mode to receive characterizing commands for defining a predetermined accumulated total for each control point apparatus which represents a significant change of value from said control point apparatus, said processing means also being adapted while in said first mode to receive command signals from said central control computer means to characterize the same to provide an output signal for transmission to said central control computer means when said predetermined total is reached, said second mode causing said processing means to receive signal pulses which are indicative of the change of state of an electrical switch contact associated with said associated control point apparatus and provide an output signal for transmission of said central control computer means indicating a change in the state of said switch contact.

30. A distribution means as defined in claim 24 wherein said function means further includes means for selectively transmitting and receiving pneumatic pressure levels to and from a pneumatically controlled control point apparatus, said pneumatic transmitting and receiving means having processing means which receive characterizing signals originating from said central control computer means for characterizing the same with respect to each associated pneumatically controlled control point apparatus in one of first and second modes, said first mode causing the same to receive a pneumatic pressure level from an associated pneumatically controlled control point apparatus and to transmit a digital electrical signal corresponding thereto to said central control computer means when the said level changes by a predetermined amount when said processing means is enabled with respect to said control point apparatus, said processing means being adapted while in said first mode to receive from said central control computer means characterizing commands for each associated control point apparatus for selectively enabling and disabling the same to transmit a digital electrical signal indicative of said changed level when enabled and to receive and store a digital electrical signal corresponding to said changed level when disabled, said processing means transmitting said digital electrical signal when requested when said processing means for said control point apparatus is disabled, said second mode causing the same to receive command signals originating from said central control computer means for controlling the pressure level in a pneumatic control line to the associated pneumatic controlled control point apparatus.

31. A distribution means as defined in claim 30 wherein said predetermined value is approximately zero.

32. A distribution means as defined in claim 30 wherein said predetermined value is plus or minus approximately 2 to approximately 8 percent of the total range of said pneumatic pressure.

33. A distribution means as defined in claim 24 wherein each of said function means has means defining a unique address signal therefor, said interfacing means including processing means which receives address and command data signals from said central control computer means and transmits the same to the particular function means for which the address data signals identifies, said interfacing means having means for defining a unique address signal therefor, and being adapted to receive address and command data signals for commanding the same to interrogate each of said function means to obtain any change of values and change of state from said function means with respect to associated control point apparatus.

34. A distribution means as defined in claim 24 further including an enclosure means and a main printed circuit board having connecting means attached thereto for receiving other printed circuit boards, each of said function means comprising electrical components that are mounted to a printed circuit board that is releasibly connected to said connecting means of said main printed circuit board.

35. In a system for monitoring and controlling a plurality of control point apparatus which sense environmental, temperature and other parameters and which control equipment which affects the same, the system being of the type which has at least one central control computer means and a plurality of said control point apparatus, a distribution means for receiving and transmitting data signals from and to said central control computer means and from and to said control point apparatus, said distribution means comprising:

means for interfacing at least one function means, each of which interacts with at least one of said control point apparatus operatively associated therewith, said interfacing means processing data signals to and from said function means and processing data signals to and from said central control computer means;

said function means including at least one means for selectively transmitting and receiving pneumatic pressure levels to and from a pneumatically controlled control point apparatus, said pneumatic transmitting and receiving means having processing means which receive characterizing signals originating from said central control computer means for characterizing the same with respect to each associated pneumatically controlled control point apparatus in one of first and second modes, said first mode causing the same to receive a pneumatic pressure level from an associated pneumatically controlled control point apparatus and to transmit a digital electrical signal corresponding thereto to said central control computer means when the said level changes by a predetermined amount when said processing means is enabled with respect to said control point apparatus, said processing means being adapted while in said first mode to receive from said central control computer means characterizing commands for each associated control point apparatus for selectively enabling and disabling the same to transmit a digital electrical signal indicative of said changed level when enabled and to receive and store a digital electrical signal corresponding to said changed level when disabled, said processing means transmitting said digital electrical signal when requested when said processing means for said control point apparatus is disabled, said second mode causing the same to receive command signals originating from said central control computer means for controlling the pressure level in a pneumatic control line to the associated pneumatic controlled control point apparatus.

36. A distribution means as defined in claim 35 wherein said predetermined value is approximately zero.

37. A distribution means as defined in claim 35 wherein said predetermined value is plus or minus approximately 2 to approximately 8 percent of the total range of said pneumatic pressure.

38. A distribution means as defined in claim 35 wherein said function means further includes means for transmitting digital output signals to said control point apparatus, said digital output transmitting means having processing means which receives characterizing and command signals originating from said central control computer means, said characterizing signals characterizing the same to operate in one of first and second modes with respect to each associated control point apparatus, each of said modes causing the same to receive command signals for transmission to said associated control point apparatus, said command signals being in the form of signal pulses when said pulsing means is operating in said first mode with respect to an associated control point apparatus, and said command signals being in the form of steady state signal levels when said pulsing means is characterized to operate in said second mode with respect to an associated control point apparatus.

39. A distribution means as defined in claim 35 wherein said function means further includes means for receiving digital input signals from at least one of said control point apparatus, said digital input receiving means having processing means which receives characterizing signals originating from said central control computer means for characterizing the same to operate in one of first and second modes with respect to each associated control point apparatus, said first mode causing the same to receive signal pulses and retain an accumulated total of said pulses, said processing means also being adapted while in said first mode to receive characterizing commands for defining a predetermined accumulated total for each control point apparatus which represents a significant change of value from said control point apparatus, said processing means also being adapted while in said first mode to receive command signals from said central control computer means to characterize the same to provide an output signal for transmission to said central control computer means when said predetermined total is reached, said second mode causing said processing means to receive signal pulses which are indicative of the change of state of an electrical switch contact associated with said associated control point apparatus and provide an output signal for transmission to said central control computer means indicating a change in the state of said switch contact.

40. A distribution means as defined in claim 35 further including means for receiving analog input signals from at least one of said control point apparatus, said analog input receiving means having processing means which receives characterizing signals with respect to each associated control point apparatus, said characterizing signals originating from said central control computer means for characterizing the same in one of first and second modes, said first mode causing the same to receive an analog input signal from an associated control point apparatus and store a digital signal that is equivalent to said analog input signal and, when said processing means is enabled with respect to an associated control point apparatus, to transmit said digital electrical signal to said central control computer means when the value of said analog input signal has changed relative to a prior analog input signal, said processing means being adapted while in said first mode to receive from said central control computer means characterizing commands for each associated control point apparatus for selectively enabling and disabling the same to transmit said changed value when enabled and to receive and store said value when disabled, said processing means transmitting the digital equivalent of said changed value when requested when said processing means is characterized for said associated control point apparatus as disabled in said first mode, said second mode causing the same to receive an analog input signal from an associated control point apparatus and to store a digital signal that is equivalent to said analog signal and to effect a resulting transmission of a digital signal that is the equivalent of the analog input signal to said central control computer means when the value of said analog input signal has changed beyond a predetermined incremental amount, said processing means being adapted while in said second mode to receive characterizing commands for each associated control point apparatus from said central control computer means for defining said predetermined amount of change for which said transmission is effected.

41. A distribution means as defined in claim 40 wherein said analog input signal is a variable frequency signal.

42. A distribution means as defined in claim 40 wherein said analog input signal is a variable current signal.

43. A distribution means as defined in claim 40 wherein said analog input signal is a variable pneumatic pressure.

44. A distribution means as defined in claim 35 wherein each of said function means has means defining a unique address signal therefor, said interfacing means including processing means which receives address and command data signals from said central control computer means and transmits the same to the particular function means for which the address data signals identifies, said interfacing means having means for defining a unique address signal therefor, and being adapted to receive address and command data signals for commanding the same to interrogate each of said function means to obtain any change of values and change of state from said function means with respect to associated control point apparatus.

45. A distribution means as defined in claim 35 further including an enclosure means and a main printed circuit board having connecting means attached thereto for receiving other printed circuit boards, each of said function means comprising electrical components that are mounted to a printed circuit board that is releasibly connected to said connecting means of said main printed circuit board.

* * * * *